(12) United States Patent
Wan et al.

(10) Patent No.: US 12,527,838 B2
(45) Date of Patent: *Jan. 20, 2026

(54) COMBINATION THERAPIES COMPRISING AN AGENT THAT BLOCKS THE INTERACTION BETWEEN CD47 AND SIRPα FOR TREATING GASTRIC OR GASTROESPHAGEAL JUNCTION CANCEL

(71) Applicant: ALX Oncology Inc., South San Francisco, CA (US)

(72) Inventors: Hong Wan, Foster City, CA (US); Bang Janet Sim, South San Francisco, CA (US); Sophia Randolph, Chico, CA (US); Jaume Pons, San Francisco, CA (US); Tracy Chia-Chien Kuo, San Carlos, CA (US)

(73) Assignee: ALX ONCOLOGY INC., South San Francisco, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/154,380

(22) Filed: Jan. 13, 2023

(65) Prior Publication Data
US 2023/0218719 A1 Jul. 13, 2023

Related U.S. Application Data

(62) Division of application No. 17/105,353, filed on Nov. 25, 2020, now abandoned.

(60) Provisional application No. 63/109,044, filed on Nov. 3, 2020, provisional application No. 63/106,225, filed on Oct. 27, 2020, provisional application No. 63/030,686, filed on May 27, 2020, provisional application No. 63/022,998, filed on May 11, 2020, provisional application No. 62/941,390, filed on Nov. 27, 2019.

(51) Int. Cl.
| | | |
|---|---|---|
| A61K 38/17 | (2006.01) | |
| A61K 31/17 | (2006.01) | |
| A61K 31/282 | (2006.01) | |
| A61K 31/337 | (2006.01) | |
| A61K 31/513 | (2006.01) | |
| A61K 31/517 | (2006.01) | |
| A61K 31/519 | (2006.01) | |
| A61K 31/52 | (2006.01) | |
| A61K 31/7068 | (2006.01) | |
| A61K 31/7072 | (2006.01) | |
| A61K 31/7076 | (2006.01) | |
| A61K 33/243 | (2019.01) | |
| A61K 35/00 | (2006.01) | |
| A61K 39/00 | (2006.01) | |
| A61K 39/395 | (2006.01) | |
| A61P 35/00 | (2006.01) | |

(52) U.S. Cl.
CPC .......... *A61K 38/1774* (2013.01); *A61K 31/17* (2013.01); *A61K 31/282* (2013.01); *A61K 31/337* (2013.01); *A61K 31/513* (2013.01); *A61K 31/517* (2013.01); *A61K 31/519* (2013.01); *A61K 31/52* (2013.01); *A61K 31/7068* (2013.01); *A61K 31/7072* (2013.01); *A61K 31/7076* (2013.01); *A61K 33/243* (2019.01); *A61K 39/3955* (2013.01); *A61P 35/00* (2018.01)

(58) Field of Classification Search
None
See application file for complete search history.

(56) References Cited

U.S. PATENT DOCUMENTS

| | | |
|---|---|---|
| 3,773,919 A | 11/1973 | Boswell et al. |
| 5,116,964 A | 5/1992 | Capon et al. |
| 5,306,809 A | 4/1994 | Boon et al. |
| 5,478,925 A | 12/1995 | Wallach et al. |
| 5,505,931 A | 4/1996 | Pribish |
| 5,648,237 A | 7/1997 | Carter |
| 5,697,901 A | 12/1997 | Eriksson |
| 5,972,707 A | 10/1999 | Roy et al. |
| 6,174,529 B1 | 1/2001 | Michael et al. |
| 6,261,554 B1 | 7/2001 | Valerio et al. |
| 6,541,615 B1 | 4/2003 | Ullrich et al. |
| 6,591,129 B1 | 7/2003 | Ben-Haim et al. |
| 6,613,332 B1 | 9/2003 | Michael et al. |
| 7,402,155 B2 | 7/2008 | Palasis et al. |
| 7,514,229 B2 | 4/2009 | Jamieson et al. |
| 7,662,367 B2 | 2/2010 | Desjarlais et al. |
| 7,691,970 B2 | 4/2010 | Skerra et al. |
| 7,892,558 B2 | 2/2011 | Zagury |

(Continued)

FOREIGN PATENT DOCUMENTS

| | | |
|---|---|---|
| CA | 3063099 A1 | 12/2018 |
| CN | 102257001 A | 11/2011 |

(Continued)

OTHER PUBLICATIONS

Kauder et al (PLoS ONE, 2018, 13(8) e0201832, internet pp. 1-33).*

(Continued)

*Primary Examiner* — Laura B Goddard
(74) *Attorney, Agent, or Firm* — MORRISON & FOERSTER LLP

(57) ABSTRACT

Provided are methods of treating cancer that comprise administering a polypeptide (e.g. a fusion polypeptide) that comprises a SIRPα D1 domain variant and an Fc domain variant in combination with at least one chemotherapy agent and/or at least one therapeutic antibody. Also provided are related kits.

13 Claims, 13 Drawing Sheets
Specification includes a Sequence Listing.

(56) References Cited

U.S. PATENT DOCUMENTS

| | | |
|---|---|---|
| 8,216,805 B2 | 7/2012 | Carter et al. |
| 8,377,448 B2 | 2/2013 | Smith et al. |
| 8,399,219 B2 | 3/2013 | Stagliano et al. |
| 8,518,404 B2 | 8/2013 | Daugherty et al. |
| 8,518,869 B2 | 8/2013 | Hallström et al. |
| 8,529,898 B2 | 9/2013 | Daugherty et al. |
| 8,541,203 B2 | 9/2013 | Daugherty et al. |
| 8,562,997 B2 | 10/2013 | Jaiswal et al. |
| 8,603,778 B2 | 12/2013 | Heavner et al. |
| 8,613,922 B2 | 12/2013 | Clemmons et al. |
| 8,728,476 B2 | 5/2014 | Van Den Berg |
| 8,748,399 B2 | 6/2014 | Bedzyk et al. |
| 8,993,266 B2 | 3/2015 | Stagliano et al. |
| 9,017,675 B2 | 4/2015 | Liu et al. |
| 9,169,321 B2 | 10/2015 | Daugherty et al. |
| 9,352,037 B2 | 5/2016 | Van Den Berg |
| 9,382,320 B2 | 7/2016 | Liu et al. |
| 9,394,365 B1 | 7/2016 | Eisenbach-Schwartz et al. |
| 9,475,882 B2 | 10/2016 | Clemmons et al. |
| 9,512,225 B2 | 12/2016 | Eisenbach-Schwartz et al. |
| 9,512,227 B2 | 12/2016 | Eisenbach-Schwartz et al. |
| 9,534,052 B2 | 1/2017 | Eisenbach-Schwartz et al. |
| 9,546,206 B2 | 1/2017 | Ring et al. |
| 9,562,087 B2 | 2/2017 | Ring et al. |
| 9,845,345 B2 | 12/2017 | Ring et al. |
| 9,944,911 B2 | 4/2018 | Ring et al. |
| 10,179,171 B2 | 1/2019 | Govindan et al. |
| 10,259,859 B2 | 4/2019 | Pons et al. |
| 10,406,179 B2 | 9/2019 | Shizuru et al. |
| 10,696,730 B2 | 6/2020 | Pons et al. |
| 10,894,831 B2 | 1/2021 | Schnorr et al. |
| 10,907,209 B2 | 2/2021 | Wang et al. |
| 11,208,459 B2 | 12/2021 | Pons et al. |
| 11,208,481 B2 | 12/2021 | Ring et al. |
| 11,419,897 B2 | 8/2022 | Shizuru et al. |
| 11,608,377 B2 | 3/2023 | Schnorr et al. |
| 11,613,564 B2 | 3/2023 | Pons et al. |
| 11,639,376 B2 | 5/2023 | Pons et al. |
| 12,098,214 B2 | 9/2024 | Wan et al. |
| 12,195,532 B2 | 1/2025 | Ring et al. |
| 2004/0213792 A1 | 10/2004 | Clemmons et al. |
| 2007/0148201 A1 | 6/2007 | Skerra et al. |
| 2008/0160013 A1 | 7/2008 | Clemmons et al. |
| 2009/0068195 A1 | 3/2009 | Vugmeyster et al. |
| 2010/0189651 A1 | 7/2010 | Stagliano et al. |
| 2010/0215640 A1 | 8/2010 | Clemmons et al. |
| 2010/0239578 A1 | 9/2010 | Danska et al. |
| 2010/0239579 A1 | 9/2010 | Smith et al. |
| 2011/0081345 A1 | 4/2011 | Moore et al. |
| 2011/0110938 A1 | 5/2011 | Chiu et al. |
| 2011/0184145 A1 | 7/2011 | Silence et al. |
| 2011/0237498 A1 | 9/2011 | Raymond et al. |
| 2012/0189625 A1 | 7/2012 | Wang et al. |
| 2012/0283408 A1 | 11/2012 | Lee et al. |
| 2013/0011401 A1 | 1/2013 | Huber et al. |
| 2014/0010810 A1 | 1/2014 | West et al. |
| 2014/0023664 A1 | 1/2014 | Lowman et al. |
| 2014/0024111 A1 | 1/2014 | Kannan et al. |
| 2014/0051634 A1 | 2/2014 | Hallström et al. |
| 2014/0113348 A1 | 4/2014 | Williams et al. |
| 2014/0140926 A1 | 5/2014 | Discher et al. |
| 2014/0161800 A1 | 6/2014 | Blankenship et al. |
| 2014/0193408 A1 | 7/2014 | Huber et al. |
| 2014/0242095 A1 | 8/2014 | Wang et al. |
| 2015/0071905 A1 | 3/2015 | Ring et al. |
| 2015/0203559 A1 | 7/2015 | Stagliano et al. |
| 2015/0329616 A1 | 11/2015 | Uger et al. |
| 2015/0353642 A1 | 12/2015 | Tykocinski |
| 2015/0376288 A1 | 12/2015 | Weiskopf et al. |
| 2016/0000909 A1 | 1/2016 | Eisenbach-Schwartz et al. |
| 2016/0008429 A1 | 1/2016 | Willingham et al. |
| 2016/0008463 A1 | 1/2016 | Eisenbach-Schwartz et al. |
| 2016/0045532 A1 | 2/2016 | Roberts et al. |
| 2016/0069898 A1 | 3/2016 | Weiskopf et al. |
| 2016/0144009 A1 | 5/2016 | Tseng et al. |
| 2016/0152715 A1 | 6/2016 | Wong et al. |
| 2016/0177276 A1 | 6/2016 | Lo et al. |
| 2016/0186150 A1 | 6/2016 | Deming et al. |
| 2016/0193295 A1 | 7/2016 | Kannan et al. |
| 2016/0194406 A1 | 7/2016 | Leeper et al. |
| 2016/0244522 A1 | 8/2016 | Van Den Berg |
| 2016/0297866 A1 | 10/2016 | Clemmons et al. |
| 2016/0304609 A1 | 10/2016 | Liu et al. |
| 2017/0029508 A1 | 2/2017 | Eisenbach-Schwartz et al. |
| 2017/0044258 A1 | 2/2017 | Van Den Berg |
| 2017/0107270 A1* | 4/2017 | Pons ................. A61P 19/02 |
| 2017/0281791 A1 | 10/2017 | Govindan et al. |
| 2017/0285037 A1 | 10/2017 | Kulangara et al. |
| 2018/0037652 A1 | 2/2018 | Liu et al. |
| 2018/0105600 A1 | 4/2018 | Pons et al. |
| 2018/0141986 A1 | 5/2018 | Tian et al. |
| 2018/0155405 A1 | 6/2018 | Ring et al. |
| 2018/0195054 A1 | 7/2018 | Ring et al. |
| 2018/0312563 A1 | 11/2018 | Uger et al. |
| 2018/0312587 A1 | 11/2018 | Van Eenennaam et al. |
| 2018/0371435 A1 | 12/2018 | Deming et al. |
| 2019/0093174 A1 | 3/2019 | Wang et al. |
| 2019/0169266 A1 | 6/2019 | Pons et al. |
| 2019/0248915 A1 | 8/2019 | Chao et al. |
| 2020/0239543 A1 | 7/2020 | Pons et al. |
| 2020/0263154 A1 | 8/2020 | Deming et al. |
| 2020/0392199 A1 | 12/2020 | Pons et al. |
| 2020/0400662 A1 | 12/2020 | Wan et al. |
| 2021/0070838 A1 | 3/2021 | Pons et al. |
| 2021/0154269 A1 | 5/2021 | Wan et al. |
| 2021/0388329 A1 | 12/2021 | Deming et al. |
| 2022/0064293 A1 | 3/2022 | Ring et al. |
| 2022/0196651 A1 | 6/2022 | Pons et al. |
| 2022/0213166 A1 | 7/2022 | Pons et al. |
| 2022/0242928 A1 | 8/2022 | Pons et al. |
| 2022/0363779 A1 | 11/2022 | Wan et al. |
| 2022/0401516 A1 | 12/2022 | Pons et al. |
| 2023/0218719 A1 | 7/2023 | Wan et al. |
| 2023/0340433 A1 | 10/2023 | Deming et al. |
| 2024/0010701 A1 | 1/2024 | Pons et al. |
| 2024/0075101 A1 | 3/2024 | Wan et al. |
| 2024/0132567 A1 | 4/2024 | Pons et al. |
| 2024/0228574 A9 | 7/2024 | Pons et al. |
| 2024/0343778 A1 | 10/2024 | Pons et al. |
| 2025/0011737 A1 | 1/2025 | Deming et al. |

FOREIGN PATENT DOCUMENTS

| | | |
|---|---|---|
| CN | 102596233 A | 7/2012 |
| CN | 102939303 A | 2/2013 |
| CN | 103635490 A | 3/2014 |
| CN | 104812413 A | 7/2015 |
| CN | 107252476 A | 10/2017 |
| CN | 108350048 A | 7/2018 |
| CO | 20180002471 A2 | 5/2018 |
| EA | 15538 B1 | 8/2011 |
| EP | 2429574 B1 | 5/2015 |
| EP | 3128005 A1 | 2/2017 |
| EP | 3287470 A1 | 2/2018 |
| JP | 2011500005 A | 1/2011 |
| JP | 2012533631 A | 12/2012 |
| JP | 2013541542 A | 11/2013 |
| JP | 2015504899 A | 2/2015 |
| JP | 2018525382 A | 9/2018 |
| KR | 2011-0112299 A | 10/2011 |
| WO | WO-1993000077 A1 | 1/1993 |
| WO | WO-1999040940 A1 | 8/1999 |
| WO | WO-2000077026 A1 | 12/2000 |
| WO | WO-2001048020 A1 | 7/2001 |
| WO | WO-2003031650 A2 | 4/2003 |
| WO | WO-2003095618 A2 | 11/2003 |
| WO | WO-2004011618 A2 | 2/2004 |
| WO | WO-2004096133 A2 | 11/2004 |
| WO | WO-2005108415 A2 | 11/2005 |
| WO | WO-2007084344 A2 | 7/2007 |
| WO | WO-2009046541 A1 | 4/2009 |
| WO | WO-2009091601 A1 | 7/2009 |
| WO | WO-2009131453 A1 | 10/2009 |
| WO | WO-2010070047 A1 | 6/2010 |

(56) References Cited

FOREIGN PATENT DOCUMENTS

| | | |
|---|---|---|
| WO | WO-2010096838 A2 | 8/2010 |
| WO | WO-2010130053 A1 | 11/2010 |
| WO | WO-2011011315 A1 | 1/2011 |
| WO | WO-2011066501 A1 | 6/2011 |
| WO | WO-2011076781 A1 | 6/2011 |
| WO | WO-2011143624 A2 | 11/2011 |
| WO | WO-2012048332 A2 | 4/2012 |
| WO | WO-2012130831 A1 | 10/2012 |
| WO | WO-2012142515 A2 | 10/2012 |
| WO | WO-2012172521 A1 | 12/2012 |
| WO | WO-2013032948 A1 | 3/2013 |
| WO | WO-2013063076 A1 | 5/2013 |
| WO | WO-2013109752 A1 | 7/2013 |
| WO | WO-2014045022 A2 | 3/2014 |
| WO | WO-2014094122 A1 | 6/2014 |
| WO | WO-2014121093 A1 | 8/2014 |
| WO | WO-2014124028 A1 | 8/2014 |
| WO | WO-2014149477 A1 | 9/2014 |
| WO | WO-2014160183 A1 | 10/2014 |
| WO | WO-2014179132 A1 | 11/2014 |
| WO | WO-2014186761 A2 | 11/2014 |
| WO | WO-2015041987 A1 | 3/2015 |
| WO | WO-2015042557 A1 | 3/2015 |
| WO | WO-2015048329 A2 | 4/2015 |
| WO | WO-2015057834 A1 | 4/2015 |
| WO | WO-2015116933 A2 | 8/2015 |
| WO | WO-2015136541 A2 | 9/2015 |
| WO | WO-2016022971 A1 | 2/2016 |
| WO | WO-2016022994 A2 | 2/2016 |
| WO | WO-2016023001 A1 | 2/2016 |
| WO | WO-2016023040 A1 | 2/2016 |
| WO | WO-2016024021 A1 | 2/2016 |
| WO | WO-2016033201 A1 | 3/2016 |
| WO | WO-2016044021 A1 | 3/2016 |
| WO | WO-2016057980 A1 | 4/2016 |
| WO | WO-2016063233 A1 | 4/2016 |
| WO | WO-2016065329 A1 | 4/2016 |
| WO | WO-2016081423 A1 | 5/2016 |
| WO | WO-2016138306 A1 | 9/2016 |
| WO | WO-2016169261 A1 | 10/2016 |
| WO | WO-2016187226 A1 | 11/2016 |
| WO | WO-2017009829 A1 | 1/2017 |
| WO | WO-2017027422 A1 | 2/2017 |
| WO | WO-2017068164 A1 | 4/2017 |
| WO | WO-2017177333 A1 | 10/2017 |
| WO | WO-2017178653 A2 | 10/2017 |
| WO | WO-2018057669 A1 | 3/2018 |
| WO | WO-2018068028 A1 | 4/2018 |
| WO | WO-2018081897 A1 | 5/2018 |
| WO | WO-2018081898 A1 | 5/2018 |
| WO | WO-2018107058 A1 | 6/2018 |
| WO | WO-2018149938 A1 | 8/2018 |
| WO | WO-2018176132 A1 | 10/2018 |
| WO | WO-2018210795 A1 | 11/2018 |
| WO | WO-2019023347 A1 | 1/2019 |
| WO | WO-2020047326 A2 | 3/2020 |
| WO | WO-2020243338 A1 | 12/2020 |
| WO | WO-2020247820 A1 | 12/2020 |
| WO | WO-2021108693 A1 | 6/2021 |
| WO | WO-2021247430 A1 | 12/2021 |
| WO | WO-2022010806 A1 | 1/2022 |
| WO | WO-2022120286 A1 | 6/2022 |
| WO | WO-2022241157 A1 | 11/2022 |
| WO | WO-2023235754 A1 | 12/2023 |

OTHER PUBLICATIONS

Lakhani et al (Jun. 15, 2018; ASCO Poster, abstract 3068; including pages with expanded view of poster).*
Chow et al (Journal of Clinical Oncology, May 26, 2019; 37, No. 15_suppl, abstract 2514).*
De Vita et al (Future Oncology, 2019, 15:2723-2731; published online Jun. 25, 2019).*
Shitara et al (2025. Final analysis of the randomized phase 2 part of the ASPEN-06 study: a phase ⅔ study of evorpacept (ALX148), a CD47 myeloid checkpoint inhibitor, in patients with HER2-overexpressing gastric/gastroesophageal cancer (GC). Journal of Clinical Oncology, 43, abstract 332).*
Abrahao-Machado et al. (2016). "HER2 testing in gastric cancer: an update," World J. Gastroenterol. 22(19):4619-4625.
Anonymous (2019). "A Phase 1 Dose Escalation Trial of Intratumoral Injections of TTI-621 in Subjects With Relapsed and Refractory Percutaneously-Accessible Solid Tumors and Mycosis Fungoide," clinical trials.gov, pp. 1-5, Retrieved Jan. 25, 2021 <https://clinicaltrials.gov/ct2/history/NCT02890368?V_13=View#StudyPageTop>.
Anonymous (2019). "A Phase 1a/1b Dose Escalation and Expansion Trial of TTI-621, a Novel Biologic Targeting CD47, in Subjects With Relapsed or Refractory Hematologic Malignancies and Selected Solid Tumors," clinical trials.gov, pp. 1-7, Retrieved Jan. 25, 2021 <https://clinicaltrials.gov/ct2/history/NCT02663518?V_21=View#StudyPageTop>.
Anonymous (2019). "A Phase 1a/1b Dose Escalation and Expansion Trial of TTI-622 in Patients With Advanced Relapsed or Refractory Lymphoma or Myeloma," clinical trials.gov, pp. 1-4, Retrieved Jan. 25, 2021 <https://clinicaltrials.gov/ct2/history/NCT03530683?V_10=View#StudyPageTop>.
Anonymous (2021). "ASPEN-01: a Phase 1 study of ALX148, a CD47 blocker, in combination with trastuzumab, ramucirumab, and paclitaxel in patients with 2nd line HER2-positive advanced gastric or gastroesophageal cancer", Retrieved Jul. 12, 2022 from <https://ir.alxoncology.com/static-files/16e6c9e0-e0fa-425d-a5b8-b6fd00431c74>, 22 pages.
Anonymous (2023). "A Study of Evorpacept (ALX148) in Patients With Advanced HER2+ GastricCancer (ASPEN-06)," clinical trials.gov, pp. 1 to 11, Retrieved Mar. 19, 2024 from <https://www.clinicaltrials.gov/study/NCT05002127#study-plan>.
Anonymous (2023). "ALX Oncology Reports Positive Interim Phase 2 ASPEN-06 Clinical Trial Results of Evorpacept for the Treatment of Advanced HER2-Positive Gastric Cancer" 2 pages.
Ansell et al. (2017). "TTI-621 (SIRPαFc), an Immune Checkpoint Inhibitor Blocking the CD47 "Do Not Eat" Signal, Induces Objective Responses in Patients with Advanced, Relapsed/Refractory Diffuse Large B-Cell Lymphoma (DLBCL)," Blood, 130 (Supplement 1): 4116, Abstract.
Ayyappan et al. (2018) "Marginal Zone Lymphoma: Clinicopathologic Variations and Approaches to Therapy," Curr Oncol Rep. 20(4):687, 11 pages.
Balsas et al. (2017) "SOX11 promotes tumor protective microenvironment interactions through CXCR4 and FAK regulation in mantle cell lymphoma," Blood, 130(4):501-513.
Barclay et al. (Jun. 2006). "The SIRP family of receptors and immune regulation," Nat. Rev. Immunol. 6(6):457-464.
Borrok et al. (epub Jul. 10, 2012). "Revisiting the role of glycosylation in the structure of human IgG Fc." ACS Chemical Biology 7(9):1596-1602.
Brown et al. (2001). "Integrin-associated protein (CD47) and its ligands," Trends Cell Biol., 11(3):130-5.
CDC (2020). "United States Cancer Statistics (USCS)," retrieved Sep. 8, 2020 from <https://www.cdc.gov/cancer/uscs/>, 2 pages.
Cheson et al. (2014) "Recommendations for Initial Evaluation, Staging and Response Assessment of Hodgkin and Non-Hodgkin Lymphoma: The Lugano Classification." J. Clin Oncol. 32:3059-3067.
Chow et al. (2019). "A phase I study of ALX148, a CD47 blocker, in combination with established anticancer antibodies in patients with advanced malignancy," Journal of Clinical Oncology, vol. 37, Issue 15_suppl, abstract 2514.
Ciobanu et al. (2013) "Indolent Lymphoma: Diagnosis and Prognosis in Medical Practice." Maedica (Buchar), 8(4):338-342.
Clinical Trials, History of Changes for Study: Nct02358031: a Study of Pembrolizumab (MK-3475) for First Line Treatment of Recurrent or Metastatic Squamous Cell Cancer of the Head and Neck (MK-3475-048/KEYNOTE-048), retrieved Apr. 21, 2022 from https://clinicaltrials.gov/ct2/show/NCT02358031, 13 pages.

(56) References Cited

OTHER PUBLICATIONS

Croxtall et al. (2010). "Trastuzumab in HER2-Positive Metastatic Gastric Cancer," Drugs, 70(17): 2259-2267.
De Vita et al. (2019). "Ramucirumab and paclitaxel in patients with gastric cancer and prior trastuzumab: subgroup analysis from Rainbow study," Future Oncology, 15:2723-2731.
Dreyling et al. (2013). "ESMO Consensus Guidelines: Marginal Cell Lymphoma, Mantle Cell Lymphoma, Peripheral T-cell Lymphoma," Ann Oncol. 24(4):857-877.
Dreyling et al. (2014). "Mantle Cell Lymphoma: Biology, Clinical Presentation, and Therapeutic Approaches," Am Soc Clin Oncol Educ Book, pp. 191-198.
Eisenhauer et al. (2009). "New response evaluation criteria in solid tumours: revised RECIST guideline (version 1.1)," Eur J. Cancer. 45:228-247.
European Medicines Agency "Herceptin, Annex I, Summary of Product Characteristics," retrieved Sep. 8, 2020 from <https://www.ema.europa.eu/en/documents/product-information/herceptin-epar-product-information_en.pdf>, 91 pages.
European Medicines Agency "KEYTRUDA, Annex I, Summary of Product Characteristics," retrieved Sep. 8, 2020 from <https://www.ema.europa.eu/en/documents/product-information/keytruda-epar-product-information_en.pdf>, 156 pages.
European Medicines Agency "MabThera, Annex I, Summary of Product Characteristics," retrieved Sep. 8, 2020 from <https://www.ema.europa.eu/en/documents/product-information/mabthera-epar-product-information_en.pdf>, 149 pages.
European Search Report mailed on Nov. 7, 2016 for European Application No. 16183261.3, filed on Aug. 8, 2016, 14 pages.
European Search Report mailed on Oct. 23, 2015 for European Application No. 13738232.1, filed on Jan. 17, 2013, seven pages.
FDA "Summary of Safety and Effectiveness Data," PD-L1 Ihc 22C3 pharmDx, retrieved Sep. 8, 2020 from <www.accessdata.fda.gov/cdrh_docs/pdf15/p150013b.pdf>, 22 p.
FDA (2012). "RITUXAN (rituximab) Label," Highlights of Prescribing Information, retrieved Sep. 8, 2020 from <https://www.accessdata.fda.gov/drugsatfda_docs/label/2012/103705s5367s5388lbl.pdf>, 40 pages
FDA (2016). "KEYTRUDA® (pembrolizumab) Label," Highlights of Prescribing Information, retrieved Sep. 8, 2020 from <https://www.accessdata.fda.gov/drugsatfda_docs/label/2016/125514s012lbl.pdf>, 26 pages.
FDA (2017). "HERCEPTIN® (trastuzumab) Label," Highlights of Prescribing Information, retrieved Sep. 8, 2020 from <https://www.accessdata.fda.gov/drugsatfda_docs/label/2017/103792s5337lbl.pdf>, 38 pages.
FDA (2019). "Highlights of Prescribing Information, ENHERTU," Retrieved Aug. 5, 2022 from <https://www.accessdata.fda.gov/drugsatfda_docs/label/2019/761139s000lbl.pdf>, 16 pages.
FDA (2020). "Highlights of Prescribing Information, TUKYSA," Drug Label, 20 pages.
Fehrenbacher et al. (2016). "Atezolizumab versus docetaxel for patients with previously treated non-small-cell lung cancer (POPLAR): a multicentre, open-label, phase 2 randomised controlled trial," Lancet, 387(10030):1837-46.
Garon et al. (2015). "Pembrolizumab for the Treatment of Non-Small-Cell Lung Cancer," New Engl J Med. 372:2018-28.
Garrido et al. (2016). "The safety and efficacy of ramucirumab in combination with paclitaxel for the treatment of advanced gastric or gastro-esophageal junction adenocarcinoma," Expert Rev Anticancer Ther., 26 pages.
GenBank Accession No. NP_037148.2, (ROD Sep. 1, 2016, last updated Apr. 16, 2017), "tyrosine-protein phosphatase non-receptor type substrate 1 precursor [Rattus norvegicus]," located at <http://www.ncbi.nlm.nih.gov/protein/NP_037148.2>, last visited on Jun. 9, 2017, 5 pages.
Gunasekaran et al. (epub Apr. 16, 2010). "Enhancing antibody Fc heterodimer formation through electrostatic steering effects: applications to bispecific molecules and monovalent IgG," J Biol Chem. 285(25):19637-19646.
Hatherley et al. (epub Jul. 23, 2009). "Structure of signal-regulatory protein alpha: a link to antigen receptor evolution," J Biol Chem. 284(39):26613-26619.
Hatherley et al. (epub Mar. 16, 2007). "The structure of the macrophage signal regulatory protein alpha (SIRPalpha) inhibitory receptor reveals a binding face reminiscent of that used by T cell receptors." J Biol Chem. 282(19):14567-14575.
Hatherley et al. (Jul. 25, 2008). "Paired receptor specificity explained by structures of signal regulatory proteins alone and complexed with CD47," Mol. Cell. 31(2):266-277.
Herbst et al. (2016). "Pembrolizumab versus docetaxel for previously treated, PD-L1-positive, advanced non-small-cell lung cancer (KEYNOTE-010): a randomised controlled trial," The Lancet, 387:1540-50.
Hezareh et al. (2001) "Effector function activities of a panel of mutants of a broadly neutralizing antibody against human immunodeficiency virus type 1," J Virol., 75(24):12161-8.
Ho et al. (2015). "'Velcro' Engineering of High Affinity CD47 Ectodomain as Signal Regulatory Protein α (SIRPα) Antagonists That Enhance Antibody-Dependent Cellular Phagocytosis," J Biol Chem, 290(20):12650-63.
Hwang et al. (2017). "Response Evaluation of Chemotherapy for Lung Cancer." Tuberc Respir Dis (Seoul). 80(2):136-142.
Icard et al. (epub Jul. 25, 2012). "A global view of the biochemical pathways involved in the regulation of the metabolism of cancer cells," Biochim Biophys Acta. 1826(2):423-433.
International Preliminary Report on Patentability, dated Feb. 14, 2017 for PCT Application No. PCT/US2015/044528, filed on Aug. 10, 2015, 10 pages.
International Preliminary Report on Patentability mailed on Feb. 13, 2018, for PCT Application No. PCT/US2016/045914, filed on Aug. 5, 2016, 20 pages.
International Preliminary Report on Patentability, dated Jul. 22, 2014 for PCT Application No. PCT/US2013/021937, filed on Jan. 17, 2013, 6 pages.
International Search Report and Written Opinion mailed Apr. 23, 2021 for PCT Application No. PCT/US2020/062402, filed on Nov. 25, 2020, 16 pages.
International Search Report mailed on Dec. 22, 2015 for PCT Application No. PCT/US2015/044528, filed on Aug. 10, 2015, four pages.
International Search Report mailed on Jan. 24, 2017, for PCT Application No. PCT/US2016/045914, filed on Aug. 5, 2016, six pages.
International Search Report mailed on Jul. 25, 2022 for PCT Application No. PCT/US2022/029056, filed on May 12, 2022, 7 pages.
International Search Report mailed on May 21, 2013, for PCT Application No. PCT/US2013/021937, filed on Jan. 17, 2013, five pages.
Jaiswal et al. (2010). "Macrophages as mediators of tumor immunosurveillance," Trends Immunol, 31(6):212-219.
Jang et al. (2013). "Comparison of RECIST version 1.0 and 1.1 in assessment of tumor response by computed tomography in advanced gastric cancer," Chin J. Cancer Res. 25(6):689-694.
Jawa et al. (epub Sep. 25, 2013). "T-cell dependent immunogenicity of protein therapeutics: Preclinical assessment and mitigation," Clin Immunol. 149(3):534-555.
Jin et al. (2018) "Pharmacokinetic and pharmacodynamic characterization of ALX148, a CD47 blocker, in patients with advanced malignancy and non-Hodgkin lymphoma," Soc Immunotherpay of Cancer Conference, #P340.
Keytruda package insert (2016). Highlights of Prescribing Information, Reference ID: 4003165, 29 pages.
Kharitonenkov et al. (Mar. 13, 1997). "A family of proteins that inhibit signalling through tyrosine kinase receptors," Nature, 386(6621):181-186.
Kim et al. (2008). "Association of CD47 with natural killer cell-mediated cytotoxicity of head-and-neck squamous cell carcinoma lines," Tumour Biol., 29(1):28-34.
Kim et al. (2015). "Single-Lesion Measurement per Organ for Assessing Tumor Response in Advanced Gastric Cancer," Oncology. 88:69-75.

(56) References Cited

OTHER PUBLICATIONS

Kim et al. (2019). "A Phase 1 Study of ALX148, a CD47 Blocker, in Combination with Rituximab in Patients with Non-Hodgkin Lymphoma," Blood, 134, Supplement_1, Abstract #1953.
Kurokawa et al. (2013) "Which is the optimal response criteria for evaluating preoperative treatment in esophageal cancer: RECIST or histology?" Ann Surg Oncol. 20(9):3009-3014.
Kwon et al. (Dec. 21, 1999). "Elimination of residual metastatic prostate cancer after surgery and adjunctive cytotoxic T lymphocyte-associated antigen 4 (CTLA-4) blockade immunotherapy," Proc. Natl. Acad. Sci. USA. 96(26):15074-15079.
Lakhani et al. (2021). "Evorpacept alone and in combination with pembrolizumab or trastuzumab in patients with advanced solid tumours (ASPEN-01): a first-in-human, open-label, multicentre, phase 1 dose-escalation and dose-expansion study," Lancet Oncology, 22(12):1740-1751.
Lala et al. (2018). "Clinical outcomes with therapies for previously treated recurrent/metastatic head-and-neck squamous cell carcinoma (R/M HNSCC): a systematic literature review," Oral Oncol., 84:108-120.
Larouche et al. (2010). "Lymphoma recurrence 5 years or later following diffuse large B-cell lymphoma: clinical characteristics and outcome," J Clin Oncol, 28(12):2094-100.
Lee et al. (2020). "404 ALX148, a CD47 blocker, in combination with standard chemotherapy and antibody regimens in patients with gastric/gastroesophageal junction (GC) cancer and head and neck squamous cell carcinoma (HNSCC)," Journal for Immuno Therapy of Cancer 8(Suppl 3):A345-A246.
Lee et al. (Dec. 1, 2007). "Novel structural determinants on SIRP alpha that mediate binding to CD47," The Journal of Immunology 179(11):7741-7750.
Lee et al. (epub Sep. 7, 2010). "The role of cis dimerization of signal regulatory protein alpha (SIRPalpha) in binding to CD47," J Biol Chem. 285(49):37953-37963.
Lin et al. (epub Jul. 17, 2012). "Soluble extracellular domains of human SIRPa and CD47 expressed in *Escherichia coli* enhances the phagocytosis of leukemia cells by macrophages in vitro," Protein Expr Purif. 85(1):109-116.
Liu et al. (2007, epub Oct. 3, 2006). "Functional elements on SIRPalpha IgV domain mediate cell surface binding to CD47," Journal of Molecular Biology 365(3):680-693.
Liu et al. (Feb. 15, 2004). "Peptide-mediated inhibition of neutrophil transmigration by blocking CD47 interactions with signal regulatory protein alpha," J Immunol. 172 (4) 2578-2585.
Lordick et al. (2016). "Oesophageal cancer: ESMO Clinical Practice Guidelines for diagnosis, treatment and follow-up," Ann Oncol. 27(suppl 5): v50-v57.
Makiyama et al. (2020). "Randomized, Phase II Study of Trastuzumab Beyond Progression in Patients with HER2-Positive Advance Gastric or Gastroesophageal Junction Cancer," J Clin Oncol., 38(17):1919-1927.
Miller et al. (1981). "Reporting results of cancer treatment," Cancer. 47:207-214.
Montoto et al. (2007). "Risk and clinical implications of transformation of follicular lymphoma to diffuse large B-cell lymphoma," J Clin Oncol (2007) 25(17):2426-33.
Murata et al. (2018). "Anti-human SIRPa antibody is a new tool for cancer immunotherapy," Cancer Sci, 109(5):1300-1308.
Nakaishi et al. (2008, epub Nov. 7, 2007). "Structural insight into the specific interaction between murine SHPS-1/SIRP alpha and its ligand CD47," J Mol Biol. 375(3):650-660.
NCT03013218, History of Changes for study NCT03013218, published Dec. 11, 2019, "A Study of ALX148 in Patients With Advanced Solid Tumors and Lymphoma," 8 pages.
NCT04499924, History of Changes for study NCT04499924, published Nov. 19, 2020, "Tucatinib, Trastuzumab, Ramucirumab, and Paclitaxel Versus Paclitaxel and Ramucirumab in Previously Treated HER2+ Gastroesophageal Cancer (MOUNTAINEER-02)," 14 pages.
Nice (Jul. 2016). "Non-Hodgkin's Lymphoma: Diagnosis and Management," London, National Institute for Health and Care Excellence (NICE), Guideline No. 52, 29s pages.
Nishino et al. (2013). "Developing a Common Language for Tumor Response to Immunotherapy: Immune-Related Response Criteria Using Unidimensional Measurements," Clinical Cancer Research, 19(14):3936-43.
Oken et al. (1982). "ECOG Performance Status," as published in "Toxicity and Response Criteria of the Eastern Cooperative Oncology Group," Am J Clin Oncol, 5:649-655, retrieved Sep. 8, 2020 from <http://www.npcrc.org/files/news/ECOG_performance_status.pdf>, 1 page.
Oldenborg et al. (Jun. 16, 2000). "Role of CD47 as a marker of self on red blood cells," Science 288(5473):2051-2054.
Patel et al. (2020). "Targeted Therapies in Advanced Gastric Cancer," Curr Treat Options Oncol., 21(9):70, 14 pages.
Reck et al. (2016) "Pembrolizumab versus Chemotherapy for PD-L1-Positive Non-Small-Cell Lung Cancer." NEJM. 375: 1823-1833.
Ridgway et al. (Jul. 1996). "'Knobs-into-holes' engineering of antibody CH3 domains for heavy chain heterodimerization," Protein Eng. 9(7):617-621.
Rudikoff et al. (1982). " Single amino acid substitution altering antigen-binding specificity," Proc Natl Acad Sci U S A. 79(6):1979-83.
Sazinsky et al. (2008). "Aglycosylated immunoglobulin G1 variants productively engage activating Fc receptors," Proc Natl Acad Sci U S A, 105(51): 20167-20172.
Shimoyama (2014). "Unraveling trastuzumab and lapatinib inefficiency in gastric cancer: Future steps (Review)," Molecular and Clinical Oncology 2: 175-181.
Shitara et al. (2020). "Trastuzumab Deruxtecan in Previously Treated HER2-Positive Gastric Cancer," N Engl J Med, 382:2419-2430.
Sim et al. (2019). "Discovery of high affinity, pan-allelic, and pan-mammalian reactive antibodies against the myeloid checkpoint receptor SIRPα," mAbs, 11(6): 1-17.
Subramanian et al. (2007, epub Nov. 10, 2006). "Phylogenetic divergence of CD47 interactions with human signal regulatory protein alpha reveals locus of species specificity. Implications for the binding site," J Biol Chem. 282(3):1805-1818.
Takenaka et al. (epub Nov. 4, 2007). "Polymorphism in SIRPα modulates engraftment of human hematopoietic stem cells," Nat Immunol. 8(12):1313-1323.
Therasse et al. (2000). "New Guidelines to Evaluate the Response to Treatment in Solid Tumors," J. Natl Cancer Inst. 92:205-216.
Tsai et al. (epub Mar. 17, 2010). "Self inhibition of phagocytosis: the affinity of 'marker of self' CD47 for SIRPalpha dictates potency of inhibition but only at low expression levels," Blood Cells Mol Dis. 45(1):67-74.
Vose (2017). "Mantle cell lymphoma: 2017 update on diagnosis, risk-stratification, and clinical management," Am J. Hematol. 92(8):806-813.
Wan et al. (2019). "Pharmacodynamic Biomarker Characterization of ALX148, a CD47 Blocker, in Combination with Established Anticancer Antibodies in Patients with Advanced Malignancy," Society for Immunotherapy of Cancer (SITC), Abstract #P449.
Weiskopf (2017.) "Cancer immunotherapy targeting the CD47/SIRPα axis," European Journal of Cancer, vol. 76, pp. 100-109.
Weiskopf et al. (epub May 30, 2013). "Engineered SIRPα variants as immunotherapeutic adjuvants to anticancer antibodies," Science 341(6141):88-91.
Who (1979) Handbook for Reporting Results of Cancer Treatment. Geneva: World Health Organization Offset Publication, No. 48, 46 pages.
Who Cancer Fact Sheets (2018), "All Cancers," the Global Cancer Observatory, retrieved Sep. 8, 2020 from <https://gco.iarc.fr/today/data/factsheets/cancers/39-All-cancers-fact-sheet.pdf>, 2 pages.
Wilke et al. (2014). "Ramucirumab plus paclitaxel versus placebo plus paclitaxel in patients with previously treated advanced gastric or gastro-oesophageal junction adenocarcinoma (RAINBOW): a double-blind, randomised phase 3 trial," Lancet Oncol., 15(11):1224-35.

(56) References Cited

OTHER PUBLICATIONS

Willingham et al. (2012). "The CD47-signal regulatory protein alpha (SIRPa) interaction is a therapeutic target for human solid tumors," Proc Natl Acad Sci USA, 109(17):6662-6667.
Wilson et al. (Jul. 1984). "The structure of an antigenic determinant in a protein," Cell 37(3):767-778.
Wray et al. (2016) "Therapy Response Assessment and Patient Outcomes in Head and Neck Squamous Cell Carcinoma: FDG PET Hopkins Criteria Versus Residual Neck Node Size and Morphologic Features." Am J. Roentgenology, 207:641-647.
Written Opinion mailed on Dec. 22, 2015 for PCT Application No. PCT/US2015/044528, filed on Aug. 10, 2015, nine pages.
Written Opinion mailed on Jan. 24, 2017 for PCT Application No. PCT/US2016/045914, filed on Aug. 5, 2016, 19 pages.
Written Opinion of the International Searching Authority mailed on May 21, 2013 for PCT Application No. PCT/US2013/021937, filed on Jan. 17, 2013, five pages.
Xie et al. (2023.) "An agonistic anti-signal regulatory protein alpha antibody for chronic inflammatory diseases," Cell Reports Med. 4:101130.
Yamao et al. (Feb. 3, 1997). "Mouse and human SHPS-1: molecular cloning of cDNAs and chromosomal localization of genes," Biochem Biophys Res Commun. 231(1):61-67.
Yanagawa et al. (2012) "Evaluation of response to neoadjuvant chemotherapy for esophageal cancer: PET response criteria in solid tumors versus response evaluation criteria in solid tumors," J Nucl Med. 53(6):872-880.
Yoshida et al. (2015). "CD47 is an adverse prognostic factor and a therapeutic target in gastric cancer," Cancer Med., 4(9): 1322-1333.
Zhang et al. (2015.) "SIRP/CD47 Signaling in Neurological Disorders," Brain Res, 1623: 74-80.
Zhang et al. (2016.) "Blocking CD47 and autophagy for the therapy of non-small cell lung cancer," Annals of Oncology, vol. 27, Supplement 9, 399P.
U.S. Appl. No. 18/441,339, filed Feb. 14, 2024 for Deming et al., titled "SIRP-Alpha Variant Constructs and Uses Thereof," (Copy not submitted herewith pursuant to the waiver of 37 C.F.R. § 1.98(a)(2)(iii) issued by the Office Sep. 21, 2004).
U.S. Appl. No. 18/452,972, filed Aug. 21, 2023 for Pons et al., titled "Methods of Treating Cancer," (Copy not submitted herewith pursuant to the waiver of 37 C.F.R. § 1.98(a)(2)(iii) issued by the Office Sep. 21, 2004).
U.S. Appl. No. 18/540,092, filed Dec. 14, 2023 for Pons et al., titled "Constructs Having a SIRP-Alpha Domain or Variant Thereof," (Copy not submitted herewith pursuant to the waiver of 37 C.F.R. § 1.98(a)(2)(iii) issued by the Office Sep. 21, 2004).
Carboplatin Label, Package Insert, 2012, retrieved Feb. 8, 2021 from <www.accessdata.fda.gov/drugsatfda_docs/label/2012/077139Orig1s016lbl.pdf>, 4 pages.
Casara et al. (2018). "S55746 is a novel orally active BCL-2 selective and potent inhibitor that impairs hematological tumor growth," Oncotarget. 9(28): 20075-20088.
Chao et al. (2010). "Anti-CD47 antibody synergizes with rituximab to promote phagocytosis and eradicate non-Hodgkin lymphoma," Cell, 142(5):699-713.
Chao et al. (2011). "Extranodal dissemination of non-Hodgkin lymphoma requires CD47 and is inhibited by anti-CD47 antibody therapy," Blood 118(18):4890-4901.
Chow et al. (2020). "A phase I study of ALX148, a CD47 blocker, in combination with standard anticancer antibodies and chemotherapy regimens in patients with advanced malignancy," Journal of Clinical Oncology, 38:15_suppl, 3056-3056.
CISplatin Label, 2015, FDA, retrieved Feb. 8, 2021 from <www.accessdata.fda.gov/drugsatfda_docs/label/2015/018057s083lbl.pdf>, 11 pages.
Edris et al. (2012). "Antibody therapy targeting the CD47 protein is effective in a model of aggressive metastatic leiomyosarcoma," Proc Natl Acad Sci U S A, 109(17):6656-61.
Gabrilovich et al. (2012). "Coordinated regulation of myeloid cells by tumours," Nat Rev Immunol. 12(4):253-68.

Goto et al. (2014). "Efficacy of anti-CD47 antibody-mediated phagocytosis with macrophages against primary effusion lymphoma," Eur J. Cancer, 50(10):1836-1846.
Husain et al. (2018). "Expanding the Boundaries of Biotherapeutics with Bispecific Antibodies," Biodrugs 32(5): 441-464.
Kabat (1991). Sequences of proteins of immunological interest, 5th ed. U.S. Dept. of Health and Human Services, Public Health Service, National Institutes of Health: Bethesda, MD, 12 pages.
Kauder et al. (2018). "ALX148 blocks CD47 and enhances innate and adaptive antitumor immunity with a favorable safety profile," PLoS ONE, 13(8): e0201832.
Kim et al. (2012). "Anti-CD47 antibodies promote phagocytosis and inhibit the growth of human myeloma cells," Leukemia 26:2538-2545.
Liu et al. (2015). "CD47 blockade triggers T cell-mediated destruction of immunogenic tumors," Nature Medicine, 21(10):1209-15.
Miller et al. (2019). "Quantitative high-throughput screening assays for the discovery and development of SIRPα-CD47 interaction inhibitors," PLoS ONE 14(7): e0218897.
Mosely et al. (2016) "Rational Selection of Syngeneic Preclinical Tumor Models for Immunotherapeutic Drug Discovery." Cancer Immunol Res., 5(1): 29-41.
NCT03013218, History of Changes, Oct. 24, 2017, "A Study of ALX148 in Patients With Advanced Solid Tumors and Lymphoma," 5 pages.
Oldenborg (2013). "CD47: A Cell Surface Glycoprotein Which Regulates Multiple Functions of Hematopoietic Cells in Health and Disease," ISRN Hematol, Article ID 614619, 19 pages.
Paraplatin Label, 2020, FDA, retrieved Feb. 8, 2021 from <www.accessdata.fda.gov/drugsatfda_docs/label/2010/020452s005lbl.pdf>, 21 pages.
Petrova et al. (2017). TTI-621 (SIRPαFc): A CD47-Blocking Innate Immune Checkpoint Inhibitor with Broad Antitumor Activity and Minimal Erythrocyte Binding, Clin Cancer Res, 23:1086-1079.
Platinol label, 2011, FDA, retrieved Feb. 8, 2021 from <www.accessdata.fda.gov/drugsatfda_docs/label/2011/018057s080lbl.pdf>, 15 pages.
Poklar et al. (1996). "Influence of cisplatin intrastrand crosslinking on the conformation, thermal stability, and energetics of a 20-mer DNA duplex.," Proc. Natl. Acad. Sci. U.S.A., 93 (15): 7606-11.
Ring et al. (2017). "Anti-SIRPα antibody immunotherapy enhances neutrophil and macrophage antitumor activity," PNAS USA, 114(49): E10578-E10585.
Rischin et al. (2019). "Protocol-specified final analysis of the phase 3 KEYNOTE-048 trial of pembrolizumab (pembro) as first-line therapy for recurrent/metastatic head and neck squamous cell carcinoma (R/M HNSCC)," Journal of Clinical Oncology, May 20, 37, No. 15_suppl, abstract # 6000.
Rudd et al. (1995). "Persistence of cisplatin-induced DNA interstrand crosslinking in peripheral blood mononuclear cells from elderly and young individuals," Cancer Chemother. Pharmacol. 35 (4): 323-6.
Russ et al. (2018). "Blocking "don't eat me" signal of CD47-SIRPα in hematological malignancies, an in-depth review," Blood Rev, 32(6):480-489, S0268-960X(17)30093-0.
Sasikumar et al. "Abstract B007: Potent antitumor activity of a novel and orally available small-molecule antagonist targeting the CD47/SIRPα pathway" CR-NCI-EORTC International Conference: Molecular Targets and Cancer Therapeutics; Oct. 26-30, 2017, Philadelphia, PA; Mol Cancer Ther, Published Jan. 1, 2018, (17) (1 Supplement) B007.
Soto-Pantoja et al. (2014). "CD47 in the tumor microenvironment limits cooperation between antitumor T-cell immunity and radiotherapy," Cancer Research, 74(23): 6771-83.
Spiess et al. (2015). "Alternative molecular formats and therapeutic applications for bispecific antibodies," Molecular Immunology 67(2): 95-106.
Stong et al. (1985). "Human acute leukemia cell line with the t(4;11) chromosomal rearrangement exhibits B lineage and monocytic characteristics," Blood. 65(1): 21-31.
Tse et al. (2008). "ABT-263: a potent and orally bioavailable Bcl-2 family inhibitor," Cancer Res, 68(9): 3421-3429.

(56) References Cited

OTHER PUBLICATIONS

Tseng et al. (2013). "Anti-CD47 antibody-mediated phagocytosis of cancer by macrophages primes an effective antitumor T-cell response," Proc Natl Acad Sci USA, 110(27): 11103-11108.
U.S. Appl. No. 16/825,850, filed Mar. 20, 2020 for Pons et al. (Copy not submitted herewith pursuant to the waiver of 37 C.F.R. § 1.98(a)(2)(iii) issued by the Office Sep. 21, 2004).
U.S. Appl. No. 17/164,716, filed Feb. 1, 2021 for Deming et al. (Copy not submitted herewith pursuant to the waiver of 37 C.F.R. § 1.98(a)(2)(iii) issued by the Office Sep. 21, 2004).
U.S. Appl. No. 17/334,151, filed May 28, 2021 for Pons et al., titled "Combination Therapies Comprising a Hypomethylation Agent for Treating Cancer," (Copy not submitted herewith pursuant to the waiver of 37 C.F.R. § 1.98(a)(2)(iii) issued by the Office Sep. 21, 2004).
U.S. Appl. No. 17/743,350, filed May 12, 2022 for Wan et al., titled "Combination Therapies for Treating Cancer," (Copy not submitted herewith pursuant to the waiver of 37 C.F.R. § 1.98(a)(2)(iii) issued by the Office Sep. 21, 2004).
U.S. Appl. No. 17/932,180, filed Sep. 14, 2022 for Deming et al., titled "SIRP-Alpha Variant Constructs and Uses Thereof," (Copy not submitted herewith pursuant to the waiver of 37 C.F.R. § 1.98(a)(2)(iii) issued by the Office Sep. 21, 2004).
U.S. Appl. No. 18/185,255, filed Mar. 16, 2023 for Pons et al., titled "Constructs Having a SIRP-Alpha Domain or Variant Thereof," (Copy not submitted herewith pursuant to the waiver of 37 C.F.R. § 1.98(a)(2)(iii) issued by the Office Sep. 21, 2004).
Venclyxto Label, Highlights of Prescribing Information, 2016, FDA, retrieved Feb. 8, 2021 from www.accessdata.fda.gov/drugsatfda_docs/label/2016/208573s000lbl.pdf>, 25 pages.
Venclyxto Product Information, 2020, EMA, retrieved Feb. 8, 2021 from <www.ema.europa.eu/en/medicines/human/EPAR/venclyxto#product-information-section>, 6 pages.
Wang et al. (1995). "Active immunotherapy of cancer with a nonreplicating recombinant fowlpox virus encoding a model tumor-associated antigen," J. Immunol. 154:4685-4692.
Wu et al. (2018). "Anti-CD47 treatment enhances anti-tumor T-cell immunity and improves immunosuppressive environment in head and neck squamous cell carcinoma," Oncoimmunology,7(4): e1397248, pp. 1-12.
Yanigata et al. (2017). "Anti-SIRPα antibodies as a potential new tool for cancer immunotherapy," JCI Insight, 2:e89140.

Yu et al. (2015). "PD-1 blockade attenuates immunosuppressive myeloid cells due to inhibition of CD47/SIRPα axis in HPV negative head and neck squamous cell carcinoma," Oncotarget, 6(39): 42067-42080.
Zhang et al. (2018). "Disrupting CD47-SIRPa axis alone or combined with autophagy depletion for the therapy of glioblastoma," Carcinogenesis, 39: 689-699.
Zhao et al. (epub Oct. 31, 2011). "CD47-signal regulatory protein-α (SIRPα) interactions form a barrier for antibody-mediated tumor cell destruction," Proc Natl Acad Sci USA. 108(45):18342-18347.
Anonymous (2024). "Promising activity observed for evorpacept plus an anti-cancer antibody in a hematologic malignancy," ALX Oncology Corporate Presentation, retrieved Jan. 17, 2025 from <https://ir.alxoncology.com/events-and-presentations>, 6 pages.
Anonymous (Jan. 23, 2025.) "ALX Oncology Presents Positive Updated Data from ASPEN-06 Phase 2 Trial Demonstrating Evorpacept Generates Strong Response and Durable Clinical Benefit in Patients with HER2-Positive Gastric Cancer Demonstrating Evorpacept Generates Strong Response and Durable Clinical Benefit in Patients with HER2-Positive Gastric Cancer," Exhibit A, ALX Oncology, 2 pages.
IUPHAR/BPS Guide to Pharmacology (2024). "Evorpacept (GtoPdb Ligand ID: 11592)," available online at <https://www.guidetopharmacology.org/GRAC/LigandDisplayForward?tab=structure&liga ndld=11592>, 1 page.
Lopez et al. (2018). "Current therapeutic landscape for advanced gastroesophageal cancers." Annals of Translational Medicine, 6(4):78, 19 pages.
Strati et al. (2024). "CT037—A phase I investigator-initiated trial of evorpacept (ALX148), lenalidomide and rituximab for patients with relapsed or refractory B-cell non-Hodgkin lymphoma," In: Proceedings of the 115th Annual Meeting of the American Association for Cancer Research, Abstract.
Takahari (2017). "Second-line chemotherapy for patients with advanced gastric cancer," Gastric Cancer, 20(3):395-406.
U.S. Appl. No. 18/970,690, filed Dec. 5, 2024 for Ring et al., titled "High Affinity SIRP-Alpha Reagents and Methods of Using," (Copy not submitted herewith pursuant to the waiver of 37 C.F.R. § 1.98(a)(2)(iii) issued by the Office Sep. 21, 2004).
U.S. Appl. No. 19/084,515, filed Mar. 19, 2025 for Pons et al., titled "Methods of Treating Cancer," (Copy not submitted herewith pursuant to the waiver of 37 C.F.R. § 1.98(a)(2)(iii) issued by the Office Sep. 21, 2004).

\* cited by examiner

COMBINATION THERAPIES COMPRISING AN AGENT THAT BLOCKS THE INTERACTION BETWEEN CD47 AND SIRPα FOR TREATING GASTRIC OR GASTROESPHAGEAL JUNCTION CANCEL

CROSS-REFERENCE TO RELATED APPLICATIONS

This application is a divisional of U.S. patent application Ser. No. 17/105,353, filed Nov. 25, 2020, which claims the priority benefit of U.S. Provisional Application No. 62/941,390, filed Nov. 27, 2019; U.S. Provisional Application No. 63/022,998, filed May 11, 2020; U.S. Provisional Application No. 63/030,686, filed May 27, 2020; U.S. Provisional Application No. 63/106,225, filed Oct. 27, 2020; and U.S. Provisional Application No. 63/109,044, filed Nov. 3, 2020, the contents of each of which are incorporated herein by reference in their entirety.

REFERENCE TO AN ELECTRONIC SEQUENCE LISTING

The contents of the electronic sequence listing (757972001110seqlist.xml; Size: 482,200 bytes; and Date of Creation: Jan. 10, 2023) is herein incorporated by reference in its entirety.

FIELD OF THE INVENTION

The present invention relates to methods of treating cancer that comprise administering an agent that blocks the interaction between CD47 (e.g., hCD47) and SIRPα (e.g., hSIRPα) in conjunction with a chemotherapy agent and at least one additional anti-cancer agent and/or at least one additional mode of cancer therapy.

BACKGROUND

Many cancers have a poor prognosis, even when treated with available therapeutics. There is a need in the art for new treatments to provide additional therapeutic options and improve outcomes for patents.

Tumor cells manipulate the myeloid compartment to evade the anti-tumor host immune response (Gabrilovich et al., Nat Rev Immunol (2012) 12(4):253-68). For example, while CD47 expressed on the surface of normal cells binds SIRPα on macrophages and provides a "don't eat me" signal, tumor cells have also been found to overexpress CD47 to evade the macrophage component of immune surveillance (Oldenborg, ISRN Hematol (2013) 614619).

Macrophage-mediated destruction of cancer cells requires both the disruption of "don't eat me" signals (e.g., CD47-SIRPα) and the activation of "eat me" signals. Neither component alone is sufficient to trigger maximal phagocytic reaction against tumor cells. As described above, CD47 provides a fundamental "don't eat me" signal through its interaction with SIRPα on macrophages. The pro-phagocytic "eat me" signal can be provided to the same macrophages by binding to their activating Fc gamma receptors. For example, the pro-phagocytic "eat me" signal can be provided by binding of anti-tumor antibodies to Fc receptors on macrophages.

All references cited herein, including patent applications, patent publications, and UniProtKB/Swiss-Prot Accession numbers are herein incorporated by reference in their entirety, as if each individual reference were specifically and individually indicated to be incorporated by reference.

BRIEF SUMMARY

Provided is a method of treating cancer in an individual, comprising administering to the individual an effective amount of: (a) a polypeptide comprising a SIRPα D1 domain variant and an Fc domain variant, and (b) a Bcl-2 inhibitor; wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the cancer is leukemia, multiple myeloma, or non-Hodgkin's lymphoma. In some embodiments, the non-Hodgkin's lymphoma is diffuse large B-cell lymphoma (DLBCL), mantle cell lymphoma (MCL), or follicular lymphoma (FL). In some embodiments, the leukemia is acute lymphoblastic leukemia (ALL), chronic lymphocytic leukemia (CLL), small lymphocytic lymphoma (SLL), Chronic myeloid leukemia (CIVIL), acute myeloid leukemia (AML), or myelodysplastic syndrome (MDS). In some embodiments, the leukemia is acute lymphoblastic leukemia. In some embodiments, the Bcl-2 inhibitor is venetoclax, ABT-737, navitoclax, BCL201, or AZD-0466. In some embodiments, the Bcl-2 inhibitor is venetoclax.

Also provided is a method of treating cancer in an individual, comprising administering to the individual an effective amount of: (a) a polypeptide comprising a SIRPα D1 domain variant and an Fc domain variant, and (b) a platinum-based chemotherapy agent; wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the cancer is a solid tumor. In some embodiments, the solid tumor is colon cancer, lung cancer, head and neck cancer, esophageal cancer, breast cancer, bladder cancer, ovarian cancer, cervical cancer, testicular cancer, endometrial cancer, liver cancer, gastric cancer, gastroesophageal junction cancer, brain tumor, mesothelioma, or neuroblastoma. In some embodiments, the colon cancer is colon carcinoma. In some embodiments, the platinum-based chemotherapy agent is carboplatin, cisplatin, oxaliplatin, nedaplatin, triplatin tetranitrate, phenanthriplatin, picoplatin, or satraplatin. In some embodiments, the platinum-based chemotherapy agent is cisplatin or carboplatin.

Also provided is a method of treating cancer in an individual, comprising administering to the individual an effective amount of: (a) a polypeptide comprising a SIRPα D1 domain variant and an Fc domain variant, (b) a PD-1 inhibitor, (c) an antimetabolite, and (d) a platinum-based chemotherapy agent; wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat, wherein the cancer is head and neck squamous cell carcinoma (HNSCC), and wherein the individual has not received prior treatment for HNSCC. In some embodiments, the polypeptide comprising the SIRPα D1 domain variant and the Fc domain variant is administered at a dose of 10 mg/kg once a week (qw). In some embodiments, the polypeptide comprising the SIRPα D1 domain variant and the Fc domain variant is administered at a dose of 15 mg/kg once a week (qw).

In some embodiments, the HNSCC is advanced and/or metastatic HNSCC. In some embodiments, the PD-1 inhibitor is an anti-PD-1 antibody, e.g., pembrolizumab, nivolumab, pidilizumab, cemiplimab, or BMS-936559. In some embodiments, the anti-PD-1 antibody is pembrolizumab. In some embodiments, the antimetabolite is 5-fluorouracil, 6-mercaptopurine, capecitabine, cytarabine, floxuridine, fludarabine, gemcitabine, hydroxycarbamide, methotrexate, pemetrexed, phototrexate. In some embodiments, the antimetabolite is 5-fluorouracil. In some embodiments, the platinum-based chemotherapy agent is carboplatin, cisplatin, oxaliplatin, nedaplatin, triplatin tetranitrate, phenanthriplatin, picoplatin, or satraplatin. In some embodiments, the platinum-based chemotherapy agent is cisplatin or carboplatin.

In another aspect, provided is a method of treating cancer in an individual, comprising administering to the individual an effective amount of: (a) a polypeptide comprising a SIRPα D1 domain variant and an Fc domain variant, (b) an anti-HER2 antibody, and (c) an anti-PD-L1 antibody (e.g., an anti-PD-L1 antagonist antibody); wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the cancer is solid tumor. In some embodiments, the solid tumor is colon cancer, lung cancer, head and neck cancer, esophageal cancer, breast cancer, bladder cancer, ovarian cancer, cervical cancer, testicular cancer, endometrial cancer, liver cancer, gastric cancer, gastroesophageal junction cancer, brain tumor, mesothelioma, or neuroblastoma. In some embodiments, the solid tumor is HER2$^+$ solid tumor. In some embodiments, the solid tumor is colon cancer (e.g., HER2$^+$ colon cancer). In some embodiments, the anti-HER2 antibody is trastuzumab. In some embodiments, the anti-PD-L1 antibody is atezolizumab, avelumab, or durvalumab.

In some embodiments, provided is a method of treating cancer in an individual, comprising administering to the individual an effective amount of: (a) a polypeptide comprising a SIRPα D1 domain variant and an Fc domain variant, (b) an anti-HER2 antibody, (c) an anti-VEGF2 antibody, and (d) paclitaxel; wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat, wherein the cancer is gastric cancer or gastroesophageal junction (GEJ) cancer, and wherein the individual has received at least one prior therapy for the gastric or the GEJ cancer. In some embodiments, the gastric cancer or GEJ cancer is a HER2-overexpressing (e.g., HER2$^+$) gastric cancer or a HER2-overexpressing GEJ cancer. In some embodiments, the individual has received prior therapy with an anti-HER2 antibody, with an anti-HER2 antibody and a fluoropyrimidine, or with an anti HER2 antibody and a platinum-based chemotherapy agent. In some embodiments, the anti-HER2 antibody is trastuzumab. In some embodiments, the anti-VEGF antibody is ramucirumab. In some embodiments, the polypeptide comprising the SIRPα D1 domain variant and the Fc domain variant is administered at a dose of 10 mg/kg once a week (qw). In some embodiments, the polypeptide comprising the SIRPα D1 domain variant and the Fc domain variant is administered at a dose of 15 mg/kg once a week (qw).

Also provided is a method of treating cancer in an individual, comprising administering to the individual an effective amount of (a) a polypeptide comprising a SIRPα D1 domain variant and an Fc domain variant, and (b) an anti-TROP2 antibody; wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the cancer is solid tumor, gastric cancer, nasopharyngeal cancer, gallbladder cancer, cervical cancer, extranodal NK/T cell lymphoma, lung cancer, laryngeal squamous cell cancer, colon cancer, Hilar Cholangiocarcinoma, pancreatic cancer, squamous cell carcinoma of the oral cavity, endometrioid endometrial carcinoma, or ovarian carcinoma.

In some embodiments of any of the methods described herein, the SIRPα D1 domain variant comprises the amino acid sequence of SEQ ID NO: 85. In some embodiments, the SIRPα D1 domain variant comprises the amino acid sequence of SEQ ID NO: 81. In some embodiments, the Fc domain variant is a human IgG1 Fc region comprising L234A, L235A, G237A, and N297A mutations, wherein numbering is according to the EU index of Kabat. In some embodiments, the Fc domain variant comprises the amino acid sequence of SEQ ID NO: 91. In some embodiments, the polypeptide comprising a SIRPα D1 domain variant and an Fc domain variant comprises the amino acid sequence of SEQ ID NO: 136. In some embodiments, the polypeptide comprising a SIRPα D1 domain variant and an Fc domain variant comprises the amino acid sequence of SEQ ID NO: 135. In some embodiments, the polypeptide comprising a SIRPα D1 domain variant and an Fc domain variant forms a homodimer. In some embodiments, the individual is a human.

In another aspect, provided is a kit comprising a polypeptide comprising a SIRPα D1 domain variant and an Fc domain variant in a pharmaceutically acceptable carrier, for use in combination with a Bcl-2 inhibitor for treating cancer in an individual in need, wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat; and wherein the kit comprises instructions for administering the polypeptide comprising a SIRPα D1 domain variant and an Fc domain variant in combination with the Bcl-2 inhibitor to the individual in need thereof. In some embodiments, the cancer is leukemia, multiple myeloma, or non-Hodgkin's lymphoma. In some embodiments, the Bcl-2 inhibitor is venetoclax.

Also provided is a kit comprising a polypeptide comprising a SIRPα D1 domain variant and an Fc domain variant in a pharmaceutically acceptable carrier, for use in combination with a platinum-based chemotherapy agent for treating cancer in an individual in need thereof, wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat; and wherein the kit comprises instructions for administering the polypeptide comprising a SIRPα D1 domain variant and an Fc domain variant in combination with the chemotherapy agent to the individual in need thereof. In some embodiments, the cancer is solid tumor. In some embodiments, the solid tumor is colon cancer, colon carcinoma, lung cancer, head and neck cancer, esophageal cancer, breast cancer, bladder cancer, ovarian cancer, cervical cancer, testicular cancer, endometrial cancer, liver cancer, gastric cancer, brain tumor, mesothelioma, or neuroblastoma. In some embodiments, the platinum-based chemotherapy agent is cisplatin or carboplatin.

In some embodiments, provided is a kit comprising a polypeptide comprising a SIRPα D1 domain variant and an Fc domain variant in a pharmaceutically acceptable carrier, for use in combination with a PD-1 inhibitor, an antimetabolite, and a platinum-based chemotherapy agent for treating cancer in an individual in need thereof, wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat, and wherein the kit comprises instructions for administering the polypeptide comprising a SIRPα D1 domain variant and an Fc domain variant in combination with the anti-PD-1 antibody, the antimetabolite, and the platinum-based chemotherapy agent to an individual with head and neck squamous cell carcinoma (HNSCC) who has not received prior treatment for HNSCC. In some embodiments, the PD-1 inhibitor is pembrolizumab. In some embodiments, the antimetabolite is 5-fluorouracil. In some embodiments, the platinum-based chemotherapy agent is cisplatin or carboplatin.

In some embodiments, provided is a kit comprising a polypeptide comprising a SIRPα D1 domain variant and an Fc domain variant in a pharmaceutically acceptable carrier, for use in combination with an anti-HER2 antibody, an anti-VEGFR2 antibody, and paclitaxel; wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat, and wherein the kit comprises instructions for administering the polypeptide comprising a SIRPα D1 domain variant and an Fc domain variant in combination with the anti-HER2 antibody, the anti-VEGFR2 antibody, and the paclitaxel to an individual with gastric cancer or gastroesophageal junction (GEJ) cancer who has received at least one prior therapy for the gastric or the GEJ cancer. In some embodiments, the gastric cancer or GEJ cancer is HER2$^+$ gastric cancer or HER2$^+$ GEJ cancer. In some embodiments, the anti-HER2 antibody is trastuzumab. In some embodiments, the anti-VEGFR2 antibody is ramucirumab. In some embodiments, the individual received prior therapy (or therapies) with an anti-HER2 antibody (e.g., trastuzumab) and/or a fluoropyrimidine, and/or a platinum-based chemotherapeutic agent. In some embodiments, the gastric cancer or GEJ cancer in the individual progressed during or after prior therapy (or therapies) comprising anti-HER2 antibody (e.g., trastuzumab) and/or a fluoropyrimidine, and/or a platinum-based chemotherapeutic agent. In some embodiments, the individual failed (e.g., relapsed after or did not respond to) prior therapy (or therapies) comprising anti-HER2 antibody (e.g., trastuzumab) and/or a fluoropyrimidine, and/or a platinum-based chemotherapeutic agent. In some embodiments, the prior therapy (or therapies) comprised an anti-HER2 antibody and a fluoropyrimidine (e.g., administered during the same line of therapy or during different lines of therapy). In some embodiments, the prior therapy (or therapies) comprised an anti-HER2 antibody and a platinum-based chemotherapy agent (e.g., administered during the same line of therapy or during different lines of therapy)

Also provided is a kit comprising a polypeptide comprising a SIRPα D1 domain variant and an Fc domain variant in a pharmaceutically acceptable carrier, for use in combination with an anti-TROP2 antibody for treating cancer in an individual in need thereof, wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat; and wherein the kit comprises instructions for administering the polypeptide comprising a SIRPα D1 domain variant and an Fc domain variant in combination with the anti-TROP2 antibody to the individual in need thereof. In some embodiments, the cancer is solid tumor, gastric cancer, nasopharyngeal cancer, gallbladder cancer, cervical cancer, extranodal NK/T cell lymphoma, lung cancer, laryngeal squamous cell carcinoma, colon cancer, Hilar Cholangiocarcinoma, pancreatic cancer, squamous cell carcinoma of the oral cavity, endometrioid endometrial carcinoma, or ovarian carcinoma.

Also provided is a kit comprising a polypeptide comprising a SIRPα D1 domain variant and an Fc domain variant in a pharmaceutically acceptable carrier, for use in combination with an anti-HER2 antibody and an anti-PD-L1 antibody (e.g., an anti PD-L1 antagonist antibody) for treating cancer in an individual in need thereof, wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat; and wherein the kit comprises instructions for administering the polypeptide comprising a SIRPα D1 domain variant and an Fc domain variant in combination with the anti-HER2 antibody and the anti-PD-L1 antibody (e.g., an anti PD-L1 antagonist antibody) to the individual in need thereof. In some embodiments, the cancer is colon cancer. In some embodiments, the colon cancer is HER2$^+$ colon cancer. In some embodiments, the anti-HER2 antibody is trastuzumab. In some embodiments, the anti-PD-L1 antibody is atezolizumab, avelumab, or durvalumab.

In some embodiments of the kits, the SIRPα D1 domain variant comprises the amino acid sequence of SEQ ID NO: 85. In some embodiments, the SIRPα D1 domain variant comprises the amino acid sequence of SEQ ID NO: 81. In some embodiments, the Fc domain variant is a human IgG1 Fc region comprising L234A, L235A, G237A, and N297A mutations, wherein numbering is according to the EU index of Kabat. In some embodiments, the Fc domain variant comprises the amino acid sequence of SEQ ID NO: 91. In some embodiments, the polypeptide comprising a SIRPα D1 domain variant and an Fc domain variant comprises the amino acid sequence of SEQ ID NO: 136. In some embodiments, the polypeptide comprising a SIRPα D1 domain variant and an Fc domain variant comprises the amino acid sequence of SEQ ID NO: 135. In some embodiments, the polypeptide comprising a SIRPα D1 domain variant and an Fc domain variant forms a homodimer. In some embodiments, the individual is a human.

DESCRIPTION OF THE FIGURES

FIG. 2A provides the mean tumor volumes (+/−SEM) for the indicated treatments. Dashed arrows indicate dosing of Cisplatin (two 5 mg/kg doses given 10 days apart). Dotted arrows indicate dosing of Drug A (two 30 mg/kg doses given 10 days apart). Both drugs were administered intraperitoneally. Mice treated with both agents were dosed with Drug A one day post treatment with cisplatin. FIG. 2B provides the mean percent change in body weight from day 7 (D7) in mice treated according to the regimens shown in FIG. 2A. FIG. 2C provides the mean tumor volumes (+/−SEM) for the indicated treatments. Dashed arrows indicate dosing of Cisplatin (one 10 mg/kg dose). Dotted arrows indicate dosing of Drug A (two 30 mg/kg doses given 10 days apart). Both drugs were administered intraperitoneally. Mice treated with both agents were dosed with Drug A one day post treatment with cisplatin. FIG. 2D provides the mean percent change in body weight from day 7 (D7) in mice treated according to the regimens shown in FIG. 2C.

DETAILED DESCRIPTION

Figure 1A:
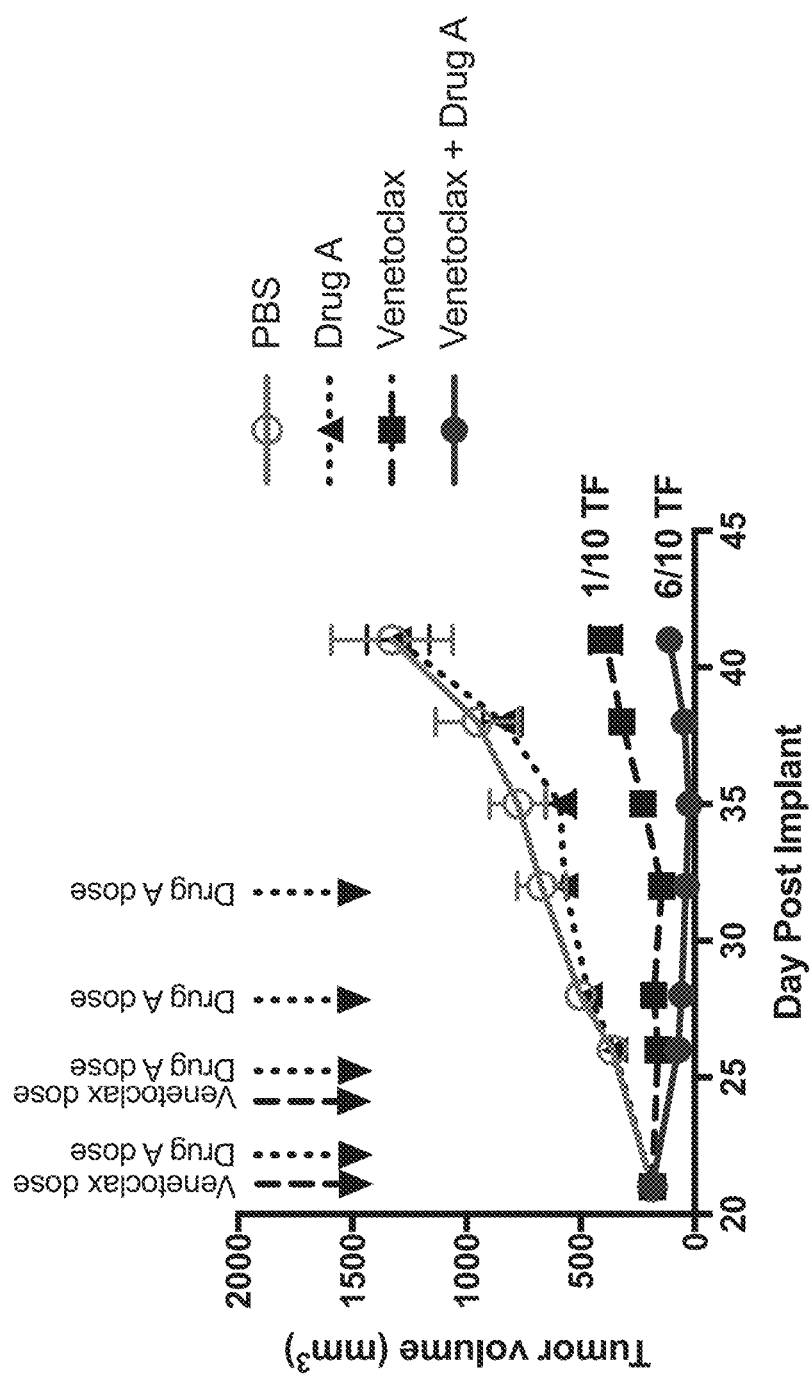
FIG. 1A provides tumor volumes (mm$^3$) in NOD-SCID female mice injected with RS4; 11 leukemia cells following treatment with Drug A, venetoclax, venetoclax/Drug A combination, or vehicle (PBS) at the indicated times post implant. Dashed arrows indicate dosing of venetoclax (250 μg) by oral gavage 2 times total, 3 days apart. Dotted arrows indicate dosing of Drug A (10 mg/kg) 4 times total, 3-4 days apart. SEM=standard error of the mean; TF=tumor free.

The following description sets forth exemplary methods, parameters and the like. It should be recognized, however, that such description is not intended as a limitation on the scope of the present disclosure but is instead provided as a description of exemplary embodiments.

Definitions

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description or the claims, such terms are intended to be inclusive in a manner similar to the term "comprising."

As used herein, the terms "treatment", "treating", and the like, refer to administering an agent, or carrying out a procedure, for the purposes of obtaining an effect. In some embodiments, the effect is prophylactic in terms of completely or partially preventing a disease or symptom thereof. In some embodiments, the effect is therapeutic in terms of affecting a partial or complete cure for a disease or symptoms of the disease.

As used herein, the term "antibody" refers to intact antibodies; antibody fragments, provided that they exhibit the desired biological activity (e.g. epitope binding); monoclonal antibodies; polyclonal antibodies; monospecific antibodies; multi-specific antibodies (e.g., bispecific antibodies); and antibody-like proteins.

As used herein, the term "antibody variable domain" refers to the portions of the light and heavy chains of an antibody that include amino acid sequences of complementary determining regions (CDRs, e.g., CDR L1, CDR L2, CDR L3, CDR H1, CDR H2, and CDR H3) and framework regions (FRs).

As used herein, the term "linker" refers to a linkage between two elements, e.g., protein domains. In some embodiments, a linker can be a covalent bond or a spacer. The term "spacer" refers to a moiety (e.g., a polyethylene glycol (PEG) polymer) or an amino acid sequence (e.g., a 1-200 amino acid sequence) occurring between two polypeptides or polypeptide domains to provide space or flexibility (or both space and flexibility) between the two polypeptides or polypeptide domains. In some embodiments, an amino acid spacer is part of the primary sequence of a polypeptide (e.g., joined to the spaced polypeptides or polypeptide domains via the polypeptide backbone).

As used herein, the term "effective amount" refers to an amount of a polypeptide or a pharmaceutical composition containing a polypeptide described herein, e.g., a polypeptide having a SIRPα D1 domain or variant thereof, that is sufficient and effective in achieving a desired therapeutic effect in treating a patient having a disease, such as a cancer, e.g., solid tumor or hematological cancer. In some embodiments, an effective amount of polypeptide will avoid adverse side effects.

As used herein, the term "pharmaceutical composition" refers to a medicinal or pharmaceutical formulation that includes an active ingredient as well as excipients or diluents (or both excipients and diluents) and enables the active ingredient to be administered by suitable methods of administration. In some embodiments, the pharmaceutical compositions disclosed herein include pharmaceutically acceptable components that are compatible with the polypeptide. In some embodiments, the pharmaceutical composition is in tablet or capsule form for oral administration or in aqueous form for intravenous or subcutaneous administration, for example by injection.

As used herein, the terms "subject," "individual," and "patient" are used interchangeably to refer to a vertebrate, for example, a mammal. Mammals include, but are not limited to, murines, simians, humans, farm animals, sport animals, and pets. Tissues, cells, and their progeny of a biological entity obtained in vivo or cultured in vitro are also encompassed. None of the terms entail supervision of a medical professional.

As used herein, the term "affinity" or "binding affinity" refers to the strength of the binding interaction between two molecules. Generally, binding affinity refers to the strength of the sum total of non-covalent interactions between a molecule and its binding partner, such as a SIRPα D1 domain variant and CD47. Unless indicated otherwise, binding affinity refers to intrinsic binding affinity, which reflects a 1:1 interaction between members of a binding pair. The binding affinity between two molecules is commonly described by the dissociation constant ($K_D$) or the association constant ($K_A$). Two molecules that have low binding affinity for each other generally bind slowly, tend to dissociate easily, and exhibit a large $K_D$. Two molecules that have high affinity for each other generally bind readily, tend to remain bound longer, and exhibit a small $K_D$. In some embodiments, the $K_D$ of two interacting molecules is determined using known methods and techniques, e.g., surface plasmon resonance (SPR). $K_D$ can be calculated as the ratio of koff/kon.

As used herein, the term "$K_D$ less than" refers to a numerically smaller $K_D$ value and an increasing binding affinity relative to the recited $K_D$ value. As used herein, the term "$K_D$ greater than" refers to a numerically larger $K_D$ value and a decreasing binding affinity relative to the recited $K_D$ value.

As used herein, "in conjunction with" refers to administration of one treatment modality in addition to another treatment modality. As such, "in conjunction with" refers to administration of one treatment modality before, during, or after administration of the other treatment modality to the individual.

Overview

Provided herein are methods of treating cancer in an individual (e.g., a human individual) that comprises administering to the individual an effective amount of (a) an agent that blocks the interaction between CD47 (e.g., hCD47) and SIRPα (e.g., hSIRPα) and (b) a chemotherapy agent (e.g., at least one chemotherapy agent, such as at least two, at least three, or at least four chemotherapy agents). In some embodiments the method further comprises administering to the individual an effective amount of a therapeutic antibody (e.g., at least one therapeutic antibody, such as at least two, at least three, or at least four therapeutic antibodies). Additionally or alternatively, in some embodiments the method further comprises administering to the individual an effective amount of an immunotherapeutic agent (e.g., at least one immunotherapeutic agent, such as at least two, at least three, or at least four immunotherapeutic agents). Additionally or alternatively, in some embodiments, the method comprises administering the polypeptide and the chemotherapy agent in combination with one or more additional modes of therapy, including, but not limited to, e.g., radiation therapy, surgery, cryoablation, and bone marrow transplant.

In some embodiments, the agent that blocks the interaction between CD47 (e.g., hCD47) and SIRPα (e.g., hSIRPα) is a small molecule inhibitor of the CD47-SIRPα pathway (e.g., RRX-001 and others). See, e.g., Miller et al. (2019) "Quantitative high-throughput screening assays for the discovery and development of SIRPα-CD47 interaction inhibitors." *PLoS ONE* 14(7): e0218897 and Sasikumar et al., ACR-NCI-EORTC International Conference: Molecular Targets and Cancer Therapeutics; Oct. 26-30, 2017; Philadelphia, PA; Abstract B007.

In some embodiments, the agent that blocks the interaction between CD47 (e.g., hCD47) and SIRPα (e.g., hSIRPα) binds CD47 (e.g., hCD47). In some embodiments, the agent binds CD47 (e.g., hCD47) with a $K_D$ of about 10 nM or better (such as at least about any one of 9 nM, 8 nM, 7 nM, 6 nM, 5 nM, 3 nM, 2 nM, 1 nM, 750 pM, 500 pM, 250 pM, 200 pM, 100 pM, 50 pM, 25 pM, 20 pM 10 pM or less than 10 pM). In some embodiments, the agent that binds CD47 (e.g., hCD47) exhibits at least about 50% CD47 receptor occupancy (e.g., at least about any one of 50%, 55%, 60%, 65%, 70%, 75%, 80%, 85%, 90%, 95%, 99%, or about 100%) in a human subject. In some embodiments, the agent that binds CD47 (e.g., hCD47) has an EC50 of about 80 ng/ml or less, e.g., about any one of 75, 70, 65, 60, 55, 50, 45, 40, 35, 30, 25, 20, 15, 10, or 5 ng/ml. In some embodiments, the agent that binds CD47 (e.g., hCD47) is an anti-CD47 antibody (e.g., a therapeutic anti-CD47 antibody) or an antigen-binding fragment thereof. In some embodiments, the antigen binding fragment is a Fab, a Fab', a Fab'-SH, an F(ab')2, an Fv, an scFv, a one-armed antibody, or a diabody. In some embodiments, the anti-CD47 antibody is a monospecific antibody. In some embodiments, the anti-CD47 antibody is a multispecific (e.g., bispecific) antibody. In some embodiments the term "anti-CD47 antibody" encompasses antibody-based constructs (such as multispecific constructs) including, without limitation triomabs, DARTs (i.e., dual-affinity re-targeting antibodies), TandAbs (i.e., tandem diabodies), tandem scFvs, CrossMabs, DNLs (i.e., dock and lock antibodies), DVD-Ig (i.e., dual variable domain immunoglobulins), tetravalent bispecific IgGs, nanobodies, dual targeting domains, and ART-Igs (i.e., asymmetric reengineering technology-immunoglobulins). Additional details regarding exemplary antibody constructs (both monospecific and multispecific) are provided in Husain et al. (2018) *Biodrugs* 32(5): 441-464 and Spiess et al. (2015) *Molecular Immunology* 67(2): 95-106. In some embodiments, the anti-CD47 antibody is Hu5F9-G4, B6H12.2, BRIC126, CC-90002, SRF231, or IBI188 (from Innovent Biologics) (see, e.g., Zhao et al. (2011), *PNAS USA* 108:18342-18347; Chao et al. (2010) *Cell* 142:699-713, Kim et al. (2012) *Leukemia* 26:2538-2545; Chao et al. (2011) *Blood* 118:4890-4891; Goto et al. (2014) *Eur J. Cancer* 50:1836-1846; and Edris et al. (2012) *PNAS USA* 109:6656-61 for additional information about these anti-CD47 antibodies).

In some embodiments, the agent that blocks the interaction between CD47 (e.g., hCD47) and SIRPα (e.g., hSIRPα) binds SIRPα (e.g., hSIRPα). In some embodiments, the agent binds SIRPα (e.g., hSIRPα) with a $K_D$ of about 10 nM or better (such as at least about any one of 9 nM, 8 nM, 7 nM, 6 nM, 5 nM, 3 nM, 2 nM, 1 nM, 750 pM, 500 pM, 250 pM, 200 pM, 100 pM, 50 pM, 25 pM, 20 pM 10 pM or less than 10 pM). In some embodiments, the agent that binds SIRPα (e.g., hSIRPα) exhibits at least about 50% SIRPα receptor occupancy (e.g., at least about any one of 50%, 55%, 60%, 65%, 70%, 75%, 80%, 85%, 90%, 95%, 99%, or about 100%) in a human subject. In some embodiments, the agent that binds SIRPα (e.g., hSIRPα) has an EC50 of about 80 ng/ml or less, e.g., about any one of 75, 70, 65, 60, 55, 50, 45, 40, 35, 30, 25, 20, 15, 10, or 5 ng/ml. In some embodiments, the agent that binds SIRPα (e.g., hSIRPα) is an anti-SIRPα antibody (e.g., a therapeutic anti-SIRPα antibody) or an antigen-binding fragment thereof. In some embodiments, the antigen binding fragment is a Fab, a Fab', a Fab'-SH, an F(ab')2, an Fv, an scFv, a one-armed antibody, or a diabody. In some embodiments, the anti-SIRPα antibody is a monospecific antibody or monospecific antibody construct (including, but not limited to those described above). In some embodiments, the anti-SIRPα antibody is a multispecific (e.g., bispecific) antibody or a multispecific antibody construct (including, but not limited to those described above). In some embodiments, the anti-SIRPα antibody is KWAR23, SE12C3, 040, or MY-1 (see, e.g., Ring et al. (2017) *PNAS USA* 114(49): E10578-E10585); Murata et al. (2018) Cancer Sci 109(5):1300-1308; and Yanigata et al. (2017) JCI Insight 2: e89140 for additional information about these anti-SIRPα antibodies). In some embodiments, the anti-SIRPα antibody is an antibody described in WO 2018/057669; US-2018-0105600-A1; US20180312587; WO2018107058; WO2019023347; US20180037652; WO2018210795; WO2017178653; WO2018149938; WO2017068164; and WO2016063233, the contents of which are incorporated herein by reference in their entireties.

In some embodiments, the agent that blocks the interaction between CD47 (e.g., hCD47) and SIRPα (e.g., hSIRPα) is an anti-SIRPβ antibody or an anti-SIRPγ antibody (e.g., an anti-SIRPβ antibody or anti-SIRPγ antibody that is capable of binding SIRPα), or an antigen-binding fragment thereof. In some embodiments, the agent is an antibody (or antigen binding fragment thereof) that is capable of bind two or more of SIRPα, SIRPβ, and SIRPγ. In some embodiments, such antibody binds SIRPα (e.g., hSIRPα) with a $K_D$ of about 10 nM or better (such as at least about any one of 9 nM, 8 nM, 7 nM, 6 nM, 5 nM, 3 nM, 2 nM, 1 nM, 750 pM, 500 pM, 250 pM, 200 pM, 100 pM, 50 pM, 25 pM, 20 pM, 10 pM or less than 10 pM). In some embodiments, the antibody exhibits at least about 50% SIRPα receptor occupancy (e.g., at least about any one of 50%, 55%, 60%, 65%, 70%, 75%, 80%, 85%, 90%, 95%, 99%, or about 100%) in a human subject. In some embodiments, the antibody has an EC50 of about 80 ng/ml or less, e.g., about any one of 75, 70, 65, 60, 55, 50, 45, 40, 35, 30, 25, 20, 15, 10, or 5 ng/ml. In some embodiments, the antigen binding fragment is a Fab, a Fab', a Fab'-SH, an F(ab')2, an Fv, an scFv, a one-armed antibody, or a diabody. In some embodiments, the antibody is a monospecific antibody or monospecific antibody construct (including, but not limited to those described above). In some embodiments, the antibody is a multispecific (e.g., bispecific) antibody or a multispecific antibody construct (including, but not limited to those described above).

In some embodiments, the agent that blocks the interaction between CD47 (e.g., hCD47) and SIRPα (e.g., hSIRPα) is a fusion polypeptide comprising a moiety that binds CD47. In some embodiments, the fusion polypeptide comprises an antibody Fc region and a moiety that binds CD47. In some embodiments, the portion of the fusion polypeptide that binds CD47 (e.g., hCD47) binds CD47 (e.g., hCD47) with a $K_D$ of about 10 nM or better (such as at least about any one of 9 nM, 8 nM, 7 nM, 6 nM, 5 nM, 3 nM, 2 nM, 1 nM, 750 pM, 500 pM, 250 pM, 200 pM, 100 pM, 50 pM, 25 pM, 20 pM, 10 pM or less than 10 pM). In some embodiments, the fusion polypeptide exhibits at least about 50% CD47 receptor occupancy (e.g., at least about any one of 50%, 55%, 60%, 65%, 70%, 75%, 80%, 85%, 90%, 95%, 99%, or about 100%) in a human subject. In some embodiments, the fusion polypeptide has an EC50 of about 80 ng/ml or less, e.g., about any one of 75, 70, 65, 60, 55, 50, 45, 40, 35, 30, 25, 20, 15, 10, or 5 ng/ml. In some embodiments, the fusion polypeptide comprises WT human antibody Fc region. In some embodiments, the fusion polypeptide comprises an Fc variant (e.g., a variant of a WT human antibody Fc region) that exhibits reduced (e.g., such as ablated) effector function as compared to a WT Fc region. Exemplary Fc variants are described in WO 2017/027422 and US 2017/0107270, the contents of which are incorporated herein by reference in their entireties. In some embodiments, moiety that binds CD47 (e.g., hCD47) is a WT SIRPα (e.g., hSIRPα), or a WT SIRPγ (e.g., hSIRPγ). In some embodiments, moiety that binds CD47 (e.g., hCD47) is a CD47-binding fragment (e.g., d1 domain) of a WT SIRPα (e.g., hSIRPα), or a WT SIRPγ (e.g., hSIRPγ). In some embodiments, the moiety that binds CD47 (e.g., hCD47) is a SIRPα variant, a SIRPγ variant, a SIRPβ variant, or a CD47-binding fragment thereof (e.g., the d1 domain). Exemplary SIRPγ variants, SIRPβ1 variant, and SIRPβ2 variants are described in, e.g., WO 2013/109752; US 2015/0071905; U.S. Pat. No. 9,944,911; WO 2016/023040; WO 2017/027422; US 2017/0107270; U.S. Pat. Nos. 10,259,859; 9,845,345; WO2016187226; US20180155405; WO2017177333; WO2014094122; US2015329616; US20180312563; WO2018176132; WO2018081898; WO2018081897; PCT/US2019/048921; US20180141986A1; and EP3287470A1, the contents of which are incorporated herein by reference in their entireties.

In some embodiments, the agent that blocks the interaction between CD47 (e.g., hCD47) and SIRPα (e.g., hSIRPα) is a fusion polypeptide comprising an antibody Fc region and a SIRPα variant. In some embodiments, the SIRPα variant binds CD47 (e.g., hCD47) with a $K_D$ of about 10 nM or better (such as at least about any one of 9 nM, 8 nM, 7 nM, 6 nM, 5 nM, 3 nM, 2 nM, 1 nM, 750 pM, 500 pM, 250 pM, 200 pM, 100 pM, 50 pM, 25 pM, 20 pM, 10 pM or less than 10 pM). In some embodiments, the fusion polypeptide exhibits at least about 50% CD47 receptor occupancy (e.g., at least about any one of 50%, 55%, 60%, 65%, 70%, 75%, 80%, 85%, 90%, 95%, 99%, or about 100%) in a human subject. In some embodiments, the fusion polypeptide has an EC50 of about 80 ng/ml or less, e.g., about any one of 75, 70, 65, 60, 55, 50, 45, 40, 35, 30, 25, 20, 15, 10, or 5 ng/ml. In some embodiments, the fusion polypeptide comprises WT human antibody Fc region. In some embodiments, the fusion polypeptide comprises an Fc variant (e.g., a variant of a WT human antibody Fc region) that exhibits reduced (e.g., such as ablated) effector function as compared to a WT Fc region, such as those described in the references cited herein. In some embodiments, the fusion polypeptide comprises a SIRPα variant described in WO 2013/109752; US 2015/0071905; WO 2016/023040; WO 2017/027422; US 2017/0107270; U.S. Pat. Nos. 10,259,859; 9,845,345; WO2016187226; US20180155405; WO2017177333; WO2014094122; US2015329616; US20180312563; WO2018176132; WO2018081898; WO2018081897; US20180141986A1; and EP3287470A1, the contents of which are incorporated herein by reference in their entireties. In some embodiments, the fusion polypeptide comprising an antibody Fc region and a SIRPα variant is TTI-621, TTI-622, or IMM01 (see, e.g., Petrova et al. (2017) Clin Cancer Res 23:1086-1079; Russ et al. (2018) Blood Rev S0268-960X(17)30093-0; Zhang, X, Chen, W, Fan, J et al. Disrupting CD47-SIRPα axis alone or combined with autophagy depletion for the therapy of glioblastoma. Carcinogenesis 2018; 39: 689-99).

In some embodiments, the agent that blocks the interaction between CD47 (e.g., hCD47) and SIRPα (e.g., hSIRPα) is a fusion polypeptide comprising a SIRPα D1 domain variant (e.g., a SIRPα D1 domain variant described herein) and an Fc domain variant (e.g., an Fc domain variant described herein).

In some embodiments, provided is a method of treating cancer (e.g., leukemia, such as acute lymphoblastic leukemia) in an individual (e.g., a human individual), comprising administering to the individual an effective amount of (a) an agent that blocks the interaction between CD47 (e.g., hCD47) and SIRPα (e.g., hSIRPα) and (b) an BCL2 inhibitor (e.g., a selective BCL2 inhibitor, such as venetoclax). In some embodiments, the agent is a polypeptide comprising a SIRPα D1 domain variant and an Fc domain variant)

wherein the SIRPα D1 domain variant comprises the amino acid sequence of SEQ ID NO: 81 or SEQ ID NO: 85, wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat.

In some embodiments, provided is a method of treating cancer (e.g., colon cancer) in an individual (e.g., a human individual), comprising administering to the individual an effective amount of (a) an agent that blocks the interaction between CD47 (e.g., hCD47) and SIRPα (e.g., hSIRPα), and (b) platinum-based chemotherapy agent (e.g., cisplatin). In some embodiments, the agent is a polypeptide comprising a SIRPα D1 domain variant and an Fc domain variant, wherein the SIRPα D1 domain variant comprises the amino acid sequence of SEQ ID NO: 81 or SEQ ID NO: 85; wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat.

In some embodiments, provided is a method of treating cancer (e.g., head and neck cancer, such as head and neck squamous cell carcinoma) in an individual (e.g., a human individual), comprising administering to the individual an effective amount of (a) an agent that blocks the interaction between CD47 (e.g., hCD47) and SIRPα (e.g., hSIRPα) (b) a PD-1 inhibitor, (c) an anti-metabolite, and (d) a platinum-based chemotherapy agent. In some embodiments, the agent that blocks the interaction between CD47 and SIRPα is a polypeptide comprising a SIRPα D1 domain variant and an Fc domain variant) wherein the SIRPα D1 domain variant comprises the amino acid sequence of SEQ ID NO: 81 or SEQ ID NO: 85, wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat.

In some embodiments, provided is a method of treating cancer (e.g., gastric cancer or gastroesophageal cancer) in an individual (e.g., a human individual), comprising administering to the individual an effective amount of (a) an agent that blocks the interaction between CD47 (e.g., hCD47) and SIRPα (e.g., hSIRPα) (b) an anti-HER2 antibody, (c) an anti-VEGFR2 antibody, and (d) paclitaxel. In some embodiments, the agent that blocks the interaction between CD47 and SIRPα is a polypeptide comprising a SIRPα D1 domain variant and an Fc domain variant) wherein the SIRPα D1 domain variant comprises the amino acid sequence of SEQ ID NO: 81 or SEQ ID NO: 85, wherein the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat.

Further details regarding the methods of treatment with polypeptides comprising a SIRPα D1 domain variant and an Fc domain variant are described below. See also WO 2017/027422 and U.S. Pat. No. 10,259,859, the contents of each of which are incorporated by reference herein in their entireties.

Signal-Regulatory Protein α (SIRPα) DI Domain and Variants Thereof

Disclosed herein, in some embodiments, are polypeptides comprising a signal-regulatory protein α (SIRP-α) D1 variant comprising a SIRPα D1 domain, or a fragment thereof, that comprises an amino acid mutation at residue 80 relative to a wild-type SIRPα D1 domain (e.g., a wild-type SIRPα D1 domain set forth in SEQ ID NO: 1 or 2); and at least one additional amino acid mutation relative to a wild-type SIRPα D1 domain (e.g., a wild-type SIRPα D1 domain set forth in SEQ ID NO: 1 or 2) at a residue selected from the group consisting of: residue 6, residue 27, residue 31, residue 47, residue 53, residue 54, residue 56, residue 66, and residue 92.

Also disclosed herein, in some embodiments, are polypeptides comprising an Fc domain variants, wherein an Fc domain variant dimer comprises two Fc domain variants, wherein each Fc domain variant independently is selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A.

Signal-regulatory protein α ("SIRP-α" or "SIRP-alpha") is a transmembrane glycoprotein belonging to the Ig superfamily that is widely expressed on the membrane of myeloid cells. SIRPα interacts with CD47, a protein broadly expressed on many cell types in the body. The interaction of SIRPα with CD47 prevents engulfment of "self" cells, which can otherwise be recognized by the immune system. It has been observed that high CD47 expression on tumor cells can act, in acute myeloid leukemia and several solid tumor cancers, as a negative prognostic factor for survival.

Native SIRPα comprises 3 highly homologous immunoglobulin (Ig)-like extracellular domains—D1, D2, and D3. The SIRPα D1 domain ("D1 domain") refers to the membrane distal, extracellular domain of SIRPα and mediates binding of SIRPα to CD47. As used herein, the term "SIRPα polypeptide" refers to any SIRPα polypeptide or fragment thereof that is capable of binding to CD47. There are at least ten variants of wild-type human SIRPα. Table 1 shows the amino acid sequences of the D1 domains of the naturally occurring wild-type human SIRPα D1 domain variants (SEQ ID NOs: 1 and 2). In some embodiments, a SIRPα polypeptide comprises a SIRPα D1 domain. In some embodiments, a SIRPα polypeptide comprises a wild-type D1 domain, such as those provided in SEQ ID NOs: 1 and 2. In some embodiments, a SIRPα polypeptide includes a D2 or D3 domain (or both a D2 and a D3 domain) (see Table 3) of a wild-type human SIRPα.

In some embodiments, a polypeptide of the disclosure comprising a SIRPα D1 domain variant binds with higher binding affinity to CD47 than a wild-type human SIRPα D1 domain. In some embodiments, the SIRPα D1 domain variant binds to human CD47 with at least 1-fold (e.g., at least 1.5-fold, 2-fold, 2.5-fold, 3-fold, 3.5-fold, 4-fold, 5-fold or greater than 5-fold) affinity than the affinity of a naturally occurring D1 domain. In some embodiments, the SIRPα D1 domain variant binds to human CD47 with at least 1-fold (e.g., at least 10-fold, 100-fold, 1000-fold or greater than 1000-fold) affinity than the affinity of a naturally occurring D1 domain.

As used herein, the term "optimized affinity" or "optimized binding affinity" refers to an optimized strength of the binding interaction between a polypeptide disclosed herein,

TABLE 1

Sequences of Wild-Type SIRPα D1 Domains

| SEQ ID NO: | Description | Amino Acid Sequence |
|---|---|---|
| 1 | Wild-type D1 domain variant 1 | EEELQVIQPDKSVLVAAGETATLRCTATSLIPVGPIQ WFRGAGPGRELIYNQKEGHFPRVTTVSDLTKRNNM DFSIRIGNITPADAGTYYCVKFRKGSPDDVEFKSGA GTELSVRAKPS |
| 2 | Wild-type D1 domain variant 2 | EEELQVIQPDKSVSVAAGESAILHCTVTSLIPVGPIQ WFRGAGPARELIYNQKEGHFPRVTTVSESTKRENM DFSISISNITPADAGTYYCVKFRKGSPDTEFKSGAGT ELSVRAKPS |
| 11 | Wild-type pan-D1 domain | EEX$_1$LQVIQPDKX$_2$VX$_3$VAAGEX$_4$AX5LX$_6$CTX$_7$TSLIP VGPIQWFRGAGPX$_8$RELIYNQKEGHFPRVTTVSX$_9$X$_{10}$ TKRX$_{11}$NMDFX$_{12}$IX$_{13}$IX$_{14}$NITPADAGTYYCVKFRKGS X$_{15}$X$_{16}$DX$_{17}$EFKSGAGTELSVRX$_{18}$KPS |
|  | Amino acid substitutions relative to SEQ ID NO: 11 | X$_1$ is E or G; X$_2$ is S or F; X$_3$ is L or S; X$_4$ is T or S; X$_5$ is T or I; X$_6$ is R, H, or L; X$_7$ is A or V; X$_8$ is G or A; X$_9$ is D or E; X$_{10}$ is L or S; X$_{11}$ is N or E or D; X$_{12}$ is S or P; X$_{13}$ is R or S; X$_{14}$ is G or S; X$_{15}$ is P or absent; X$_{16}$ is D or P; X$_{17}$ is V or T; and X$_{18}$ is A or G |

As used herein, the term "SIRPα D1 domain variant" refers to a polypeptide comprising a SIRPα D1 domain or a CD47-binding portion of a SIRPα polypeptide that has a higher affinity to CD47 than wild-type SIRPα. A SIRPα D1 domain variant comprises at least one amino acid substitution, deletion, or insertion (or a combination thereof) relative to a wild-type SIRPα.

In some embodiments, SIRPα D1 domain variants disclosed herein comprise a SIRPα D1 domain or variant thereof. In some embodiments, a SIRPα D1 domain variant comprises one or more amino acid substitutions, insertions, additions, or deletions relative to a wild-type D1 domain shown in SEQ ID NOs: 1 and 2. Table 2 lists exemplary amino acid substitutions in each SIRPα D1 domain variant (SEQ ID NOs: 13-14). In some embodiments, the SIRPα D1 domain polypeptide or SIRPα D1 domain variant comprises a fragment of the D1 domain. In some embodiments, the SIRPα polypeptide fragment or SIRPα D1 domain variant fragment comprises an amino acid sequence of less than 10 amino acids in length, about 10 amino acids in length, about 20 amino acids in length, about 30 amino acids in length, about 40 amino acids in length, about 50 amino acids in length, about 60 amino acids in length, about 70 amino acids in length, about 80 amino acids in length, about 90 amino acids in length, about 100 amino acids in length, or more than about 100 amino acids in length. In some embodiments, the SIRPα D1 domain fragments retain the ability to bind to CD47.

including a SIRPα D1 domain variant, and CD47. For example, in some embodiments, the polypeptide binds primarily or with higher affinity to CD47 on cancer cells and does not substantially bind or binds with lower affinity to CD47 on non-cancer cells. In some embodiments, the binding affinity between the polypeptide and CD47 is optimized such that the interaction does not cause clinically relevant toxicity or decreases toxicity compared to a variant which binds with maximal affinity. In some embodiments, in order to achieve an optimized binding affinity between a polypeptide provided herein and CD47, the polypeptide including a SIRPα D1 domain variant is developed to have a lower binding affinity to CD47 than which is maximally achievable. In some embodiments, the SIRPα D1 domain variants disclosed herein cross react with rodent, non-human primate (NHP), and human CD47.

As used herein, the term "immunogenicity" refers to the property of a protein (e.g., a therapeutic protein) which causes an immune response in the host as though it is a foreign antigen. The immunogenicity of a protein can be assayed in vitro in a variety of different ways, such as through in vitro T-cell proliferation assays.

As used herein, the term "minimal immunogenicity" refers to an immunogenicity of a protein (e.g., a therapeutic protein) that has been modified, e.g., through amino acid substitutions, to be lower (e.g., at least 10%, 25%, 50%, or 100% lower) than the immunogenicity before the amino acid substitutions are introduced (e.g., an unmodified protein). In some embodiments, a protein (e.g., a therapeutic protein) is modified to have minimal immunogenicity and causes no or very little host immune response even though it is a foreign antigen.

In some embodiments, the SIRPα D1 domain variant demonstrates minimal immunogenicity. In some embodiments, a SIRPα polypeptide of the disclosure administered to a subject has the same amino acid sequence as that of the SIRPα polypeptide in a biological sample of the subject, except for amino acid changes which increase affinity of the SIRPα D1 domain variant. In some embodiments, the polypeptide variants disclosed herein lower the risk of side effects compared to anti-CD47 antibodies or wild-type SIRPα. In some embodiments, the polypeptide variants disclosed herein lower the risk of anemia compared to anti-CD47 antibodies or wild-type SIRPα. In some embodiments, the polypeptide variants disclosed herein do not cause acute anemia in rodent or non-human primates (NHP) studies.

Table 2 lists specific amino acid substitutions in a SIRPα D1 domain variant relative to each D1 domain sequence. In some embodiments, a SIRPα D1 domain variant includes one or more (e.g., two, three, four, five, six, seven, eight, nine, ten, eleven, twelve, thirteen, fourteen or more) of the substitutions listed in Table 2. In some embodiments, a SIRPα D1 domain variant includes at most fourteen amino acid substitutions relative to a wild-type D1 domain. In some embodiments, a SIRPα D1 domain variant includes at most ten amino acid substitutions relative to a wild-type D1 domain. In some embodiments, a SIRPα D1 domain variant includes at most seven amino acid substitutions relative to a wild-type D1 domain. In some embodiments, a SIRPα D1 domain variant of the disclosure has at least 90% (e.g., at least 92%, 95%, 97% or greater than 97%) amino acid sequence identity to a sequence of a wild-type D1 domain.

In some embodiments, a SIRPα D1 domain variant is a chimeric SIRPα D1 domain variant that includes a portion of two or more wild-type D1 domains or variants thereof (e.g., a portion of one wild-type D1 domain or variant thereof and a portion of another wild-type D1 domain or variant thereof). In some embodiments, a chimeric SIRPα D1 domain variant includes at least two portions (e.g., three, four, five or more portions) of wild-type D1 domains or variants thereof, wherein each of the portions is from a different wild-type D1 domain. In some embodiments, a chimeric SIRPα D1 domain variant further includes one or more amino acid substitutions listed in Table 2.

TABLE 2

Amino Acid Substitutions in a SIRPα D1 Domain Variant

| SEQ ID NO: | Description | Amino Acid Sequence |
|---|---|---|
| 13 | D1 domain v1 | EEEX$_1$QX$_2$IQPDKSVLVAAGETX$_3$TLRCTX$_4$TSLX$_5$PVG PIQWFRGAGPGRX$_6$LIYNQX$_7$X$_8$GX$_9$FPRVTTVSDX$_{10}$T X$_{11}$RNNMDFSIRIGNITPADAGTYYCX$_{12}$KX$_{13}$RKGSPDD VEX$_{14}$KSGAGTELSVRAKPS |
| — | Amino acid substitutions relative to SEQ ID NO: 13 | X$_1$ = L, I, V; X$_2$ = V, L, I; X$_3$ = A, V; X$_4$ = A, I, L; X$_5$ = I, T, S, F; X$_6$ = E, V, L; X$_7$ = K, R; X$_8$ = E, Q; X$_9$ = H, P, R; X$_{10}$ = L, T, G; X$_{11}$ = K, R; X$_{12}$ = V, I; X$_{13}$ = F, L, V; X$_{14}$ = F, V |
| 14 | D1 domain v2 | EEEX$_1$QX$_2$IQPDKSVSVAAGESX$_3$ILHCTX$_4$TSLX$_5$PVGP IQWFRGAGPARX$_6$LIYNQX$_7$X$_8$GX$_9$FPRVTTVSEX$_{10}$TX$_{11}$ RENMDFSISISNITPADAGTYYCX$_{12}$KX$_{13}$RKGSPDTEX$_{14}$ KSGAGTELSVRAKPS |
| — | Amino acid substitutions relative to SEQ ID NO: 14 | X$_1$ = L, I, V; X$_2$ = V, L, I; X$_3$ = A, V; X$_4$ = V, I, L; X$_5$ = I, T, S, F; X$_6$ = E, V, L; X$_7$ = K, R; X$_8$ = E, Q; X$_9$ = H, P, R; X$_{10}$ = S, T, G; X$_{11}$ = K, R; X$_{12}$ = V, I; X$_{13}$ = F, L, V; X$_{14}$ = F, V |
| 23 | Pan D1 domain | EEX$_1$X$_2$QX$_3$IQPDKX$_4$VX$_5$VAAGEX$_6$X$_7$X$_8$LX$_9$CTX$_{10}$TSL X$_{11}$PVGPIQWFRGAGPX$_{12}$RX$_{13}$LIYNQX$_{14}$X$_{15}$GX$_{16}$FPRV TTVSX$_{17}$X$_{18}$TX$_{19}$RX$_{20}$NMDFX$_{21}$IX$_{22}$IX$_{23}$NITPADAGTYY CX$_{24}$KX$_{25}$RKGSPDX$_{26}$X$_{27}$EX$_{28}$KSGAGTELSVRX$_{29}$KPS |
| — | Amino acid substitutions relative to SEQ ID NO: 23 | X$_1$ = E, G; X$_2$ = L, I, V; X$_3$ = V, L, I; X$_4$ = S, F; X$_5$ = L, S; X$_6$ = S, T; X$_7$ = A, V; X$_8$ = I, T; X$_9$ = H, R; X$_{10}$ = A, V, I, L; X$_{11}$ = I, T, S, F; X$_{12}$ = A, G; X$_{13}$ = E, V, L; X$_{14}$ = K, R; X$_{15}$ = E, Q; X$_{16}$ = H, P, R; X$_{17}$ = D, E; X$_{18}$ = S, L, T, G; X$_{19}$ = K, R; X$_{20}$ = E, D; X$_{21}$ = S, P; X$_{22}$ = S, R; X$_{23}$ = S, G; X$_{24}$ = V, I; X$_{25}$ = F, L, V; X$_{26}$ = D or absent; X$_{27}$ = T, V; X$_{28}$ = F, V; and X$_{29}$ = A, G |

In some embodiments, a polypeptide comprises a SIRPα D1 domain variant that comprises a sequence of: EEE$X_1$Q$X_2$IQPDKSVLVAAGET$X_3$TLRCT$X_4$TSL$X_5$PVG PIQWFRGAGPGR$X_6$LIYNQ$X_7$$X_8$G$X_9$FPRVTTVSD$X_{10}$ T$X_{11}$RNNMDFSIRIGNITPADAGTYYC$X_{12}$K$X_{13}$RKGSP DDVE$X_{14}$KSGAGTELSVRAKPS (SEQ ID NO: 13), wherein $X_1$ is L, I, or V; $X_2$ is V, L, or, I; $X_3$ is A or V; $X_4$ is A, I, or L; $X_5$ is I, T, S, or F; $X_6$ is E, V, or L; $X_7$ is K or R; $X_8$ is E or Q; $X_9$ is H, P, or R; $X_{10}$ is L, T, or G; $X_{11}$ is K or R; $X_{12}$ is V or I; $X_{13}$ is F, L, or V; and $X_{14}$ is F or V; and wherein the variant comprises at least one amino acid substitution relative to a wild-type SIRPα D1 domain that comprises the sequence of SEQ ID NO: 1.

In some embodiments, a polypeptide comprises a SIRPα D1 domain variant that comprises the sequence of SEQ ID NOs: 13, wherein $X_1$ is L, I, or V. In any of the aforementioned embodiments, $X_2$ is V, L, or, I. In some embodiments, $X_3$ is A or V. In some embodiments, $X_4$ is A, I, or L. In some embodiments, $X_5$ is I, T, S, or F. In some embodiments, $X_6$ is E, V, or L. In some embodiments, $X_7$ is K or R. In some embodiments, $X_8$ is E or Q. In some embodiments, $X_9$ is H, P, or R. In some embodiments, $X_{10}$ is L, T, or G. In some embodiments, $X_{11}$ is K or R. In some embodiments, $X_{12}$ is V or I. In some embodiments, $X_{13}$ is F, L, V. In some embodiments, $X_{14}$ is F or V. In some embodiments, the polypeptide of this aspect of the disclosure includes no more than six amino acid substitutions relative to the wild-type SIRPα D1 domain that comprises the sequence of SEQ ID NO: 1.

In some embodiments, the polypeptide binds CD47 with at least 10-fold greater binding affinity than the wild-type SIRPα D1 domain that comprises the sequence of SEQ ID NO: 1. In some embodiments, the polypeptide binds CD47 with at least 100-fold greater binding affinity than the wild-type SIRPα D1 domain that comprises the sequence of SEQ ID NO: 1. In some embodiments, the polypeptide binds CD47 with at least 1000-fold greater binding affinity than the wild-type SIRPα D1 domain that comprises the sequence of SEQ ID NO: 1. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In some embodiments, a polypeptide includes a SIRPα D1 domain variant that comprises a sequence of: EEE$X_1$Q$X_2$IQPDKSVSVAAGES$X_3$ILHCT$X_4$TSL$X_5$PVG PIQWFRGAGPAR$X_6$LIYNQ$X_7$$X_8$G$X_9$FPRVTTVSE$X_{10}$ T$X_{11}$RENMDFSISISNITPADAGTYYC$X_{12}$K$X_{13}$RKGSPD TE$X_{14}$KSGAGTELSVR AKPS (SEQ ID NO: 14), wherein $X_1$ is L, I, or V; $X_2$ is V, L, or, I; $X_3$ is A or V; $X_4$ is V, I, or L; $X_5$ is I, T, S, or F; $X_6$ is E, V, or L; $X_7$ is K or R; $X_8$ is E or Q; $X_9$ is H, P, or R; $X_{10}$ is S, T, or G; $X_{11}$ is K or R; $X_{12}$ is V or I; $X_{13}$ is F, L, or V; and $X_{14}$ is F or V; and wherein the variant comprises at least one amino acid substitution relative to a wild-type SIRPα D1 domain that comprises the sequence of SEQ ID NO: 2.

In some embodiments in this aspect of the disclosure, the polypeptide comprises the sequence of SEQ ID NO: 14, wherein $X_1$ is L, I, or V. In some embodiments, $X_2$ is V, L, or, I. In some embodiments, $X_3$ is A or V. In some embodiments, $X_4$ is V, I, or L. In some embodiments, $X_5$ is I, T, S, or F. In some embodiments, $X_6$ is E, V, or L. In some embodiments, $X_7$ is K or R. In some embodiments, $X_8$ is E or Q. In some embodiments, $X_9$ is H, P, or R. In some embodiments, $X_{10}$ is S, T, or G. In some embodiments, $X_{11}$ is K or R. In some embodiments, $X_{12}$ is V or I. In some embodiments, $X_{13}$ is F, L, or V. In some embodiments, $X_{14}$ is F or V. In some embodiments, the polypeptide of this aspect of the disclosure includes no more than six amino acid substitutions relative to the wild-type SIRPα D1 domain that comprises the sequence of SEQ ID NO: 2.

In some embodiments, the polypeptide binds CD47 with at least 10-fold greater binding affinity than the wild-type SIRPα D1 domain having the sequence of SEQ ID NO: 2. In some embodiments, the polypeptide binds CD47 with at least 100-fold greater binding affinity than the wild-type SIRPα D1 domain having the sequence of SEQ ID NO: 2. In some embodiments, the polypeptide binds CD47 with at least 1000-fold greater binding affinity than the wild-type SIRPα D1 domain having the sequence of SEQ ID NO: 2. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In some embodiments, a polypeptide includes a SIRPα D1 domain variant having a sequence of: EE$X_1$$X_2$Q$X_3$IQPDK$X_4$V$X_5$VAAGE$X_6$$X_7$$X_8$L$X_9$CT$X_{10}$TS L$X_{11}$PVGPIQWFRGAGP$X_{12}$R$X_{13}$LIYNQ$X_{14}$$X_{15}$G$X_{16}$FP RVTTVS$X_{17}$$X_{18}$T$X_{19}$R$X_{20}$NMDF$X_{21}$I$X_{22}$I$X_{23}$NITPADA GTYYC$X_{24}$K$X_{25}$RKGSPD$X_{26}$$X_{27}$E$X_{28}$KSGAGTELSVR $X_{29}$KPS (SEQ ID NO: 23), wherein $X_1$ is E or G; $X_2$ is L, I, or V; $X_3$ is V, L, or, I; $X_4$ is S or F; $X_5$ is L or S; $X_6$ is S or T; $X_7$ is A or V; $X_8$ is I or T; $X_9$ is H or R; $X_{10}$ is A, V, I, or L; $X_{11}$ is I, T, S, or F; $X_{12}$ is A or G; $X_{13}$ is E, V, or L; $X_{14}$ is K or R; $X_{15}$ is E or Q; $X_{16}$ is H, P, or R; $X_{17}$ is D or E; $X_{18}$ is S, L, T, or G; $X_{19}$ is K or R; $X_{20}$ is E or D; $X_{21}$ is S or P; $X_{22}$ is S or R; $X_{23}$ is S or G; $X_{24}$ is V or I; $X_{25}$ is F, L, V; $X_{26}$ is D or absent; $X_{27}$ is T or V; $X_{28}$ is F or V; and $X_{29}$ is A or G; and wherein the variant comprises at least one amino acid substitution relative to a wild-type SIRPα D1 domain having the sequence of SEQ ID NO: 1 or 2.

In any of the aforementioned embodiments in this aspect of the disclosure, $X_2$ is L, I, or V. In any of the aforementioned embodiments, $X_3$ is V, L, or, I. In embodiments, $X_4$ is S or F. In some embodiments, $X_5$ is L or S. In some embodiments, $X_6$ is S or T. In some embodiments, $X_7$ is A or V. In some embodiments, $X_8$ is I or T. In some embodiments, $X_9$ is H or R. In some embodiments, $X_{10}$ is A, V, I, or L. In some embodiments, $X_{11}$ is I, T, S, or F. In some embodiments, $X_{12}$ is A or G. In some embodiments, $X_{13}$ is E, V, or L. In some embodiments, $X_{14}$ is K or R. In some embodiments, $X_{15}$ is E or Q. In some embodiments, $X_{16}$ is H, P, or R. In some embodiments, $X_{17}$ is D or E. In some embodiments, $X_{18}$ is S, L, T, or G. In some embodiments, $X_{19}$ is K or R. In some embodiments, $X_{20}$ is E or D. In some embodiments, $X_{21}$ is S or P. In some embodiments, $X_{22}$ is S or R. In some embodiments, $X_{23}$ is S or G. In some embodiments, $X_{24}$ is V or I. In some embodiments, $X_{25}$ is F, L, V. In some embodiments, $X_{26}$ is D or absent. In some embodiments, $X_{27}$ is T or V. In some embodiments, $X_{28}$ is F or V. In some embodiments, $X_{29}$ is A or G. In some embodiments, the polypeptide of this aspect of the disclosure includes no more than six amino acid substitutions relative to the wild-type SIRPα D1 domain having the sequence of SEQ ID NO: 1 or 2.

In some embodiments, the polypeptide binds CD47 with at least 10-fold greater binding affinity than the wild-type SIRPα D1 domain having the sequence of SEQ ID NO: 1 or 2. In some embodiments, the polypeptide binds CD47 with at least 100-fold greater binding affinity than the wild-type SIRPα D1 domain having the sequence of SEQ ID NO: 1 or 2. In some embodiments, the polypeptide binds CD47 with at least 1000-fold greater binding affinity than the wild-type SIRPα D1 domain having the sequence of SEQ ID NO: 1 or 2. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In some embodiments, a polypeptide of the disclosure including a SIRPα D1 domain variant further comprises a D2 domain having the sequence of SEQ ID NO: 24, a D3 domain having the sequence of SEQ ID NO: 25, or a D2 domain having the sequence of SEQ ID NO: 24 and a D3 domain having the sequence of SEQ ID NO: 25 of a wild-type human SIRPα as shown in Table 3. In some embodiments, the SIRPα D1 domain variant further comprises a fragment or variant of a D2 domain or a fragment or variant of a D3 domain. In some embodiments, the SIRPα D1 domain variant further comprises a fragment or variant of a D2 domain and a fragment or variant of a D3 domain. In some embodiments, a SIRPα D1 domain variant is joined to a D2 or D3 domain by way of a linker. In some embodiments, a SIRPα D1 domain variant is joined to a D2 and D3 domain by way of a linker.

TABLE 3

Amino Acid Sequences of SIRPα D2 and D3 Domains

| SEQ ID NO: | Description | Amino Acid Sequence |
|---|---|---|
| 24 | SIRPα D2 domain | APVVSGPAARATPQHTVSFTCESHGFSPRDITL KWFKNGNELSDFQTNVDPVGESVSYSIHSTAKV VLTREDVHSQVICEVAHVTLQGDPLRGTANLSE TIR |
| 25 | SIRPα D3 domain | VPPTLEVTQQPVRAENQVNVTCQVRKFYPQRLQ LTWLENGNVSRTETASTVTENKDGTYNWMSWLL VNVSAHRDDVKLTCQVEHDGQPAVSKSHDLKVS |

In some embodiments, a polypeptide of the disclosure including a SIRPα D1 domain variant is attached to an Fc domain variant in order to improve the pharmacokinetic properties of the polypeptide, e.g., increase serum half-life. In some embodiments, a SIRPα D1 domain variant is attached to an Fc domain variant that is unable to dimerize. In some embodiments, Fc domain variants serve to increase the serum half-life of the polypeptides described herein. In some embodiments, a polypeptide of the disclosure including a SIRPα D1 domain variant does not include the sequence of any one of SEQ ID NOs: 26-36 shown in Table 4.

TABLE 4

| SEQ ID NO: | AMINO ACID SEQUENCE |
|---|---|
| 26 | EEELQVIQPDKSVSVAAGESAILHCTITSLIPVGPIQWFRGAGP ARELIYNQREGHFPRVTTVSETTRRENMDFSISISNITPADAGT YYCVKFRKGSPDTEVKSGAGTELSVRAKPS |
| 27 | EEEVQVIQPDKSVSVAAGESAILHCTLTSLIPVGPIQWFRGAGP ARVLIYNQRQGHFPRVTTVSEGTRRENMDFSISISNITPADAGT YYCIKFRKGSPDTEFKSGAGTELSVRAKPS |
| 28 | EEEVQIIQPDKSVSVAAGESVILHCTITSLTPVGPIQWFRGAGP ARLLIYNQREGPFPRVTTVSETTRRENMDFSISISNITPADAGT YYCVKLRKGSPDTEFKSGAGTELSVRAKPS |
| 29 | EEELQIIQPDKSVSVAAGESAILHCTITSLSPVGPIQWFRGAGP ARVLIYNQRQGPFPRVTTVSEGTKRENMDFSISISNITPADAGT YYCIKLRKGSPDTEFKSGAGTELSVRAKPS |
| 30 | EEEIQVIQPDKSVSVAAGESVIIHCTVTSLFPVGPIQWFRGAGP ARVLIYNQRQGRFPRVTTVSEGTKRENMDFSISISNITPADAGT YYCVKVRKGSPDTEVKSGAGTELSVRAKPS |
| 31 | EEEVQIIQPDKSVSVAAGESIILHCTVTSLFPVGPIQWFRGAGP ARVLIYNQREGRFPRVTTVSEGTRRENMDFSISISNITPADAGT YYCIKLRKGSPDTEFKSGAGTELSVRAKPS |
| 32 | EEEVQLIQPDKSVSVAAGESAILHCTVTSLFPVGPIQWFRGAGP ARVLIYNQREGPFPRVTTVSEGTKRENMDFSISISNITPADAGT YYCIKFRKGSPDTEVKSGAGTELSVRAKPS |
| 33 | EEELQIIQPDKSVLVAAGETATLRCTITSLFPVGPIQWFRGAGP GRVLIYNQRQGPFPRVTTVSDTTKRNNMDFSIRIGNITPADAGT YYCIKFRKGSPDDVEFKSGAGTELSVRAKPS |
| 34 | EEELQIIQPDKSVSVAAGESAILHCTITSLFPVGPIQWFRGAGP ARLLIYNQRQGPFPRVTTVSETTKRENMDFSISISNITPADAGT YYCVKFRKGSPDTEFKSGAGTELSVRAKPS |
| 35 | EEEVQIIQPDKSVSVAAGESAILHCTITSLFPVGPIQWFRGAGP ARVLIYNQKQGPFPRVTTISETTRRENMDFSISISNITPADAGT YYCIKFRKGSPDTEFKSGAGTELSVRAKPS |
| 36 | EEELQIIQPDKSVSVAAGESAILHCTITSLTPVGPIQWFRGAGP ARVLIYNQRQGPFPRVTTVSEGTRRENMDFSISISNITPADAGT YYCIKFRKGSPDTEVKSGAGTELSVRAKPS |

In some embodiments, the polypeptides and polypeptide constructs described herein are utilized in vitro for binding assays, such as immune assays. For example, in some embodiments, the polypeptides and polypeptide constructs described herein are utilized in liquid phase or bound to a solid phase carrier. In some embodiments, polypeptides utilized for immunoassays are detectably labeled in various ways.

In some embodiments, polypeptides and polypeptide constructs described herein are bound to various carriers and used to detect the presence of specific antigen expressing cells. Examples of carriers include glass, polystyrene, polypropylene, polyethylene, dextran, nylon, amylases, natural and modified celluloses, polyacrylamides, agaroses, and magnetite. The nature of the carrier can be either soluble or insoluble.

Various different labels and methods of labeling are known. Examples of labels include enzymes, radioisotopes, fluorescent compounds, colloidal metals, chemiluminescent compounds, and bio-luminescent compounds. Various techniques for binding labels to polypeptides disclosed herein are available.

In some embodiments, the polypeptides are coupled to low molecular weight haptens. These haptens are then specifically detected by means of a second reaction. For example, in some embodiments, the hapten biotin is used with avidin or the haptens dinitrophenol, pyridoxal, or fluorescein are detected with specific anti-hapten antibodies (e.g., anti-dinitrophenol antibodies, anti-pyridoxal antibodies, and anti-fluorescein antibodies respectively).

SIRPα D1 Domain Variants with Altered Glycosylation Patterns

Disclosed herein, in some embodiments, are polypeptides comprising a signal-regulatory protein α (SIRP-α) D1 variant comprising a SIRPα D1 domain, or a fragment thereof, having an amino acid mutation at residue 80 relative to a wild-type SIRPα D1 domain (e.g., a wild-type SIRPα D1 domain set forth in SEQ ID NO: 1 or 2); and at least one additional amino acid mutation relative to a wild-type SIRPα D1 domain (e.g., a wild-type SIRPα D1 domain set forth in SEQ ID NO: 1 or 2) at a residue selected from the group consisting of: residue 6, residue 27, residue 31, residue 47, residue 53, residue 54, residue 56, residue 66, and residue 92.

Also disclosed herein, in some embodiments, are polypeptides comprising an Fc domain variant, wherein an Fc domain variant dimer comprises two Fc domain variants, wherein each Fc domain variant independently is selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A.

In some embodiments, a polypeptide in a composition disclosed herein comprises a SIRPα D1 domain variant that has reduced or minimal glycosylation. The D1 domain of SEQ ID NOs: 1 and 2 in Table 1 each contains a single potential N-linked glycosylation site at amino acid N80 in the sequence N80ITP. Expression of a SIRPα D1 domain in Chinese Hamster Ovary (CHO) cells results in a major band of 16 kDa (non-glycosylated) and a minor band of higher molecular weight that was removed by Endo Hf. Endo Hf is a recombinant protein fusion of Endoglycosidase H and maltose binding protein. Endo Hf cleaves within the chitobiose core of high mannose and some hybrid oligosaccharides from N-linked glycoproteins. This implies that a proline at amino acid position 83 can reduce the efficiency of glycosylation, leading to a protein with different degrees of glycosylation and therefore heterogeneity. For drug development, heterogeneity can give rise to challenges in process development. Therefore, to investigate the possibility of generating homogenous, non-glycosylated forms of SIRPα D1 domain variants, in some embodiments, amino acid N80 of a SIRPα D1 variant is mutated to Ala. In some embodiments, to make a non-glycosylated, SIRPα D1 domain variant, amino acid N80 in a SIRPα D1 domain variant is replaced by any amino acid, including any naturally and non-naturally occurring amino acid, e.g., N80A and N80Q. In some embodiments, a SIRPα D1 domain variant comprises an N80A mutation and at least 1 additional mutation (e.g., at least 2, 3, 4, 5, 6, 7, 8, 9, or 10 additional mutations or more). In some embodiments, the additional mutation is in the CD47 binding site. In some embodiments, the additional mutation is in the hydrophobic core of the D1 domain.

In some embodiments, a polypeptide in a composition disclosed herein includes a SIRPα D1 domain variant that has increased glycosylation relative to a wild-type SIRPα D1 domain. Another option to increase homogeneity of the final product is to enhance the efficiency of glycosylation at amino acid N80 and generate SIRPα D1 domain variants with increased glycosylation relative to a wild-type. In some embodiments, the amino acid P83 in the sequence NITP83 affects the degree of glycosylation at amino acid N80. In some embodiments, changing P83 to any amino acid increases the efficiency of glycosylation at N80. In some embodiments, amino acid P83 in a SIRPα D1 domain variant is replaced by any amino acid, including naturally and non-naturally amino acids, e.g., P83V, P83A, P83I, and P83L. In some embodiments, a polypeptide of the disclosure is expressed in a cell that is optimized not to glycosylate proteins that are expressed by such cell, for example by genetic engineering of the cell line (e.g., genetically engineered yeast or mammalian host) or modifications of cell culture conditions such as addition of kifunensine or by using a naturally non-glycosylating host such as a prokaryote (*E. coli*, etc.).

Table 5 lists specific amino acid substitutions in a SIRPα D1 domain variant relative to each D1 domain variant sequence. In some embodiments, a SIRPα D1 domain variant includes one or more (e.g., two, three, four, five, six, seven, eight, nine, ten, eleven, twelve, thirteen, fourteen or more) of the substitutions listed in Table 5. In some embodiments, the SIRPα D1 domain variants are not glycosylated or are minimally glycosylated. In some embodiments, the SIRPα D1 domain variants are fully glycosylated or almost fully glycosylated. In some embodiments, a SIRPα D1 domain variant includes at most fourteen amino acid substitutions relative to a wild-type D1 domain. In some embodiments, a SIRPα D1 domain variant includes at most ten amino acid substitutions relative to a wild-type D1 domain. In some embodiments, a SIRPα D1 domain variant includes at most seven amino acid substitutions relative to a wild-type D1 domain. In some embodiments, a SIRPα D1 domain variant of the disclosure has at least 90% (e.g., at least 92%, 95%, 97% or greater than 97%) amino acid sequence identity to a sequence of a wild-type D1 domain.

In some embodiments, a SIRPα D1 domain variant is a chimeric SIRPα D1 domain variant that includes a portion of two or more wild-type D1 domains or variants thereof (e.g., a portion of one wild-type D1 domain or variant thereof and a portion of another wild-type D1 domain or variant thereof). In some embodiments, a chimeric SIRPα D1 domain variant includes at least two portions (e.g., three, four, five or more portions) of wild-type D1 domains or variants thereof, wherein each of the portions is from a different wild-type D1 domain. In some embodiments, a chimeric SIRPα D1 domain variant further includes one or more amino acid substitutions listed in Table 5.

TABLE 5

Amino Acid Substitutions in a SIRPα D1 Domain Variant

| SEQ ID NO: | Description | Amino Acid Sequence |
|---|---|---|
| 37 | D1 domain v1 | EEEX$_1$QX$_2$IQPDKSVLVAAGETX$_3$TLRCTX$_4$TSLX$_5$PVG PIQWFRGAGPGRX$_6$LIYNQX$_7$X$_8$GX$_9$FPRVTTVSDX$_{10}$T X$_{11}$RNNMDFSIRIGX$_{12}$ITX$_{13}$ADAGTYYCX$_{14}$KX$_{15}$RKGSP DDVEX$_{16}$KSGAGTELSVRAKPS |
| — | Amino acid substitutions relative to SEQ ID NO: 37 | X$_1$ = L, I, V; X$_2$ = V, L, I; X$_3$ = A, V; X$_4$ = A, I, L; X$_5$ = I, T, S, F; X$_6$ = E, V, L; X$_7$ = K, R; X$_8$ = E, Q; X$_9$ = H, P, R; X$_{10}$ = L, T, G; X$_{11}$ = K, R; X$_{12}$ = N, A, C, D, E, F, G, H, I, K, L, M, P, Q, R, S, T, V, W, Y; X$_{13}$ = P, A, C, D, E, F, G, H, I, K, L, M, N, Q, R, S, T, V, W, Y; X$_{14}$ = V, I; X$_{15}$ = F, L, V; X$_{16}$ = F, V |
| 38 | D1 domain v2 | EEEX$_1$QX$_2$IQPDKSVSVAAGESX$_3$ILHCTX$_4$TSLX$_5$PVGP IQWFRGAGPARX$_6$LIYNQX$_7$X$_8$GX$_9$FPRVTTVSEX$_{10}$TX$_{11}$ RENMDFSISISX$_{12}$ITX$_{13}$ADAGTYYCX$_{14}$KX$_{15}$RKGSPDT EX$_{16}$KSGAGTELSVRAKPS |
| — | Amino acid substitutions relative to SEQ ID NO: 38 | X$_1$ = L, I, V; X$_2$ = V, L, I; X$_3$ = A, V; X$_4$ = V, I, L; X$_5$ = I, T, S, F; X$_6$ = E, V, L; X$_7$ = K, R; X$_8$ = E, Q; X$_9$ = H, P, R; X$_{10}$ = S, T, G; X$_{11}$ = K, R; X$_{12}$ = N, A, C, D, E, F, G, H, I, K, L, M, P, Q, R, S, T, V, W, Y; X$_{13}$ = P, A, C, D, E, F, G, H, I, K, L, M, N, Q, R, S, T, V, W, Y; X$_{14}$ = V, I; X$_{15}$ = F, L, V; X$_{16}$ = F, V |
| 47 | Pan D1 domain | EEX$_1$X$_2$QX$_3$IQPDKX$_4$VX$_5$VAAGEX$_6$X$_7$X$_8$LX$_9$CTX$_{10}$TSL X$_{11}$PVGPIQWFRGAGPX$_{12}$RX$_{13}$LIYNQX$_{14}$X$_{15}$GX$_{16}$FPRV TTVSX$_{17}$X$_{18}$TX$_{19}$RX$_{20}$NMDFX$_{21}$IX$_{22}$IX$_{23}$X$_{24}$ITX$_{25}$ADAGT YYCX$_{26}$KX$_{27}$RKGSPDX$_{28}$X$_{29}$EX$_{30}$KSGAGTELSVRX$_{31}$KP S |
| — | Amino acid substitutions relative to SEQ ID NO: 47 | X$_1$ = E, G; X$_2$ = L, I, V; X$_3$ = V, L, I; X$_4$ = S, F; X$_5$ = L, S; X$_6$ = S, T; X$_7$ = A, V; X$_8$ = I, T; X$_9$ = H, R, L; X$_{10}$ = A, V, I, L; X$_{11}$ = I, T, S, F; X$_{12}$ = A, G; X$_{13}$ = E, V, L; X$_{14}$ = K, R; X$_{15}$ = E, Q; X$_{16}$ = H, P, R; X$_{17}$ = D, E; X$_{18}$ = S, L, T, G; X$_{19}$ = K, R; X$_{20}$ = E, N; X$_{21}$ = S, P; X$_{22}$ = S, R; X$_{23}$ = S, G; X$_{24}$ = any amino acid; X$_{25}$ = any amino acid; X$_{26}$ = V, I; X$_{27}$ = F, L, V; X$_{28}$ = D or absent; X$_{29}$ = T, V; X$_{30}$ = F, V; and X$_{31}$ = A, G |
| 48 | Pan D1 domain | EEELQX$_1$IQPDKSVX$_2$VAAGEX$_3$AX$_4$LX$_5$CTX$_6$TSLX$_7$PV GPIQWFRGAGPX$_8$RX$_9$LIYNQX$_{10}$X$_{11}$GX$_{12}$FPRVTTVSX$_{13}$ X$_{14}$TKRX$_{15}$NMDFSIX$_{16}$IX$_{17}$X$_{18}$ITPADAGTYYCX$_{19}$KFR KGX$_{20}$X$_{21}$X$_{22}$DX$_{23}$EFKSGAGTELSVRAKPS |
| — | Amino acid substitutions relative to SEQ ID NO: 48 | X$_1$ = V, I; X$_2$ = L, S; X$_3$ = T, S; X$_4$ = T, I; X$_5$ = R, H; X$_6$ = A, V, I; X$_7$ = I, R, Y, K, F; X$_8$ = G, A; X$_9$ = E, V; X$_{10}$ = K, R; X$_{11}$ = E, D, Q; X$_{12}$ = H, P; X$_{13}$ = D, E; X$_{14}$ = S, L, T; X$_{15}$ = N, E; X$_{16}$ = R, S; X$_{17}$ = G, S; X$_{18}$ = N, A; X$_{19}$ = V, I; X$_{20}$ = S, I, M; X$_{21}$ = P or absent; X$_{22}$ = D, P; and X$_{23}$ = V, T |
| 49 | Pan D1 domain | EEELQX$_1$IQPDKSVLVAAGETATLRCTX$_2$TSLX$_3$PVGPI QWFRGAGPGRX$_4$LIYNQX$_5$X$_6$GX$_7$FPRVTTVSDX$_8$TKR NNMDFSIRIGX$_9$ITPADAGTYYCX$_{10}$KFRKGSPDDVEF KSGAGTELSVRAKPS |
| — | Amino acid substitutions relative to SEQ ID NO: 49 | X$_1$ = V, I, L; X$_2$ = A, I, V, L; X$_3$ = I, F, S, T; X$_4$ = E, V, L; X$_5$ = K, R; X$_6$ = E, Q; X$_7$ = H, P, R; X$_8$ = L, T, S, G; X$_9$ = A; and X$_{10}$ = V, I |
| 50 | Pan D1 domain | EEELQX$_1$IQPDKSVSVAAGESAILHCTX$_2$TSLX$_3$PVGPI QWFRGAGPARX$_4$LIYNQX$_5$X$_6$GX$_7$FPRVTTVSEX$_8$TKR ENMDFSISISX$_9$ITPADAGTYYCX$_{10}$KFRKGSPDTEFKS GAGTELSVRAKPS |
| — | Amino acid substitutions relative to SEQ ID NO: 50 | X$_1$ = V, I; X$_2$ = V, I; X$_3$ = I, F; X$_4$ = E, V; X$_5$ = K, R; X$_6$ = E, Q; X$_7$ = H, P; X$_8$ = S, T; X$_9$ = N, A; and X$_{10}$ = V, I |
| 51 | Pan D1 domain | EEELQX$_1$IQPDKSVLVAAGETATLRCTX$_2$TSLX$_3$PVGPI QWFRGAGPGRX$_4$LIYNQX$_5$EGX$_6$FPRVTTVSDX$_7$TKRN NMDFSIRIGX$_8$ITPADAGTYYCX$_9$KFRKGSPDDVEFKS GAGTELSVRAKPS |
| — | Amino acid substitutions relative to SEQ ID NO: 51 | X$_1$ = V, I; X$_2$ = A, I; X$_3$ = I, F; X$_4$ = E, V; X$_5$ = K, R; X$_6$ = H, P; X$_7$ = L, T; X$_8$ = N, A; and X$_9$ = V, I |

TABLE 5-continued

Amino Acid Substitutions in a SIRPα D1 Domain Variant

| SEQ ID NO: | Description | Amino Acid Sequence |
|---|---|---|
| 52 | Pan D1 domain | EEELQX$_1$IQPDKSVLVAAGETATLRCTX$_2$TSLX$_3$PVGPI QWFRGAGPGRELIYNQX$_4$EGX$_5$FPRVTTVSDX$_6$TKRN NMDFSIRIGX$_7$ITPADAGTYYCVKFRKGSPDDVEFKSG AGTELSVRAKPS |
| — | Amino acid substitutions relative to SEQ ID NO: 52 | X$_1$ = V, L, I; X$_2$ = A, I, L; X$_3$ = I, T, S, F; X$_4$ = K, R; X$_5$ = H, P, R; X$_6$ = L, T, G; and X$_7$ = N, A |
| 212 | Pan D1 domain | EEELQX$_1$IQPDKSVSVAAGESAILHCTX$_2$TSLX$_3$PVGPI QWFRGAGPARELIYNQX$_4$EGX$_5$FPRVTTVSEX$_6$TKREN MDFSISISX$_7$ITPADAGTYYCVKFRKGSPDTEFKSGAG TELSVRAKPS |
| — | Amino acid substitutions relative to SEQ ID NO: 212 | X$_1$ = V, L, I; X$_2$ = V, I, L; X$_3$ = I, T, S, F; X$_4$ = K, R; X$_5$ = H, P, R; X$_6$ = S, T, G; and X$_7$ = N, A |
| 218 | Pan D1 domain | EEELQX$_1$IQPDKSVLVAAGETATLRCTX$_2$TSLX$_3$PVGPI QWFRGAGPGRX$_4$LIYNQX$_5$X$_6$GX$_7$FPRVTTVSDX$_8$TKR NNMDFSIRIGX$_9$X$_{10}$X$_{11}$X$_{12}$ADAGTYYCX$_{13}$KFRKGSPD DVEFKSGAGTELSVRAKPS |
| — | Amino acid substitutions relative to SEQ ID NO: 218 | X$_1$ = V, L, or I; X$_2$ = A, V, L, or I; X$_3$ = I, S, T, or F; X$_4$ = E, L, or V; X$_5$ = K or R; X$_6$ = E or Q; X$_7$ = H, R or P; X$_8$ = S,G, L or T, X$_9$ = any amino acid; X$_{10}$ = any amino acid; X$_{11}$ = any amino acid; X$_{12}$ = any amino acid; and X$_{13}$ = V or I |
| 219 | Pan D1 domain | EEELQX$_1$IQPDKSVLVAAGETATLRCTX$_2$TSLX$_3$PVGPI QWFRGAGPGRX$_4$LIYNQX$_5$X$_6$GX$_7$FPRVTTVSDX$_8$TKR NNMDFSIRIGX$_9$ITX$_{10}$ADAGTYYCX$_{11}$KFRKGSPDDVE FKSGAGTELSVRAKPS |
| — | Amino acid substituions relative to SEQ ID NO: 219 | X$_1$ = V, L or I; X$_2$ = A, V, L, or I; X$_3$ = I, S, T or F; X$_4$ = E, L, or V; X$_5$ = K or R; X$_6$ = E or Q; X$_7$ = H, R or P; X$_8$ = S, G, L, or T; X$_9$ = N; X$_{10}$ = any amino acid other than P; and X$_{11}$ = V or I |

In some embodiments, a polypeptide includes a SIRPα D1 domain variant having a sequence of: EEEX$_1$QX$_2$IQPDKSVLVAAGETX$_3$TLRCTX$_4$TSLX$_5$PVG PIQWFRGAGPGRX$_6$LIYNQX$_7$X$_8$GX$_9$FPRVTTVSDX$_{10}$ TX$_{11}$RNNMDFSIRIGX$_{12}$ITX$_{13}$ADAGTYYCX$_{14}$KX$_{15}$RK GSPDDVEX$_{16}$KSGAGTELSVRAKPS (SEQ ID NO: 37), wherein X$_1$ is L, I, or V; X$_2$ is V, L, or, I; X$_3$ is A or V; X$_4$ is A, I, or L; X$_5$ is I, T, S, or F; X$_6$ is E, V, or L; X$_7$ is K or R; X$_8$ is E or Q; X$_9$ is H, P, or R; X$_{10}$ is L, T, or G; X$_{11}$ is K or R; X$_{12}$ is N, A, C, D, E, F, G, H, I, K, L, M, P, Q, R, S, T, V, W, or Y; X$_{13}$ is P, A, C, D, E, F, G, H, I, K, L, M, N, Q, R, S, T, V, W, or Y; X$_{14}$ is V or I; X$_{15}$ is F, L, or V; and X$_{16}$ is F or V; and wherein the variant comprises at least one amino acid substitution relative to a wild-type SIRPα D1 domain having the sequence of SEQ ID NO: 1.

In some embodiments in this aspect of the disclosure, a polypeptide includes a SIRPα D1 domain variant having a sequence of SEQ ID NO: 37, wherein X$_1$ is L, I, or V. In some embodiments, X$_2$ is V, L, or, I. In some embodiments, X$_3$ is A or V. In some embodiments, X$_4$ is A, I, or L. In some embodiments, X$_5$ is I, T, S, or F. In some embodiments, X$_6$ is E, V, or L. In some embodiments, X$_7$ is K or R. In some embodiments, X$_8$ is E or Q. In some embodiments, X$_9$ is H, P, or R. In some embodiments, X$_{10}$ is L, T, or G. In some embodiments, X$_{11}$ is K or R. In some embodiments, X$_{12}$ is N, A, C, D, E, F, G, H, I, K, L, M, P, Q, R, S, T, V, W, or Y. In some embodiments, X$_{13}$ is P, A, C, D, E, F, G, H, I, K, L, M, N, Q, R, S, T, V, W, or Y. In some embodiments, X$_{14}$ is V or I. In some embodiments, X$_{15}$ is F, L, V. In some embodiments, X$_{16}$ is F or V.

In some embodiments, a polypeptide provided herein includes no more than ten amino acid substitutions relative to the wild-type SIRPα D1 domain having the sequence of SEQ ID NO: 1. In some embodiments, the polypeptide provided herein includes no more than seven amino acid substitutions relative to the wild-type SIRPα D1 domain having the sequence of SEQ ID NO: 1.

In some embodiments, the polypeptide binds CD47 with at least 10-fold greater binding affinity than the wild-type SIRPα D1 domain having the sequence of SEQ ID NO: 1. In some embodiments, the polypeptide binds CD47 with at least 100-fold greater binding affinity than the wild-type SIRPα D1 domain having the sequence of SEQ ID NO: 1. In some embodiments, the polypeptide binds CD47 with at least 1000-fold greater binding affinity than the wild-type SIRPα D1 domain having the sequence of SEQ ID NO: 1. In some embodiments, a SIRPα D1 domain variant polypeptide or fragment thereof binds to CD47 with a K$_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a K$_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In some embodiments, a polypeptide includes a SIRPα D1 domain variant having a sequence of: EEEX$_1$QX$_2$IQPDKSVSVAAGESX$_3$ILHCTX$_4$TSLX$_5$PVG PIQWFRGAGPARX$_6$LIYNQX$_7$X$_8$GX$_9$FPRVTTVSEX$_{10}$ TX$_{11}$RENMDFSISISX$_{12}$ITX$_{13}$ADAGTYYCX$_{14}$KX$_{15}$RK GSPDTEX$_{16}$KSGAGTELSVRAKPS (SEQ ID NO: 38), wherein $X_1$ is L, I, or V; $X_2$ is V, L, or, I; $X_3$ is A or V; $X_4$ is V, I, or L; $X_5$ is I, T, S, or F; $X_6$ is E, V, or L; $X_7$ is K or R; $X_8$ is E or Q; $X_9$ is H, P, or R; $X_{10}$ is S, T, or G; $X_{11}$ is K or R; $X_{12}$ is N, A, C, D, E, F, G, H, I, K, L, M, P, Q, R, S, T, V, W, or Y; $X_{13}$ is P, A, C, D, E, F, G, H, I, K, L, M, N, Q, R, S, T, V, W, or Y; $X_{14}$ is V or I; $X_{15}$ is F, L, or V; and $X_{16}$ is F or V; and wherein the variant comprises at least one amino acid substitution relative to a wild-type SIRPα D1 domain having the sequence of SEQ ID NO: 2.

In some embodiments in this aspect of the disclosure, a polypeptide includes a SIRPα D1 domain variant having a sequence of SEQ ID NO: 38, wherein $X_1$ is L, I, or V. In some embodiments, $X_2$ is V, L, or, I. In some embodiments, $X_3$ is A or V. In some embodiments, $X_4$ is V, I, or L. In some embodiments, $X_5$ is I, T, S, or F. In some embodiments, $X_6$ is E, V, or L. In some embodiments, $X_7$ is K or R. In some embodiments, $X_8$ is E or Q. In some embodiments, $X_9$ is H, P, or R. In some embodiments, $X_{10}$ is S, T, or G. In some embodiments, $X_{11}$ is K or R. In some embodiments, $X_{12}$ is N, A, C, D, E, F, G, H, I, K, L, M, P, Q, R, S, T, V, W, or Y. In some embodiments, $X_{13}$ is P, A, C, D, E, F, G, H, I, K, L, M, N, Q, R, S, T, V, W, or Y. In some embodiments, $X_{14}$ is V or I. In some embodiments, $X_{15}$ is F, L, or V. In some embodiments, $X_{16}$ is F or V.

In some embodiments, a polypeptide includes a SIRPα D1 domain variant having no more than ten amino acid substitutions relative to the wild-type SIRPα D1 domain having the sequence of SEQ ID NO: 2. In some embodiments, a polypeptide includes a SIRPα D1 domain variant having no more than seven amino acid substitutions relative to the wild-type SIRPα D1 domain having the sequence of SEQ ID NO: 2.

In some embodiments, the polypeptide binds CD47 with at least 10-fold greater binding affinity than the wild-type SIRPα D1 domain having the sequence of SEQ ID NO: 2. In some embodiments, the polypeptide binds CD47 with at least 100-fold greater binding affinity than the wild-type SIRPα D1 domain having the sequence of SEQ ID NO: 2. In some embodiments, the polypeptide binds CD47 with at least 1000-fold greater binding affinity than the wild-type SIRPα D1 domain having the sequence of SEQ ID NO: 2. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In another aspect, the disclosure features a polypeptide including a SIRPα D1 domain variant having a sequence of: EEX$_1$X$_2$QX$_3$IQPDKX$_4$VX$_5$VAAGEX$_6$X$_7$X$_8$LX$_9$CTX$_{10}$TS LX$_{11}$PVGPIQWFRGAGPX$_{12}$RX$_{13}$LIYNQX$_{14}$X$_{15}$GX$_{16}$FP RVTTVSX$_{17}$X$_{18}$TX$_{19}$RX$_{20}$NMDFX$_{21}$IX$_{22}$IX$_{23}$X$_{24}$ITX$_{25}$A DAGTYYCX$_{26}$KX$_{27}$RKGSPDX$_{28}$X$_{29}$EX$_{30}$KSGAGTELS VRX$_{31}$KPS (SEQ ID NO: 47), wherein $X_1$ is E or G; $X_2$ is L, I, or V; $X_3$ is V, L, or, I; $X_4$ is S or F; $X_5$ is L or S; $X_6$ is S or T; $X_7$ is A or V; $X_8$ is I or T; $X_9$ is H, R, or L; $X_{10}$ is A, V, I, or L; $X_{11}$ is I, T, S, or F; $X_{12}$ is A or G; $X_{13}$ is E, V, or L; $X_{14}$ is K or R; $X_{15}$ is E or Q; $X_{16}$ is H, P, or R; $X_{17}$ is D or E; $X_{18}$ is S, L, T, or G; $X_{19}$ is K or R; $X_{20}$ is E or N; $X_{21}$ is S or P; $X_{22}$ is S or R; $X_{23}$ is S or G; $X_{24}$ is any amino acid; $X_{25}$ is any amino acid; $X_{26}$ is V or I; $X_{27}$ is F, L, V; $X_{28}$ is D or absent; $X_{29}$ is T or V; $X_{30}$ is F or V; and $X_{31}$ is A or G; and wherein the variant comprises at least one amino acid substitution relative to a wild-type SIRPα D1 domain having the sequence of SEQ ID NO: 1 or 2.

In some embodiments, the polypeptide comprises the sequence of SEQ ID NO: 47, wherein $X_1$ is E or G. In any of the aforementioned embodiments in this aspect of the disclosure, $X_2$ is L, I, or V. In any of the aforementioned embodiments, $X_3$ is V, L, or, I. In any of the aforementioned embodiments, $X_4$ is S or F. In any of the aforementioned embodiments, $X_5$ is L or S. In any of the aforementioned embodiments, $X_6$ is S or T. In any of the aforementioned embodiments, $X_7$ is A or V. In any of the aforementioned embodiments, $X_8$ is I or T. In any of the aforementioned embodiments, $X_9$ is H or R. In any of the aforementioned embodiments, $X_{10}$ is A, V, I, or L. In any of the aforementioned embodiments, $X_{11}$ is I, T, S, or F. In any of the aforementioned embodiments, $X_{12}$ is A or G. In any of the aforementioned embodiments, $X_{13}$ is E, V, or L. In any of the aforementioned embodiments, $X_{14}$ is K or R. In any of the aforementioned embodiments, $X_{15}$ is E or Q. In any of the aforementioned embodiments, $X_{16}$ is H, P, or R. In any of the aforementioned embodiments, $X_{17}$ is D or E. In any of the aforementioned embodiments, $X_{18}$ is S, L, T, or G. In any of the aforementioned embodiments, $X_{19}$ is K or R. In any of the aforementioned embodiments, $X_{20}$ is E or N. In any of the aforementioned embodiments, $X_{21}$ is S or P. In any of the aforementioned embodiments, $X_{22}$ is S or R. In any of the aforementioned embodiments, $X_{23}$ is S or G. In any of the aforementioned embodiments, $X_{24}$ is N, A, C, D, E, F, G, H, I, K, L, M, P, Q, R, S, T, V, W, or Y. In any of the aforementioned embodiments, $X_{25}$ is P, A, C, D, E, F, G, H, I, K, L, M, N, Q, R, S, T, V, W, or Y. In any of the aforementioned embodiments, $X_{26}$ is V or I. In any of the aforementioned embodiments, $X_{27}$ is F, L, V. In any of the aforementioned embodiments, $X_{28}$ is D or absent. In any of the aforementioned embodiments, $X_{29}$ is T or V. In any of the aforementioned embodiments, $X_{30}$ is F or V. In any of the aforementioned embodiments, $X_{31}$ is A or G.

In some embodiments, the polypeptide of this aspect of the disclosure includes no more than ten amino acid substitutions relative to the wild-type SIRPα D1 domain having the sequence of SEQ ID NO: 1 or 2. In some embodiments, the polypeptide of this aspect of the disclosure includes no more than seven amino acid substitutions relative to the wild-type SIRPα D1 domain having the sequence of SEQ ID NO: 1 or 2.

In some embodiments, the polypeptide binds CD47 with at least 10-fold greater binding affinity than the wild-type SIRPα D1 domain having the sequence of SEQ ID NO: 1 or 2. In some embodiments, the polypeptide binds CD47 with at least 100-fold greater binding affinity than the wild-type SIRPα D1 domain having the sequence of SEQ ID NO: 1 or 2. In some embodiments, the polypeptide binds CD47 with at least 1000-fold greater binding affinity than the wild-type SIRPα D1 domain having the sequence of SEQ ID NO: 1 or 2. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In some embodiments, a polypeptide includes a SIRPα D1 domain variant having a sequence of: EEELQX$_1$IQPDKSVX$_2$VAAGEX$_3$AX$_4$LX$_5$CTX$_6$TSLX$_7$P VGPIQWFRGAGPX$_8$RX$_9$LIYNQX$_{10}$X$_{11}$GX$_{12}$FPRVTTV SX$_{13}$X$_{14}$TKRX$_{15}$NMDFSIX$_{16}$IX$_{17}$X$_{18}$ITPADAGTYYC X$_{19}$KFRKGX$_{20}$X$_{21}$X$_{22}$DX$_{23}$EFKSGAGTELSVRAKPS (SEQ ID NO: 48), wherein X$_1$ is V or I; X$_2$ is L or S; X$_3$ is T or S; X$_4$ is T or I; X$_5$ is R or H; X$_6$ is A, V, or I; X$_7$ is I, R, Y, K or F; X$_8$ is G or A; X$_9$ is E or V; X$_{10}$ is K or R; X$_{11}$ is E, D or Q; X$_{12}$ is H or P; X$_{13}$ is D or E; X$_{14}$ is S, L or T; X$_{15}$ is N or E; X$_{16}$ is R or S; X$_{17}$ is G or S; X$_{18}$ is N or A; X$_{19}$ is V or I; X$_{20}$ is S, I or M; X$_{21}$ is P or absent; X$_{22}$ is D or P; and X$_{23}$ is V or T, or a fragment thereof.

In another aspect, the disclosure features a polypeptide including a SIRPα D1 domain variant having a sequence of: EEELQX$_1$IQPDKSVLVAAGETATLRCTX$_2$TSLX$_3$PVGPI QWFRGAGPGRX$_4$LIYNQX$_5$X$_6$GX$_7$FPRVTTVSDX$_8$TKR NNMDFSIRIGX$_9$ITPADAGTYYCX$_{10}$KFRKGSPDDVEF KSGAGTELSVRAKPS (SEQ ID NO: 49), wherein X$_1$ is V, L, or I; X$_2$ is A, I, V, or L; X$_3$ is I, F, S, or T; X$_4$ is E, V, or L; X$_5$ is K or R; X$_6$ is E or Q; X$_7$ is H, P, or R; X$_8$ is L, T, S, or G; X$_9$ is A; and X$_{10}$ is V or I; and wherein the variant comprises at least one amino acid substitution relative to a wild-type SIRPα D1 domain having the sequence of SEQ ID NO: 1.

In some embodiments, the polypeptide comprises the sequence of SEQ ID NO: 49, wherein X$_1$ is V, L or I. In any of the aforementioned embodiments in this aspect of the disclosure, X$_2$ is A, I, V, or L. In any of the aforementioned embodiments, X$_3$ is I, F, S, or T. In any of the aforementioned embodiments, X$_4$ is E, V, or L. In any of the aforementioned embodiments, X$_5$ is K or R. In any of the aforementioned embodiments, X$_6$ is E or Q. In any of the aforementioned embodiments, X$_7$ is H, P, or R. In any of the aforementioned embodiments, X$_8$ is L, T, S or G. In any of the aforementioned embodiments, X$_9$ is A. In any of the aforementioned embodiments, X$_{10}$ is V or I.

In some embodiments, the polypeptide comprises a SIRPα D1 domain that comprises at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NO: 49, wherein each of X$_1$, X$_2$, X$_3$, X$_4$, X$_5$, X$_6$, X$_7$, X$_8$, X$_9$, and X$_{10}$ are not a wild-type amino acid.

In some embodiments, the polypeptide of this aspect of the disclosure includes no more than ten amino acid substitutions relative to the wild-type SIRPα D1 domain having the sequence of any one of SEQ ID NO: 1. In some embodiments, the polypeptide of this aspect of the disclosure includes no more than seven amino acid substitutions relative to the wild-type SIRPα D1 domain having the sequence of any one of SEQ ID NO: 1.

In some embodiments, the polypeptide binds CD47 with at least 10-fold greater binding affinity than the wild-type SIRPα D1 domain having the sequence of SEQ ID NO: 1. In some embodiments, the polypeptide binds CD47 with at least 100-fold greater binding affinity than the wild-type SIRPα D1 domain having the sequence of SEQ ID NO: 1. In some embodiments, the polypeptide binds CD47 with at least 1000-fold greater binding affinity than the wild-type SIRPα D1 domain having the sequence of SEQ ID NO: 1. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In another aspect, the disclosure features a polypeptide including a SIRPα D1 domain variant having a sequence of: EEELQX$_1$IQPDKSVSVAAGESAILHCTX$_2$TSLX$_3$PVGPI QWFRGAGPARX$_4$LIYNQX$_5$X$_6$GX$_7$FPRVTTVSEX$_8$TKR ENMDFSISISX$_9$ITPADAGTYYCX$_{10}$KFRKGSPDTEFKS GAGTELSVRAKPS, (SEQ ID NO: 50), wherein X$_1$ is V or I; X$_2$ is V or I; X$_3$ is I or F; X$_4$ is E or V; X$_5$ is K or R; X$_6$ is E or Q; X$_7$ is H or P; X$_8$ is S or T; X$_9$ is N or A; and X$_{10}$ V or I; and wherein the variant comprises at least one amino acid substitution relative to a wild-type SIRPα D1 domain having the sequence of SEQ ID NO: 2.

In some embodiments, the polypeptide comprises the sequence of SEQ ID NO: 50, wherein X$_1$ is V or I. In any of the aforementioned embodiments in this aspect of the disclosure, X$_2$ is V or I. In any of the aforementioned embodiments, X$_3$ is I or F. In any of the aforementioned embodiments, X$_4$ is E or V. In any of the aforementioned embodiments, X$_5$ is K or R. In any of the aforementioned embodiments, X$_6$ is E or Q. In any of the aforementioned embodiments, X$_7$ is H or P. In any of the aforementioned embodiments, X$_8$ is S or R. In any of the aforementioned embodiments, X$_9$ is N or A. In any of the aforementioned embodiments, X$_{10}$ is V or I.

In some embodiments, the polypeptide comprises a SIRPα D1 domain that comprises at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NO: 50, wherein each of X$_1$, X$_2$, X$_3$, X$_4$, X$_5$, X$_6$, X$_7$, X$_8$, X$_9$, and X$_{10}$ is not a wild-type amino acid.

In some embodiments, the polypeptide of this aspect of the disclosure includes no more than ten amino acid substitutions relative to the wild-type SIRPα D1 domain having the sequence of SEQ ID NO: 2. In some embodiments, the polypeptide of this aspect of the disclosure includes no more than seven amino acid substitutions relative to the wild-type SIRPα D1 domain having the sequence of SEQ ID NO: 2.

In some embodiments, the polypeptide binds CD47 with at least 10-fold greater binding affinity than the wild-type SIRPα D1 domain having the sequence of SEQ ID NO: 2. In some embodiments, the polypeptide binds CD47 with at least 100-fold greater binding affinity than the wild-type SIRPα D1 domain having the sequence of SEQ ID NO: 2. In some embodiments, the polypeptide binds CD47 with at least 1000-fold greater binding affinity than the wild-type SIRPα D1 domain having the sequence of SEQ ID NO: 2. In some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In another aspect, the disclosure features a polypeptide including a SIRPα D1 domain variant having a sequence of: EEELQX$_1$IQPDKSVLVAAGETATLRCTX$_2$TSLX$_3$PVGPI QWFRGAGPGRX$_4$LIYNQX$_5$EGX$_6$FPRVTTVSDX$_7$TKR NNMDFSIRIGX$_8$ITPADAGTYYCX$_9$KFRKGSPDDVEFK SGAGTELSVRAKPS (SEQ ID NO: 51), wherein X$_1$ is V or I; X$_2$ is A or I; X$_3$ is I or F; X$_4$ is E or V; X$_5$ is K or R; X$_6$ is H or P; X$_7$ is L or T; X$_8$ is N or A; and X$_9$ is V or I; and wherein the variant comprises at least one amino acid substitution relative to a wild-type SIRPα D1 domain having the sequence of SEQ ID NO: 1.

In some embodiments, the polypeptide comprises the sequence of SEQ ID NO: 51, wherein X$_1$ is V or I. In any of the aforementioned embodiments in this aspect of the disclosure, X$_2$ is A or I. In any of the aforementioned embodiments, X$_3$ is I or F. In any of the aforementioned embodiments, X$_4$ is E or V. In any of the aforementioned embodiments, X$_5$ is K or R. In any of the aforementioned embodiments, X$_6$ is H or P. In any of the aforementioned embodiments, X$_7$ is L or T. In any of the aforementioned embodiments, X$_8$ is N or A. In any of the aforementioned embodiments, X$_9$ is V or I. In some embodiments, X$_4$ is not V.

In some embodiments, the polypeptide comprises the sequence of SEQ ID NO: 51, wherein X$_8$ is A. In any of the aforementioned embodiments in this aspect of the disclosure, X$_8$ is A and X$_1$ is V or I. In any of the aforementioned embodiments in this aspect of the disclosure, X$_8$ is A and X$_2$ is A or I. In any of the aforementioned embodiments, X$_8$ is A and X$_3$ is I or F. In any of the aforementioned embodiments, X$_8$ is A and X$_4$ is E or V. In some embodiments, X$_4$ is not V. In any of the aforementioned embodiments, X$_8$ is A and X$_5$ is K or R. In any of the aforementioned embodiments, X$_8$ is A and X$_6$ is H or P. In any of the aforementioned embodiments, X$_8$ is A and X$_7$ is A or V. In any of the aforementioned embodiments, X$_8$ is A and X$_9$ is V or I.

In some embodiments, the polypeptide comprises the sequence of SEQ ID NO: 51, wherein X$_8$ is A. In any of the aforementioned embodiments in this aspect of the disclosure, X$_8$ is A and X$_1$ is I. In any of the aforementioned embodiments in this aspect of the disclosure, X$_8$ is A and X$_2$ is I. In any of the aforementioned embodiments, X$_8$ is A and X$_3$ is F. In any of the aforementioned embodiments, X$_8$ is A and X$_4$ is V. In any of the aforementioned embodiments, X$_8$ is A and X$_5$ is R. In any of the aforementioned embodiments, X$_8$ is A and X$_6$ is P. In any of the aforementioned embodiments, X$_8$ is A and X$_7$ is T. In any of the aforementioned embodiments, X$_8$ is A and X$_9$ is I.

In some embodiments, the polypeptide comprises a SIRPα D1 domain variant that comprises at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NO: 51, wherein each of X$_1$, X$_2$, X$_3$, X$_4$, X$_5$, X$_6$, X$_7$, X$_8$, and X$_9$ is not a wild-type amino acid.

In some embodiments, the polypeptide of this aspect of the disclosure comprises no more than ten amino acid substitutions relative to the wild-type SIRPα D1 domain having the sequence of SEQ ID NO: 1. In some embodiments, the polypeptide of this aspect of the disclosure comprises no more than seven amino acid substitutions relative to the wild-type SIRPα D1 domain having the sequence of SEQ ID NO: 1.

In some embodiments, the polypeptide binds CD47 with at least 10-fold greater binding affinity than the wild-type SIRPα D1 domain having the sequence of SEQ ID NO: 1. In some embodiments, the polypeptide binds CD47 with at least 100-fold greater binding affinity than the wild-type SIRPα D1 domain having the sequence of SEQ ID NOs: 1. In some embodiments, the polypeptide binds CD47 with at least 1000-fold greater binding affinity than the wild-type SIRPα D1 domain having the sequence of SEQ ID NO: 1. In some embodiments, a SIRPα D1 domain variant polypeptide or fragment thereof binds to CD47 with a $K_D$ less than $1 \times 10^{-8}$ M, less than $5 \times 10^{-9}$ M, less than $1 \times 10^{-9}$ M, less $5 \times 10^{-10}$ in less than $1 \times 10^{-10}$ M or less than $1 \times 10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In another aspect, the disclosure features a polypeptide including a SIRPα D1 domain variant having a sequence of: EEELQX$_1$IQPDKSVLVAAGETATLRCTX$_2$TSLX$_3$PVGPI QWFRGAGPGRELIYNQX$_4$EGX$_5$FPRVTTVSDX$_6$TKRN NMDFSIRIGX$_7$ITPADAGTYYCVKFRKGSPDDVEFKS GAGTELSVRAKPS (SEQ ID NO: 222), wherein X$_1$ is V, L, or I; X$_2$ is A, I, or L; X$_3$ is I, T, S, or F; X$_4$ is K or R; X$_5$ is H or P; X$_6$ is L, T, or G; X$_7$ is N or A; and wherein the variant comprises at least one amino acid substitution relative to a wild-type SIRPα D1 domain having a sequence according to SEQ ID NO: 1.

In some embodiments, the polypeptide comprises the sequence of SEQ ID NO: 222, wherein X$_1$ is V, L, or I. In any of the aforementioned embodiments in this aspect of the disclosure, X$_2$ is A, I, or L. In any of the aforementioned embodiments, X$_3$ is I, T, S, or F. In any of the aforementioned embodiments, X$_4$ is K or R. In any of the aforementioned embodiments, X$_5$ is H or P. In any of the aforementioned embodiments, X$_6$ is L, T, or G. In any of the aforementioned embodiments, X$_7$ is N or A.

In some embodiments, the polypeptide comprises the sequence of SEQ ID NO: 222, wherein X$_1$ is V or I. In any of the aforementioned embodiments in this aspect of the disclosure, X$_2$ is A or I. In any of the aforementioned embodiments, X$_3$ is I or F. In any of the aforementioned embodiments, X$_4$ is K or R. In any of the aforementioned embodiments, X$_5$ is H or P. In any of the aforementioned embodiments, X$_6$ is L or T. In any of the aforementioned embodiments, X$_7$ is N or A.

In some embodiments, the polypeptide comprises the sequence of SEQ ID NO: 222, wherein X$_7$ is A. In any of the aforementioned embodiments in this aspect of the disclosure, X$_7$ is A and X$_1$ is V or I. In any of the aforementioned embodiments in this aspect of the disclosure, X$_7$ is A and X$_2$ is A or I. In any of the aforementioned embodiments, X$_7$ is A and X$_3$ is I or F. In any of the aforementioned embodiments, X$_7$ is A and X$_4$ is K or R. In any of the aforementioned embodiments, X$_7$ is A and X$_5$ is H or P. In any of the aforementioned embodiments, X$_7$ is A and X$_6$ is L or T.

In some embodiments, the polypeptide comprises the sequence of SEQ ID NO: 222, wherein X$_7$ is A. In any of the aforementioned embodiments in this aspect of the disclosure, $X_7$ is A and $X_1$ is I. In any of the aforementioned embodiments in this aspect of the disclosure, $X_7$ is A and $X_2$ is I. In any of the aforementioned embodiments, $X_7$ is A and $X_3$ is F. In any of the aforementioned embodiments, $X_7$ is A and $X_4$ is R. In any of the aforementioned embodiments, $X_7$ is A and $X_5$ is P. In any of the aforementioned embodiments, $X_7$ is A and $X_6$ is T.

In some embodiments, the polypeptide comprises a SIRPα D1 domain that comprises at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NO: 222, wherein each of $X_1$, $X_2$, $X_3$, $X_4$, $X_5$, $X_6$, and $X_7$ is not a wild-type amino acid.

In some embodiments, the polypeptide of this aspect of the disclosure includes no more than ten amino acid substitutions relative to the wild-type SIRPα D1 domain having the sequence of SEQ ID NO: 1. In some embodiments, the polypeptide of this aspect of the disclosure includes no more than seven amino acid substitutions relative to the wild-type SIRPα D1 domain having the sequence of SEQ ID NO: 1.

In some embodiments, the polypeptide binds CD47 with at least 10-fold greater binding affinity than the wild-type SIRPα D1 domain having the sequence of SEQ ID NO: 1. In some embodiments, the polypeptide binds CD47 with at least 100-fold greater binding affinity than the wild-type SIRPα D1 domain having the sequence of SEQ ID NO: 1. In some embodiments, the polypeptide binds CD47 with at least 1000-fold greater binding affinity than the wild-type SIRPα D1 domain having the sequence of SEQ ID NO: 1. In some embodiments, fragments include polypeptides of less than 10 amino acids in length, about 10 amino acids in length, about 20 amino acids in length, about 30 amino acids in length, about 40 amino acids in length, about 50 amino acids in length, about 60 amino acids in length, about 70 amino acids in length, about 80 amino acids in length, about 90 amino acids in length, about 100 amino acids in length, or more than about 100 amino acids in length. Fragments retain the ability to bind to CD47. Preferably, SIRPα D1 domain variant polypeptides and fragments thereof bind to CD47 with a higher affinity than a SIRPα polypeptide binds to CD47. For example, in some embodiments, a SIRPα D1 domain variant polypeptide or fragment thereof binds to CD47 with a $K_D$ less than $1 \times 10^{-8}$ M, less than $5 \times 10^{-9}$ M, less than $1 \times 10^{-9}$ M, less $5 \times 10^{-10}$ M, less than $1 \times 10^{-10}$ M or less than $1 \times 10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

In another aspect, the disclosure features a polypeptide including a SIRPα D1 domain variant having a sequence of: EEELQX$_1$IQPDKSVSVAAGESAILHCTX$_2$TSLX$_3$PVGPI QWFRGAGPARELIYNQX$_4$EGX$_5$FPRVTTVSEX$_6$TKRE NMDFSISISX$_7$ITPADAGTYYCVKFRKGSPDTEFKSGA GTELSVRAKPS (SEQ ID NO: 212), wherein $X_1$ is V, L, or I; $X_2$ is V, I, or L; $X_3$ is I, T, S, or F; $X_4$ is K or R; $X_5$ is H, P, or R; $X_6$ is S, T, or G; $X_7$ is N or A; and wherein the variant comprises at least one amino acid substitution relative to a wild-type SIRPα D1 domain having the sequence of SEQ ID NO: 2.

In some embodiments, the polypeptide comprises the sequence of SEQ ID NO: 212, wherein $X_1$ is V, L, or I. In any of the aforementioned embodiments in this aspect of the disclosure, $X_2$ is V, I, or L. In any of the aforementioned embodiments, $X_3$ is I, T, S, or F. In any of the aforementioned embodiments, $X_4$ is K or R. In any of the aforementioned embodiments, $X_5$ is H or P. In any of the aforementioned embodiments, $X_6$ is S, T, or G. In any of the aforementioned embodiments, $X_7$ is N or A.

In some embodiments, the polypeptide comprises the sequence of SEQ ID NO: 212, wherein $X_1$ is V or I. In any of the aforementioned embodiments in this aspect of the disclosure, $X_2$ is V or I. In any of the aforementioned embodiments, $X_3$ is I or F. In any of the aforementioned embodiments, $X_4$ is K or R. In any of the aforementioned embodiments, $X_5$ is H or P. In any of the aforementioned embodiments, $X_6$ is S or T. In any of the aforementioned embodiments, $X_7$ is N or A.

In some embodiments, the polypeptide comprises the sequence of SEQ ID NO: 212, wherein $X_7$ is A. In any of the aforementioned embodiments in this aspect of the disclosure, $X_7$ is A and $X_1$ is V or I. In any of the aforementioned embodiments in this aspect of the disclosure, $X_7$ is A and $X_2$ is V or I. In any of the aforementioned embodiments, $X_7$ is A and $X_3$ is I or F. In any of the aforementioned embodiments, $X_7$ is A and $X_4$ is K or R. In any of the aforementioned embodiments, $X_7$ is A and $X_5$ is H or P. In any of the aforementioned embodiments, $X_7$ is A and $X_6$ is S or T.

In some embodiments, the polypeptide comprises the sequence of SEQ ID NO: 212, wherein $X_7$ is A. In any of the aforementioned embodiments in this aspect of the disclosure, $X_7$ is A and $X_1$ is I. In any of the aforementioned embodiments in this aspect of the disclosure, $X_7$ is A and $X_2$ is I. In any of the aforementioned embodiments, $X_7$ is A and $X_3$ is F. In any of the aforementioned embodiments, $X_7$ is A and $X_4$ is R. In any of the aforementioned embodiments, $X_7$ is A and $X_5$ is P. In any of the aforementioned embodiments, $X_7$ is A and $X_6$ is T.

In some embodiments, the polypeptide comprises a SIRPα D1 domain having at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NO: 212, wherein each of $X_1$, $X_2$, $X_3$, $X_4$, $X_5$, $X_6$, and $X_7$ is not a wild-type amino acid.

In some embodiments, the polypeptide of this aspect of the disclosure includes no more than ten amino acid substitutions relative to the wild-type SIRPα D1 domain having the sequence of SEQ ID NO: 2. In some embodiments, the polypeptide of this aspect of the disclosure includes no more than seven amino acid substitutions relative to the wild-type SIRPα D1 domain having the sequence of SEQ ID NO: 2.

In some embodiments, the polypeptide binds CD47 with at least 10-fold greater binding affinity than the wild-type SIRPα D1 domain having the sequence of SEQ ID NO: 2. In some embodiments, the polypeptide binds CD47 with at least 100-fold greater binding affinity than the wild-type SIRPα D1 domain having the sequence of SEQ ID NO: 2. In some embodiments, the polypeptide binds CD47 with at least 1000-fold greater binding affinity than the wild-type SIRPα D1 domain having the sequence of SEQ ID NO: 2. In some embodiments, fragments include polypeptides of less than 10 amino acids in length, about 10 amino acids in length, about 20 amino acids in length, about 30 amino acids in length, about 40 amino acids in length, about 50 amino acids in length, about 60 amino acids in length, about 70 amino acids in length, about 80 amino acids in length, about 90 amino acids in length, about 100 amino acids in length, or more than about 100 amino acids in length. Fragments retain the ability to bind to CD47. Preferably, SIRPα D1 domain variant polypeptides and fragments thereof bind to CD47 with a higher affinity than a SIRPα polypeptide binds to CD47. For example, in some embodiments, a SIRPα D1 domain variant polypeptide or fragment thereof binds to CD47 with a $K_D$ less than $1\times10^{-8}$ M, less than $5\times10^{-9}$ M, less than $1\times10^{-9}$ M, less $5\times10^{-10}$ M, less than $1\times10^{-10}$ M or less than $1\times10^{-11}$ M. In some embodiments, a SIRPα D1 domain variant polypeptide or fragment thereof binds to CD47 with a $K_D$ between about 500 nM and 100 nM, between about 100 nM and 50 nM, between about 50 nM and 10 nM, between about 10 nM and 5 nM, between about 5 nM and 1 nM, between about 1 nM and 500 pM, between about 500 pM and 100 pM, between about 100 pM and 50 pM, or between about 50 pM and 10 pM.

Described herein, in some embodiments, is a polypeptide comprising a SIRPα D1 domain variant having a sequence according to: EEELQX$_1$IQPDKSVLVAA GETATLRCTX$_2$TSLX$_3$PVGPIQWFRGAGPGRX$_4$LIYNQ X$_5$X$_6$GX$_7$FPRVTTVSDX$_8$TKRNNMDFSIRIGX$_9$X$_{10}$X$_{11}$ X$_{12}$ADAGTYYCX$_{13}$KFRKGSPDDVEFKSGAGTELSVR AKPS (SEQ ID NO: 218), wherein X$_1$ is V, L, or I; X$_2$ is A, V, L, or I; X$_3$ is I, S, T, or F; X$_4$ is E, L, or V; X$_5$ is K or R; X$_6$ is E or Q; X$_7$ is H, R, or P; X$_8$ is S, G, L, or T; X$_9$ is any amino acid; X$_{10}$ is any amino acid; X$_{11}$ is any amino acid; X$_{12}$ is any amino acid; and X$_{13}$ is V or I; and wherein the SIRPα D1 domain variant comprises at least two amino acid substitutions relative to a wild-type SIRPα D1 domain having a sequence according to SEQ ID NO: 1.

In some embodiments, the polypeptide comprises the sequence of SEQ ID NO: 212, wherein X$_1$, wherein X$_9$ is A. In any of the aforementioned embodiments in this aspect of the disclosure, X$_9$ is N. In any of the aforementioned embodiments in this aspect of the disclosure X$_{10}$ is I. In any of the aforementioned embodiments in this aspect of the disclosure X$_9$ is N and X10 is P. In any of the aforementioned embodiments in this aspect of the disclosure X$_9$ is N and X11 is any amino acid other than S, T, or C. In any of the aforementioned embodiments in this aspect of the disclosure X$_{11}$ is T. In any of the aforementioned embodiments in this aspect of the disclosure X$_{11}$ is an amino acid other than T. In any of the aforementioned embodiments in this aspect of the disclosure X$_{12}$ is P. In any of the aforementioned embodiments in this aspect of the disclosure X$_9$ is N and X$_{12}$ is any amino acid other than P.

Described herein, in some embodiments, is a polypeptide comprising a SIRPα D1 domain variant having a sequence according to: EEELQX$_1$IQPDKSVLVAAGETATLRCTX$_2$ TSLX$_3$PVGPIQWFRGAGPGRX$_4$LIYNQX$_5$X$_6$GX$_7$FPRV TTVSDX$_8$TKRNNMDFSIRIGX$_9$ITX$_{10}$ADAGTYYCX$_{11}$K FRKGSPDDVEFKSGAGTELSVRAKPS (SEQ ID NO: 219), wherein X$_1$ is V, L, or I; X$_2$ is A, V, L, or I; X$_3$ is I, S, T, or F; X$_4$ is E, L, or V; X$_5$ is K or R; X$_6$ is E or Q; X$_7$ is H, R, or P; X$_8$ iS S, G, L, or T; X$_9$ is N; X$_{10}$ is any amino acid other than P; and X$_{11}$ is V or I; and wherein the SIRPα D1 domain variant comprises at least two amino acid substitutions relative to a wild-type SIRPα D1 domain having a sequence according to SEQ ID NO: 1.

In another aspect of the disclosure, compositions are disclosed herein which include a SIRPα D1 domain variant polypeptide having the amino acid sequence of SEQ ID NO: 48, or a fragment thereof. In some embodiments, the SIRPα D1 domain variant polypeptide or fragment thereof binds to CD47 with a higher affinity compared to the affinity that a SIRPα polypeptide binds to the CD47. In some embodiments, the SIRPα D1 domain variant polypeptide binds to CD47 with a $K_D$ less than $1\times10^{-8}$ M, or less than $1\times10^{-9}$ M, less than $1\times10^{-10}$ M or less than $1\times10^{-11}$ M. In some embodiments, the above-mentioned SIRPα D1 domain variant polypeptides are attached or fused to a second polypeptide. In some embodiments, the second polypeptide includes, without limitation, an Fc polypeptide, an Fc variant or a fragment of the foregoing.

Without limiting the foregoing, in some embodiments, a SIRPα D1 domain variant polypeptide is selected from any one of SEQ ID NOs: 53-87 and 213 shown in Table 6.

TABLE 6

SIRPα Variant Polypeptides

| SEQ ID NO: | Amino Acid Sequence |
|---|---|
| 53 | EEELQIIQPDKSVSVAAGESAILHCTITSLFPVGPIQWFRGAGPARVLIYNQRQ GPFPRVTTVSETTKRENMDFSISISNITPADAGTYYCIKFRKGSPDTEFKSGAG TELSVRAKPS |
| 54 | EEELQVIQPDKSVSVAAGESAILHCTVTSLFPVGPIQWFRGAGPARELIYNQR QGPFPRVTTVSESTKRENMDFSISISNITPADAGTYYCVKFRKGSPDTEFKSG AGTELSVRAKPS |
| 55 | EEELQVIQPDKSVSVAAGESAILHCTITSLFPVGPIQWFRGAGPARVLIYNQR QGPFPRVTTVSETTKRENMDFSISISNITPADAGTYYCIKFRKGSPDTEFKSGA GTELSVRAKPS |
| 56 | EEELQIIQPDKSVSVAAGESAILHCTVTSLFPVGPIQWFRGAGPARVLIYNQR QGPFPRVTTVSETTKRENMDFSISISNITPADAGTYYCIKFRKGSPDTEFKSGA GTELSVRAKPS |
| 57 | EEELQIIQPDKSVSVAAGESAILHCTITSLIPVGPIQWFRGAGPARVLIYNQRQ GPFPRVTTVSETTKRENMDFSISISNITPADAGTYYCIKFRKGSPDTEFKSGAG TELSVRAKPS |
| 58 | EEELQIIQPDKSVSVAAGESAILHCTITSLFPVGPIQWFRGAGPARELIYNQRQ GPFPRVTTVSETTKRENMDFSISISNITPADAGTYYCIKFRKGSPDTEFKSGAG TELSVRAKPS |
| 59 | EEELQIIQPDKSVSVAAGESAILHCTITSLFPVGPIQWFRGAGPARVLIYNQKQ GPFPRVTTVSETTKRENMDFSISISNITPADAGTYYCIKFRKGSPDTEFKSGAG TELSVRAKPS |

TABLE 6-continued

SIRPα Variant Polypeptides

| SEQ ID NO: | Amino Acid Sequence |
|---|---|
| 60 | EEELQIIQPDKSVSVAAGESAILHCTITSLFPVGPIQWFRGAGPARVLIYNQRE
GPFPRVTTVSETTKRENMDFSISISNITPADAGTYYCIKFRKGSPDTEFKSGAG
TELSVRAKPS |
| 61 | EEELQIIQPDKSVSVAAGESAILHCTITSLFPVGPIQWFRGAGPARVLIYNQRQ
GHFPRVTTVSETTKRENMDFSISISNITPADAGTYYCIKFRKGSPDTEFKSGA
GTELSVRAKPS |
| 62 | EEELQIIQPDKSVSVAAGESAILHCTITSLFPVGPIQWFRGAGPARVLIYNQRQ
GPFPRVTTVSESTKRENMDFSISISNITPADAGTYYCIKFRKGSPDTEFKSGAG
TELSVRAKPS |
| 63 | EEELQIIQPDKSVSVAAGESAILHCTITSLFPVGPIQWFRGAGPARVLIYNQRQ
GPFPRVTTVSETTKRENMDFSISISNITPADAGTYYCVKFRKGSPDTEFKSGA
GTELSVRAKPS |
| 64 | EEELQVIQPDKSVSVAAGESAILHCTVTSLIPVGPIQWFRGAGPARELIYNQR
EGPFPRVTTVSESTKRENMDFSISISNITPADAGTYYCVKFRKGSPDTEFKSG
AGTELSVRAKPS |
| 65 | EEELQVIQPDKSVSVAAGESAILHCTVTSLFPVGPIQWFRGAGPARELIYNQR
EGPFPRVTTVSESTKRENMDFSISISNITPADAGTYYCVKFRKGSPDTEFKSG
AGTELSVRAKPS |
| 66 | EEELQVIQPDKSVSVAAGESAILHCTITSLFPVGPIQWFRGAGPARELIYNQR
EGPFPRVTTVSESTKRENMDFSISISNITPADAGTYYCVKFRKGSPDTEFKSG
AGTELSVRAKPS |
| 67 | EEELQVIQPDKSVSVAAGESAILHCTITSLFPVGPIQWFRGAGPARELIYNQR
EGPFPRVTTVSETTKRENMDFSISISNITPADAGTYYCVKFRKGSPDTEFKSG
AGTELSVRAKPS |
| 68 | EEELQIIQPDKSVSVAAGESAILHCTITSLFPVGPIQWFRGAGPARELIYNQRE
GPFPRVTTVSESTKRENMDFSISISNITPADAGTYYCVKFRKGSPDTEFKSGA
GTELSVRAKPS |
| 69 | EEELQVIQPDKSVSVAAGESAILHCTITSLIPVGPIQWFRGAGPARELIYNQRE
GPFPRVTTVSESTKRENMDFSISISNITPADAGTYYCVKFRKGSPDTEFKSGA
GTELSVRAKPS |
| 70 | EEELQIIQPDKSVSVAAGESAILHCTITSLFPVGPIQWFRGAGPARELIYNQRE
GPFPRVTTVSETTKRENMDFSISISNITPADAGTYYCVKFRKGSPDTEFKSGA
GTELSVRAKPS |
| 71 | EEELQVIQPDKSVLVAAGETATLRCTATSLFPVGPIQWFRGAGPGRELIYNQ
RQGPFPRVTTVSDLTKRNNMDFSIRIGNITPADAGTYYCVKFRKGSPDDVEF
KSGAGTELSVRAKPS |
| 72 | EEELQIIQPDKSVLVAAGETATLRCTITSLFPVGPIQWFRGAGPGRELIYNQRE
GPFPRVTTVSDLTKRNNMDFSIRIGNITPADAGTYYCVKFRKGSPDDVEFKS
GAGTELSVRAKPS |
| 73 | EEELQVIQPDKSVLVAAGETATLRCTITSLFPVGPIQWFRGAGPGRELIYNQR
EGPFPRVTTVSDTTKRNNMDFSIRIGNITPADAGTYYCVKFRKGSPDDVEFK
SGAGTELSVRAKPS |
| 74 | EEELQIIQPDKSVLVAAGETATLRCTITSLFPVGPIQWFRGAGPGRELIYNQRE
GPFPRVTTVSDTTKRNNMDFSIRIGNITPADAGTYYCVKFRKGSPDDVEFKS
GAGTELSVRAKPS |
| 75 | EEELQVIQPDKSVLVAAGETATLRCTITSLFPVGPIQWFRGAGPGRELIYNQR
EGPFPRVTTVSDLTKRNNMDFSIRIGNITPADAGTYYCVKFRKGSPDDVEFK
SGAGTELSVRAKPS |
| 76 | EEELQVIQPDKSVLVAAGETATLRCTATSLFPVGPIQWFRGAGPGRELIYNQ
REGPFPRVTTVSDLTKRNNMDFSIRIGNITPADAGTYYCVKFRKGSPDDVEF
KSGAGTELSVRAKPS |
| 77 | EEELQIIQPDKSVLVAAGETATLRCTITSLFPVGPIQWFRGAGPGRVLIYNQR
QGPFPRVTTVSDTTKRNNMDFSIRIGNITPADAGTYYCIKFRKGSPDDVEFKS
GAGTELSVRAKPS |
| 78 | EEELQIIQPDKSVLVAAGETATLRCTITSLFPVGPIQWFRGAGPGRVLIYNQR
QGPFPRVTTVSDTTKRNNMDFSIRIGAITPADAGTYYCIKFRKGSPDDVEFKS
GAGTELSVRAKPS |

TABLE 6-continued

SIRPα Variant Polypeptides

| SEQ ID NO: | Amino Acid Sequence |
|---|---|
| 79 | EEELQVIQPDKSVLVAAGETATLRCTATSLFPVGPIQWFRGAGPGRELIYNQ<br>RQGPFPRVTTVSDLTKRNNMDFSIRIGAITPADAGTYYCVKFRKGSPDDVEF<br>KSGAGTELSVRAKPS |
| 80 | EEELQIIQPDKSVLVAAGETATLRCTITSLFPVGPIQWFRGAGPGRVLIYNQR<br>EGPFPRVTTVSDTTKRNNMDFSIRIGAITPADAGTYYCIKFRKGSPDDVEFKS<br>GAGTELSVRAKPS |
| 81 | EEELQVIQPDKSVLVAAGETATLRCTATSLFPVGPIQWFRGAGPGRELIYNQ<br>REGPFPRVTTVSDLTKRNNMDFSIRIGAITPADAGTYYCVKFRKGSPDDVEF<br>KSGAGTELSVRAKPS |
| 82 | EEELQVIQPDKSVLVAAGETATLRCTITSLFPVGPIQWFRGAGPGRELIYNQR<br>EGPFPRVTTVSDLTKRNNMDFSIRIGAITPADAGTYYCVKFRKGSPDDVEFK<br>SGAGTELSVRAKPS |
| 83 | EEELQIIQPDKSVLVAAGETATLRCTITSLFPVGPIQWFRGAGPGRELIYNQRE<br>GPFPRVTTVSDLTKRNNMDFSIRIGAITPADAGTYYCVKFRKGSPDDVEFKS<br>GAGTELSVRAKPS |
| 84 | EEELQVIQPDKSVLVAAGETATLRCTITSLFPVGPIQWFRGAGPGRELIYNQR<br>EGPFPRVTTVSDTTKRNNMDFSIRIGAITPADAGTYYCVKFRKGSPDDVEFK<br>SGAGTELSVRAKPS |
| 85 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGSPDDVEFKS<br>GAGTELSVRAKPS |
| 86 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPS |
| 87 | EEELQVIQPDKSVLVAAGETATLRCTATSLIPVGPIQWFRGAGPGRELIYNQK<br>EGHFPRVTTVSDLTKRNNMDFSIRIGNITPADAGTYYCVKFRKGSPDDVEFK<br>SGAGTELSVRAKPS |
| 195 | EEELQIIQPDKSVLVAAGETATLRCTMTSLFPVGPIQWFRGAGPGRELIYNQR<br>EGPFPRVTTVSDTTKRNNMDFSIRIGAITPADAGTYYCVKFRKGSPDDVEFK<br>SGAGTELSVRAKPS |
| 196 | EEELQIIQPDKSVLVAAGETATLRCTITSLKPVGPIQWFRGAGPGRELIYNQR<br>EGPFPRVTTVSDTTKRNNMDFSIRIGAITPADAGTYYCVKFRKGSPDDVEFK<br>SGAGTELSVRAKPS |
| 197 | EEELQIIQPDKSVLVAAGETATLRCTITSLRPVGPIQWFRGAGPGRELIYNQR<br>EGPFPRVTTVSDTTKRNNMDFSIRIGAITPADAGTYYCVKFRKGSPDDVEFK<br>SGAGTELSVRAKPS |
| 198 | EEELQIIQPDKSVLVAAGETATLRCTITSLYPVGPIQWFRGAGPGRELIYNQR<br>EGPFPRVTTVSDTTKRNNMDFSIRIGAITPADAGTYYCVKFRKGSPDDVEFK<br>SGAGTELSVRAKPS |
| 199 | EEELQIIQPDKSVLVAAGETATLRCTITSLFPVGPIQWFRGAGPGRELIYNQR<br>DGPFPRVTTVSDTTKRNNMDFSIRIGAITPADAGTYYCVKFRKGSPDDVEFK<br>SGAGTELSVRAKPS |
| 200 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGIPDDVEFKSG<br>AGTELSVRAKPS |
| 201 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGMPDDVEFKS<br>GAGTELSVRAKPS |
| 202 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGSPDVEFKSG<br>AGTELSVRAKPS |
| 203 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGSSEPDVEFKS<br>GAGTELSVRAKPS |
| 204 | EEELQIIQPDKSVLVAAGETATLRCTITSLRPVGPIQWFRGAGPGRELIYNQR<br>DGPFPRVTTVSDTTKRNNMDFSIRIGAITPADAGTYYCVKFRKGSPDDVEFK<br>SGAGTELSVRAKPS |

TABLE 6-continued

SIRPα Variant Polypeptides

| SEQ ID NO: | Amino Acid Sequence |
|---|---|
| 205 | EEELQIIQPDKSVLVAAGETATLRCTITSLRPVGPIQWFRGAGPGRELIYNQR<br>EGPFPRVTTVSDTTKRNNMDFSIRIGAITPADAGTYYCVKFRKGIPDDVEFKS<br>GAGTELSVRAKPS |
| 206 | EEELQIIQPDKSVLVAAGETATLRCTITSLRPVGPIQWFRGAGPGRELIYNQR<br>DGPFPRVTTVSDTTKRNNMDFSIRIGAITPADAGTYYCVKFRKGIPDDVEFKS<br>GAGTELSVRAKPS |
| 207 | EEELQIIQPDKSVLVAAGETATLRCTITSLYPVGPIQWFRGAGPGRELIYNQR<br>DGPFPRVTTVSDTTKRNNMDFSIRIGAITPADAGTYYCVKFRKGSPDDVEFK<br>SGAGTELSVRAKPS |
| 208 | EEELQIIQPDKSVLVAAGETATLRCTITSLYPVGPIQWFRGAGPGRELIYNQR<br>EGPFPRVTTVSDTTKRNNMDFSIRIGAITPADAGTYYCVKFRKGIPDDVEFKS<br>GAGTELSVRAKPS |
| 209 | EEELQIIQPDKSVLVAAGETATLRCTITSLYPVGPIQWFRGAGPGRELIYNQR<br>DGPFPRVTTVSDTTKRNNMDFSIRIGAITPADAGTYYCVKFRKGIPDDVEFKS<br>GAGTELSVRAKPS |
| 210 | EEELQIIQPDKSVLVAAGETATLRCTITSLFPVGPIQWFRGAGPGRELIYNQR<br>DGPFPRVTTVSDTTKRNNMDFSIRIGAITPADAGTYYCVKFRKGIPDDVEFKS<br>GAGTELSVRAKPS |
| 213 | EEELQVIQPDKSVLVAAGETATLRCTATSLFPVGPIQWFRGAGPGRELIYNQ<br>RQGPFPRVTTVSDLTKRNNMDFSIRIGNITVADAGTYYCVKFRKGSPDDVEF<br>KSGAGTELSVRAKPS |

In some embodiments, the polypeptide comprises a SIRPα D1 domain variant that has at least 85% sequence identity (e.g., at least 86%, 87%, 88%, 89%, 90%, 91%, 92%, 93%, 94%, 95%, 96%, 97%, 98%, 99%, or 100% sequence identity) to any variant provided in Table 6.

In some embodiments, the polypeptide comprises a SIRPα D1 domain that has at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NOs: 80, 81, or 85 in Table 6.

Fc Domain Variants and Fusion Polypeptides Comprising Same

Disclosed herein, in some embodiments, are polypeptides comprising a signal-regulatory protein α (SIRP-α) D1 variant comprising a SIRPα D1 domain, or a fragment thereof, having an amino acid mutation at residue 80 relative to a wild-type SIRPα D1 domain (e.g., a wild-type SIRPα D1 domain set forth in SEQ ID NO: 1 or 2); and at least one additional amino acid mutation relative to a wild-type SIRPα D1 domain (e.g., a wild-type SIRPα D1 domain set forth in SEQ ID NO: 1 or 2) at a residue selected from the group consisting of: residue 6, residue 27, residue 31, residue 47, residue 53, residue 54, residue 56, residue 66, and residue 92.

Also disclosed herein, in some embodiments, are Fc domain variant dimers, wherein the Fc domain variant dimer comprises two Fc domain variants, wherein each Fc domain variant independently is selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A.

Antibodies that target cell surface antigens can trigger immunostimulatory and effector functions that are associated with Fc receptor (FcR) engagement on immune cells. There are a number of Fc receptors that are specific for particular classes of antibodies, including IgG (gamma receptors), IgE (eta receptors), IgA (alpha receptors) and IgM (mu receptors). Binding of the Fc region to Fc receptors on cell surfaces can trigger a number of biological responses including phagocytosis of antibody-coated particles (antibody-dependent cell-mediated phagocytosis, or ADCP), clearance of immune complexes, lysis of antibody-coated cells by killer cells (antibody-dependent cell-mediated cytotoxicity, or ADCC) and, release of inflammatory mediators, placental transfer, and control of immunoglobulin production. Additionally, binding of the C1 component of complement to antibodies can activate the complement system. Activation of complement can be important for the lysis of cellular pathogens. However, the activation of complement can also stimulate the inflammatory response and can also be involved in autoimmune hypersensitivity or other immunological disorders. Variant Fc regions with reduced or ablated ability to bind certain Fc receptors are useful for developing therapeutic antibodies and Fc-fusion polypeptide constructs which act by targeting, activating, or neutralizing ligand functions while not damaging or destroying local cells or tissues.

In some embodiments, a SIRPα D1 polypeptide construct comprises a non-naturally occurring SIRPα D1 domain variant linked to an Fc domain variant which forms an Fc domain having ablated or reduced effector function.

In some embodiments, a Fc domain variant refers to a polypeptide chain that includes second and third antibody constant domains (e.g., CH2 and CH3). In some embodiments, an Fc domain variant also includes a hinge domain. In some embodiments, the Fc domain variant is of any immunoglobulin antibody isotype, including IgG, IgE, IgM, IgA, and IgD. Additionally, in some embodiments, an Fc domain variant is of any IgG subtype (e.g., IgG1, IgG2, IgG2a, IgG2b, IgG2c, IgG3, and IgG4). In some embodiments, an Fc domain variant comprises as many as ten amino acid modifications (e.g., insertions, deletions and/or substitutions) relative to a wild-type Fc domain monomer sequence (e.g., 1-10, 1-8, 1-6, 1-4 amino acid substitutions, additions or insertions, deletions, or combinations thereof) that alter the interaction between an Fc domain and an Fc receptor.

As used herein, the term "Fc domain dimer" refers to a dimer of two Fc domains. In a wild-type Fc domain dimer, two wild-type Fc domains dimerize by the interaction between the two CH3 antibody constant domains, as well as one or more disulfide bonds that form between the hinge domains of the two dimerized Fc domains.

As used herein, the term "Fc domain dimer variant" comprises at least one Fc domain variant. In some embodiments, an Fc domain dimer variant comprises Fc domain variants that are mutated to lack effector functions, for example a "dead Fc domain dimer variant." In some embodiments, each of the Fc domains in an Fc domain dimer variant includes amino acid substitutions in the CH2 antibody constant domain to reduce the interaction or binding between the Fc domain dimer variant and an Fc receptor, such as an Fcγ receptor (FcγR), an Fcα receptor (FcαR), or an Fcε (FcεR).

In some embodiments, a SIRPα D1 domain variant (e.g., any of the variants described in Tables 2, 5, and 6) is fused to an Fc domain variant of an immunoglobulin or a fragment of an Fc domain variant. In some embodiments, an Fc domain variant of an immunoglobulin or a fragment of an Fc domain variant is capable of forming an Fc domain dimer with another Fc domain variant. In some embodiments, an Fc domain variant of an immunoglobulin or a fragment of an Fc domain variant is not capable of forming an Fc domain dimer with another Fc domain variant. In some embodiments, an Fc domain variant or a fragment of an Fc domain variant is fused to a polypeptide of the disclosure to increase serum half-life of the polypeptide. In some embodiments, an Fc domain variant or a fragment of an Fc domain variant fused to a polypeptide of the disclosure dimerizes with a second Fc domain variant to form an Fc domain dimer variant which binds an Fc receptor, or alternatively, an Fc domain variant binds to an Fc receptor. In some embodiments, an Fc domain variant or a fragment of the Fc domain variant fused to a polypeptide to increase serum half-life of the polypeptide does not induce any immune system-related response.

In some embodiments, a SIRPα polypeptide or construct provided herein includes a SIRPα D1 domain or variant thereof joined to a first Fc domain variant and an antibody variable domain joined to a second Fc domain variant, in which the first and second Fc domain variants combine to form an Fc domain dimer variant (e.g., a heterodimeric Fc domain dimer variant). An Fc domain dimer is the protein structure that is found at the C-terminus of an immunoglobulin. An Fc domain dimer includes two Fc domains that are dimerized by the interaction between the CH3 antibody constant domains. A wild-type Fc domain dimer forms the minimum structure that binds to an Fc receptor, e.g., FcγRI, FcγRIIa, FcγRIIb, FcγRIIIa, FcγRIIIb, and FcγRIV.

The Fc domain dimer is not involved directly in binding an antibody to its target, but can be involved in various effector functions, such as participation of the antibody in antibody-dependent cellular toxicity. In some embodiments, the Fc domain in a SIRPα polypeptide or construct of the disclosure comprises amino acid substitutions, additions or insertions, deletions, or any combinations thereof that lead to decreased effector function such as decreased antibody-dependent cell-mediated cytotoxicity (ADCC), decreased complement-dependent cytolysis (CDC), decreased antibody-dependent cell-mediated phagocytosis (ADCP), or any combinations thereof. In some embodiments, the SIRPα polypeptides or constructs of the disclosure are characterized by decreased binding (e.g., minimal binding or absence of binding) to a human Fc receptor and decreased binding (e.g., minimal binding or absence of binding) to complement protein C1q. In some embodiments, the SIRPα constructs of the disclosure are characterized by decreased binding (e.g., minimal binding or absence of binding) to human FcγRI, FcγRIIA, FcγRIIB, FcγRIIIB, or any combinations thereof, and C1q. To alter or reduce an antibody-dependent effector function, such as ADCC, CDC, ADCP, or any combinations thereof, in some embodiments, the Fc domains in SIRPα constructs of the disclosure are of the IgG class and comprise one or more amino acid substitutions at E233, L234, L235, G236, G237, D265, D270, N297, E318, K320, K322, A327, A330, P331, or P329 (numbering according to the EU index of Kabat (Sequences of Proteins of Immunological Interest, 5th Ed. Public Health Service, National Institutes of Health, Bethesda, MD (1991))).

In some embodiments, polypeptide constructs comprising a non-native Fc region described herein exhibit reduced or ablated binding to at least one of Fcγ receptors CD16a, CD32a, CD32b, CD32c, and CD64 as compared to a polypeptide construct comprising a native Fc region. In some cases, the polypeptide constructs described herein exhibit reduced or ablated binding to CD16a, CD32a, CD32b, CD32c, and CD64 Fcγ receptors.

CDC refers to a form of cytotoxicity in which the complement cascade is activated by the complement component C1q binding to antibody Fc domains. In some embodiments, polypeptide constructs comprising a non-native Fc region described herein exhibit at least a 5%, 10%, 15%, 20%, 30%, 40%, 50%, 60%, 70%, 80%, 90% or greater reduction in C1q binding compared to a polypeptide construct comprising a wild-type Fc region. In some cases, polypeptide constructs comprising a non-native Fc region as described herein exhibit reduced CDC as compared to a polypeptide construct comprising a wild-type Fc region. In some embodiments, polypeptide constructs comprising a non-native Fc region as described herein exhibit at least a 5%, 10%, 15%, 20%, 30%, 40%, 50%, 60%, 70%, 80%, 90% or greater reduction in CDC compared to a polypeptide construct comprising a wild-type Fc region. In some cases, polypeptide constructs comprising a non-natural Fc domain variants or Fc domain dimer variants as described herein exhibit negligible CDC as compared to a polypeptide construct comprising a wild-type Fc region.

In some embodiments, the Fc domain variants or Fc domain dimer variants described herein are minimally glycosylated or have reduced glycosylation relative to a wild-type sequence. In some embodiments, deglycosylation is accomplished with a mutation of N297A, or by mutating N297 to any amino acid which is not N. In some embodiments, deglycosylation is accomplished by disrupting the motif N-Xaa1-Xaa2-Xaa3, wherein N=asparagine; Xaa1=any amino acid except P (proline); Xaa2=T (threonine), S (serine) or C (cysteine); and Xaa3=any amino acid except P (proline). In one embodiment, the N-Xaa1-Xaa2-Xaa3 motif refers to residues 297-300 as designated according to Kabat et al., 1991. In some embodiments, a mutation to any one or more of N, Xaa1, Xaa2, or Xaa3 results in deglycosylation of the Fc domain variant or Fc domain dimer variant.

In some embodiments, variants of antibody IgG constant regions (e.g., Fc domain variants or Fc domain dimer variants) possess a reduced capacity to specifically bind Fcγ receptors or have a reduced capacity to induce phagocytosis. In some embodiments, variants of antibody IgG constant regions (e.g., Fc domain variants or Fc domain dimer variants) possess a reduced capacity to specifically bind Fcγ receptors and have a reduced capacity to induce phagocytosis. For example, in some embodiments, an Fc domain variant is mutated to lack effector functions, typical of a "dead" Fc domain variant. For example, in some embodiments, an Fc domain variant includes specific amino acid substitutions that are known to minimize the interaction between the Fc domain dimer and an Fcγ receptor. In some embodiments, an Fc domain variant is from an IgG1 antibody and includes one or more of amino acid substitutions L234A, L235A, G237A, and N297A (as designated according to the EU numbering system per Kabat et al., 1991). In some embodiments, one or more additional mutations are included in such IgG1 Fc domain variant. Non-limiting examples of such additional mutations for human IgG1 Fc domain variants include E318A and K322A. In some instances, a human IgG1 Fc domain variant has up to 12, 11, 10, 9, 8, 7, 6, 5 or 4 or fewer mutations in total as compared to wild-type human IgG1 sequence. In some embodiments, one or more additional deletions are included in such IgG1 Fc domain variant. For example, in some embodiments, the C-terminal lysine of the Fc domain IgG1 heavy chain constant region provided in SEQ ID NO: 88 in Table 1 is deleted, for example to increase the homogeneity of the polypeptide when the polypeptide is produced in bacterial or mammalian cells. In some instances, a human IgG1 Fc domain variant has up to 12, 11, 10, 9, 8, 7, 6, 5 or 4 or fewer deletions in total as compared to wild-type human IgG1 sequence (see, e.g., SEQ ID NO: 161 below). In some embodiments, a IgG1 Fc domain variant has a sequence according to any one of SEQ ID NO: 135, SEQ ID NO: 136 or SEQ ID NO: 137.

```
SEQ ID NO: 161:
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSREEMTKNQVSLTCLVK

GFYPSDIAVEWESNGQPENNYKTTPPVLDSDGSFFLYSKLTVDKSRWQQG

NVFSCSVMHEALHNHYTQKSLSLSPG
```

In some embodiments, an Fc domain variant is from an IgG2 or IgG4 antibody and includes amino acid substitutions A330S, P331S, or both A330S and P331S. The aforementioned amino acid positions are defined according to Kabat, et al. (1991). The Kabat numbering of amino acid residues can be determined for a given antibody by alignment at regions of homology of the sequence of the antibody with a "standard" Kabat numbered sequence. In some embodiments, the Fc domain variant comprises a human IgG2 Fc domain sequence comprising one or more of A330S, P331S and N297A amino acid substitutions (as designated according to the EU numbering system per Kabat, et al. (1991). In some embodiments, one or more additional mutations are included in such IgG2 Fc domain variants. Non-limiting examples of such additional mutations for human IgG2 Fc domain variant include V234A, G237A, P238S, V309L and H268A (as designated according to the EU numbering system per Kabat et al. (1991)). In some instances, a human IgG2 Fc domain variant has up to 12, 11, 10, 9, 8, 7, 6, 5, 4, 3 or fewer mutations in total as compared to wild-type human IgG2 sequence. In some embodiments, one or more additional deletions are included in such IgG2 Fc domain variant. For example, in some embodiments, the C-terminal lysine of the Fc domain IgG2 heavy chain constant region provided in SEQ ID NO: 89 in Table 7 is deleted, for example to increase the homogeneity of the polypeptide when the polypeptide is produced in bacterial or mammalian cells. In some instances, a human IgG2 Fc domain variant has up to 12, 11, 10, 9, 8, 7, 6, 5 or 4 or fewer deletions in total as compared to wild-type human IgG2 sequence (see, e.g., SEQ ID NO: 162 below).

```
SEQ ID NO: 162:
ERKCCVECPPCPAPPVAGPSVFLFPPKPKDTLMISRTPEVTCVVVDVSHE

DPEVQFNWYVDGVEVHNAKTKPREEQFNSTFRVVSVLTVVHQDWLNGKEY

KCKVSNKGLPAPIEKTISKTKGQPREPQVYTLPPSREEMTKNQVSLTCLV

KGFYPSDIAVEWESNGQPENNYKTTPPMLDSDGSFFLYSKLTVDKSRWQQ

GNVFSCSVMHEALHNTQKSLSLSPG
```

When the Fc domain variant is an IgG4 Fc domain variant, in some embodiments, such Fc domain variant comprises a S228P mutation (as designated according to Kabat, et al. (1991)). In some instances, a human IgG4 Fc domain variant has up to 12, 11, 10, 9, 8, 7, 6, 5, 4, 3, 2 or 1 mutation(s) in total as compared to wild-type human IgG4 sequence. In some embodiments, the Fc domain variant comprises a human IgG4 Fc sequence comprising one or more of S228P, E233P, F234V, L235A, and delG236 amino acid substitutions (as designated according to the EU numbering system per Kabat, et al. (1991). In some embodiments, the Fc domain variant comprises a human IgG4 Fc sequence comprising one or more of S228P, E233P, F234V, L235A, delG236, and N297A amino acid substitutions (as designated according to the EU numbering system per Kabat, et al. (1991).

In some embodiments, the Fc domain variant includes at least one of the mutations L234A, L235A, G237A or N297A of an IgG1 Fc region or at least one of the mutations A330S, P331S or N297A of an IgG2 Fc region. In some embodiments, the Fc domain variant includes at least two of the mutations L234A, L235A, G237A or N297A of an IgG1 Fc region or at least two of the mutations A330S, P331S or N297A of an IgG2 Fc region. In some embodiments, the Fc domain variant includes at least three of the mutations L234A, L235A, G237A or N297A of an IgG1 Fc region or consists of the mutations A330S, P331S and N297A of an IgG2 Fc region. In some embodiments, the Fc domain variant consists of the mutations L234A, L235A, G237A and N297A.

In some embodiments, the Fc domain variant exhibits reduced binding to an Fc receptor of the subject compared to the wild-type human IgG Fc region. In some embodiments, the Fc domain variant exhibits ablated binding to an Fc receptor of the subject compared to the wild-type human IgG Fc region. In some embodiments, the Fc domain variant exhibits a reduction of phagocytosis compared to the wild-type human IgG Fc region. In some embodiments, the Fc domain variant exhibits ablated phagocytosis compared to the wild-type human IgG Fc region.

SEQ ID NO: 88 and SEQ ID NO: 89 provide amino acid sequences of Fc domain IgG1 and IgG2 heavy chain constant regions. In some embodiments, an Fc domain variant is any variant of SEQ ID NOs: 90-95 as shown in Table 7.

TABLE 7

Amino Acid Sequences of Fc Domain Variants

| SEQ ID NO: | AMINO ACID SEQUENCE |
|---|---|
| 88 | EPKSCDKTHTCPPCPAPELLGGPSVFLFPPKPKDTLMISRTPEVTCVVVDVS HEDPEVKFNWYVDGVEVHNAKTKPREEQYNSTYRVVSVLTVLHQDWLNG KEYKCKVSNKALPAPIEKTISKAKGQPREPQVYTLPPSREEMTKNQVSLTCL VKGFYPSDIAVEWESNGQPENNYKTTPPVLDSDGSFFLYSKLTVDKSRWQQ GNVFSCSVMHEALHNHYTQKSLSLSPGK |
| 89 | STKGPSVFPLAPCSRSTSESTAALGCLVKDYFPEPVTVSWNSGALTSGVHTF PAVLQSSGLYSLSSVVTVPSSSLGTQTYTCNVIDEIKPSNTKVDKTVERKCCV ECPPCPAPPVAGPSVFLFPPKPKDTLMISRTPEVTCVVVDVSHEDPEVQFNW YVDGVEVHNAKTKPREEQFNSTFRVVSVLTVVHQDWLNGKEYKCKVSNK GLPAPIEKTISKTKGQPREPQVYTLPPSREEMTKNQVSLTCLVKGFYPSDIAV EWESNGQPENNYKTTPPMLDSDGSFFLYSKLTVDKSRWQQGNVFSCSVMH EALHNHYTQKSLSLSPGK |
| 90 | DKTHTCPPCPAPEAAGAPSVFLFPPKPKDTLMISRTPEVTCVVVDVSHEDPE VKFNWYVDGVEVHNAKTKPREEQYASTYRVVSVLTVLHQDWLNGKEYK CKVSNKALPAPIEKTISKAKGQPREPQVYTLPPSREEMTKNQVSLTCLVKGF YPSDIAVEWESNGQPENNYKTTPPVLDSDGSFFLYSKLTVDKSRWQQGNVF SCSVMHEALHNHYTQKSLSLSPGK |
| 91 | DKTHTCPPCPAPEAAGAPSVFLFPPKPKDTLMISRTPEVTCVVVDVSHEDPE VKFNWYVDGVEVHNAKTKPREEQYASTYRVVSVLTVLHQDWLNGKEYK CKVSNKALPAPIEKTISKAKGQPREPQVYTLPPSREEMTKNQVSLTCLVKGF YPSDIAVEWESNGQPENNYKTTPPVLDSDGSFFLYSKLTVDKSRWQQGNVF SCSVMHEALHNHYTQKSLSLSPG |
| 92 | VECPPCPAPPVAGPSVFLFPPKPKDTLMISRTPEVTCVVVDVSHEDPEVQFN WYVDGVEVHNAKTKPREEQFASTFRVVSVLTVVHQDWLNGKEYKCKVSN KGLPSSIEKTISKTKGQPREPQVYTLPPSREEMTKNQVSLTCLVKGFYPSDIA VEWESNGQPENNYKTTPPMLDSDGSFFLYSKLTVDKSRWQQGNVFSCSVM HEALHNHYTQKSLSLSPGK |
| 93 | VECPPCPAPPVAGPSVFLFPPKPKDTLMISRTPEVTCVVVDVSHEDPEVQFN WYVDGVEVHNAKTKPREEQFASTFRVVSVLTVVHQDWLNGKEYKCKVSN KGLPSSIEKTISKTKGQPREPQVYTLPPSREEMTKNQVSLTCLVKGFYPSDIA VEWESNGQPENNYKTTPPMLDSDGSFFLYSKLTVDKSRWQQGNVFSCSVM HEALHNHYTQKSLSLSPG |
| 94 | ERKSSVECPPCPAPPVAGPSVFLFPPKPKDTLMISRTPEVTCVVVDVSHEDP EVQFNWYVDGVEVEINAKTKPREEQFASTFRVVSVLTVVHQDWLNGKEYK CKVSNKGLPSSIEKTISKTKGQPREPQVYTLPPSREEMTKNQVSLTCLVKGF YPSDIAVEWESNGQPENNYKTTPPMLDSDGSFFLYSKLTVDKSRWQQGNV FSCSVMHEALHNHYTQKSLSLSPGK |
| 95 | ERKSSVECPPCPAPPVAGPSVFLFPPKPKDTLMISRTPEVTCVVVDVSHEDP EVQFNWYVDGVEVHNAKTKPREEQFASTFRVVSVLTVVHQDWLNGKEYK CKVSNKGLPSSIEKTISKTKGQPREPQVYTLPPSREEMTKNQVSLTCLVKGF YPSDIAVEWESNGQPENNYKTTPPMLDSDGSFFLYSKLTVDKSRWQQGNV FSCSVMHEALHNHYTQKSLSLSPG |

Antibody-dependent cell-mediated cytotoxicity, which is also referred to herein as ADCC, refers to a form of cytotoxicity in which secreted Ig bound onto Fc receptors (FcRs) present on certain cytotoxic cells (e.g., Natural Killer (NK) cells and neutrophils) enabling these cytotoxic effector cells to bind specifically to an antigen-bearing target cell and subsequently kill the target cell. Antibody-dependent cell-mediated phagocytosis, which is also referred to herein as ADCP, refers to a form of cytotoxicity in which secreted Ig bound onto Fc receptors (FcRs) present on certain phagocytic cells (e.g., macrophages) enabling these phagocytic effector cells to bind specifically to an antigen-bearing target cell and subsequently engulf and digest the target cell. Ligand-specific high-affinity IgG antibodies directed to the surface of target cells can stimulate the cytotoxic or phagocytic cells and can be used for such killing. In some embodiments, polypeptide constructs comprising an Fc domain variant or Fc domain dimer variant as described herein exhibit reduced ADCC or ADCP as compared to a polypeptide construct comprising a wild-type Fc region. In some embodiments, polypeptide constructs comprising an Fc domain variant or Fc domain dimer variant as described herein exhibit at least a 5%, 10%, 15%, 20%, 30%, 40%, 50%, 60%, 70%, 80%, 90% or greater reduction in ADCC or ADCP compared to a polypeptide construct comprising a wild-type Fc region. In some embodiments, polypeptide constructs comprising an Fc domain variant or Fc domain dimer variant as described herein exhibit ablated ADCC or ADCP as compared to a polypeptide construct comprising a wild-type Fc region.

Complement-directed cytotoxicity, which is also referred to herein as CDC, refers to a form of cytotoxicity in which the complement cascade is activated by the complement component C1q binding to antibody Fc domains. In some embodiments, polypeptide constructs comprising an Fc domain variant or Fc domain dimer variant as described herein exhibit at least a 5%, 10%, 15%, 20%, 30%, 40%, 50%, 60%, 70%, 80%, 90% or greater reduction in C1q binding compared to a polypeptide construct comprising a wild-type Fc region. In some cases, polypeptide constructs comprising an Fc domain variant or Fc domain dimer variant as described herein exhibit reduced CDC as compared to a polypeptide construct comprising a wild-type Fc region. In some embodiments, polypeptide constructs comprising an Fc domain variant or Fc domain dimer variant as described herein exhibit at least a 5%, 10%, 15%, 20%, 30%, 40%, 50%, 60%, 70%, 80%, 90% or greater reduction in CDC compared to a polypeptide construct comprising a wild-type Fc region. In some cases, polypeptide constructs comprising an Fc domain variant or Fc domain dimer variant as described herein exhibit negligible CDC as compared to a polypeptide construct comprising a wild-type Fc region.

Fc domain variants or Fc domain dimer variants herein include those that exhibit reduced binding to an Fcγ receptor compared to the wild-type human IgG Fc region. For example, in some embodiments, an Fc domain variant or Fc domain dimer variant exhibits binding to an Fcγ receptor that is less than the binding exhibited by a wild-type human IgG Fc region to an Fcγ receptor, as described in the Examples. In some instances, an Fc domain variant or Fc domain dimer variant has reduced binding to an Fcγ receptor by a factor of 10%, 20% 30%, 40%, 50%, 60%, 70%, 80%, 90%, 95%, 96%, 97%, 98%, 99% or 100% (fully ablated effector function). In some embodiments, the reduced binding is for any one or more Fcγ receptor, e.g., CD16a, CD32a, CD32b, CD32c, or CD64.

In some instances, the Fc domain variants or Fc domain dimer variants disclosed herein exhibit a reduction of phagocytosis compared to its wild-type human IgG Fc region. Such Fc domain variants or Fc domain dimer variants exhibit a reduction in phagocytosis compared to its wild-type human IgG Fc region, wherein the reduction of phagocytosis activity is e.g., by a factor of 10%, 20%, 30%, 40%, 50%, 60%, 70%, 80%, 90%, 95%, 96%, 97%, 98%, 99% or 100%. In some instances, an Fc domain variant or Fc domain dimer variant exhibits ablated phagocytosis compared to its wild-type human IgG Fc region.

In some embodiments, the Fc domain variants or Fc domain dimer variants disclosed herein are coupled to one or more fusion partners. In some cases the fusion partner is a therapeutic moiety. In some cases, the fusion partner is selected to enable targeting of an expressed protein, purification, screening, display, and the like. In some embodiments, the fusion partner also affects the degree of binding to Fc receptors or the degree of phagocytosis reduction. As described herein, in some embodiments, when an Fc domain variant or Fc domain dimer variant is coupled to a fusion partner, it forms a polypeptide construct as described below.

In some embodiments, fusion partners are linked to the Fc domain variant or Fc domain dimer variant sequence via a linker sequence. In some embodiments, the linker sequence generally comprises a small number of amino acids, such as less than ten amino acids, although longer linkers are also utilized. In some cases, the linker has a length less than 10, 9, 8, 7, 6, or 5 amino acids or shorter. In some cases, the linker has a length of at least 10, 11, 12, 13, 14, 15, 20, 25, 30, or 35 amino acids or longer. Optionally, in some embodiments, a cleavable linker is employed.

In some embodiments, a fusion partner is a targeting or signal sequence that directs an Fc domain variant or Fc domain dimer variant protein and any associated fusion partners to a desired cellular location or to the extracellular media. In some embodiments, certain signaling sequences target a protein to be either secreted into the growth media, or into the periplasmic space, located between the inner and outer membrane of the cell. In some embodiments, a fusion partner is a sequence that encodes a peptide or protein that enables purification or screening. Such fusion partners include, but are not limited to, polyhistidine tags (His-tags) (for example His6 (SEQ ID NO: 223) and His10 (SEQ ID NO: 224)) or other tags for use with Immobilized Metal Affinity Chromatography (IMAC) systems (e.g., Ni+2 affinity columns), GST fusions, MBP fusions, Strep-tag, the BSP biotinylation target sequence of the bacterial enzyme BirA, and epitope tags which are targeted by antibodies (for example c-myc tags, flag-tags, and the like).

In some embodiments, such tags are useful for purification, for screening, or both. For example, in some embodiments, an Fc domain variant or Fc domain dimer variant is purified using a His-tag by immobilizing it to a Ni+2 affinity column, and then after purification the same His-tag is used to immobilize the antibody to a Ni+2 coated plate to perform an ELISA or other binding assay as described elsewhere herein. In some embodiments, a fusion partner enables the use of a selection method to screen Fc domain variants or Fc domain dimer variants as described herein.

Various fusion partners that enable a variety of selection methods are available. For example, by fusing the members of an Fc domain variant or Fc domain dimer variant library to the gene III protein, phage display can be employed. In some embodiments, fusion partners Fc domain variants or Fc domain dimer variants to be labeled. Alternatively, in some embodiments, a fusion partner binds to a specific sequence on the expression vector, enabling the fusion partner and associated Fc domain variant or Fc domain dimer variant to be linked covalently or noncovalently with the nucleic acid that encodes them.

In some embodiments, when a fusion partner is a therapeutic moiety, the therapeutic moiety is, e.g., a peptide, a protein, an antibody, a siRNA, or a small molecule. Non-limiting examples of therapeutic antibodies that are coupled to the Fc domain variants or Fc domain dimer variants of the present disclosure include, but are not limited to antibodies that recognize CD47. Non-limiting examples of therapeutic polypeptides that are coupled to the Fc domain variants or Fc domain dimer variants of the present disclosure include, but are not limited to, CD47 binding polypeptides, including SIRPα polypeptides. In such instances, the CD47 binding polypeptide is attached or fused to an Fc domain variant or Fc domain dimer variant of the disclosure. Examples of CD47 binding polypeptides include, but are not limited to, anti-CD47 antibodies or fragments thereof, and ligands of CD47 such as SIRPα or a fragment thereof. Additional examples of CD47 binding polypeptides include, but are not limited to naturally-occurring forms of SIRPα as well as mutants thereof.

In some embodiments, disclosed herein is a polypeptide comprising an Fc domain dimer variant, wherein the Fc domain dimer variant comprises two Fc domain variants, wherein each Fc domain variant independently is selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A. In some embodiments, the Fc domain variants are identical (i.e., homodimer). In some embodiments, the Fc domain variants are different (i.e., heterodimer). In some embodiments, at least one of the Fc domain variant in an Fc domain dimer is a human IgG1 Fc region consisting of mutations L234A, L235A, G237A, and N297A. In some embodiments, at least one of the Fc domain variants in an Fc domain dimer is a human IgG2 Fc region consisting of mutations A330S, P331S and N297A. In some embodiments, the Fc domain dimer variant exhibits ablated or reduced binding to an Fcγ receptor compared to the wild-type version of the human IgG Fc region. In some embodiments, the Fc domain dimer variant exhibits ablated or reduced binding to CD16a, CD32a, CD32b, CD32c, and CD64 Fcγ receptors compared to the wild-type version of the human IgG Fc region. In some embodiments, the Fc domain dimer variant exhibits ablated or reduced binding to C1q compared to the wild-type version of the human IgG Fc fusion. In some embodiments, at least one of the Fc domain variants in an Fc domain dimer variant is a human IgG4 Fc region comprising mutations S228P, E233P, F234V, L235A, delG236, and N297A. In some embodiments, the Fc domain dimer variant exhibits ablated or reduced binding to an Fcγ receptor compared to the wild-type human IgG4 Fc region. In some embodiments, the Fc domain dimer variant exhibits ablated or reduced binding to CD16a and CD32b Fcγ receptors compared to the wild-type version of its human IgG4 Fc region. In some embodiments, the Fc domain dimer variant binds to an Fcγ receptor with a $K_D$ greater than about $5 \times 10^{-6}$ M.

In some embodiments, the Fc domain dimer variant further comprises a CD47 binding polypeptide. In some embodiments, the Fc domain dimer variant exhibits ablated or reduced binding to an Fcγ receptor compared to a wild-type version of a human IgG Fc region. In some embodiments, the CD47 binding polypeptide does not cause acute anemia in rodents and non-human primates. In some embodiments, the CD47 binding polypeptide does not cause acute anemia in humans.

In some embodiments, the CD47 binding polypeptide is a signal-regulatory protein α (SIRP-α) polypeptide or a fragment thereof. In some embodiments, the SIRPα polypeptide comprises a SIRPα D1 domain variant comprising the amino acid sequence, EEELQX$_1$IQPDKSVLVAAGETATL RCTX$_2$TSLX$_3$PVGPIQWFRGAGPGRX$_4$LIYNQX$_5$EGX$_6$ FPRVTTVSDX$_7$TKRNNMDFSIRIGX$_8$ITPADAGTYYC X$_9$KFRKGSPDDVEFKSGAGTELSVRAKPS (SEQ ID NO: 221), wherein X$_1$ is V or I; X$_2$ is A or I; X$_3$ is I or F; X$_4$ is E or V; X$_5$ is K or R; X$_6$ is H or P; X$_7$ is L or T; X$_8$ is any amino acid other than N; and X$_9$ is V or I. In some embodiments, the SIRPα polypeptide comprises a SIRPα D1 domain variant wherein X$_1$ is V or I; X$_2$ is A or I; X$_3$ is I or F; X$_4$ is E; X$_5$ is K or R; X$_6$ is H or P; X$_7$ is L or T; X$_8$ is not N; and X$_9$ is V.

In some embodiments, disclosed herein, is a polypeptide comprising: a SIRPα D1 domain variant, wherein the SIRPα D1 domain variant is a non-naturally occurring high affinity SIRPα D1 domain, wherein the SIRPα D1 domain variant binds to human CD47 with an affinity that is at least 10-fold greater than the affinity of a naturally occurring D1 domain; and an Fc domain variant, wherein the Fc domain variant is linked to a second polypeptide comprising a second Fc domain variant to form an Fc domain dimer variant, wherein the Fc domain dimer variant has ablated or reduced effector function. In some embodiments, the non-naturally occurring high affinity SIRPα D1 domain comprises an amino acid mutation at residue 80.

In some embodiments, disclosed herein, is a SIRPα D1 domain variant, wherein the SIRPα D1 domain variant binds CD47 from a first species with a $K_D$ less than 250 nM; and wherein the SIRPα D1 domain variant binds CD47 from a second species with a $K_D$ less than 250 nM; and the $K_D$ for CD47 from the first species and the $K_D$ for CD47 from the second species are within 100 fold of each other; wherein the first species and the second species are selected from the group consisting of: human, rodent, and non-human primate. In some embodiments, the SIRPα D1 domain variant binds CD47 from at least 3 different species. In some embodiments, the non-human primate is cynomolgus monkey.

In some embodiments, disclosed herein, is a polypeptide comprising (a) a SIRPα D1 domain that binds human CD47 with a $K_D$ less than 250 nM; and (b) an Fc domain or variant thereof linked to the N-terminus or the C-terminus of the SIRPα D1 domain, wherein the polypeptide does not cause acute anemia in rodents and non-human primates. In some embodiments, the polypeptide is a non-naturally occurring variant of a human SIRP-α. In some embodiments, administration of the polypeptide in vivo results in hemoglobin reduction by less than 50% during the first week after administration. In some embodiments, administration of the polypeptide in humans results in hemoglobin reduction by less than 50% during the first week after administration. In some embodiments, the polypeptide further comprises at least one Fc domain dimer variant, wherein the Fc domain dimer variant comprises an Fc domain variant selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A. In some embodiments, the Fc domain variant is a human IgG1 Fc region consisting of mutations L234A, L235A, G237A, and N297A. In some embodiments, the Fc domain variant is a human IgG2 Fc region consisting of mutations A330S, P331S and N297A.

The SIRPα constructs of the disclosure include a SIRPα domain or variant thereof that has its C-terminus joined to the N-terminus of an Fc domain or variant thereof by way of a linker using conventional genetic or chemical means, e.g., chemical conjugation. In some embodiments, a linker (e.g., a spacer) is inserted between the polypeptide and the Fc domain or variant thereof. In some embodiments, a polypeptide of the disclosure including a SIRPα D1 domain variant is fused to an Fc domain variant that is incapable of forming a dimer. In some embodiments, a polypeptide of the disclosure is fused to an Fc domain or variant thereof that is capable of forming a dimer, e.g., a heterodimer, with another Fc domain or variant thereof. In some embodiments, a polypeptide of the invention is fused to an Fc domain or variant thereof and this fusion protein forms a homodimer. In some embodiments, a polypeptide of the disclosure is fused to a first Fc domain or variant thereof and a different protein or peptide (e.g., an antibody variable region) is fused to a second Fc domain or variant thereof. In some embodiments, a SIRPα D1 domain or variant thereof is joined to a first Fc domain or variant thereof and a therapeutic protein (e.g., a cytokine, an interleukin, an antigen, a steroid, an anti-inflammatory agent, or an immunomodulatory agent) is joined to a second Fc domain or variant thereof. In some embodiments, the first and second Fc domains or variants thereof form a heterodimer.

Without the limiting the foregoing, in some embodiments, a SIRPα D1 domain variant polypeptide (e.g., any of the variants described in Tables 2, 5, and 6) is fused to an Fc polypeptide or Fc variant polypeptide, such as an Fc domain or variant thereof. Examples of polypeptides comprising a SIRPα D1 domain variant polypeptide and a fused Fc domain variant polypeptide include, but are not limited to, SEQ ID NOS: 96-137, 214, and 216 shown in Table 8.

TABLE 8

Polypeptides Comprising SIRPα D1 Domain
Variants Fused to Fc Domain Variants

| SEQ ID NO: | Amino Acid Sequence |
|---|---|
| 96 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSDKTHTCPPCPAPEAAGAPSVFLFPPKPKDTLMISRTPEVT<br>CVVVDVSHEDPEVKFNWYVDGVEVHNAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 97 | EEELQVIQPDKSVLVAAGETATLRCTATSLFPVGPIQWFRGAGPGRELIYNQ<br>RQGPFPRVTTVSDLTKRNNMDFSIRIGNITPADAGTYYCVKFRKGSPDDVEF<br>KSGAGTELSVRAKPSDKTHTCPPCPAPEAAGAPSVFLFPPKPKDTLMISRTPE<br>VTCVVVDVSHEDPEVKFNWYVDGVEVHNAKTKPREEQYASTYRVVSVLT<br>VLHQDWLNGKEYKCKVSNKALPAPIEKTISKAKGQPREPQVYTLPPSREEM<br>TKNQVSLTCLVKGFYPSDIAVEWESNGQPENNYKTTPPVLDSDGSFFLYSKL<br>TVDKSRWQQGNVFSCSVMHEALHNHYTQKSLSLSPGK |
| 98 | EEELQIIQPDKSVLVAAGETATLRCTITSLFPVGPIQWFRGAGPGRVLIYNQR<br>QGPFPRVTTVSDTTKRNNMDFSIRIGAITPADAGTYYCIKFRKGSPDDVEFKS<br>GAGTELSVRAKPSDKTHTCPPCPAPEAAGAPSVFLFPPKPKDTLMISRTPEVT<br>CVVVDVSHEDPEVKFNWYVDGVEVHNAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 99 | EEELQVIQPDKSVLVAAGETATLRCTATSLFPVGPIQWFRGAGPGRELIYNQ<br>RQGPFPRVTTVSDLTKRNNMDFSIRIGAITPADAGTYYCVKFRKGSPDDVEF<br>KSGAGTELSVRAKPSDKTHTCPPCPAPEAAGAPSVFLFPPKPKDTLMISRTPE<br>VTCVVVDVSHEDPEVKFNWYVDGVEVHNAKTKPREEQYASTYRVVSVLT<br>VLHQDWLNGKEYKCKVSNKALPAPIEKTISKAKGQPREPQVYTLPPSREEM<br>TKNQVSLTCLVKGFYPSDIAVEWESNGQPENNYKTTPPVLDSDGSFFLYSKL<br>TVDKSRWQQGNVFSCSVMHEALHNHYTQKSLSLSPGK |
| 100 | EEELQVIQPDKSVLVAAGETATLRCTATSLFPVGPIQWFRGAGPGRELIYNQ<br>REGPFPRVTTVSDLTKRNNMDFSIRIGAITPADAGTYYCVKFRKGSPDDVEF<br>KSGAGTELSVRAKPSDKTHTCPPCPAPEAAGAPSVFLFPPKPKDTLMISRTPE<br>VTCVVVDVSHEDPEVKFNWYVDGVEVHNAKTKPREEQYASTYRVVSVLT<br>VLHQDWLNGKEYKCKVSNKALPAPIEKTISKAKGQPREPQVYTLPPSREEM<br>TKNQVSLTCLVKGFYPSDIAVEWESNGQPENNYKTTPPVLDSDGSFFLYSKL<br>TVDKSRWQQGNVFSCSVMHEALHNHYTQKSLSLSPGK |
| 101 | EEELQVIQPDKSVLVAAGETATLRCTITSLFPVGPIQWFRGAGPGRELIYNQR<br>EGPFPRVTTVSDLTKRNNMDFSIRIGAITPADAGTYYCVKFRKGSPDDVEFK<br>SGAGTELSVRAKPSDKTHTCPPCPAPEAAGAPSVFLFPPKPKDTLMISRTPEV<br>TCVVVDVSHEDPEVKFNWYVDGVEVINAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 102 | EEELQIIQPDKSVLVAAGETATLRCTITSLFPVGPIQWFRGAGPGRELIYNQRE<br>GPFPRVTTVSDLTKRNNMDFSIRIGAITPADAGTYYCVKFRKGSPDDVEFKS<br>GAGTELSVRAKPSDKTHTCPPCPAPEAAGAPSVFLFPPKPKDTLMISRTPEVT<br>CVVVDVSHEDPEVKFNWYVDGVEVHNAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 103 | EEELQVIQPDKSVLVAAGETATLRCTITSLFPVGPIQWFRGAGPGRELIYNQR<br>EGPFPRVTTVSDTTKRNNMDFSIRIGAITPADAGTYYCVKFRKGSPDDVEFK<br>SGAGTELSVRAKPSDKTHTCPPCPAPEAAGAPSVFLFPPKPKDTLMISRTPEV<br>TCVVVDVSHEDPEVKFNWYVDGVEVINAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 104 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGSPDDVEFKS<br>GAGTELSVRAKPSDKTHTCPPCPAPEAAGAPSVFLFPPKPKDTLMISRTPEVT<br>CVVVDVSHEDPEVKFNWYVDGVEVHNAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALEINHYTQKSLSLSPGK |
| 105 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSVECPPCPAPPVAGPSVFLFPPKPKDTLMISRTPEVTCVVV |

TABLE 8-continued

Polypeptides Comprising SIRPα D1 Domain
Variants Fused to Fc Domain Variants

| SEQ ID NO: | Amino Acid Sequence |
|---|---|
| | DVSHEDPEVQFNWYVDGVEVEINAKTKPREEQFASTFRVVSVLTVVHQDWL
NGKEYKCKVSNKGLPSSIEKTISKTKGQPREPQVYTLPPSREEMTKNQVSLT
CLVKGFYPSDIAVEWESNGQPENNYKTTPPMLDSDGSFFLYSKLTVDKSRW
QQGNVFSCSVMHEALEINHYTQKSLSLSPGK |
| 106 | EEELQVIQPDKSVLVAAGETATLRCTATSLFPVGPIQWFRGAGPGRELIYNQ
RQGPFPRVTTVSDLTKRNNMDFSIRIGNITPADAGTYYCVKFRKGSPDDVEF
KSGAGTELSVRAKPSVECPPCPAPPVAGPSVFLFPPKPKDTLMISRTPEVTCV
VVDVSHEDPEVQFNWYVDGVEVEINAKTKPREEQFASTFRVVSVLTVVHQD
WLNGKEYKCKVSNKGLPSSIEKTISKTKGQPREPQVYTLPPSREEMTKNQVS
LTCLVKGFYPSDIAVEWESNGQPENNYKTTPPMLDSDGSFFLYSKLTVDKSR
WQQGNVFSCSVMHEALEINHYTQKSLSLSPGK |
| 107 | EEELQIIQPDKSVLVAAGETATLRCTITSLFPVGPIQWFRGAGPGRVLIYNQR
QGPFPRVTTVSDTTKRNNMDFSIRIGAITPADAGTYYCIKFRKGSPDDVEFKS
GAGTELSVRAKPSVECPPCPAPPVAGPSVFLFPPKPKDTLMISRTPEVTCVVV
DVSHEDPEVQFNWYVDGVEVEINAKTKPREEQFASTFRVVSVLTVVHQDWL
NGKEYKCKVSNKGLPSSIEKTISKTKGQPREPQVYTLPPSREEMTKNQVSLT
CLVKGFYPSDIAVEWESNGQPENNYKTTPPMLDSDGSFFLYSKLTVDKSRW
QQGNVFSCSVMHEALEINHYTQKSLSLSPGK |
| 108 | EEELQVIQPDKSVLVAAGETATLRCTATSLFPVGPIQWFRGAGPGRELIYNQ
RQGPFPRVTTVSDLTKRNNMDFSIRIGAITPADAGTYYCVKFRKGSPDDVEF
KSGAGTELSVRAKPSVECPPCPAPPVAGPSVFLFPPKPKDTLMISRTPEVTCV
VVDVSHEDPEVQFNWYVDGVEVEINAKTKPREEQFASTFRVVSVLTVVHQD
WLNGKEYKCKVSNKGLPSSIEKTISKTKGQPREPQVYTLPPSREEMTKNQVS
LTCLVKGFYPSDIAVEWESNGQPENNYKTTPPMLDSDGSFFLYSKLTVDKSR
WQQGNVFSCSVMHEALEINHYTQKSLSLSPGK |
| 109 | EEELQVIQPDKSVLVAAGETATLRCTATSLFPVGPIQWFRGAGPGRELIYNQ
REGPFPRVTTVSDLTKRNNMDFSIRIGAITPADAGTYYCVKFRKGSPDDVEF
KSGAGTELSVRAKPSVECPPCPAPPVAGPSVFLFPPKPKDTLMISRTPEVTCV
VVDVSHEDPEVQFNWYVDGVEVEINAKTKPREEQFASTFRVVSVLTVVHQD
WLNGKEYKCKVSNKGLPSSIEKTISKTKGQPREPQVYTLPPSREEMTKNQVS
LTCLVKGFYPSDIAVEWESNGQPENNYKTTPPMLDSDGSFFLYSKLTVDKSR
WQQGNVFSCSVMHEALEINHYTQKSLSLSPGK |
| 110 | EEELQVIQPDKSVLVAAGETATLRCTITSLFPVGPIQWFRGAGPGRELIYNQR
EGPFPRVTTVSDLTKRNNMDFSIRIGAITPADAGTYYCVKFRKGSPDDVEFK
SGAGTELSVRAKPSVECPPCPAPPVAGPSVFLFPPKPKDTLMISRTPEVTCVV
VDVSHEDPEVQFNWYVDGVEVHNAKTKPREEQFASTFRVVSVLTVVHQD
WLNGKEYKCKVSNKGLPSSIEKTISKTKGQPREPQVYTLPPSREEMTKNQVS
LTCLVKGFYPSDIAVEWESNGQPENNYKTTPPMLDSDGSFFLYSKLTVDKSR
WQQGNVESCSVMHEALHNHYTQKSLSLSPGK |
| 111 | EEELQIIQPDKSVLVAAGETATLRCTITSLFPVGPIQWFRGAGPGRELIYNQRE
GPFPRVTTVSDLTKRNNMDFSIRIGAITPADAGTYYCVKFRKGSPDDVEFKS
GAGTELSVRAKPSVECPPCPAPPVAGPSVFLFPPKPKDTLMISRTPEVTCVVV
DVSHEDPEVQFNWYVDGVEVEINAKTKPREEQFASTFRVVSVLTVVHQDWL
NGKEYKCKVSNKGLPSSIEKTISKTKGQPREPQVYTLPPSREEMTKNQVSLT
CLVKGFYPSDIAVEWESNGQPENNYKTTPPMLDSDGSFFLYSKLTVDKSRW
QQGNVESCSVMITEALHNHYTQKSLSLSPGK |
| 112 | EEELQVIQPDKSVLVAAGETATLRCTITSLFPVGPIQWFRGAGPGRELIYNQR
EGPFPRVTTVSDTTKRNNMDFSIRIGAITPADAGTYYCVKFRKGSPDDVEFK
SGAGTELSVRAKPSVECPPCPAPPVAGPSVFLFPPKPKDTLMISRTPEVTCVV
VDVSHEDPEVQFNWYVDGVEVHNAKTKPREEQFASTFRVVSVLTVVHQD
WLNGKEYKCKVSNKGLPSSIEKTISKTKGQPREPQVYTLPPSREEMTKNQVS
LTCLVKGFYPSDIAVEWESNGQPENNYKTTPPMLDSDGSFFLYSKLTVDKSR
WQQGNVESCSVMHEALHNHYTQKSLSLSPGK |
| 113 | EEELQIIQPDKSVLVAAGETATLRCTITSLFPVGPIQWFRGAGPGRELIYNQRE
GPFPRVTTVSDTTKRNNMDFSIRIGAITPADAGTYYCVKFRKGSPDDVEFKS
GAGTELSVRAKPSVECPPCPAPPVAGPSVFLFPPKPKDTLMISRTPEVTCVVV
DVSHEDPEVQFNWYVDGVEVEINAKTKPREEQFASTFRVVSVLTVVHQDWL
NGKEYKCKVSNKGLPSSIEKTISKTKGQPREPQVYTLPPSREEMTKNQVSLT
CLVKGFYPSDIAVEWESNGQPENNYKTTPPMLDSDGSFFLYSKLTVDKSRW
QQGNVESCSVMITEALHNHYTQKSLSLSPGK |

TABLE 8-continued

Polypeptides Comprising SIRPα D1 Domain
Variants Fused to Fc Domain Variants

SEQ ID NO: Amino Acid Sequence

114  EEELQIIQPDKSVLVAAGETATLRCTITSLFPVGPIQWFRGAGPGRVLIYNQR
QGPFPRVTTVSDTTKRNNMDFSIRIGNITPADAGTYYCIKFRKGSPDDVEFKS
GAGTELSVRAKPSERKSSVECPPCPAPPVAGPSVFLFPPKPKDTLMISRTPEV
TCVVVDVSHEDPEVQFNWYVDGVEVEINAKTKPREEQFASTFRVVSVLTVV
HQDWLNGKEYKCKVSNKGLPSSIEKTISKTKGQPREPQVYTLPPSREEMTKN
QVSLTCLVKGFYPSDIAVEWESNGQPENNYKTTPPMLDSDGSFFLYSKLTVD
KSRWQQGNVFSCSVMHEALHNHYTQKSLSLSPGK

115  EEELQVIQPDKSVLVAAGETATLRCTATSLFPVGPIQWFRGAGPGRELIYNQ
RQGPFPRVTTVSDLTKRNNMDFSIRIGNITPADAGTYYCVKFRKGSPDDVEF
KSGAGTELSVRAKPSERKSSVECPPCPAPPVAGPSVFLFPPKPKDTLMISRT
PEVTCVVVDVSHEDPEVQFNWYVDGVEVEINAKTKPREEQFASTFRVVSVLT
VVHQDWLNGKEYKCKVSNKGLPSSIEKTISKTKGQPREPQVYTLPPSREEMT
KNQVSLTCLVKGFYPSDIAVEWESNGQPENNYKTTPPMLDSDGSFFLYSKLT
VDKSRWQQGNVFSCSVMHEALHNHYTQKSLSLSPGK

116  EEELQIIQPDKSVLVAAGETATLRCTITSLFPVGPIQWFRGAGPGRVLIYNQR
QGPFPRVTTVSDTTKRNNMDFSIRIGAITPADAGTYYCIKFRKGSPDDVEFKS
GAGTELSVRAKPSERKSSVECPPCPAPPVAGPSVFLFPPKPKDTLMISRTPEV
TCVVVDVSHEDPEVQFNWYVDGVEVEINAKTKPREEQFASTFRVVSVLTVV
HQDWLNGKEYKCKVSNKGLPSSIEKTISKTKGQPREPQVYTLPPSREEMTKN
QVSLTCLVKGFYPSDIAVEWESNGQPENNYKTTPPMLDSDGSFFLYSKLTVD
KSRWQQGNVFSCSVMHEALHNHYTQKSLSLSPGK

117  EEELQVIQPDKSVLVAAGETATLRCTATSLFPVGPIQWFRGAGPGRELIYNQ
RQGPFPRVTTVSDLTKRNNMDFSIRIGAITPADAGTYYCVKFRKGSPDDVEF
KSGAGTELSVRAKPSERKSSVECPPCPAPPVAGPSVFLFPPKPKDTLMISRTP
EVTCVVVDVSHEDPEVQFNWYVDGVEVEINAKTKPREEQFASTFRVVSVLT
VVHQDWLNGKEYKCKVSNKGLPSSIEKTISKTKGQPREPQVYTLPPSREEMT
KNQVSLTCLVKGFYPSDIAVEWESNGQPENNYKTTPPMLDSDGSFFLYSKLT
VDKSRWQQGNVFSCSVMHEALHNHYTQKSLSLSPGK

118  EEELQVIQPDKSVLVAAGETATLRCTATSLFPVGPIQWFRGAGPGRELIYNQ
REGPFPRVTTVSDLTKRNNMDFSIRIGAITPADAGTYYCVKFRKGSPDDVEF
KSGAGTELSVRAKPSERKSSVECPPCPAPPVAGPSVFLFPPKPKDTLMISRTP
EVTCVVVDVSHEDPEVQFNWYVDGVEVEINAKTKPREEQFASTFRVVSVLT
VVHQDWLNGKEYKCKVSNKGLPSSIEKTISKTKGQPREPQVYTLPPSREEMT
KNQVSLTCLVKGFYPSDIAVEWESNGQPENNYKTTPPMLDSDGSFFLYSKLT
VDKSRWQQGNVFSCSVMHEALHNHYTQKSLSLSPGK

119  EEELQVIQPDKSVLVAAGETATLRCTITSLFPVGPIQWFRGAGPGRELIYNQR
EGPFPRVTTVSDLTKRNNMDFSIRIGAITPADAGTYYCVKFRKGSPDDVEFK
SGAGTELSVRAKPSERKSSVECPPCPAPPVAGPSVFLFPPKPKDTLMISRTPE
VTCVVVDVSHEDPEVQFNWYVDGVEVHNAKTKPREEQFASTFRVVSVLTV
VHQDWLNGKEYKCKVSNKGLPSSIEKTISKTKGQPREPQVYTLPPSREEMTK
NQVSLTCLVKGFYPSDIAVEWESNGQPENNYKTTPPMLDSDGSFFLYSKLTV
DKSRWQQGNVFSCSVMITEALHNHYTQKSLSLSPGK

120  EEELQIIQPDKSVLVAAGETATLRCTITSLFPVGPIQWFRGAGPGRELIYNQRE
GPFPRVTTVSDLTKRNNMDFSIRIGAITPADAGTYYCVKFRKGSPDDVEFKS
GAGTELSVRAKPSERKSSVECPPCPAPPVAGPSVFLFPPKPKDTLMISRTPEV
TCVVVDVSHEDPEVQFNWYVDGVEVEINAKTKPREEQFASTFRVVSVLTVV
HQDWLNGKEYKCKVSNKGLPSSIEKTISKTKGQPREPQVYTLPPSREEMTKN
QVSLTCLVKGFYPSDIAVEWESNGQPENNYKTTPPMLDSDGSFFLYSKLTVD
KSRWQQGNVFSCSVMHEALHNHYTQKSLSLSPGK

121  EEELQVIQPDKSVLVAAGETATLRCTITSLFPVGPIQWFRGAGPGRELIYNQR
EGPFPRVTTVSDTTKRNNMDFSIRIGAITPADAGTYYCVKFRKGSPDDVEFK
SGAGTELSVRAKPSERKSSVECPPCPAPPVAGPSVFLFPPKPKDTLMISRTPE
VTCVVVDVSHEDPEVQFNWYVDGVEVHNAKTKPREEQFASTFRVVSVLTV
VHQDWLNGKEYKCKVSNKGLPSSIEKTISKTKGQPREPQVYTLPPSREEMTK
NQVSLTCLVKGFYPSDIAVEWESNGQPENNYKTTPPMLDSDGSFFLYSKLTV
DKSRWQQGNVFSCSVMITEALHNHYTQKSLSLSPGK

122  EEELQIIQPDKSVLVAAGETATLRCTITSLFPVGPIQWFRGAGPGRELIYNQRE
GPFPRVTTVSDTTKRNNMDFSIRIGAITPADAGTYYCVKFRKGSPDDVEFKS
GAGTELSVRAKPSERKSSVECPPCPAPPVAGPSVFLFPPKPKDTLMISRTPEV
TCVVVDVSHEDPEVQFNWYVDGVEVEINAKTKPREEQFASTFRVVSVLTVV
HQDWLNGKEYKCKVSNKGLPSSIEKTISKTKGQPREPQVYTLPPSREEMTKN
QVSLTCLVKGFYPSDIAVEWESNGQPENNYKTTPPMLDSDGSFFLYSKLTVD
KSRWQQGNVFSCSVMHEALHNHYTQKSLSLSPGK

TABLE 8-continued

Polypeptides Comprising SIRPα D1 Domain
Variants Fused to Fc Domain Variants

| SEQ ID NO: | Amino Acid Sequence |
|---|---|
| 123 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSDKTHTCPPCPAPELLGGPSVFLFPPKPKDTLMISRTPEVT<br>CVVVDVSHEDPEVKFNWYVDGVEVHNAKTKPREEQYNSTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 124 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSDKTHTCPPCPAPEAAGAPSVFLFPPKPKDTLMISRTPEVT<br>CVVVDVSHEDPEVKFNWYVDGVEVHNAKTKPREEQYNSTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 125 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSDKTHTCPPCPAPELLGGPSVFLFPPKPKDTLMISRTPEVT<br>CVVVDVSHEDPEVKFNWYVDGVEVHNAKTKPREEQYASTYRVVSVLTVL<br>HQDWLNGKEYKCKVSNKALPAPIEKTISKAKGQPREPQVYTLPPSREEMTK<br>NQVSLTCLVKGFYPSDIAVEWESNGQPENNYKTTPPVLDSDGSFFLYSKLTV<br>DKSRWQQGNVFSCSVMHEALHNHYTQKSLSLSPGK |
| 126 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSERKCCVECPPCPAPPVAGPSVFLFPPKPKDTLMISRTPEV<br>TCVVVDVSHEDPEVQFNWYVDGVEVEINAKTKPREEQFNSTFRVVSVLTVV<br>HQDWLNGKEYKCKVSNKGLPAPIEKTISKTKGQPREPQVYTLPPSREEMTK<br>NQVSLTCLVKGFYPSDIAVEWESNGQPENNYKTTPPMLDSDGSFFLYSKLTV<br>DKSRWQQGNVFSCSVMHEALHNHYTQKSLSLSPGK |
| 127 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSERKCCVECPPCPAPPVAGPSVFLFPPKPKDTLMISRTPEV<br>TCVVVDVSHEDPEVQFNWYVDGVEVEINAKTKPREEQFNSTFRVVSVLTVV<br>HQDWLNGKEYKCKVSNKGLPSSIEKTISKTKGQPREPQVYTLPPSREEMTKN<br>QVSLTCLVKGFYPSDIAVEWESNGQPENNYKTTPPMLDSDGSFFLYSKLTVD<br>KSRWQQGNVFSCSVMHEALHNHYTQKSLSLSPGK |
| 128 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSERKCCVECPPCPAPPVAGPSVFLFPPKPKDTLMISRTPEV<br>TCVVVDVSHEDPEVQFNWYVDGVEVEINAKTKPREEQFASTFRVVSVLTVV<br>HQDWLNGKEYKCKVSNKGLPAPIEKTISKTKGQPREPQVYTLPPSREEMTK<br>NQVSLTCLVKGFYPSDIAVEWESNGQPENNYKTTPPMLDSDGSFFLYSKLTV<br>DKSRWQQGNVFSCSVMHEALHNHYTQKSLSLSPGK |
| 129 | EEELQIIQPDKSVLVAAGETATLRCTITSLFPVGPIQWFRGAGPGRVLIYNQR<br>QGPFPRVTTVSDTTKRNNMDFSIRIGNITPADAGTYYCIKFRKGSPDDVEFKS<br>GAGTELSVRAKPSERKCCVECPPCPAPPVAGPSVFLFPPKPKDTLMISRTPEV<br>TCVVVDVSHEDPEVQFNWYVDGVEVEINAKTKPREEQFASTFRVVSVLTVV<br>HQDWLNGKEYKCKVSNKGLPSSIEKTISKTKGQPREPQVYTLPPSREEMTKN<br>QVSLTCLVKGFYPSDIAVEWESNGQPENNYKTTPPMLDSDGSFFLYSKLTVD<br>KSRWQQGNVFSCSVMHEALHNHYTQKSLSLSPGK |
| 130 | EEELQVIQPDKSVSVAAGESAILHCTVTSLIPVGPIQWFRGAGPARELIYNQK<br>EGHFPRVTTVSESTKRENMDFSISISNITPADAGTYYCVKFRKGSPDTEFKSG<br>AGTELSVRAKPSESKYGPPCPSCPAPEFLGGPSVFLFPPKPKDTLMISRTPEVT<br>CVVVDVSQEDPEVQFNWYVDGVEVEINAKTKPREEQFNSTYRVVSVLTVLH<br>QDWLNGKEYKCKVSNKGLPSSIEKTISKAKGQPREPQVYTLPPSQEEMTKN<br>QVSLTCLVKGFYPSDIAVEWESNGQPENNYKTTPPVLDSDGSFFLYSRLTVD<br>KSRWQEGNVFSCSVMHEALHNHYTQKSLSLSLGK |
| 131 | EEELQIIQPDKSVLVAAGETATLRCTITSLFPVGPIQWFRGAGPGRELIYNQRE<br>GPFPRVTTVSDTTKRNNMDFSIRIGAITPADAGTYYCVKFRKGSPDDVEFKS<br>GAGTELSVRAKPSESKYGPPCPPCPAPEFLGGPSVFLFPPKPKDTLMISRTPEV<br>TCVVVDVSQEDPEVQFNWYVDGVEVEINAKTKPREEQFNSTYRVVSVLTVL<br>HQDWLNGKEYKCKVSNKGLPSSIEKTISKAKGQPREPQVYTLPPSQEEMTK<br>NQVSLTCLVKGFYPSDIAVEWESNGQPENNYKTTPPVLDSDGSFFLYSRLTV<br>DKSRWQEGNVFSCSVMHEALHNHYTQKSLSLSLGK |

TABLE 8-continued

Polypeptides Comprising SIRPα D1 Domain
Variants Fused to Fc Domain Variants

SEQ ID NO: Amino Acid Sequence

132 EEELQIIQPDKSVLVAAGETATLRCTITSLFPVGPIQWFRGAGPGRELIYNQRE
GPFPRVTTVSDTTKRNNMDFSIRIGAITPADAGTYYCVKFRKGSPDDVEFKS
GAGTELSVRAKPSESKYGPPCPPCPAPEFEGGPSVFLFPPKPKDTLMISRTPEV
TCVVVDVSQEDPEVQFNWYVDGVEVEINAKTKPREEQFNSTYRVVSVLTVL
HQDWLNGKEYKCKVSNKGLPSSIEKTISKAKGQPREPQVYTLPPSQEEMTK
NQVSLTCLVKGFYPSDIAVEWESNGQPENNYKTTPPVLDSDGSFFLYSRLTV
DKSRWQEGNVFSCSVMHEALHNHYTQKSLSLSLGK

133 EEELQIIQPDKSVLVAAGETATLRCTITSLFPVGPIQWFRGAGPGRELIYNQRE
GPFPRVTTVSDTTKRNNMDFSIRIGAITPADAGTYYCVKFRKGSPDDVEFKS
GAGTELSVRAKPSESKYGPPCPPCPAPPVAGPSVFLFPPKPKDTLMISRTPEV
TCVVVDVSQEDPEVQFNWYVDGVEVEINAKTKPREEQFNSTYRVVSVLTVL
HQDWLNGKEYKCKVSNKGLPSSIEKTISKAKGQPREPQVYTLPPSQEEMTK
NQVSLTCLVKGFYPSDIAVEWESNGQPENNYKTTPPVLDSDGSFFLYSRLTV
DKSRWQEGNVFSCSVMHEALHNHYTQKSLSLSLGK

134 EEELQIIQPDKSVLVAAGETATLRCTIT SLFPVGPIQWFRGAGPGRVLIYNQR
QGPFPRVTTVSDTTKRNNMDFSIRIGNITPADAGTYYCIKFRKGSPDDVEFKS
GAGTELSVRAKPSAAAPPCPPCPAPEFLGGPSVFLFPPKPKDTLMISRTPEVT
CVVVDVSQEDPEVQFNWYVDGVEVEINAKTKPREEQFNSTYRVVSVLTVLH
QDWLNGKEYKCKVSNKGLPSSIEKTISKAKGQPREPQVYTLPPSQEEMTKN
QVSLTCLVKGFYPSDIAVEWESNGQPENNYKTTPPVLDSDGSFFLYSRLTVD
KSRWQEGNVFSCSVMHEALHNHYTQKSLSLSPGK

135 EEELQVIQPDKSVLVAAGETATLRCTATSLFPVGPIQWERGAGPGRELIYNQ
REGPFPRVTTVSDLTKRNNMDFSIRIGAITPADAGTYYCVKFRKGSPDDVEF
KSGAGTELSVRAKPSDKTHTCPPCPAPEAAGAPSVFLEPPKPKDTLMISRTPE
VTCVVVDVSHEDPEVKFNWYVDGVEVHNAKTKPREEQYASTYRVVSVLT
VLHQDWLNGKEYKCKVSNKALPAPIEKTISKAKGQPREPQVYTLPPSREEM
TKNQVSLTCLVKGFYPSDIAVEWESNGQPENNYKTTPPVLDSDGSFFLYSKL
TVDKSRWQQGNVFSCSVMHEALHNHYTQKSLSLSPG

136 EEELQIIQPDKSVLVAAGETATLRCTITSLEPVGPIQWERGAGPGRELIYNQRE
GPFPRVTTVSDTTKRNNMDFSIRIGAITPADAGTYYCVKFRKGSPDDVEFKS
GAGTELSVRAKPSDKTHTCPPCPAPEAAGAPSVFLEPPKPKDTLMISRTPEVT
CVVVDVSHEDPEVKFNWYVDGVEVHNAKTKPREEQYASTYRVVSVLTVL
HQDWLNGKEYKCKVSNKALPAPIEKTISKAKGQPREPQVYTLPPSREEMTK
NQVSLTCLVKGFYPSDIAVEWESNGQPENNYKTTPPVLDSDGSFFLYSKLTV
DKSRWQQGNVFSCSVMHEALHNHYTQKSLSLSPG

137 EEELQIIQPDKSVLVAAGETATLRCTITSLEPVGPIQWERGAGPGRVLIYNQR
EGPFPRVTTVSDTTKRNNMDFSIRIGAITPADAGTYYCIKERKGSPDDVEFKS
GAGTELSVRAKPSDKTHTCPPCPAPEAAGAPSVFLEPPKPKDTLMISRTPEVT
CVVVDVSHEDPEVKFNWYVDGVEVHNAKTKPREEQYASTYRVVSVLTVL
HQDWLNGKEYKCKVSNKALPAPIEKTISKAKGQPREPQVYTLPPSREEMTK
NQVSLTCLVKGFYPSDIAVEWESNGQPENNYKTTPPVLDSDGSFFLYSKLTV
DKSRWQQGNVFSCSVMHEALHNHYTQKSLSLSPG

211 EEELQIIQPDKSVLVAAGETATLRCTITSLRPVGPIQWFRGAGPGRELIYN
QRDGPFPRVTTVSDTTKRNNMDFSIRIGAITPADAGTYYCVKFRKGIPDD
VEFKSGAGTELSVRAKPSDKTHTCPPCPAPEAAGAPSVFLFPPKPKDTLM
ISRTPEVTCVVVDVSHEDPEVKFNWYVDGVEVHNAKTKPREEQYASTY
RVVSVLTVLHQDWLNGKEYKCKVSNKALPAPIEKTISKAKGQPREPQVY
TLPPSREEMTKNQVSLTCLVKGFYPSDIAVEWESNGQPENNYKTTPPVLD
SDGSFFLYSKLTVDKSRWQQGNVFSCSVMHEALHNHYTQKSLSLSPG

214 EEELQVIQPDKSVLVAAGETATLRCTATSLFPVGPIQWERGAGPGRELIYNQ
REGPFPRVTTVSDLTKRNNMDFSIRIGAITPADAGTYYCVKFRKGSPDDVEF
KSGAGTELSVRAKPSERKSSVECPPCPAPPVAGPSVFLEPPKPKDTLMISRTP
EVTCVVVDVSHEDPEVQFNWYVDGVEVENAKTKPREEQFASTERVVSVLT
VVHQDWLNGKEYKCKVSNKGLPSSIEKTISKTKGQPREPQVYTLPPSREEMT
KNQVSLTCLVKGFYPSDIAVEWESNGQPENNYKTTPPMLDSDGSFFLYSKLT
VDKSRWQQGNVFSCSVMHEALHNHYTQKSLSLSPG

216 EEELQIIQPDKSVLVAAGETATLRCTITSLEPVGPIQWERGAGPGRVLIYNQR
QGPFPRVTTVSDTTKRNNMDFSIRIGNITPADAGTYYCIKERKGSPDDVEFKS
GAGTELSVRAKPSDKTHTCPPCPAPELLGGPSVFLEPPKPKDTLMISRTPEVT
CVVVDVSHEDPEVKFNWYVDGVEVHNAKTKPREEQYNSTYRVVSVLTVL
HQDWLNGKEYKCKVSNKALPAPIEKTISKAKGQPREPQVYTLPPSREEMTK
NQVSLTCLVKGFYPSDIAVEWESNGQPENNYKTTPPVLDSDGSFFLYSKLTV
DKSRWQQGNVFSCSVMBEALHNHYTQKSLSLSPGK

TABLE 8-continued

Polypeptides Comprising SIRPα D1 Domain
Variants Fused to Fc Domain Variants

SEQ ID NO: Amino Acid Sequence

217   EEELQIIQPDKSVLVAAGETATLRCTITSLFPVGPIQWFRGAGPGRELIYN
      QREGPFPRVTTVSDTTKRNNMDFSIRIGAITPADAGTYYCVKFRKGSPDD
      VEFKSGAGTELSVRAKPSEKTHTCPECPAPEAAGAPSVFLEPPKPKDTLMI
      SRTPEVTCVVVDVSHEDPEVKFNWYVDGVEVHNAKTKPREEQYASTYR
      VVSVLTVLHQDWLNGKEYKCKVSNKALPAPIEKTISKAKGQPREPQVYT
      LPPSREEMTKNQVSLTCEVKGFYPSDIAVEWESNGQPENNYKTTPPVLDS
      DGSFFLYSKLTVDKSRWQQGNVFSCSVMHEALHNHYTQKSLSLSPGK

In some embodiments, the polypeptide comprises a SIRPα D1 variant domain that has at least 85% sequence identity (e.g., at least 86%, 87%, 88%, 89%, 90%, 91%, 92%, 93%, 94%, 95%, 96%, 97%, 98%, 99%, or 100% sequence identity) to any variant provided in Table 8.

In some embodiments, the polypeptide comprises a SIRPα D1 domain variant that has at least 85% sequence identity (e.g., at least 86%, 87%, 88%, 89%, 90%, 91%, 92%, 93%, 94%, 95%, 96%, 97%, 98%, 99%, or 100% sequence identity) to SEQ ID NOs: 98-104, 107-113, 116-122, or 135-137 in Table 8.

In some embodiments, the polypeptide comprises (a) a signal-regulatory protein α (SIRP-α) D1 variant, wherein the SIRPα D1 domain variant comprises the amino acid sequence, EEX$_1$X$_2$QX$_3$IQPDKX$_4$VX$_5$VAAGEX$_6$X$_7$X$_8$LX$_9$CTX$_{10}$TSLX$_{11}$PVGPIQWFRGAGPX$_{12}$RX$_{13}$LIYNQX$_{14}$X$_{15}$GX$_{16}$FPRVTTVSX$_{17}$X$_{18}$TX$_{19}$RX$_{20}$NMDFX$_{21}$IX$_{22}$IX$_{23}$X$_{24}$ITX$_{25}$ADAGTYYCX$_{26}$KX$_{27}$RKGSPDX$_{28}$X$_{29}$EX$_{30}$KS GAGTELSVRX$_{31}$KPS (SEQ ID NO: 47), wherein X$_1$ is E, or G; X$_2$ is L, I, or V; X$_3$ is V, L, or I; X$_4$ is S, or F; X$_5$ is L, or S; X$_6$ is S, or T; X$_7$ is A, or V; X$_8$ is I, or T; X$_9$ is H, R, or L; X$_{10}$ is A, V, I, or L; X$_{11}$ is I, T, S, or F; X$_{12}$ is A, or G; X$_{13}$ is E, V, or L; X$_{14}$ is K, or R; X$_{15}$ is E, or Q; X$_{16}$ is H, P, or R; X$_{17}$ is D, or E; X$_{18}$ IS S, L, T, or G; X$_{19}$ is K, or R; X$_{20}$ is E, or N; X$_{21}$ is S, or P; X$_{22}$ is S, or R; X$_{23}$ is S, or G; X$_{24}$ is any amino acid; X$_{25}$ is any amino acid; X$_{26}$ is V, or I; X$_{27}$ is F, L, or V; X$_{28}$ is D or absent; X$_{29}$ is T, or V; X$_{30}$ is F, or V; and X$_{31}$ is A, or G; and wherein the SIRPα D1 domain variant comprises at least two amino acid substitutions relative to a wild-type SIRPα D1 domain having a sequence according to any one of SEQ ID NOs: 1 to 10; and (b) an Fc domain dimer variant having two Fc domain variants, wherein each Fc domain variant independently is (i) a human IgG1 Fc region comprising a N297A mutation; (ii) a human IgG1 Fc region comprising L234A, L235A, and G237A mutations; (iii) a human IgG1 Fc region comprising L234A, L235A, G237A, and N297A mutations; (iv) a human IgG2 Fc region comprising a N297A mutation; (v) a human IgG2 Fc region comprising A330S and P331S mutations; (vi) a human IgG2 Fc region comprising A330S, P331S, and N297A mutations; (vii) a human IgG4 Fc region comprising S228P, E233P, F234V, L235A, and delG236 mutations; or (viii) a human IgG4 Fc region comprising S228P, E233P, F234V, L235A, delG236, and N297A mutations.

In some embodiments, the polypeptide comprises a SIRPα D1 domain variant wherein the SIRPα D1 domain variant comprises an amino acid sequence according to SEQ ID NO: 47; an Fc domain dimer having two Fc domains, wherein one of the Fc domains is an Fc domain variant comprising a human IgG1 Fc region comprising L234A, L235A, G237A, and N297A mutations.

Dimerization of Fc Domains

In some embodiments, a SIRPα D1 domain variant polypeptide (e.g., any of the variants described in Tables 2, 5, and 6) is fused to a first Fc domain (e.g., an Fc domain variant) either at the N-terminus or at the C-terminus. In some embodiments, the first Fc domain is a variant that is incapable of forming an dimer. In some embodiments, the first Fc domain forms a dimer with a second Fc domain. In some embodiments, the first and second Fc domains comprise amino acid substitutions that promote heterodimerization between the first and second domain Fc domains.

In some embodiments, each of the two Fc domains in an Fc domain dimer includes amino acid substitutions that promote the heterodimerization of the two monomers. In some embodiments, a SIRPα construct is formed, for example, from a first subunit including a SIRPα D1 domain variant polypeptide fused to a first Fc domain and a second subunit including a second Fc domain (e.g., without a SIRPα D1 domain variant polypeptide or any other polypeptide). In some embodiments, a construct has a single SIRPα D1 domain variant polypeptide linked to an Fc domain dimer (e.g., single arm). In some embodiments, a construct has two SIRPα D1 domain variant polypeptides linked to an Fc domain dimer (e.g., double arm). In some embodiments, a SIRPα D1 domain variant having a K$_D$ of about 500 nM is particularly useful in a double arm construct. In some embodiments, a SIRPα D1 domain variant having a K$_D$ of about 50 nM is particularly useful in a double arm construct. In some embodiments, a SIRPα D1 domain variant having a K$_D$ of about 5 nM is useful in a double arm construct and a single arm construct. In some embodiments, a SIRPα D1 domain variant having a K$_D$ of about 500 pM is useful in a double arm construct and a single arm construct. In some embodiments, a SIRPα D1 domain variant having a K$_D$ of about 100 pM is useful in a double arm construct and a single arm construct. In some embodiments, a SIRPα D1 domain variant having a K$_D$ of about 50 pM is useful in a double arm construct and a single arm construct. In some embodiments, a SIRPα D1 domain variant having a K$_D$ of about 10 pM is useful in a double arm construct and a single arm construct.

In some embodiments, heterodimerization of Fc domains is promoted by introducing different, but compatible, substitutions in the two Fc domains, such as "knob-into-hole" residue pairs and charge residue pairs. The knob and hole interaction favors heterodimer formation, whereas the knob-knob and the hole-hole interaction hinder homodimer formation due to steric clash and deletion of favorable interactions. A hole refers to a void that is created when an original amino acid in a protein is replaced with a different amino acid having a smaller side-chain volume. A knob refers to a bump that is created when an original amino acid in a protein is replaced with a different amino acid having a larger side-chain volume. For example, in some embodiments, an amino acid being replaced is in the CH3 antibody constant domain of an Fc domain and involved in the dimerization of two Fc domains. In some embodiments, a hole in one CH3 antibody constant domain is created to accommodate a knob in another CH3 antibody constant domain, such that the knob and hole amino acids act to promote or favor the heterodimerization of the two Fc domains. In some embodiments, a hole in one CH3 antibody constant domain is created to better accommodate an original amino acid in another CH3 antibody constant domain. In some embodiments, a knob in one CH3 antibody constant domain is created to form additional interactions with original amino acids in another CH3 antibody constant domain.

In some embodiments, a hole is constructed by replacing amino acids having larger side chains such as tyrosine or tryptophan with amino acids having smaller side chains such as alanine, valine, or threonine, for example a Y407V mutation in the CH3 antibody constant domain. Similarly, in some embodiments, a knob is constructed by replacing amino acids having smaller side chains with amino acids having larger side chains, for example a T366W mutation in the CH3 antibody constant domain. In some embodiments, one Fc domain includes the knob mutation T366W and the other Fc domain includes hole mutations T366S, L358A, and Y407V. In some embodiments, a polypeptide of the disclosure including a SIRPα D1 domain variant is fused to an Fc domain including the knob mutation T366W to limit unwanted knob-knob homodimer formation. Examples of knob-into-hole amino acid pairs are included, without limitation, in Table 9 and examples of knob-into-hole Fc domain variants and SIRPα-Fc fusions are provided in Table 10.

TABLE 9

| | Knob-Into-Hole Amino Acid Pairs | | | | | | | |
|---|---|---|---|---|---|---|---|---|
| First Fc Domain | Y407T | Y407A | F405A | T394S | T366S L358A Y407V | T394W Y407T | T394S IY407A | T366W T394S |
| Second Fc Domain | T366Y | T366W | T394W | F405W | T366W | T366Y F405A | T366W F405W | F405W Y407A |

TABLE 10

Exemplary Fc Domain Variants and SIRPα D1 Domain
Variant - Fc Domain Variant Fusion Polypeptides

| SEQ ID NO: | Amino Acid Sequence |
|---|---|
| 138 | EEELQIIQPDKSVLVAAGETATLRCTITSLFPVGPIQWFRGAGPGRVLIYNQR QGPFPRVTTVSDTTKRNNMDFSIRIGAITPADAGTYYCIKFRKGSPDDVEFK SGAGTELSVRAKPSDKTHTCPPCPAPEAAGAPSVFLFPPKPKDTLMISRTPE VTCVVVDVSHEDPEVKFNWYVDGVEVHNAKTKPREEQYASTYRVVSVLT VLHQDWLNGKEYKCKVSNKALPAPIEKTISKAKGQPREPQVYTLPPSREEM TKNQVSLWCLVKGFYPSDIAVEWESNGQPENNYKTTPPVLDSDGSFFLYSK LTVDKSRWQQGNVFSCSVMHEALHNHYTQKSLSLSPGK |
| 139 | DKTHTCPPCPAPEAAGAPSVFLFPPKPKDTLMISRTPEVTCVVVDVSHEDPE VKFNWYVDGVEVHNAKTKPREEQYASTYRVVSVLTVLHQDWLNGKEYK CKVSNKALPAPIEKTISKAKGQPREPQVYTLPPSREEMTKNQVSLSCAVKGF YPSDIAVEWESNGQPENNYKTTPPVLDSDGSFFLVSKLTVDKSRWQQGNVF SCSVMHEALHNHYTQKSLSLSPGK |
| 140 | EEELQIIQPDKSVLVAAGETATLRCTITSLFPVGPIQWFRGAGPGRVLIYNQR QGPFPRVTTVSDTTKRNNMDFSIRIGAITPADAGTYYCIKFRKGSPDDVEFK SGAGTELSVRAKPSDKTHTCPPCPAPEAAGAPSVFLFPPKPKDTLMISRTPE VTCVVVDVSHEDPEVKFNWYVDGVEVHNAKTKPREEQYASTYRVVSVLT VLHQDWLNGKEYKCKVSNKALPAPIEKTISKAKGQPREPQVYTLPPSREEM TKNQVSLSCAVKGFYPSDIAVEWESNGQPENNYKTTPPVLDSDGSFFLVSK LTVDKSRWQQGNVFSCSVMHEALHNHYTQKSLSLSPGK |
| 141 | DKTHTCPPCPAPEAAGAPSVFLFPPKPKDTLMISRTPEVTCVVVDVSHEDPE VKFNWYVDGVEVHNAKTKPREEQYASTYRVVSVLTVLHQDWLNGKEYK CKVSNKALPAPIEKTISKAKGQPREPQVYTLPPSREEMTKNQVSLWCLVKG FYPSDIAVEWESNGQPENNYKTTPPVLDSDGSFFLYSKLTVDKSRWQQGNV FSCSVMHEALHNHYTQKSLSLSPGK |
| 142 | EEELQIIQPDKSVLVAAGETATLRCTITSLFPVGPIQWFRGAGPGRELIYNQR EGPFPRVTTVSDTTKRNNMDFSIRIGAITPADAGTYYCVKFRKGSPDDVEFK SGAGTELSVRAKPSDKTHTCPPCPAPEAAGAPSVFLFPPKPKDTLMISRTPE VTCVVVDVSHEDPEVKFNWYVDGVEVHNAKTKPREEQYASTYRVVSVLT VLHQDWLNGKEYKCKVSNKALPAPIEKTISKAKGQPREPQVYTLPPSREEM TKNQVSLWCLVKGFYPSDIAVEWESNGQPENNYKTTPPVLDSDGSFFLYSK LTVDKSRWQQGNVFSCSVMHEALHNHYTQKSLSLSPGK |
| 143 | EEELQIIQPDKSVLVAAGETATLRCTITSLEPVGPIQWERGAGPGRELIYNQR EGPFPRVTTVSDTTKRNNMDFSIRIGAITPADAGTYYCVKFRKGSPDDVEFK SGAGTELSVRAKPSDKTHTCPPCPAPEAAGAPSVFLEPPKPKDTLMISRTPE VTCVVVDVSHEDPEVKFNWYVDGVEVEINAKTKPREEQYASTYRVVSVLT VLHQDWLNGKEYKCKVSNKALPAPIEKTISKAKGQPREPQVYTLPPSREEM |

TABLE 10-continued

Exemplary Fc Domain Variants and SIRPα D1 Domain
Variant - Fc Domain Variant Fusion Polypeptides SEQ ID NO: Amino Acid Sequence TKNQVSLSCAVKGFYPSDIAVEWESNGQPENNYKTTPPVLDSDGSFFLVSK
           LTVDKSRWQQGNVFSCSVMHEALHNHYTQKSLSLSPGK 144    QVQLKQSGPGLVQPSQSLSITCTVSGESLTNYGVHWVRQSPGKGLEWL
           GVIWSGGNTDYNTPFTSRLSINKDNSKSQVFFKMNSLQSNDTAIYYCAR
           ALTYYDYEFAYWGQGTLVTVSSASTKGPSVFPLAPSSKSTSGGTAALGC
           LVKDYFPEPVTVSWNSGALTSGVHTFPAVLQSSGLYSLSSVVTVPSSSLG
           TQTYICNVNHKPSNTKVDKKVEPKSCRKTHTCPRCPAPELLGGPSVFLFP
           PKPKDTLMISRTPEVTCVVVDVSHEDPEVKFNWYVDGVEVHNAKTKPR
           EEQYASTYRVVSVLTVLHQDWLNGKEYKCKVSNKALPAPIEKTISKAK
           GQPREPQVYTLPPSREEMTKNQVSLTCLVKGFYPSDIAVEWESNGQPEN
           NYKTTPPVLDSDGSFFLYSRLTVDKSRWQQGNVFSCSVMHEALHNHYT
           QKSLSLSPGK 145    EEELQIIQPDKSVLVAAGETATLRCTITSLEPVGPIQWERGAGPGRELIYNQR
           EGPFPRVTTVSDTTKRNNMDFSIRIGAITPADAGTYYCVKFRKGSPDDVEFK
           SGAGTELSVRAKPSEKTHTCPECPAPEAAGAPSVFLEPPKPKDTLMISRTPEV
           TCVVVDVSHEDPEVKFNWYVDGVEVHNAKTKPREEQYASTYRVVSVLTV
           LHQDWLNGKEYKCKVSNKALPAPIEKTISKAKGQPREPQVYTLPPSREEMT
           KNQVSLTCEVKGFYPSDIAVEWESNGQPENNYKTTPPVLDSDGSFFLYSKL
           TVDKSRWQQGNVFSCSVMHEALHNHYTQKSLSLSPGK 146    EEELQVIQPDKSVLVAAGETATLRCTATSLEPVGPIQWERGAGPGRELIYNQ
           RQGPFPRVTTVSDLTKRNNMDFSIRIGNITPADAGTYYCVKFRKGSPDDVEF
           KSGAGTELSVRAKPSDKTHTCPPCPAPEAAGAPSVFLFPPKPKDTLMISRTP
           EVTCVVVDVSHEDPEVKFNWYVDGVEVHNAKTKPREEQYNSTYRVVSVL
           TVLHQDWLNGKEYKCKVSNKALPAPIEKTISKAKGQPREPQVYTLPPSREE
           MTKNQVSLWCLVKGFYPSDIAVEWESNGQPENNYKTTPPVLDSDGSFFLYS
           KLTVDKSRWQQGNVFSCSVMHEALHNHYTQKSLSLSPGK 147    DKTHTCPPCPAPEAAGAPSVFLEPPKPKDTLMISRTPEVTCVVVDVSHEDPE
           VKFNWYVDGVEVHNAKTKPREEQYNSTYRVVSVLTVLHQDWLNGKEYK
           CKVSNKALPAPIEKTISKAKGQPREPQVYTLPPSREEMTKNQVSLSCAVKGF
           YPSDIAVEWESNGQPENNYKTTPPVLDSDGSFFLVSKLTVDKSRWQQGNVF
           SCSVMHEALHNHYTQKSLSLSPGK 148    EEELQVIQPDKSVLVAAGETATLRCTATSLEPVGPIQWERGAGPGRELIYNQ
           RQGPFPRVTTVSDLTKRNNMDFSIRIGNITPADAGTYYCVKFRKGSPDDVEF
           KSGAGTELSVRAKPSDKTHTCPPCPAPEAAGAPSVFLEPPKPKDTLMISRTP
           EVTCVVVDVSHEDPEVKFNWYVDGVEVHNAKTKPREEQYNSTYRVVSVL
           TVLHQDWLNGKEYKCKVSNKALPAPIEKTISKAKGQPREPQVYTLPPSREE
           MTKNQVSLSCAVKGFYPSDIAVEWESNGQPENNYKTTPPVLDSDGSFFLVS
           KLTVDKSRWQQGNVFSCSVMHEALHNHYTQKSLSLSPGK 149    DKTHTCPPCPAPEAAGAPSVFLFPPKPKDTLMISRTPEVTCVVVDVSHEDPE
           VKFNWYVDGVEVHNAKTKPREEQYNSTYRVVSVLTVLHQDWLNGKEYK
           CKVSNKALPAPIEKTISKAKGQPREPQVYTLPPSREEMTKNQVSLWCLVKG
           FYPSDIAVEWESNGQPENNYKTTPPVLDSDGSFFLYSKLTVDKSRWQQGNV
           FSCSVMHEALHNHYTQKSLSLSPGK In addition to the knob-into-hole strategy, in some embodiments, electrostatic steering is also used to control the dimerization of Fc domains. Electrostatic steering refers to the utilization of favorable electrostatic interactions between oppositely charged amino acids in peptides, protein domains, and proteins to control the formation of higher ordered protein molecules. In particular, to control the dimerization of Fc domains using electrostatic steering, one or more amino acid residues that make up the CH3-CH3 interface are replaced with positively- or negatively-charged amino acid residues such that the interaction becomes electrostatically favorable or unfavorable depending on the specific charged amino acids introduced. In some embodiments, a positively-charged amino acid in the interface, such as lysine, arginine, or histidine, is replaced with a negatively-charged amino acid such as aspartic acid or glutamic acid. In some embodiments, a negatively-charged amino acid in the interface is replaced with a positively-charged amino acid. In some embodiments, the charged amino acids are introduced to one of the interacting CH3 antibody constant domains, or both. In some embodiments, introducing charged amino acids to the interacting CH3 antibody constant domains of the two Fc domains promotes the selective formation of heterodimers of Fc domains as controlled by the electrostatic steering effects resulting from the interaction between charged amino acids. Examples of electrostatic steering amino acid pairs are included, without limitation, in Table 11.

TABLE 11

Electrostatic Steering Amino Acid Pairs

| Fc domain monomer 1 | K409D | K409D | K409E | K409E | K392D | K392D | K392E | K392E | K409D K392D | K370E K409D K439E |
|---|---|---|---|---|---|---|---|---|---|---|
| Fc domain monomer 2 | D399K | D399R | D399K | D399R | D399K | D399R | D399K | D399R | D399K D356K | D356K E357K D399K |

Other methods used to control the heterodimerization of Fc domains, especially in the context of constructing a bispecific antibody, are available.

In some embodiments, a first Fc domain and a second Fc domain each includes one or more of the following amino acid substitutions: T366W, T366S, L368A, Y407V, T366Y, T394W, F405W, Y349T, Y349E, Y349V, L351T, L351H, L351N, L351K, P353S, S354D, D356K, D356R, D356S, E357K, E357R, E357Q, S364A, T366E, L368T, L368Y, L368E, K370E, K370D, K370Q, K392E, K392D, T394N, P395N, P396T, V397T, V397Q, L398T, D399K, D399R, D399N, F405T, F405H, F405R, Y407T, Y407H, Y407I, K409E, K409D, K409T, and K409I, relative to the sequence of human IgG1.

In some embodiments an Fc domain comprises: (a) one of the following amino acid substitutions relative to wild type human IgG1: T366W, T366S, L368A, Y407V, T366Y, T394W, F405W, Y349T, Y349E, Y349V, L351T, L351H, L351N, L351K, P353S, S354D, D356K, D356R, D356S, E357K, E357R, E357Q, S364A, T366E, L368T, L368Y, L368E, K370E, K370D, K370Q, K392E, K392D, T394N, P395N, P396T, V397T, V397Q, L398T, D399K, D399R, D399N, F405T, F405H, F405R, Y407T, Y407H, Y407I, K409E, K409D, K409T, or K409I; or (b) (i) a N297A mutation relative to a human IgG1 Fc region; (ii) a L234A, L235A, and G237A mutation relative to a human IgG1 Fc region; (iii) a L234A, L235A, G237A, and N297A mutation relative to a human IgG1 Fc region; (iv) a N297A mutation relative to a human IgG2 Fc region; (v) a A330S and P331S mutation relative to a human IgG2 Fc region; (vi) a A330S, P331S, and N297A mutation relative to a human IgG2 Fc region; (vii) a S228P, E233P, F234V, L235A, and delG236 mutation relative to a human IgG4 Fc region; or (viii) a S228P, E233P, F234V, L235A, delG236, and N297A mutation relative to a human IgG4 Fc region. In some embodiments an Fc domain variant comprises: (a) one of the following amino acid substitutions relative to wild type human IgG1: T366W, T366S, L368A, Y407V, T366Y, T394W, F405W, Y349T, Y349E, Y349V, L351T, L351H, L351N, L351K, P353S, S354D, D356K, D356R, D356S, E357K, E357R, E357Q, S364A, T366E, L368T, L368Y, L368E, K370E, K370D, K370Q, K392E, K392D, T394N, P395N, P396T, V397T, V397Q, L398T, D399K, D399R, D399N, F405T, F405H, F405R, Y407T, Y407H, Y407I, K409E, K409D, K409T, or K409I; and (b) further comprises (i) a N297A mutation relative to a human IgG1 Fc region; (ii) a L234A, L235A, and G237A mutation relative to a human IgG1 Fc region; (iii) a L234A, L235A, G237A, and N297A mutation relative to a human IgG1 Fc region; (iv) a N297A mutation relative to a human IgG2 Fc region; (v) a A330S and P331S mutation relative to a human IgG2 Fc region; (vi) a A330S, P331S, and N297A mutation relative to a human IgG2 Fc region; (vii) a S228P, E233P, F234V, L235A, and delG236 mutation relative to a human IgG4 Fc region; or (viii) a S228P, E233P, F234V, L235A, delG236, and N297A mutation relative to a human IgG4 Fc region.

In some embodiments, the first and second Fc domains include different amino acid substitutions. In some embodiments, the first Fc domain includes T366W. In some embodiments, the second Fc domain includes T366S, L368A, and Y407V. In some embodiments, the first Fc domain includes D399K. In some embodiments, the second Fc domain includes K409D.

Linkers

Disclosed herein, in some embodiments, are polypeptides comprising a signal-regulatory protein α (SIRP-α) D1 variant comprising a SIRPα D1 domain, or a fragment thereof, having an amino acid mutation at residue 80 relative to a wild-type SIRPα D1 domain; and at least one additional amino acid mutation relative to a wild-type SIRPα D1 domain at a residue selected from the group consisting of: residue 6, residue 27, residue 31, residue 47, residue 53, residue 54, residue 56, residue 66, and residue 92.

Also disclosed herein, in some embodiments, are polypeptides comprising an Fc variant, wherein the Fc variant comprises an Fc domain dimer comprising two Fc domain variants, wherein each Fc domain variant independently is selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A.

In the present disclosure, a linker is used to describe a linkage or connection between polypeptides or protein domains or associated non-protein moieties. In some embodiments, a linker is a linkage or connection between an Fc domain (or variant thereof) and a SIRPα D1 domain variant. In some embodiments, the linker connects the C-terminus of the SIRPα D1 domain variant and the N-terminus of the Fc domain variant, such that the two polypeptides are joined to each other in tandem series.

In some embodiments, a linker is a simple covalent bond, e.g., a peptide bond, a synthetic polymer, or any kind of bond created from a chemical reaction, e.g. chemical conjugation. When a linker is a peptide bond, in some embodiments, the carboxylic acid group at the C-terminus of one protein domain reacts with the amino group at the N-terminus of another protein domain in a condensation reaction to form a peptide bond. In some embodiments, the peptide bond is formed from synthetic means through a conventional organic chemistry reaction, or by natural production from a host cell, wherein a nucleic acid molecule encoding the DNA sequences of both proteins (e.g., an Fc domain variant and a SIRPα D1 domain variant) in tandem series can be directly transcribed and translated into a contiguous polypeptide encoding both proteins by the necessary molecular machineries (e.g., DNA polymerase and ribosome) in the host cell.

When a linker is a synthetic polymer, in some embodiments, the polymer is functionalized with reactive chemical functional groups at each end to react with the terminal amino acids at the connecting ends of two proteins.

When a linker (except peptide bond mentioned above) is made from a chemical reaction, in some embodiments, chemical functional groups (e.g., amine, carboxylic acid, ester, azide, or other functional groups), are attached synthetically to the C-terminus of one protein and the N-terminus of another protein, respectively. In some embodiments, the two functional groups then react through synthetic chemistry means to form a chemical bond, thus connecting the two proteins together.

Spacers

In the present disclosure, in some embodiments, a linker between an Fc domain monomer and a SIRPα D1 variant polypeptide of the disclosure, is an amino acid spacer including about 1-200 amino acids. Suitable peptide spacers include peptide linkers containing flexible amino acid residues such as glycine and serine. Examples of linker sequences are provided in Table 12. In some embodiments, a spacer contains motifs, e.g., multiple or repeating motifs, of GS, GG, GGS, GGG, GGGGS (SEQ ID NO: 163), GGSG (SEQ ID NO: 164), or SGGG (SEQ ID NO: 165). In some embodiments, a spacer contains 2 to 12 amino acids including motifs of GS, e.g., GS, GSGS (SEQ ID NO: 166), GSGSGS (SEQ ID NO: 167), GSGSGSGS (SEQ ID NO: 168), GSGSGSGSGS (SEQ ID NO: 169), or GSGSGSGSGSGS (SEQ ID NO: 170). In some embodiments, a spacer contains 3 to 12 amino acids including motifs of GGS, e.g., GGS, GGSGGS (SEQ ID NO: 171), GGSGGSGGS (SEQ ID NO: 172), and GGSGGSGGSGGS (SEQ ID NO: 173). In some embodiments, a spacer contains 4 to 12 amino acids including motifs of GGSG (SEQ ID NO: 164), e.g., GGSG (SEQ ID NO: 164), GGSGGGSG (SEQ ID NO: 174), or GGSGGGSGGGSG (SEQ ID NO: 175). In some embodiments, a spacer contains motifs of GGGGS (SEQ ID NO: 163), e.g., GGGGSGGGGSGGGGS (SEQ ID NO: 176). In some embodiments, a spacer contains amino acids other than glycine and serine, e.g., AAS (SEQ ID NO: 177), AAAL (SEQ ID NO: 178), AAAK (SEQ ID NO: 179), AAAR (SEQ ID NO: 180), EGKSSGSGSESKST (SEQ ID NO: 181), GSAGSAAGSGEF (SEQ ID NO: 182), AEAAAKEAAAKA (SEQ ID NO: 183), KESGSVSSEQLAQFRSLD (SEQ ID NO: 184), GGGGAGGGG (SEQ ID NO: 185), GENLYFQSGG (SEQ ID NO: 186), SACYCELS (SEQ ID NO: 187), RSIAT (SEQ ID NO: 188), RPACKIPNDLKQKVIVINH (SEQ ID NO: 189), GGSAGGSGSGSSGGSSGASGTGTAGGTGSGSGTGSG (SEQ ID NO: 190), AAANSSIDLISVPVDSR (SEQ ID NO: 191), or GGSGGGSEGGGSEGGGSEGGGSEGGGSEGGGSGGGS (SEQ ID NO: 192).

In some embodiments, a spacer contains motifs, e.g., multiple or repeating motifs, of EAAAK (SEQ ID NO: 193). In some embodiments, a spacer contains motifs, e.g., multiple or repeating motifs, of proline-rich sequences such as (XP)n, in which X is any amino acid (e.g., A, K, or E) and n is from 1-5, and PAPAP (SEQ ID NO: 194).

TABLE 12

Linker Sequences

| SEQ ID NO: | AMINO ACID SEQUENCE |
|---|---|
| 163 | GGGGS |
| 164 | GGSG |
| 165 | SGGG |

TABLE 12-continued

Linker Sequences

| SEQ ID NO: | AMINO ACID SEQUENCE |
|---|---|
| 166 | GSGS |
| 167 | GSGSGS |
| 168 | GSGSGSGS |
| 169 | GSGSGSGSGS |
| 170 | GSGSGSGSGSGS |
| 171 | GGSGGS |
| 172 | GGSGGSGGS |
| 173 | GGSGGSGGSGGS |
| 174 | GGSGGGSG |
| 175 | GGSGGGSGGGSG |
| 176 | GGGGSGGGGSGGGGS |
| 177 | AAS |
| 178 | AAAL |
| 179 | AAAK |
| 180 | AAAR |
| 181 | EGKSSGSGSESKST |
| 182 | GSAGSAAGSGEF |
| 183 | AEAAAKEAAAKA |
| 184 | KESGSVSSEQLAQFRSLD |
| 185 | GGGGAGGGG |
| 186 | GENLYFQSGG |
| 187 | SACYCELS |
| 188 | RSIAT |
| 189 | RPACKIPNDLKQKVMNH |
| 190 | GGSAGGSGSGSSGGSSGASGTGTAGGTGSGSGTGSG |
| 191 | AAANSSIDLISVPVDSR |
| 192 | GGSGGGSEGGGSEGGGSEGGGSEGGGSEGGGSGGGS |
| 193 | EAAAK |
| 194 | PAPAP |

In some embodiments, the length of the peptide spacer and the amino acids used is adjusted depending on the two proteins involved and the degree of flexibility desired in the final protein fusion polypeptide. In some embodiments, the length of the spacer is adjusted to ensure proper protein folding and avoid aggregate formation. In some embodiments, a spacer is A or AAAL (SEQ ID NO: 178).

Vectors, Host Cells, and Protein Production

Disclosed herein, in some embodiments, are polypeptides comprising a signal-regulatory protein α (SIRP-α) D1 variant comprising a SIRPα D1 domain, or a fragment thereof, having an amino acid mutation at residue 80 relative to a wild-type SIRPα D1 domain; and at least one additional amino acid mutation relative to a wild-type SIRPα D1 domain at a residue selected from the group consisting of:

residue 6, residue 27, residue 31, residue 47, residue 53, residue 54, residue 56, residue 66, and residue 92.

Also disclosed herein, in some embodiments, are polypeptides comprising an Fc variant, wherein the Fc variant comprises an Fc domain dimer having two Fc domain monomers, wherein each Fc domain monomer independently is selected from (i) a human IgG1 Fc region consisting of mutations L234A, L235A, G237A, and N297A; (ii) a human IgG2 Fc region consisting of mutations A330S, P331S and N297A; or (iii) a human IgG4 Fc region comprising mutations S228P, E233P, F234V, L235A, delG236, and N297A.

In some embodiments, the polypeptides of the disclosure are produced from a host cell. A host cell refers to a vehicle that includes the necessary cellular components, e.g., organelles, needed to express the polypeptides and fusion polypeptides described herein from their corresponding nucleic acids. In some embodiments, the nucleic acids are included in nucleic acid vectors introduced into the host cell by transformation, transfection, electroporation, calcium phosphate precipitation, direct microinjection, infection, etc. In some embodiments, the choice of nucleic acid vector depends on the host cell to be used. In some embodiments, host cells are of either prokaryotic (e.g., bacterial) or eukaryotic (e.g., mammalian) origin.

In some embodiments, a polypeptide, for example a polypeptide construct comprising a SIRPα D1 domain variant (e.g., any variant provided in Tables 2, 5, and 6) and a fusion partner such as an Fc variant are produced by culturing a host cell transformed with a nucleic acid, preferably an expression vector, containing a nucleic acid encoding the polypeptide construct (e.g., Fc variant, linker, and fusion partner) under the appropriate conditions to induce or cause expression of the polypeptide construct. In some embodiments, the conditions appropriate for expression varies with the expression vector and the host cell chosen. In some embodiments, a wide variety of appropriate host cells are used, including, but not limited to, mammalian cells, bacteria, insect cells, and yeast. For example, a variety of cell lines that find use in the present disclosure are described in the ATCC® cell line catalog, available from the American Type Culture Collection. In some embodiments, Fc domain variants of this disclosure are expressed in a cell that is optimized not to glycosylate proteins that are expressed by such cell, either by genetic engineering of the cell line or modifications of cell culture conditions such as addition of kifunensine or by using a naturally non-glycosylating host such as a prokaryote (E. coli, etc.), and in some cases, modification of the glycosylation sequence in the Fc is not be needed.

Nucleic Acid Vector Construction and Host Cells

A nucleic acid sequence encoding the amino acid sequence of a polypeptide of the disclosure can be prepared by a variety of methods. These methods include, but are not limited to, oligonucleotide-mediated (or site-directed) mutagenesis and PCR mutagenesis. In some embodiments, a nucleic acid molecule encoding a polypeptide of the disclosure is obtained using standard techniques, e.g., gene synthesis. Alternatively, a nucleic acid molecule encoding a wild-type SIRPα D1 domain is mutated to include specific amino acid substitutions using standard techniques, e.g., QuikChange™ mutagenesis. In some cases, nucleic acid molecules are synthesized using a nucleotide synthesizer or PCR techniques.

In some embodiments, the nucleic acids that encode a polypeptide construct, for example a polypeptide construct comprising a SIRPα D1 domain variant (e.g., any variant provided in Tables 2, 5, and 6) and a fusion partner such as an Fc variant are incorporated into an expression vector in order to express the protein. A variety of expression vectors can be utilized for protein expression. Expression vectors can comprise self-replicating, extra-chromosomal vectors or vectors which integrate into a host genome. A vector can also include various components or elements. For example, in some embodiments, the vector components include, but are not limited to, transcriptional and translational regulatory sequences such as a promoter sequence, a ribosomal binding site, a signal sequence, transcriptional start and stop sequences, translational start and stop sequences, 3' and 5' untranslated regions (UTRs), and enhancer or activator sequences; an origin of replication; a selection marker gene; and the nucleic acid sequence encoding the polypeptide of interest, and a transcription termination sequence. In some embodiments, expression vectors comprise a protein operably linked with control or regulatory sequences, selectable markers, any fusion partners, additional elements, or any combinations thereof. The term "operably linked" means that the nucleic acid is placed into a functional relationship with another nucleic acid sequence. Generally, these expression vectors include transcriptional and translational regulatory nucleic acid operably linked to the nucleic acid encoding the Fc variant, and are typically appropriate to the host cell used to express the protein. A selection gene or marker, such as, but not limited to, an antibiotic resistance gene or fluorescent protein gene, can be used to select for host cells containing the expression vector, for example by antibiotic or fluorescence expression. Various selection genes are available.

In some embodiments, the components or elements of a vector are optimized such that expression vectors are compatible with the host cell type. Expression vectors which find use in the present disclosure include, but are not limited to, those which enable protein expression in mammalian cells, bacteria, insect cells, yeast, and in in vitro systems.

In some embodiments, mammalian cells are used as host cells to produce polypeptides of the disclosure. Examples of mammalian cell types include, but are not limited to, human embryonic kidney (HEK) (e.g., HEK293, HEK 293F), Chinese hamster ovary (CHO), HeLa, COS, PC3, Vero, MC3T3, NS0, Sp2/0, VERY, BHK, MDCK, W138, BT483, Hs578T, HTB2, BT20, T47D, NS0 (a murine myeloma cell line that does not endogenously produce any immunoglobulin chains), CRL7O3O, and HsS78Bst cells. In some embodiments, E. coli cells are used as host cells to produce polypeptides of the disclosure. Examples of E. coli strains include, but are not limited to, E. coli 294 (ATCC® 31,446), E. coli λ 1776 (ATCC® 31,537, E. coli BL21 (DE3) (ATCC® BAA-1025), and E. coli RV308 (ATCC® 31,608).

Different host cells have characteristic and specific mechanisms for the posttranslational processing and modification of protein products (e.g., glycosylation). In some embodiments, appropriate cell lines or host systems are chosen to ensure the correct modification and processing of the polypeptide expressed. Once the vectors are introduced into host cells for protein production, host cells are cultured in conventional nutrient media modified as appropriate for inducing promoters, selecting transformants, or amplifying the genes encoding the desired sequences.

In some embodiments, a polypeptide construct, for example a polypeptide construct comprising a SIRPα D1 domain variant (e.g., any variant provided in Tables 2, 5, and 6) and a fusion partner such as an Fc variant are expressed in mammalian expression systems, including systems in which the expression constructs are introduced into the mammalian cells using virus such as retrovirus or adenovirus. In some embodiments, human, mouse, rat, hamster, or primate cells are utilized. Suitable cells also include known research cells, including but not limited to Jurkat T cells, NIH3T3, CHO, COS, and 293 cells. Alternately, in some embodiments, proteins are expressed in bacterial cells. Bacterial expression systems are well known in the art, and include *Escherichia coli* (*E. coli*), *Bacillus subtilis, Streptococcus cremoris*, and *Streptococcus lividans*. In some cases, polypeptide constructs comprising Fc domain variants are produced in insect cells such as but not limited to Sf9 and Sf21 cells or yeast cells such as but not limited to organisms from the genera *Saccharomyces, Pichia, Kluyveromyces, Hansenula* and *Yarrowia*. In some cases, polypeptide constructs comprising Fc domain variants are expressed in vitro using cell free translation systems. In vitro translation systems derived from both prokaryotic (e.g., *E. coli*) and eukaryotic (e.g., wheat germ, rabbit reticulocytes) cells are available and, in some embodiments, chosen based on the expression levels and functional properties of the protein of interest. For example, as appreciated by those skilled in the art, in vitro translation is required for some display technologies, for example ribosome display. In addition, in some embodiments, the Fc domain variants are produced by chemical synthesis methods such as, but not limited to, liquid-phase peptide synthesis and solid-phase peptide synthesis. In the case of in vitro transcription using a non-glycosylating system such as bacterial extracts, the Fc will not be glycosylated even in presence of the natural glycosylation site and therefore inactivation of the Fc will be equivalently obtained.

In some embodiments, a polypeptide construct includes non-natural amino acids, amino acid analogues, amino acid mimetics, or any combinations thereof that function in a manner similar to the naturally occurring amino acids. Naturally encoded amino acids generally refer to the 20 common amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine) and pyrrolysine and selenocysteine. Amino acid analogs refers to compounds that have the same basic chemical structure as a naturally occurring amino acid, e.g., a carbon that is bound to a hydrogen, a carboxyl group, an amino group, and an R group, such as, homoserine, norleucine, methionine sulfoxide, methionine methyl sulfonium. In some embodiments, such analogs have modified R groups (such as, norleucine) or modified peptide backbones, but generally retain the same basic chemical structure as a naturally occurring amino acid.

Protein Production, Recovery, and Purification

In some embodiments, host cells used to produce polypeptides of the disclosure are grown in media suitable for culturing of the selected host cells. Examples of suitable media for mammalian host cells include Minimal Essential Medium (MEM), Dulbecco's Modified Eagle's Medium (DMEM), Expi293™ Expression Medium, DMEM with supplemented fetal bovine serum (FBS), and RPMI-1640. Examples of suitable media for bacterial host cells include Luria broth (LB) plus necessary supplements, such as a selection agent, e.g., ampicillin. In some embodiments, host cells are cultured at suitable temperatures, such as from about 20° C. to about 39° C., e.g., from about 25° C. to about 37° C., preferably 37° C., and $CO_2$ levels, such as about 5% to 10%. In some embodiments, the pH of the medium is from about pH 6.8 to pH 7.4, e.g., pH 7.0, depending mainly on the host organism. If an inducible promoter is used in the expression vector, protein expression can be induced under conditions suitable for the activation of the promoter.

In some embodiments, protein recovery involves disrupting the host cell, for example by osmotic shock, sonication, or lysis. Once the cells are disrupted, cell debris is removed by centrifugation or filtration. The proteins can then be further purified. In some embodiments, a polypeptide of the disclosure is purified by various methods of protein purification, for example, by chromatography (e.g., ion exchange chromatography, affinity chromatography, and size-exclusion column chromatography), centrifugation, differential solubility, or by any other standard technique for the purification of proteins. For example, in some embodiments, the protein is isolated and purified by appropriately selecting and combining affinity columns such as Protein A column (e.g., POROS Protein A chromatography) with chromatography columns (e.g., POROS HS-50 cation exchange chromatography), filtration, ultra-filtration, de-salting and dialysis procedures. In some embodiments, a polypeptide is conjugated to marker sequences, such as a peptide to facilitate purification. An example of a marker amino acid sequence is a hexa-histidine peptide (His6-tag (SEQ ID NO: 223)), which can bind to a nickel-functionalized agarose affinity column with micromolar affinity. As an alternative, a hemagglutinin "HA" tag, which corresponds to an epitope derived from the influenza hemagglutinin protein can be used.

In some embodiments, polypeptides of the disclosure, for example a polypeptide construct comprising a SIRPα D1 domain variant (e.g., any variant provided in Tables 2, 5, and 6) and a fusion partner such as an Fc variant are produced by the cells of a subject (e.g., a human), e.g., in the context of gene therapy, by administrating a vector such as a viral vector (e.g., a retroviral vector, adenoviral vector, poxviral vector (e.g., vaccinia viral vector, such as Modified Vaccinia Ankara (MVA)), adeno-associated viral vector, and alphaviral vector) containing a nucleic acid molecule encoding a polypeptide of the disclosure. The vector, once inside a cell of the subject (e.g., by transformation, transfection, electroporation, calcium phosphate precipitation, direct microinjection, infection, etc.) can be used for the expression of a polypeptide disclosed herein. In some cases, the polypeptide is secreted from the cell. In some embodiments, if treatment of a disease or disorder is the desired outcome, no further action is required. In some embodiments, if collection of the protein is desired, blood is collected from the subject and the protein purified from the blood by various methods.

Methods of Treating Cancer

Provided herein are methods of treating cancer in an individual (e.g., a human individual) that comprises administering to the individual an effective amount of (a) an agent that blocks the interaction between CD47 (e.g., hCD47) and SIRPα (e.g., hSIRPα) and (b) a chemotherapy agent (e.g., at least one chemotherapy agent, such as at least two, at least three, or at least four chemotherapy agents). Provided herein is a method of treating cancer in an individual (e.g., a human individual) that comprises administering to the individual an effective amount of (a) a polypeptide comprising a SIRPα D1 domain variant (e.g., a SIRPα D1 domain variant described herein) and an Fc domain variant (e.g., an Fc domain variant described herein) and (b) a chemotherapy agent (e.g., at least one chemotherapy agent, such as at least two, at least three, or at least four chemotherapy agents). In some embodiments the method further comprises administering to the individual an effective amount of a therapeutic antibody (e.g., at least one therapeutic antibody, such as at least two, at least three, or at least four therapeutic antibodies). Additionally or alternatively, in some embodiments the method further comprises administering to the individual an effective amount of an immunotherapeutic agent (e.g., at least one immunotherapeutic agent, such as at least two, at least three, or at least four immunotherapeutic agents). Additionally or alternatively, in some embodiments, the method comprises administering the polypeptide and the chemotherapy agent in combination with one or more additional modes of therapy, including, but not limited to, e.g., radiation therapy, surgery, cryoablation, and bone marrow transplant.

Combination Therapies Comprising Chemotherapy Agents, and Exemplary Chemotherapy Agents Exemplary chemotherapy agent(s) that can be used in a method of treating cancer described herein include, without limitation, e.g., methotrexate (RHEUMATREX®, Amethopterin), cyclophosphamide (CYTOXAN®), abiraterone, abemaciclib, altretamine, thalidomide (THALIDOMID®), acridine carboxamide, Actimid®, actinomycin, actinomycin-D, afatinib, 17-N-allylamino-17-demethoxygeldanamycin, alectinib, alpelisib, aminopterin, amsacrine, anlotinib, anthracycline, antineoplastic, antineoplaston, apartinib, 5-azacitidine, 6-mercaptopurine, 6-thioguanine, arabinosylcytosine, axitinib, azacitidine, azathioprine, BL22, bendamustine, binimetinib, biricodar, bleomycin, bortezomib, bosutinib, brigatinib, bryostatin, busulfan, cabozantinib, calyculin, camptothecin, capecitabine, carboplatin, carmustine, ceritinib, chlorambucil, cisplatin, cladribine, clofarabine, cobimetinib, crizotinib, cytarabine, dabrafenib, dacarbazine, dacomitinib, dasatinib, daunorubicin, dexamethasone, dichloroacetic acid, discodermolide, docetaxel, doxorubicin, encorafenib, epirubicin, entrectinib, enzalutamide, epothilone, erdafitinib, eribulin, erlotinib, estramustine, etoposide, everolimus, exatecan, exisulind, ferruginol, floxuridine, fludarabine, fluorouracil (such as 5-fluorouracil), folinic acid, fosfestrol, fotemustine, fruquintinib, ganciclovir, gefitinib, gemcitabine, gilteritinib, goserelin, hexamethylmelamine, hydroxycarbamide, hydroxyurea, IT-101, ibrutinib, icotinib, idarubicin, idelalisib, ifosfamide, imatinib, irinoimiquimod, irinotecan, irofulven, ivosidenib, ixabepilone, laniquidar, lapatinib, larotrectinib, lenalidomide, lenvatinib, lorlatinib, lomustine, lurtotecan, mafosfamide, masoprocol, mechlorethamine, melphalan, mercaptopurine, methotrexate, methylprednisolone, mitomycin, mitotane, mitoxantrone, nelarabine, neratinib, niraparib, nilotinib, nintedanib, oblimersen, olaparib, osimertinib, oxaliplatin, nedaplatin, phenanthriplatin, picoplatin, PAC-1, paclitaxel, palbociclib, pazopanib, pemetrexed, pegfilgrastim, pentostatin, pipobroman, pixantrone, plicamycin, prednisone, ponatinib, procarbazine, proteasome inhibitors (e.g., bortezomib), pyrotinib, raltitrexed, rebeccamycin, Revlimid®, regorafenib, ribociclib, rubitecan, rucaparib, ruxolitinib, SN-38, salinosporamide A, satraplatin, sirolimus, sonidegib, sorafenib, streptozocin, streptozotocin, sunitinib, swainsonine, talazoparib, tariquidar, taxane, tegafur-uracil, temsirolimus, teniposide, temozolomide, testolactone, thioTEPA, tioguanine, topotecan, trabectedin, trametinib, tretinoin, trifluridine, triplatin tetranitrate, tris(2-chloroethyl)amine, troxacitabine, uracil mustard, valrubicin, vandetanib, vemurafenib, venetoclax (ABT-199), navitoclax (ABT-263), vinblastine, vincristine, vinorelbine, vismodegib, vorinostat, ziv-aflibercept (ZALTRAP®), zosuquidar, or the like.

In some embodiments, the method of treating cancer comprises administering an agent that blocks the interaction between CD47 (e.g., hCD47) and SIRPα (e.g., hSIRPα) in combination with chemotherapeutic agent(s)s of a particular class. In some embodiments, the agent that blocks the interaction between CD47 and SIRPα is a polypeptide described herein (e.g., a fusion polypeptide comprising a SIRPα d1 domain variant and an Fc variant; a fusion polypeptide comprising a SIRPγ variant, a SIRPβ1 variant, or a SIRPβ2 variant and an Fc variant). For example, in some embodiments, the method of treating cancer comprises administering a polypeptide (e.g. fusion polypeptide) described herein in combination with an adrenal inhibitor (including, but not limited to adrenal inhibitors described herein). For example, in some embodiments, the method of treating cancer comprises administering a polypeptide described herein in combination with an anthracycline (including, but not limited to anthracyclines described herein). In some embodiments, the method of treating cancer comprises administering a polypeptide described herein in combination with an alkylating agent (including, but not limited to alkylating agents described herein). In some embodiments, the method of treating cancer comprises administering a polypeptide described herein in combination with an androgen inhibitor (including, but not limited to androgen inhibitors described herein). In some embodiments, the method of treating cancer comprises administering a polypeptide described herein in combination with an antimetabolite, e.g., a purine analog, (including, but not limited to antimetabolites, e.g., purine analogs, described herein). In some embodiments, the method of treating cancer comprises administering a polypeptide described herein in combination with an antitumor antibiotic (including, but not limited to antitumor antibiotics described herein. In some embodiments, the method of treating cancer comprises administering a polypeptide described herein in combination with a BLC-2 inhibitor (including, but not limited to BLC-2 inhibitors described herein). In some embodiments, the method of treating cancer comprises administering a polypeptide described herein in combination with a BTK inhibitor (including, but not limited to BTK inhibitors described herein. In some embodiments, the method of treating cancer comprises administering a polypeptide described herein in combination with a CDK 4/6 inhibitor (including, but not limited to CDK 4/6 inhibitors described herein). In some embodiments, the method of treating cancer comprises administering a polypeptide described herein in combination with a colony stimulating factor (including, but not limited to colony stimulating factors described herein). In some embodiments, the method of treating cancer comprises administering a polypeptide described herein in combination with a corticosteroid (including, but not limited to corticosteroids described herein). In some embodiments, the method of treating cancer comprises administering a polypeptide described herein in combination with an EGFR inhibitor (including, but not limited to EGFR inhibitors described herein). In some embodiments, the method of treating cancer comprises administering a polypeptide described herein in combination with a gonadotropin releasing hormone (GnRH) agonist (including, but not limited to GnRH agonists described herein). In some embodiments, the method of treating cancer comprises administering a polypeptide described herein in combination with a mitotic inhibitor/microtubule inhibitor (including, but not limited to mitotic inhibitors/microtubule inhibitors described herein). In some embodiments, the method of treating cancer comprises administering a polypeptide described herein in combination with an mTOR kinase inhibitor (including, but not limited to mTOR kinase inhibitors described herein). In some embodiments, the method of treating cancer comprises administering a polypeptide described herein in combination with a proteasome inhibitor (including, but not limited to proteasome inhibitors described herein). In some embodiments, the method of treating cancer comprises administering a polypeptide described herein in combination with a signal transduction inhibitor, e.g., a protein-tyrosine kinase inhibitor, a PAK4 inhibitor, a PI3K inhibitor, (including, but not limited to signal transduction inhibitors described herein). In some embodiments, the method of treating cancer comprises administering a polypeptide described herein in combination with a topoisomerase inhibitor, (including, but not limited to topoisomerase inhibitors described herein). In some embodiments, the method of treating cancer comprises administering a polypeptide described herein in combination with a tyrosine kinase inhibitor, (including, but not limited to tyrosine kinase inhibitors described herein). In some embodiments, the method of treating cancer comprises administering a polypeptide described herein in combination with a VEGF inhibitor, such as a VEGF1 inhibitor, a VEGF2 inhibitor, and/or a VEGF3 inhibitor (including, but not limited to VEGF inhibitors described herein. In some embodiments, the method of treating cancer comprises administering a polypeptide described herein in combination with an agent that modulates apoptosis, e.g., by modulating the activity of Bcl-2, Mcl1, Bcl-lx, etc., (including, but not limited to agents that modulate apoptosis, e.g., by modulating the activity of Bcl-2, Mcl1, Bcl-lx, etc., described herein). In some embodiments, the method of treating cancer comprises administering a polypeptide described herein in combination with a platinum-based agent, (including, but not limited to platinum-based agents described herein). In some embodiments, the method of treating cancer comprises administering a polypeptide described herein in combination with an inhibitor of NTRK1, NTRK2, and/or NTRK3, an ALK inhibitor, a ROS inhibitor, a FLT3 inhibitor, a BRAF inhibitor, an inhibitor of MEK1 and/or MEK2, an inhibitor of HER2, HER3, and/or HER 4, an inhibitor of RET/PTC, an inhibitor of BCR-ABL, a c-KIT inhibitor, an inhibitor of PDGFR-alpha and/or PDGFR-beta, an inhibitor of FGFR1, FGFR2, FGFR3, and/or FGFR4, an Smoothened inhibitor and/or an inhibitor of PARP1, PARP2, and/or PARP3 (including, but not limited to inhibitors described herein). In some embodiments, the inhibitor is an antisense polynucleotide (such as an siRNA or an RNAi). In some embodiments, the inhibitor is a small molecule inhibitor, as described in further detail below.

In some embodiments the chemotherapeutic agent is a small molecule anti-cancer agent (such as a small molecule inhibitor In some embodiments, the method of treating cancer comprises administering a polypeptide described herein in combination with a small molecule inhibitor of VEGFR and/or PDGFR, a small molecule EGFR inhibitor, a small molecule ALK inhibitor, a small molecule CDK4/6 inhibitor, a small molecule PARP inhibitor, a small molecule PAK4 inhibitor, a small molecule mTOR inhibitor, a small molecule KRAS inhibitor, a small molecule TRK inhibitor, a small molecule BCL2 inhibitor, a small molecule B-raf inhibitor, a small molecule IDH inhibitor, a small molecule PI3K inhibitor, a small molecule DDR (DNA damage response) inhibitor, or a small molecule hypomethylation agent. In other cases, the targeted small molecule modulates a cellular signaling pathway of the cell expressing CD47, e.g., an IDO/TDO inhibitor, AhR inhibitor, arginase inhibitor, A2a R inhibitor, TLR agonists, STING agonist, or Rig-1 agonist.

In some embodiments, the method of treating cancer comprises administering a polypeptide described herein (e.g., a fusion polypeptide comprising a SIRPα d1 domain variant and an Fc variant) in combination with at least one, at least two, at least three, or at least four chemotherapeutic agents. In some embodiments where two or more chemotherapeutic agents are administered, the two or more chemotherapeutic agents are from different classes (as described above) and/or exert their anti-cancer effects via different mechanisms of action.

Further details regarding exemplary pharmaceutical compositions and preparations, exemplary dosages, and exemplary routes of administration for the fusion polypeptides described herein are provided in WO 2017/027422 and U.S. Pat. No. 10,259,859, the contents of each of which are incorporated by reference entireties.

Combination Therapies Comprising Therapeutic Antibodies, and Exemplary Therapeutic Antibodies In some embodiments a method of treating cancer provided herein comprises administering to the individual an effective amount of a therapeutic antibody (e.g., at least one therapeutic antibody, such as at least two, at least three, or at least four therapeutic antibodies), i.e., in combination with agent that blocks the interaction between CD47 (e.g., hCD47) and SIRPα (e.g., a fusion polypeptide described herein) and a chemotherapeutic agent described herein (e.g., at least one chemotherapeutic agent, such as at least two, at least three, or at least four chemotherapeutic agents). In some embodiments, the therapeutic antibody is conjugated to a drug (i.e., an antibody-drug conjugate, or "ADC").

Exemplary therapeutic antibodies (e.g., therapeutic monoclonal antibodies) for use in a method herein include, but are not limited to, e.g., 3F8, 8H9, Abagovomab, Abciximab, Abituzumab, Abrilumab, Actoxumab, Adalimumab, Adecatumumab, Aducanumab, Afelimomab, Afutuzumab, Alacizumab pegol, ALD518, Alemtuzumab, Alirocumab, Altumomab pentetate, Amatuximab, Anatumomab mafenatox, Anetumab ravtansine, Anifrolumab, Anrukinzumab (IMA-638), Apolizumab, Arcitumomab, Ascrinvacumab, Aselizumab, Atezolizumab, Atinumab, Atlizumab (tocilizumab), Atorolimumab, Avelumab, Bapineuzumab, Basiliximab, Bavituximab, Bectumomab, Begelomab, Belimumab, Benralizumab, Bertilimumab, Besilesomab, Bevacizumab, Bezlotoxumab, Biciromab, Bimagrumab, Bimekizumab, Bivatuzumab mertansine, Blinatumomab, Blosozumab, Bococizumab, Brentuximab vedotin, Briakinumab, Brodalumab, Brolucizumab, Brontictuzumab, Cabiralizumab (FPA008), Camrelizumab, Canakinumab, Cantuzumab mertansine, Cantuzumab ravtansine, Caplacizumab, Capromab pendetide, Carlumab, Catumaxomab, cBR96-doxorubicin immunoconjugate, CC49, Cedelizumab, Certolizumab pegol, Cetuximab, Ch. 14.18, Citatuzumab bogatox, Cixutumumab, Clazakizumab, Clenoliximab, Clivatuzumab tetraxetan, Codrituzumab, Coltuximab ravtansine, Conatumumab, Concizumab, Crenezumab, CR6261, Dacetuzumab, Daclizumab, Dalotuzumab, Dapirolizumab pegol, Daratumumab, Dectrekumab, Demcizumab, Denintuzumab mafodotin, Denosumab, Derlotuximab biotin, Detumomab, Dinutuximab, Diridavumab, Dorlimomab aritox, Drozitumab, Duligotumab, Dupilumab, Durvalumab, Dusigitumab, Ecromeximab, Eculizumab, Edobacomab, Edrecolomab, Efalizumab, Efungumab, Eldelumab, Elgemtumab, Elotuzumab, Elsilimomab, Emactuzumab (RG7155), Emibetuzumab, Enavatuzumab, Enfortumab vedotin, Enlimomab pegol, Enoblituzumab, Enokizumab, Enoticumab, Ensituximab, Epitumomab cituxetan, Epratuzumab, Erlizumab, Ertumaxomab, Etaracizumab, Etrolizumab, Evinacumab, Evolocumab, Exbivirumab, Fanolesomab, Faralimomab, Farletuzumab, Fasinumab, FBTA05, Felvizumab, Fezakinumab, Ficlatuzumab, Figitumumab, Firivumab, Flanvotumab, Fletikumab, Fontolizumab, Foralumab, Foravirumab, Fresolimumab, Fulranumab, Futuximab, Galiximab, Ganitumab, Gantenerumab, Gavilimomab, Gemtuzumab ozogamicin, Gevokizumab, Girentuximab, Glembatumumab vedotin, Golimumab, Gomiliximab, Guselkumab, Ibalizumab, Ibritumomab tiuxetan, Icrucumab, Idarucizumab, Igovomab, IMAB362, Imalumab, Imciromab, Imgatuzumab, Inclacumab, Indatuximab ravtansine, Indusatumab vedotin, Infliximab, Intetumumab, Inolimomab, Inotuzumab ozogamicin, Ipilimumab, Iratumumab, Isatuximab, Itolizumab, Ixekizumab, Keliximab, Labetuzumab, Lambrolizumab, Lampalizumab, Lebrikizumab, Lemalesomab, Lenzilumab, Lerdelimumab, Lexatumumab, Libivirumab, Lifastuzumab vedotin, Ligelizumab, Lilotomab satetraxetan, Lintuzumab, Lirilumab, Lodelcizumab, Lokivetmab, Lorvotuzumab mertansine, Lucatumumab, Lulizumab pegol, Lumiliximab, Lumretuzumab, MSB0010718C (avelumab), Mapatumumab, Margetuximab, Maslimomab, Mavrilimumab, Matuzumab, MEDI6469, MEDI0680, MEDI6383, Mepolizumab, Metelimumab, Milatuzumab, Minretumomab, Mitumomab, Mogamulizumab, Morolimumab, Motavizumab, Moxetumomab pasudotox, Muromonab-CD3, Nacolomab tafenatox, Namilumab, Naptumomab estafenatox, Narnatumab, Natalizumab, Nebacumab, Necitumumab, Nemolizumab, Nerelimomab, Nesvacumab, Nimotuzumab, Nivolumab, Nofetumomab merpentan, Obiltoxaximab, Obinutuzumab, Ocaratuzumab, Ocrelizumab, Odulimomab, Ofatumumab, Olaratumab, Olokizumab, Omalizumab, Onartuzumab, Ontuxizumab, Opicinumab, Oportuzumab monatox, Oregovomab, Orticumab, Otelixizumab, Otlertuzumab, Oxelumab, Ozanezumab, Ozoralizumab, Pagibaximab, Palivizumab, Panitumumab, Pankomab, Panobacumab, Parsatuzumab, Pascolizumab, Pasotuxizumab, Pateclizumab, Patritumab, Pembrolizumab, Pemtumomab, Perakizumab, Pertuzumab, Pexelizumab, Pidilizumab, Pinatuzumab vedotin, Pintumomab, Placulumab, Polatuzumab vedotin, Ponezumab, Priliximab, Pritoxaximab, Pritumumab, PRO 140, Quilizumab, Racotumomab, Radretumab, Rafivirumab, Ralpancizumab, Ramucirumab, Ranibizumab, Raxibacumab, Refanezumab, Regavirumab, Reslizumab, Rilotumumab, Rinucumab, Rituximab, Robatumumab, Roledumab, Romosozumab, Rontalizumab, Rovelizumab, Ruplizumab, Sacituzumab govitecan, Samalizumab, SAR650984 (Isatuximab) Sarilumab, Satumomab pendetide, Secukinumab, Seribantumab, Setoxaximab, Sevirumab, Sibrotuzumab, SGN-CD19A, SGN-CD33A, Sifalimumab, Siltuximab, Simtuzumab, Sintilimab, Siplizumab, Sirukumab, Sofituzumab vedotin, Solanezumab, Solitomab, Sonepcizumab, Sontuzumab, Stamulumab, Sulesomab, Suvizumab, Tabalumab, Tacatuzumab tetraxetan, Tadocizumab, Talizumab, Tanezumab, Taplitumomab paptox, Tarextumab, Tefibazumab, Telimomab aritox, Tenatumomab, Teneliximab, Teplizumab, Teprotumumab, Tesidolumab, TGN1412, Ticilimumab (tremelimumab), Tildrakizumab, Tigatuzumab, TNX-650, Tocilizumab (atlizumab), Toralizumab, Toripalimab, Tosatoxumab, Tositumomab, Tovetumab, Tralokinumab, Trastuzumab, trastuzumab-emtansine, TRBS07, Tregalizumab, Tremelimumab, Tucotuzumab celmoleukin, Tuvirumab, Ublituximab, Ulocuplumab, Urelumab, Urtoxazumab, Ustekinumab, Utomilumab (PF-05082566), Vandortuzumab vedotin, Vantictumab, Vanucizumab, Vapaliximab, Varlilumab, Vatelizumab, Vedolizumab, Veltuzumab, Vepalimomab, Vesencumab, Visilizumab, Volociximab, Vonlerolizumab (RG7888), Vorsetuzumab mafodotin, Votumumab, Zalutumumab, Zanolimumab, Zatuximab, Ziralimumab, or Zolimomab aritox, including biosimilars of any of the preceding therapeutic antibodies.

Other exemplary therapeutic antibodies (e.g., therapeutic monoclonal antibodies) that can be used in a method herein is an antibody include, but are not limited to, e.g., an anti-CD20 antibody, an anti-EGFR antibody, an anti-Her2/Neu (ERBB2) antibody, an anti-EPCAM antibody, an anti-GL2 antibody, anti-GD2, anti-GD3, anti-CD2, anti-CD3, anti-CD4, anti-CD8, anti-CD 1 9, anti-CD22, anti-CD30, anti-CD33, anti-CD39, anti-CD45, anti-CD47, anti-CD52, anti-CD56, anti-CD70, anti-CD73, anti-CD117, an anti-SIRPα antibody, an anti-LILRB1, an anti-LILRB2, an anti-LILRB4 antibody, an anti-PD-1 antibody (e.g., an anti PD-1 antagonist antibody), an anti-PD-L1 antibody (e.g., an anti PD-L1 antagonist antibody), an anti-PD-L2 antibody, or any antibody designed to bind to a tumor cell, a virally- or bacterially-infected cell, immune cell, or healthy normal cell, or to a cytokine, chemokine, or hormone of any kind.

In some embodiments, the therapeutic antibody used in a method herein is an antibody that binds to, e.g., CS1/SLAMF7, Trop-2, VWF, vimentin, VEGFR2, VEGFR-1, VEGF, VEGF-A, TYRP1 (glycoprotein 75), TWEAK receptor, tumor specific glycosylation of MUC1, tumor antigen CTAA16.88, TRAIL-R2, TRAIL-R1, TNF-alpha, TGF-beta, TGF beta 2, TGF beta 1, TFPI, tenascin C, TEM1, TAG-72, T-cell receptor, STEAP1, sphingosine-1-phosphate, SOST, SLAMF7, BCL-2, selectin P, SDC1, sclerostin, RTN4, RON, Rhesus factor, RHD, respiratory syncytial virus, RANKL, rabies virus glycoprotein, platelet-derived growth factor receptor beta, phosphatidylserine, phosphate-sodium co-transporter, PDGF-R alpha, PDCD1, PD-1, PD-L1, PCSK9, oxLDL, OX-40, NRP1, Notch receptor 4, Notch receptor 3, Notch receptor 2, Notch receptor 1, NOGO-A, NGF, neural apoptosis-regulated proteinase 1, NCA-90 (granulocyte antigen), NARP-1, N-glycolylneuraminic acid, myostatin, myelin-associated glycoprotein, mucin CanAg, MUC1, MSLN, MS4A1, MIF, mesothelin, MCP-1, LTA, LOXL2, lipoteichoic acid, LINGO-1, LFA-1 (CD11a), Lewis-Y antigen, L-selectin (CD62L), KIR2D, ITGB2 (CD18), ITGA2, interferon alpha/beta receptor, interferon receptor, interferon gamma-induced protein, integrin αvβ3, integrin αIIβ3, integrin α7β7, integrin α5β1, integrin α4β7, integrin α4, insulin-like growth factor I receptor, Influenza A hemagglutinin, ILGF2, IL9, IL6, IL4, IL3 IRA, IL23, IL1 7A, IL-6 receptor, IL-6, IL-S, IL-4, IL-23, IL-22, IL-I, IL-I 7A, IL-17, IL-13, IL-I 2, IL-I, IL 20, IGHE, IgG4, IGF-I, IGF-I receptor, IgE Fc region, IFN-gamma, IFN-alpha, ICAM-1 (CD54), human TNF, human scatter factor receptor kinase, Hsp90, HNGF, HLA-DR, HIV-1, histone complex, HHGFR, HGF, HER3, HER2, HER2/neu, HER1, hepatitis B surface antigen, hemagglutinin, GUCY2C, GPNMB, GMCSF receptor alpha-chain, glypican 3, GD3 ganglioside, GD2, ganglioside GD2, Frizzled receptor, folate receptor 1, folate hydrolase, fibronectin extra domain-B, fibrin II, beta chain, FAP, F protein of respiratory syncytial virus, ERBB3, episialin, EpCAM, endotoxin, EGFR, EGFL7, E. coli shiga toxin type-2, E. coli shiga toxin type-I, DRS, DPP4, DLL4, dabigatran, cytomegalovirus glycoprotein B, CTLA-4, CSF2, CSF1R, clumping factor A, CLDN18.2, ch4DS, CFD, CEA-related antigen, CEA, CD80, CD79B, CD74, CD73, CD70, CD6, CD56, CD52, CD51, CD5, CD44 v6, CD41, CD40 ligand, CD40, CD4, CD39, CD38, CD37, CD33, CD30 (TNFRSF8), CD123, CD138, CD3 epsilon, CD3, CD28, CD274, CD27, CD2S (a chain of IL-2 receptor), CD23 (IgE receptor), CD221, CD22, CD200, CD20, CD2, CD19, CD137, CD154, CD152, CD15, CD147 (basigin), CD140a, CD125, CD11, CD-18, CCR5, CCR4, CCL11 (eotaxin-I), cardiac myosin, carbonic anhydrase 9 (CA-IX), Canis lupus familiaris IL31, CA-125, C5, C242 antigen, C-X-C chemokine receptor type 4, beta-amyloid, BAFF, B7-H3, B-lymphoma cell, AOC3 (VAP-I), anthrax toxin, protective antigen, angiopoietin 3, angiopoietin 2, alpha-fetoprotein, AGS-22M6, adenocarcinoma antigen, ACVR2B, activin receptor-like kinase I, 5T4, SAC, 4-IBB or 1-40-beta-amyloid.

In some embodiments, the therapeutic antibody used in a method herein binds to an antigen expressed by a cancer cell (e.g., expressed on the surface of a cancer cell). Exemplary antigens expressed by cancers are known in the art and include, without limitation, e.g., CD19, CD20, CD22, CD30, CD33, CD38, CD52, CD56, CD70, CD74, CD79b, CD123, CD138, CS1/SLAMF7, Trop-2, 5T4, BCMA, Mucin 1, Mucin 16, PTK7, PD-L1, STEAP1, Endothelin B Receptor, mesothelin, EGFRvIII, ENPP3, SLC44A4, GNMB, nectin 4, NaPi2b, LW-1A, Guanylyl cyclase C, DLL3, EGFR, HER2, VEGF, VEGFR, integrin $\alpha V\beta 3$, integrin $\alpha 5\beta 1$, MET, IGF1R, TRAILR1, TRAILR2, RANKL, FAP, Tenascin, Le$^y$, EpCAM, CEA, gpA33, PSMA, TAG72, a mucin, CAM EPHA3, folate receptor $\alpha$, GD2, GD3, and an MEC/peptide complex comprising a peptide from NY-ESO-1/LAGE, SSX-2, a MAGE family protein, MAGE-A3, gp100/pmel17, Melan-A/MART1, gp75/TRP1, tyrosinase, TRP2, CEA, PSA, TAG-72, immature laminin receptor, MOK/RAGE-1, WT-1, SAP-1, BING-4, EpCAM, MUC1, PRAME, survivin, BRCA1, BRCA2, CDK4, CML66, MART-2, p53, Ras, $\beta$-catenin, TGF-$\beta$RII, HPV E6, or HPV E7. For example, in some embodiments, an polypeptide described herein is administered in combination with a chemotherapeutic agent (e.g., at least one chemotherapeutic agent) and a monoclonal antibody that binds CD123 (also known as IL-3 receptor alpha), such as talacotuzumab (also known as CSL362 and JNJ-56022473).

In some embodiments, the therapeutic antibody (e.g., therapeutic monoclonal antibody) used in a method herein is an antibody that binds an antigen expressed by an NK cell. Exemplary antigens expressed by an NK cell include, without limitation, NKR-P1A (KLRB1), CD94 (NKG2A), KLRG1, KIR2DL5A, KIR2DL5B, K1R2DL1, KIR2DL2, KIR2DL3, KIR2DS2, KIR2DS3, KIR2DS4, KIR2DS5, KIR3DS1, KIR2DS1, CD94 (NKG2C/E), NKG2D, CD160 (BY55), CD16 (Fc$\gamma$RIIIA), NKp46 (NCR1), NKp30 (NCR3), NKp44 (NCR2), DNAM1 (CD226), CRTAM, CD27, NTB-A (SLAMF6), PSGL1, CD96 (Tactile), CD100 (SEMA4D), NKp80 (KLRF1, CLEC5C), SLAMF7 (CRACC, CS1, CD319), and CD244 (2B4, SLAMF4).

Combination Therapies Comprising Immunotherapeutic Agents, and Exemplary Immunotherapeutic Agents In some embodiments a method of treating cancer provided herein comprises administering to the individual an effective amount of an immunotherapeutic agent (e.g., at least one immunotherapeutic agent, such as at least two, at least three, or at least four immunotherapeutic agents), i.e., in combination with an agent that blocks the interaction between CD47 (e.g., hCD47) and SIRP$\alpha$ (e.g., a polypeptide described herein) and a chemotherapeutic agent described herein (e.g., at least one chemotherapeutic agent, such as at least two, at least three, or at least four chemotherapeutic agents).

In some embodiments, an immunotherapeutic agent refers to any therapeutic that targets the immune system and promotes a therapeutic redirection of the immune system, such as a modulator of a costimulatory pathway, cancer vaccine, recombinantly modified immune cell, etc. Exemplary and non-limiting immunotherapeutic agents are described infra. In some embodiments, the immunotherapeutic agent is or comprises an antibody. Exemplary targets of immunotherapeutic antibodies are known in the art and include, without limitation, BDCA2, BDCA4, ILT7, LILRB1, LILRB2, LILRB3, LILRB4, LILRB5, Siglec-3, Siglec-7, Siglec-9, Siglec-10, Siglec-15, FGL-1, CD200, CD200R, CSF-1R, CD24, CD40, CD40L, CD163, CD206, DEC205, CD47, CD123, arginase, IDO, TDO, AhR, EP2, COX-2, CCR2, CCR-7, CXCR1, CX3CR1, CXCR2, CXCR3, CXCR4, CXCR7, TGF-$\beta$ RI, TGF-$\beta$ RII, c-Kit, CD244, L-selectin/CD62L, CD11b, CD11c, CD68, 41BB, CTLA4, PD1, PD-L1, PD-L2, TIM-3, BTLA, VISTA, LAG-3, CD28, OX40, GITR, CD137, CD27, HVEM, CCR4, CD25, CD103, KIrg1, Nrp1, CD278, Gpr83, TIGIT, CD154, CD160, TNFR2, PVRIG, DNAM, and ICOS.

Immunotherapeutic agents that are approved or in late-stage clinical testing include, without limitation, ipilimumab, pembrolizumab, nivolumab, atezolizumab, avelumab, durvalumab, and the like. In certain embodiments, the agent that blocks the interaction between CD47 and SIRP$\alpha$ (such as a polypeptide described herein) is administered in combination with an inhibitor of the PD-L1/PD-1 pathway, e.g., an antibody, a small molecule, or polypeptide that blocks the interaction between PD-L1 and PD-1 (e.g., by binding to PD-1 or PD-L1). In some embodiments, the inhibitor of the PD-L1/PD-1 pathway is an antisense polynucleotide. In some embodiments, the inhibitor of the PD-L1/PD-1 pathway is an anti-PD-L1 or anti-PD-1 antagonist antibody (e.g., an anti-PD-1 or anti-PD-L1 antagonist antibody described elsewhere herein). As demonstrated herein, combined administration of an agent that blocks the interaction between CD47 and SIRP$\alpha$ (such as a polypeptide described herein) and an inhibitor of the PD-L1/PD-1 pathway can result in synergistic anti-tumor activity. In some embodiments, the immunotherapeutic agent is or comprises a vaccine, oncolytic virus, adoptive cell therapy, cytokine, or small molecule immunotherapeutic agent. Examples of such immunotherapeutic agents are known in the art. For example, adoptive cell therapies and therapeutics can include without limitation chimeric antigen receptor T-cell therapy (CAR-T), tumor infiltrating lymphocytes (TILs), TCR engineered T cells, TCR engineered NK cell, and macrophage cell products. Vaccines can include without limitation polynucleotide vaccines, polypeptide vaccines, or cell-based (e.g., tumor or dendritic cell-based) vaccines. Various cytokines useful for the treatment of cancer are known and include without limitation IL-2, IL-15, IL-7, IL-10, IL-12, IL21, TNFa, IFNs, GM-CSF, and engineered cytokine mutants. Small molecule immunotherapeutic agents can include without limitation IDO/TDO inhibitors, AhR inhibitors, arginase inhibitors, A2a R inhibitors, TLR agonists, STING agonists, and Rig-1 agonists.

In some embodiments where the agent that blocks the interaction between CD47 and SIRP$\alpha$ (such as a polypeptide described herein) and the chemotherapeutic agent (e.g., at least one chemotherapeutic agent) are administered in combination with further agent(s) described herein (e.g., therapeutic antibodies, small molecule inhibitors, immunotherapeutic agents, etc.), the further agent(s) are from different classes and/or exert their anti-cancer effects via different mechanisms of action. For example, in some embodiments, the method of treating cancer comprises administering an agent that blocks the interaction between CD47 and SIRP$\alpha$ (such as a polypeptide described herein) in combination with a chemotherapeutic agent (including, but not limited to those described herein) and a therapeutic antibody (including, but not limited to those described herein, e.g., an anti-HER2 antibody). In some embodiments, the agent that blocks the interaction between CD47 and SIRPα (such as a polypeptide described herein) is administered in combination with a chemotherapeutic agent (including, but not limited to those described herein) and a small molecule inhibitor (including, but not limited to those described herein). Other combinations are also contemplated.

In some embodiments, the agent that blocks the interaction between CD47 and SIRPα (such as a polypeptide described herein) is administered in combination with one or more agents including, without limitation, e.g., anti-diarrheal agents, anti-emetic agents, analgesics, opioids and/or non-steroidal anti-inflammatory agent.

Combination Therapies that Comprise Additional Mode(s) of Therapy

In some embodiments, the agent that blocks the interaction between CD47 and SIRPα (such as a polypeptide described herein) is administered in combination with at least one chemotherapy agent and one or more additional modes of therapy. In some embodiments, the one or more additional modes therapy comprises radiotherapy (e.g., gamma-rays, X-rays, and/or the directed delivery of radio-isotopes to tumor cells, microwaves, UV radiation, or gene therapy. For example, therapeutic genes for gene therapy include, but are not limited to, an antisense version of an inducer of cellular proliferation (oncogene), an inhibitor of cellular proliferation (tumor suppressor), or an inducer of programmed cell death (pro-apoptotic gene). In some embodiments, any one or more of the combination therapies described herein are administered in conjunction with a surgery (e.g., resection).

Exemplary Therapeutic Combinations

In some embodiments, the method of treating cancer comprises administering an agent that blocks the interaction between CD47 (e.g., hCD47) and SIRPα (e.g., hSIRPα) in combination with nivolumab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

In some embodiments, the method of treating cancer comprises administering an agent that blocks the interaction between CD47 (e.g., hCD47) and SIRPα (e.g., hSIRPα) in combination with pembrolizumab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

In some embodiments, the method of treating cancer comprises administering an agent that blocks the interaction between CD47 (e.g., hCD47) and SIRPα (e.g., hSIRPα) in combination with trastuzumab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

In some embodiments, the method of treating cancer comprises administering an agent that blocks the interaction between CD47 (e.g., hCD47) and SIRPα (e.g., hSIRPα) in combination with bevacizumab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

In some embodiments, the method of treating cancer comprises administering an agent that blocks the interaction between CD47 (e.g., hCD47) and SIRPα (e.g., hSIRPα) in combination with rituximab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

In some embodiments, the method of treating cancer comprises administering an agent that blocks the interaction between CD47 (e.g., hCD47) and SIRPα (e.g., hSIRPα) in combination with pertuzumab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

In some embodiments, the method of treating cancer comprises administering an agent that blocks the interaction between CD47 (e.g., hCD47) and SIRPα (e.g., hSIRPα) in combination with denosumab and one or agents selected from: lenalidomide, ibrutinib, palbociclib, enzalutamide, pemetrexed, nilotinib, abiraterone, imatinib, palbociclib, erlotinib, bortezomib, enzalutamide, cyclophosphamide, carboplatin, cisplatin, oxaliplatin, 5-fluorouracil, 6-mercaptopurine, cytarabine, gemcitabine, methotrexate, bleomycin, daunorubicin, doxorubicin, docetaxel, estramustine, paclitaxel, vinblastine, etoposide, irinotecan, teniposide, topotecan, prednisone, methylprednisolone, and dexamethasone. In some embodiments, the agent that blocks the interaction between CD47 and SIRPα is a polypeptide described herein (e.g., a fusion polypeptide comprising a SIRPα d1 domain variant and an Fc variant).

Exemplary Cancers

In some embodiments, the cancer treated by a method provided herein is breast cancer, lung cancer, adenocarcinoma of the lung, squamous cell lung cancer, small cell lung cancer (SCLC), non-small cell lung cancer (NSCLC), head and neck cancer, mesothelioma, brain cancer, brain tumor, abdominal cancer, colon cancer, colorectal cancer, esophageal cancer, parapharyngeal cancer, gastrointestinal cancer, glioma, liver cancer, gastric cancer, oral cancer, tongue cancer, neuroblastoma, osteosarcoma, ovarian cancer, renal cancer, urinary bladder cancer, urinary tract cancer, pancreatic cancer, retinoblastoma, cervical cancer, uterine cancer, Wilm's tumor, multiple myeloma, skin cancer, lymphoma, leukemia, blood cancer, thyroid cancer, bone cancer, adenocystic tumor, chondrosar-coma, pancreatic islet cell tumor, neuroendocrine tumor, prostate cancer, glioblastoma, endometrial carcinoma, endometrial cancer, leiomyosarcoma, gall bladder cancer, hepatocellular cancer, a melanoma, or a solid tumor.

In some embodiments, the cancer treated by a method provided herein is a hematological cancer. In some embodiments, the hematological cancer is multiple myeloma, or a leukemia, including, but not limited to, e.g., acute or chronic myelogenous leukemia acute or chronic lymphoblastic leukemia, acute lymphocytic leukemia (ALL) chronic lymphocytic leukemia (CLL), small lymphocytic lymphoma (SLL), acute myeloid leukemia (AML), myelodysplastic syndrome (MDS), chronic myeloid leukemia (CML), hairy cell leukemia, chronic myelomonocytic leukemia (CMML), Juvenile myelomonocytic leukemia (JMML), large granular lymphocytic (LGL) leukemia, plasmacytoma, blastic plasmacytoid dendritic cell neoplasm (BPDCN), B-cell prolymphocytic leukemia (B-PLL), T-cell prolymphocytic leukemia (T-PLL), multiple myeloma (MM), and Non-Hodgkin lymphomas (such as diffuse large B-cell lymphoma (DLBCL), Burkitt lymphoma, mantle cell lymphoma (MCL), peripheral T-cell lymphoma (PTCL), lymphoplasmacytic lymphoma, Waldenström macroglobulinemia, marginal zone lymphoma (MZL) and follicular lymphoma (FL).

Methods of Treating Leukemia

In some embodiments, provided is a method of treating leukemia (e.g., acute lymphoblastic leukemia (ALL), chronic lymphocytic leukemia (CLL), small lymphocytic lymphoma (SLL), acute myeloid leukemia (AML), myelodysplastic syndrome (MDS), chronic myeloid leukemia (CML), hairy cell leukemia, chronic myelomonocytic leukemia (CMML), Juvenile myelomonocytic leukemia (JMML), large granular lymphocytic (LGL) leukemia, blastic plasmacytoid dendritic cell neoplasm (BPDCN), B-cell prolymphocytic leukemia (B-PLL), T-cell prolymphocytic leukemia (T-PLL), multiple myeloma (MM), and Non-Hodgkin lymphomas (such as diffuse large B-cell lymphoma (DLBCL), Burkitt lymphoma, mantle cell lymphoma (MCL), peripheral T-cell lymphoma (PTCL), lymphoplasmacytic lymphoma, Waldenström macroglobulinemia, marginal zone lymphoma (MZL) and follicular lymphoma (FL)), in an individual (e.g., a human individual) that comprises administering to the individual an effective amount of (a) an agent that blocks the interaction between CD47 (e.g., hCD47) and SIRPα (e.g., hSIRPα) and (b) a Bcl2 inhibitor. In some embodiments, the Bcl2 inhibitor is venetoclax (also known as ABT-199), ABT-737, navitoclax (also known as ABT-263), BCL201, or AZD-0466. In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide) and the Bcl2 inhibitor (e.g., venetoclax) are administered simultaneously, concurrently, or sequentially.

Bcl2 inhibitors are a class of anticancer drugs that are believed to exert their cytotoxic effects by competing with proapoptotic Bcl2s to occupy BH3 docking grooves on the surfaces of antiapoptotic family members. By binding to one or more Bcl2 family members, these inhibitors induce apoptosis by mimicking the activity of natural antagonists of BCL-2 and other related proteins and restore apoptosis in tumor cells.

Venetoclax (also known as GDC-0199, ABT-199, and RG7601) is an exemplary selective Bcl2 inhibitor used in the methods described herein. Venetoclax is a light yellow to dark yellow solid with the empirical formula $C_{45}H_{50}ClN_7O_7S$ and a molecular weight of 868.44 g/mol. Venetoclax has very low aqueous solubility. Venetoclax is described chemically as 4-(4-{[2-(4-chlorophenyl)-4,4dimethylcyclohex-1-en-1-yl]methyl}piperazin-1-yl)-N-({3-nitro-4-[(tetrahydro-2H-pyran-4ylmethyl)amino]phenyl}sulfonyl)-2-(1H-pyrrolo[2,3-b]pyridin-5-yloxy)benzamide) and has the following chemical structure:

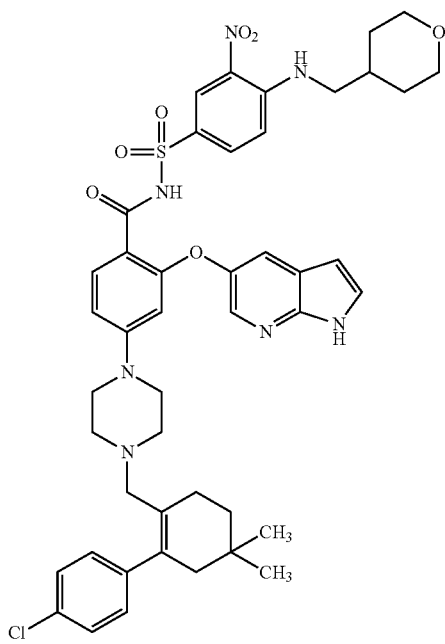 [SMILES: CC1(C)CCC(CN2CCN(c3ccc(C(=O)NS(=O)(=O)c4ccc(NCC5CCOCC5)c([N+](=O)[O-])c4)c(Oc4cnc5[nH]ccc5c4)c3)CC2)=C(c2ccc(Cl)cc2)C1]

The CAS Registry Number for venetoclax is 1257044-40-8. Venetoclax is administered orally and is sold under the trade names Venclexta and Venclyxto. Complete information about venetoclax preparation, dispensing, dosage, and administration schedule can be found in the local package insert (for the United States, see, e.g., www(dot)accessdata(dot)fda(dot)gov/drugsatfda_docs/label/2016/208573s000lbl(dot)pdf; for Europe, see, e.g., www(dot)ema(dot)europa(dot)eu/en/medicines/human/EPAR/venclyxto#product-information-section). In some embodiments, the venetoclax is administered in accordance with the dosing and frequency recommended in the local package insert.

ABT-737 is another exemplary selective Bcl2 inhibitor used in the methods described herein. ABT-737, which inhibits both Bcl2 and Bcl-xL, has the empirical formula $C_{42}H_{45}ClN_6O_5S_2$ and a molecular weight of 813.43 g/mol. The CAS Registry Number for ABT-737 is 852-808-04-9. ABT-737 is described chemically as 4-{4-[(4'-Chloro-2-biphenylyl)methyl]-1-piperazinyl}-N-[(4-{[(2R)-4-(dimethylamino)-1-(phenylsulfanyl)-2-butanyl]amino}-3-nitrophenyl)sulfonyl]benzamide and has the following chemical structure:

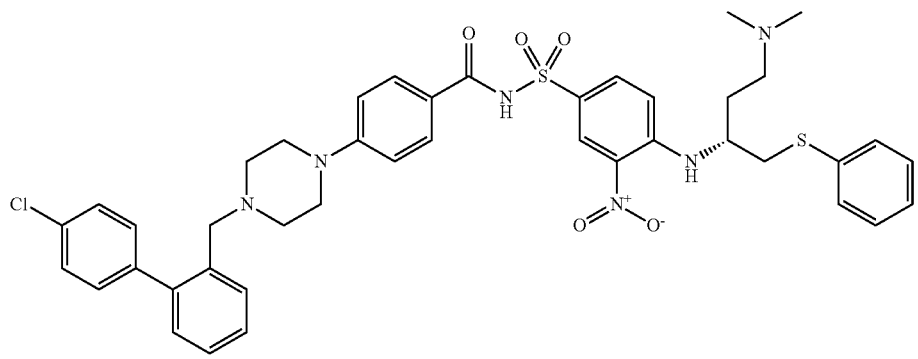 [SMILES: CN(C)CC[C@H](CSc1ccccc1)Nc1ccc(S(=O)(=O)NC(=O)c2ccc(N3CCN(Cc4ccccc4-c4ccc(Cl)cc4)CC3)cc2)cc1[N+](=O)[O-]]

Another exemplary selective Bcl2 inhibitor used in the methods described herein is navitoclax (also known as ABT-263). Navitoclax, which inhibits both Bcl2, Bcl-xL, and Bcl-w, has the empirical formula $C_{47}H_{55}ClF_3N_5O_6S_3$ and a molecular weight of 974.6 g/mol. The CAS Registry Number for navitoclax is 923564-51-6. ABT-737 is described chemically as 4-[4-[[2-(4-chlorophenyl)-5,5-dimethylcyclohexen-1-yl]methyl]piperazin-1-yl]-N-[4-[[(2R)-4-morpholin-4-yl-1-phenylsulfanylbutan-2-yl]amino]-3-(trifluoromethylsulfonyl) phenyl]sulfonylbenzamide and has the chemical structure provided below. Additional details regarding navitoclax are provided in, e.g., Tse et al. (2008) *Cancer Res.* 68(9): 3421-3429.

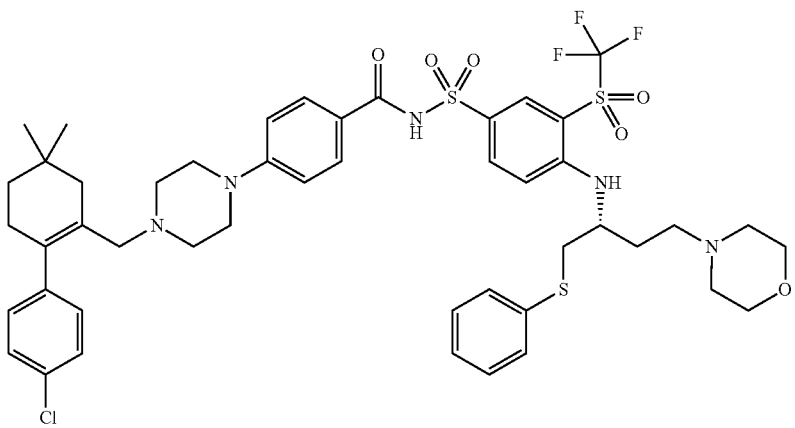 [SMILES: CC1(C)CCC(c2ccc(Cl)cc2)=C(CN2CCN(c3ccc(C(=O)NS(=O)(=O)c4ccc(N[C@H](CCN5CCOCC5)CSc5ccccc5)c(S(=O)(=O)C(F)(F)F)c4)cc3)CC2)C1]

Another exemplary selective Bcl2 inhibitor used in the methods described herein is S55746 (also known as BCL201 and Servier-1). S55746 occupies the hydrophobic groove of BCL-2. Its selectivity profile demonstrates no significant binding to MCL-1, BFL-1 S55746 occupies the hydrophobic groove of BCL-2. Its selectivity profile demonstrates no significant binding to MCL-1, BFL-1 (BCL2A1/A1) and poor affinity for BCL-XL. S55746 has no cytotoxic activity on BCL-XL-dependent cells, such as platelets (see, e.g., Casara et al. (2008) Oncotarget. 9(28): 29975-20088). S55746 has the empirical formula $C_{43}H_{42}N_4O_6$ and a molecular weight of 710.82 g/mol. The CAS Registry Number for S55746 is 1448584-12-0. S55746 is described chemically as (S)—N-(4-hydroxyphenyl)-3-(6-(3-(morpholinomethyl)-1,2,3,4-tetrahydroisoquinoline-2-carbonyl)benzo[d][1,3]dioxol-5-yl)-N-phenyl-5,6,7,8-tetrahydroindolizine-1-carboxamide and has the following chemical structure:

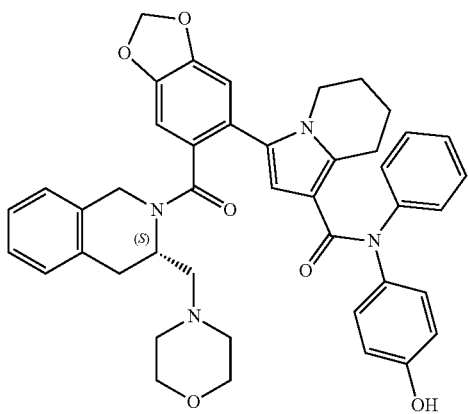

Methods of Treating Solid Tumor

In some embodiments, provided is a method of treating solid tumor in an individual (e.g., a human individual) that comprises administering to the individual an effective amount of (a) an agent that blocks the interaction between CD47 (e.g., hCD47) and SIRPα (e.g., hSIRPα) and (b) a platinum-based chemotherapy agent. In some embodiments, the solid tumor is colon cancer (e.g., colon carcinoma), lung cancer, head and neck cancer, esophageal cancer, breast cancer, bladder cancer, ovarian cancer, cervical cancer, testicular cancer, brain tumor, mesothelioma, or neuroblastoma. In some embodiments, the platinum-based chemotherapy agent is carboplatin, cisplatin, oxaliplatin, nedaplatin, triplatin tetranitrate, phenanthriplatin, picoplatin, and/or satraplatin. In some embodiments, the platinum-based chemotherapy agent is cisplatin. In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide) and the platinum-based chemotherapy agent (e.g., cisplatin) are administered simultaneously, concurrently, or sequentially.

Platinum agents (such as carboplatin, cisplatin, oxaliplatin, nedaplatin, triplatin tetranitrate, phenanthriplatin, picoplatin, and satraplatin) are widely used antitumor drugs that cause crosslinking of DNA as monoadduct, interstrand crosslinks, intrastrand crosslinks or DNA protein crosslinks. Platinum agents typically act on the adjacent N-7 position of guanine, forming a 1, 2 intrastrand crosslink (Poklar et al. (1996). Proc. Natl. Acad. Sci. U.S.A. 93 (15): 7606-11; Rudd et al. (1995). Cancer Chemother. Pharmacol. 35 (4): 323-6). The resultant crosslinking inhibits DNA repair and/or DNA synthesis in cancer cells.

Cisplatin is an exemplary platinum coordination compound used in the methods described herein. The chemical name for cisplatin is dichloroplatinum diammoniate, and cisplatin has the following structural formula:

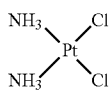

Cisplatin is an inorganic and water-soluble platinum complex with the molecular formula of $Pt(NH_3)_2Cl_2$ and a molecular weight of 300.046. After undergoing hydrolysis, it reacts with DNA to produce both intra and interstrand crosslinks. These crosslinks appear to impair replication and transcription of DNA. The cytotoxicity of cisplatin correlates with cellular arrest in the G2 phase of the cell cycle. Cisplatin, which has been assigned the CAS Registry No. 15663-27-1, is commercially available as PLATINOL®, PLATINOL®-AQ, CDDP, CISPLAN, CISPLAT, PLATIKEM, PLATIONCO, PRACTICIS, PLATICIS, BLASTOLEM, CISMAX, CISPLAN, CISPLATINUM, CISTEEN, DUPLAT, KEMOPLAT, ONCOPLATIN-AQ, PLATINEX, PLATIN, TEVAPLATIN, and others. Complete information about cisplatin preparation, dispensing, dosage, and administration schedule can be found in local package insert (for the United States, see, e.g., www(dot)accessdata(dot)fda(dot)gov/drugsatfda_docs/label/2011/018057s080lbl(dot)pdf and www(dot)accessdata(dot)fda(dot)gov/drugsatfda_docs/label/2015/018057s083lbl(dot)pdf). In some embodiments, the cisplatin is administered in accordance with the dosing and frequency recommended in the local package insert.

Carboplatin is another exemplary platinum coordination compound used in the methods described herein. The chemical name for carboplatin is platinum, diammine [1,1cyclobutane-dicarboxylato(2-)-0,0]-, (SP-4-2), and carboplatin has the following structural formula:

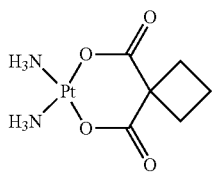

Carboplatin is a water-soluble platinum complex with the molecular formula of C6H12N2O4Pt and a molecular weight of 373.26. Carboplatin has been assigned the CAS Registration Number 41575-94-4, and its mechanism of action is similar to that of cisplatin. Carboplatin is typically prescribed more commonly than cisplatin. Carboplatin is commercially available as PARAPLATIN®, BLASTOCARB®, BLASTOPLATIN®, CARBOKEM®, CARBOMAX®, PARAPLATIN®, CARBOPA®, KARPLAT®, and others. Complete information about carboplatin preparation, dispensing, dosage, and administration schedule can be found in local package insert (for the United States, see, e.g., www(dot)accessdata(dot)fda(dot)gov/drugsatfda_docs/label/2010/020452s005lbl(dot)pdf and www(dot)accessdata.fda(dot)gov/drugsatfda_docs/label/2012/077139Orig1s016lbl(dot)pdf). In some embodiments, the carboplatin is administered in accordance with the dosing and frequency recommended in the local package insert.

In some embodiments, provided is a method of treating solid tumor in an individual (e.g., a human individual) that comprises administering to the individual an effective amount of (a) an agent that blocks the interaction between CD47 (e.g., hCD47) and SIRPα (e.g., hSIRPα), (b) an anti-HER 2 antibody, and (c) an anti-PDL1 antibody. In some embodiments the anti-HER2 antibody is trastuzumab (CAS Registry No. 180288-69-1). In some embodiments the anti-PDL1 antibody is atezolizumab (CAS Registry No. 1380723-44-3), avelumab (CAS Registry No. 1537032-82-8), or durvalumab (CAS Registry No. 1428935-60-7). In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide), the anti-HER2 antibody, the anti-PD-L1 antibody (e.g., an anti PD-L1 antagonist antibody) are administered simultaneously, concurrently, or sequentially. In some embodiments, the solid tumor is colon cancer, lung cancer, head and neck cancer, esophageal cancer, breast cancer, bladder cancer, ovarian cancer, cervical cancer, testicular cancer, endometrial cancer, liver cancer, gastric cancer, gastroesophageal junction cancer, brain tumor, mesothelioma, or neuroblastoma. In some embodiments, the solid tumor is $HER2^+$ solid tumor. In some embodiments, the solid tumor is colon cancer (e.g., $HER2^+$ colon cancer).

Methods of Treating Gastric or Gastroesophageal Junction (GEJ) Cancer

In some embodiments, provided is a method of treating gastric cancer or gastroesophageal junction (GEJ) cancer in an individual (e.g., a human individual) that comprises administering to the individual an effective amount of (a) an agent that blocks the interaction between CD47 (e.g., hCD47) and SIRPα (e.g., hSIRPα), (b) an anti-HER 2 antibody, (c) an anti-VEGFR2 antibody, and (d) paclitaxel. In some embodiments the anti-HER2 antibody is trastuzumab (CAS Registry No. 180288-69-1). In some embodiments the anti-VEGFR2 antibody is ramucirumab (CAS Registry No. 947687-13-0). In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4

Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide), the anti-HER2 antibody, the anti-VEGFR2 antibody, and the paclitaxel are administered simultaneously, concurrently, or sequentially. In some embodiments, the polypeptide (e.g. fusion polypeptide) is administered to the individual at a dose of 10 mg/kg once a week or 15 mg/kg once a week. In some embodiments, the individual receiving treatment has gastric or GEJ adenocarcinoma. In some embodiments, the individual receiving treatment has HER2$^+$ gastric cancer or HER2$^+$ GEJ cancer (e.g., a HER2-overexpressing gastric or GEJ cancer). In some embodiments, the HER2$^+$ gastric cancer or HER2$^+$ GEJ cancer is advanced and/or metastatic. In some embodiments, the individual receiving treatment has gastric or GEJ cancer that has progressed during or after prior treatment(s) comprising anti-HER2 antibody (e.g., trastuzumab). In some embodiments, the individual receiving treatment has gastric or GEJ cancer that has progressed during or after prior treatment(s) comprising anti-HER2 antibody (e.g., trastuzumab) and a fluoropyrimidine. In some embodiments, the individual receiving treatment has gastric or GEJ cancer that has progressed during or after prior treatments(s) comprising anti-HER2 antibody (e.g., trastuzumab) and a platinum-based chemotherapeutic agent. In some embodiments, the individual receiving treatment has gastric or GEJ cancer (e.g., HER2$^+$ gastric cancer or GEJ cancer) that has progressed during or after prior treatment(s) comprising anti-HER2 antibody (e.g., trastuzumab) and/or a fluoropyrimidine, and/or a platinum-based chemotherapeutic agent. In some embodiments, the individual failed (e.g., relapsed after or did not respond to) prior therapy with an anti-HER2 antibody, with an anti-HER2 antibody and a fluoropyrimidine, or with an anti-HER2 antibody and a platinum-based chemotherapy agent. In some embodiments, the fluoropyrimidine was fluorouracil (also known as 5-fluorouracil). In some embodiments, treatment with the polypeptide, the anti-HER2 antibody, the anti-VEGFR2 antibody, and the paclitaxel does not result in adverse effects. In some embodiments, treatment with the polypeptide, the anti-HER2 antibody, the anti-VEGFR2 antibody, and the paclitaxel results in only low grade adverse effects.

In some embodiments, provided is a method of treating gastric cancer or gastroesophageal junction (GEJ) cancer in an individual (e.g., a human individual) that comprises administering to the individual an effective amount of (a) an agent that blocks the interaction between CD47 (e.g., hCD47) and SIRPα (e.g., hSIRPα), (b) an anti-PD-1 antibody (e.g., an anti-PD-1 antagonist antibody), (c) an anti-HER2 antibody, (d) 5-fluorouracil and (e) a platinum-based chemotherapeutic agent. In some embodiments, provided is a method of treating gastric cancer or gastroesophageal junction (GEJ) cancer in an individual (e.g., a human individual) that comprises administering to the individual an effective amount of (a) an agent that blocks the interaction between CD47 (e.g., hCD47) and SIRPα (e.g., hSIRPα), (b) an anti-PD-1 antibody (e.g., an anti-PD-1 antagonist antibody), (c) an anti-HER2 antibody, (d) capecitabine, and (e) a platinum-based chemotherapeutic agent. In some embodiments the anti-PD-1 antibody is pembrolizumab (CAS Registry No. 1374853-91-4). In some embodiments the anti-HER2 antibody is trastuzumab (CAS Registry No. 180288-69-1). In some embodiments, the platinum-based chemotherapeutic agent is cisplatin. In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide), the anti-PD-1 antibody, the anti-HER2 antibody, the 5-fluorouracil, and the platinum-based chemotherapeutic agent are administered simultaneously, concurrently, or sequentially. In some embodiments, the polypeptide (e.g., fusion polypeptide), the anti-PD-1 antibody, the anti-HER2 antibody, the capecitabine, and the platinum-based chemotherapeutic agent are administered simultaneously, concurrently, or sequentially. In some embodiments, the individual receiving treatment has HER2-overexpressing gastric cancer or HER2-overexpressing GEJ cancer. In some embodiments, the gastric cancer or the GEJ cancer is advanced and/or metastatic. In some embodiments, the individual has not received prior treatment for gastric cancer or the GEJ cancer.

Methods of Treating Head and Neck Cancer

In some embodiments, provided is a method of treating head and neck cancer (e.g., head and neck cancer squamous cell carcinoma or HNSCC) in an individual (e.g., a human individual) that comprises administering to the individual an effective amount of (a) an agent that blocks the interaction between CD47 (e.g., hCD47) and SIRPα (e.g., hSIRPα), (b) a PD-1 inhibitor, (c) an antimetabolite, and (d) a platinum-based agent. In some embodiments, the PD-1 inhibitor is a small molecule inhibitor, an antisense nucleotide, or a peptide. In some embodiments, the PD-1 inhibitor is an anti-PD-1 antibody. In some embodiments, the anti-PD-1 antibody is pembrolizumab, nivolumab, pidilizumab, cemiplimab, or BMS-936559. In some embodiments, the anti-PD-1 antibody is pembrolizumab (CAS Registry No. 1374853-91-4). In some embodiments, the antimetabolite is 5-fluorouracil, 6-mercaptopurine, capecitabine, cytarabine, floxuridine, fludarabine, gemcitabine, hydroxycarbamide, methotrexate, pemetrexed, phototrexate. In some embodiments, the antimetabolite is 5-fluorouracil. In some embodiments, the platinum-based chemotherapy agent is carboplatin, cisplatin, oxaliplatin, nedaplatin, triplatin tetranitrate, phenanthriplatin, picoplatin, or satraplatin. In some embodiments, the platinum-based chemotherapy agent is cisplatin or carboplatin. In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide), the PD-1 inhibitor (e.g., an anti-PD-1 antibody, e.g., pembrolizumab), the antimetabolite (e.g., 5-fluorouracil), and the platinum-based chemotherapeutic agent (e.g., cisplatin or carboplatin) are administered simultaneously, concurrently, or sequentially. In some embodiments, the polypeptide (e.g. fusion polypeptide) is administered to the individual at a dose of 10 mg/kg once a week or 15 mg/kg once a week. In some embodiments, the individual receiving treatment has HNSCC. In some embodiments, the HNSCC is advanced and/or metastatic HNSCC. In some embodiments, the HNSCC is unresectable and/or recurrent. In some embodiments, the individual has not received prior treatment for head and neck cancer (e.g., HNSCC). In some embodiments, treatment with the polypeptide, the PD-1 inhibitor (e.g., pembrolizumab), the antimetabolite (e.g., 5-fluorouracil), and the platinum-based chemotherapeutic agent (e.g., cisplatin or carboplatin) does not result in adverse effects. In some embodiments treatment with the polypeptide, the PD-1 inhibitor (e.g., pembrolizumab), the antimetabolite (e.g., 5-fluorouracil), and the platinum-based chemotherapeutic agent (e.g., cisplatin or carboplatin) results in only low grade adverse effects.

Combination Cancer Therapies Comprising an anti-TROP2 Antibody

In some embodiments, provided is a method of treating cancer in an individual (e.g., a human individual) that comprises administering to the individual an effective amount of (a) an agent that blocks the interaction between CD47 (e.g., hCD47) and SIRPα (e.g., hSIRPα) and (b) an anti-TROP2 antibody. In some embodiments, the anti-TROP2 antibody is RS7, which is described in U.S. Pat. No. 10,179,171, the contents of which are incorporated herein in their entirety. In some embodiments, the anti-TROP2 antibody is conjugated to a drug (i.e., an antibody-drug conjugate or "ADC"). In some embodiments, the anti-TROP2 ADC is Sacituzumab govitecan (also known as hRS7-SN38 or IMMU-132), which is described in US 2017/0281791, the contents of which are incorporated herein by reference in their entirety. In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the polypeptide (e.g., fusion polypeptide), and the anti-TROP2 antibody are administered simultaneously, concurrently, or sequentially. In some embodiments, the cancer is solid tumor, gastric cancer, nasopharyngeal cancer, gallbladder cancer, cervical cancer, extranodal NK/T cell lymphoma, lung cancer, laryngeal squamous cell cancer, colon cancer, Hilar Cholangiocarcinoma, pancreatic cancer, squamous cell carcinoma of the oral cavity, endometrioid endometrial carcinoma, or ovarian carcinoma. In some embodiments, the cancer is characterized by the overexpression of TROP2. In some embodiments, the cancer is not characterized by the overexpression of TROP2.

Methods of Increasing Phagocytosis of a Target Cell

In some embodiments, provided is a method of increasing phagocytosis of a target cell (e.g., a cancer cell) that comprises contacting the target cell with (a) an agent that blocks the interaction between CD47 (e.g., hCD47) and SIRPα (e.g., hSIRPα) and (b) an anti-TROP2 antibody. In some embodiments, the anti-TROP2 antibody is RS7, which is described in U.S. Pat. No. 10,179,171, the contents of which are incorporated herein in their entirety. In some embodiments, the anti-TROP2 antibody is conjugated to a drug (i.e., an antibody-drug conjugate or "ADC"). In some embodiments, the anti-TROP2 ADC is Sacituzumab govitecan (also known as hRS7-SN38 or IIVIMU-132), which is described in US 2017/0281791, the contents of which are incorporated herein by reference in their entirety. In some embodiments, the agent is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the target cell is a cancer cell. In some embodiments, the cancer cell is a solid tumor cell, a gastric cancer cell, a nasopharyngeal cancer cell, a gallbladder cancer cell, a cervical cancer cell, an extranodal NK/T cell lymphoma cell, a lung cancer cell, a laryngeal squamous cell cancer cell, a colon cancer cell, a Hilar Cholangiocarcinoma cell, a pancreatic cancer cell, a squamous cell carcinoma cell of the oral cavity, an endometrioid endometrial carcinoma cell, or an ovarian carcinoma cell.

In some embodiments, provided is a method of increasing phagocytosis of a target cell comprising contacting the target cell with (a) an agent that blocks the interaction between CD47 (e.g., hCD47) and SIRPα (e.g., hSIRPα) and (b) a second agent that is capable of enhancing phagocytosis. In some embodiments, the agent that blocks the interaction between CD47 and SIRPα is a polypeptide (e.g., fusion polypeptide) comprising a SIRPα D1 domain variant (e.g., a SIRPα D1 domain variant described herein) and an Fc domain variant (e.g., an Fc domain variant described herein). In some embodiments, the polypeptide (e.g., fusion polypeptide) comprises a SIRPα D1 domain variant that comprises the amino acid sequence of SEQ ID NO: 81 or SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the polypeptide (e.g., fusion polypeptide) administered to the individual comprises the amino acid sequence of SEQ ID NO: 136 or SEQ ID NO: 135. In some embodiments, the polypeptide (e.g., fusion polypeptide) forms a homodimer. In some embodiments, the second agent enhances phagocytosis, e.g., by blocking "don't eat me" signals. Exemplary agents include, but are not limited to, e.g., an anti-LILRB2 antibody, an anti-LILRB1 antibody, an anti-SIGLEC-10 antibody, an anti-CD24 antibody, an anti-SIRPα antibody, an anti-PD1 antibody (e.g., an anti PD1 antagonist antibody), and an anti-PD-L1 antibody (e.g., an anti PD-L1 antagonist antibody). In some embodiments, the second agent enhances phagocytosis, e.g., by enhancing "eat me" signals. Exemplary agents include, but are not limited to, e.g., BTK activators, TLR agonists, agents that promote the interaction between Mac-1 and SLAMF7, and agents that agents that promote the interaction between calreticulin and LRP1. Additional exemplary agents that enhance phagocytosis include, but are not limited to, e.g., agents that modulate podosome adhesions, agents that modulate the expression level of lamin A, activators of the SHP-1 phosphatase activity, and activators of myosin IIa assembly. In some embodiments, the method comprises contacting the target cell with (a) the polypeptide (e.g., fusion polypeptide) comprising a SIRPα D1 domain variant (e.g., a SIRPα D1 domain variant described herein) and an Fc domain variant (e.g., an Fc domain variant described herein) and (b) and an anti-LILBR2 antibody, an anti-CD24 antibody, or an anti-SIGLEC-10 antibody. In some embodiments, the method comprise contacting the target cell with (a) the fusion polypeptide and (b) a BTK activator. In some embodiments, the method comprises contacting the target cell with (a) the fusion polypeptide and (b) a TLR agonist.

In some embodiments, the method comprises contacting the target cell with (a) the polypeptide (e.g., fusion polypeptide) comprising a SIRPα D1 domain variant (e.g., a SIRPα D1 domain variant described herein) and an Fc domain variant (e.g., an Fc domain variant described herein) and (b) two or more agents that are capable of enhancing phagocytosis (e.g., including, but not limited to, two or more agents described herein). In some embodiments, the method comprises contacting the target cell with (a) the polypeptide (e.g., fusion polypeptide) comprising a SIRPα D1 domain variant (e.g., a SIRPα D1 domain variant described herein) and an Fc domain variant (e.g., an Fc domain variant described herein), (b) and an anti-LILBR2 antibody, an anti-CD24 antibody, or an anti-SIGLEC-10 antibody, and (c) an anti-PD1 antibody (e.g., an anti-PD-1 antagonist antibody) or an anti-PD-L1 antibody (e.g., an anti-PD-L1 antagonist antibody). In some embodiments, the method comprises contacting the target cell with (a) the fusion polypeptide, (b) an anti-LILBR2 antibody, and (c) an anti-PD1 antibody (e.g., anti-PD-1 antagonist antibody). In some embodiments, the method comprises contacting the target cell with (a) the fusion polypeptide, (b) an anti-LILBR2 antibody, and (c) an anti-PD-L1 antibody (e.g. an anti-PD-L1 antagonist antibody).

In some embodiments, the contacting is performed in vitro. In some embodiments, the contacting is performed in vivo. In some embodiments, the target cell is a cancer cell. In some embodiments, contacting the target cell with (a) the polypeptide comprising a SIRPα D1 domain variant (e.g., a SIRPα D1 domain variant described herein) and an Fc domain variant (e.g., an Fc domain variant described herein) and (b) one or more agents that are capable of enhancing phagocytosis increases phagocytosis of target cells by at least any one of 5%, 10%, 15%, 20%, 25%, 30%, 35%, 40%, 45%, 50%, 55%, 60%, 65%, 70%, 75%, 80%, 85%, 90%, 95%, 99%, or more than 99% as compared contacting the target cell with one or more agents that are capable of enhancing phagocytosis (i.e., in the absence of the polypeptide comprising a SIRPα D1 domain variant (e.g., a SIRPα D1 domain variant described herein) and an Fc domain variant (e.g., an Fc domain variant described herein)).

Kits and Articles of Manufacture

In another embodiment of the invention, an article of manufacture or a kit is provided comprising a polypeptide (e.g., a fusion polypeptide described herein) comprising a SIRPα D1 domain variant and an Fc domain variant. In some embodiments, the SIRPα D1 domain variant comprises the amino acid sequence selected from the group consisting of: SEQ ID NO: 81 and SEQ ID NO: 85. In some embodiments, the Fc domain variant is (i) a human IgG1 Fc region comprising L234A, L235A, G237A, and N297A mutations, wherein numbering is according to the EU index of Kabat; (ii) a human IgG2 Fc region comprising A330S, P331S, and N297A mutations, wherein numbering is according to the EU index of Kabat; (iii) a human IgG4 Fc region comprising S228P, E233P, F234V, L235A, and delG236 mutations, wherein numbering is according to the EU index of Kabat; or (iv) a human IgG4 Fc region comprising S228P, E233P, F234V, L235A, delG236, and N297A mutations, wherein numbering is according to the EU index of Kabat. In some embodiments, the Fc domain variant comprises the amino acid sequence of SEQ ID NO: 91. In some embodiments the polypeptide comprises the amino acid sequence of SEQ ID NO: 135 or SEQ ID NO:

136. In some embodiments, the kit or article of manufacture is for use according to a method of treatment provided herein.

In some embodiments, the kit or article of manufacture further comprises a BCL2 inhibitor. In some embodiments, the BCL2 inhibitor is venetoclax. In some embodiments, the kit comprises a package insert or label with instructions for using the polypeptide (e.g., fusion polypeptide) in combination with the BCL2 inhibitor (e.g., venetoclax) to treat or delay progression of cancer (e.g., leukemia, including, but not limited to acute or chronic lymphoblastic leukemia, acute lymphocytic leukemia (ALL), chronic lymphocytic leukemia (CLL), small lymphocytic lymphoma (SLL), acute myeloid leukemia (AML), myelodysplastic syndrome (MDS), chronic myeloid leukemia (CML), hairy cell leukemia, Chronic myelomonocytic leukemia (CMML), Juvenile myelomonocytic leukemia (JMML), Large granular lymphocytic (LGL) leukemia, blastic plasmacytoid dendritic cell neoplasm (BPDCN), B-cell prolymphocytic leukemia (B-PLL), T-cell prolymphocytic leukemia (T-PLL), Multiple Myeloma (MM), and Non-Hodgkin Lymphomas (such as diffuse large B-cell lymphoma (DLBCL), Burkitt lymphoma, mantle cell lymphoma (MCL), Peripheral T-cell lymphoma (PTCL), Lymphoplasmacytic lymphoma, Waldenström macroglobulinemia, marginal zone lymphoma (MZL) and follicular lymphoma (FL)) in an individual (such as a human individual).

In some embodiments, the kit or article of manufacture further comprises a platinum-based chemotherapy agent. In some embodiments, the platinum-based chemotherapy agent is carboplatin, cisplatin, oxaliplatin, nedaplatin, triplatin tetranitrate, phenanthriplatin, picoplatin, or satraplatin. In some embodiments, the kit comprises a package insert or label with instructions for using the polypeptide (e.g., fusion polypeptide) in combination with the platinum-based chemotherapy agent (e.g., cisplatin) to treat or delay progression of solid tumor (e.g., colon cancer, colon carcinoma, lung cancer, head and neck cancer, esophageal cancer, breast cancer, bladder cancer, ovarian cancer, cervical cancer, testicular cancer, endometrial cancer, liver cancer, gastric cancer, brain tumor, mesothelioma, or neuroblastoma) in an individual (such as a human individual).

In some embodiments, the kit or article of manufacture further comprises an anti-HER2 antibody (e.g., trastuzumab), and a PD-L1 inhibitor (e.g., an anti-PD-L1 antibody such as atezolizumab, avelumab, or durvalumab. In some embodiments, the kit comprises a package insert or label with instructions for using the polypeptide (e.g., fusion polypeptide) in combination with the anti-HER2 antibody (e.g., trastuzumab), the PD-L1 inhibitor (e.g., atezolizumab, avelumab, or durvalumab) to treat or delay progression of cancer (e.g., solid tumor) in an individual (such as a human individual). In some embodiments, the cancer (e.g., solid tumor) is colon cancer, lung cancer, head and neck cancer, esophageal cancer, breast cancer, bladder cancer, ovarian cancer, cervical cancer, testicular cancer, endometrial cancer, liver cancer, gastric cancer, gastroesophageal junction cancer, brain tumor, mesothelioma, or neuroblastoma. In some embodiments, the cancer (e.g., solid tumor) is HER2$^+$ cancer. In some embodiments, the cancer is colon cancer (e.g., HER2$^+$ colon cancer).

In some embodiments, the kit or article of manufacture further comprises an anti-HER2 antibody (e.g., trastuzumab), an anti-VEGFR2 antibody (e.g., ramucirumab), and paclitaxel. In some embodiments, the kit comprises a package insert or label with instructions for using the polypeptide (e.g., fusion polypeptide) in combination with the anti-HER2 antibody (e.g., trastuzumab), the anti-VEGFR2 antibody (e.g., ramucirumab), and the paclitaxel to treat or delay progression of gastric cancer or gastroesophageal junction (GEJ) cancer in an individual (such as a human individual), e.g., according to a method described herein.

In some embodiments, the kit or article of manufacture further comprises an anti-HER2 antibody (e.g., trastuzumab), a PD-1 inhibitor (e.g., an anti-PD-1 antibody such as pembrolizumab), 5-fluorouracil, and a platinum-based agent (e.g., cisplatin or carboplatin). In some embodiments, the kit comprises a package insert or label with instructions for using the polypeptide (e.g., fusion polypeptide) in combination with the anti-HER2 antibody (e.g., trastuzumab), the PD-1 inhibitor (e.g., pembrolizumab), the 5-fluorouracil, and the platinum-based agent (e.g., cisplatin or carboplatin) to treat or delay progression of gastric cancer or gastroesophageal junction (GEJ) cancer in an individual (such as a human individual). In some embodiments, the kit or article of manufacture further comprises an anti-HER2 antibody (e.g., trastuzumab), a PD-1 inhibitor (e.g., an anti-PD-1 antibody such as pembrolizumab), capecitabine, and a platinum-based agent (e.g., cisplatin or carboplatin). In some embodiments, the kit comprises a package insert or label with instructions for using the polypeptide (e.g., fusion polypeptide) in combination with the anti-HER2 antibody (e.g., trastuzumab), the PD-1 inhibitor (e.g., pembrolizumab), the capecitabine, and the platinum-based agent (e.g., cisplatin or carboplatin) to treat or delay progression of gastric cancer or gastroesophageal junction (GEJ) cancer in an individual (such as a human individual).

In some embodiments, the kit or article of manufacture further comprises a PD-1 inhibitor (e.g., an anti-PD-1 antibody such as pembrolizumab, nivolumab, pidilizumab, cemiplimab, or BMS936559), an antimetabolite (e.g., 5-fluorouracil, 6-mercaptopurine, capecitabine, cytarabine, floxuridine, fludarabine, gemcitabine, hydroxycarbamide, methotrexate, pemetrexed, phototrexate) and a platinum-based agent (e.g., cisplatin, carboplatin, oxaliplatin, nedaplatin, triplatin tetranitrate, phenanthriplatin, picoplatin, or satraplatin). In some embodiments, the kit comprises a package insert or label with instructions for using the polypeptide (e.g., fusion polypeptide) in combination with the PD-1 inhibitor (e.g., pembrolizumab, nivolumab, pidilizumab, cemiplimab, or BMS936559), the antimetabolite (e.g., 5-fluorouracil, 6-mercaptopurine, capecitabine, cytarabine, floxuridine, fludarabine, gemcitabine, hydroxycarbamide, methotrexate, pemetrexed, phototrexate), and the platinum-based agent (e.g., cisplatin, carboplatin, oxaliplatin, nedaplatin, triplatin tetranitrate, phenanthriplatin, picoplatin, or satraplatin) to treat or delay progression of head and neck cancer (e.g., head and neck squamous cell carcinoma) in an individual (such as a human individual), e.g., according to a method provided herein.

In some embodiments, the kit or article of manufacture further comprises a therapeutic anti-TROP2 antibody. In some embodiments, the anti-TROP2 antibody is RS7 (see, e.g., U.S. Pat. No. 10,179,171) or sacituzumab govitecan. In some embodiments, the kit comprises a package insert or label with instructions for using the polypeptide (e.g., fusion polypeptide) in combination with anti-TROP2 antibody (e.g., cisplatin) to treat or delay progression of a TROP2$^+$ cancer (e.g., solid tumor, gastric cancer, nasopharyngeal cancer, gallbladder cancer, cervical cancer, extranodal NK/T cell lymphoma, lung cancer, laryngeal squamous cell cancer, colon cancer, Hilar Cholangiocarcinoma, pancreatic cancer, squamous cell carcinoma of the oral cavity, endometrioid endometrial carcinoma, or ovarian carcinoma) in an individual (such as a human individual).

In some embodiments, the polypeptide (e.g., fusion polypeptide) and the one or more additional anti-cancer agents (e.g., as outlined in the embodiments above) are provided together in the kit. In some embodiments, the polypeptide (e.g., fusion polypeptide) and the one or more additional anti-cancer agents are provided in the same container or separate containers. Suitable containers include, for example, bottles, vials, bags and syringes. The container may be formed from a variety of materials such as glass, plastic (such as polyvinyl chloride or polyolefin), or metal alloy (such as stainless steel or hastelloy). In some embodiments, the container holds the formulation and the label on, or associated with, the container may indicate directions for use. The article of manufacture or kit may further include other materials desirable from a commercial and user standpoint, including other buffers, diluents, filters, needles, syringes, and package inserts with instructions for use. In some embodiments, the article of manufacture further includes one or more of another agent (e.g., a chemotherapeutic agent, an anti-neoplastic agent, a therapeutic antibody, etc.). Suitable containers for the one or more agents include, for example, bottles, vials, bags and syringes.

The specification is considered to be sufficient to enable one skilled in the art to practice the invention. Various modifications of the invention in addition to those shown and described herein will become apparent to those skilled in the art from the foregoing description and fall within the scope of the appended claims. All publications, patents, and patent applications cited herein are hereby incorporated by reference in their entirety for all purposes.

EXAMPLES

The present disclosure will be more fully understood by reference to the following examples. The examples should not, however, be construed as limiting the scope of the present disclosure. It is understood that the examples and embodiments described herein are for illustrative purposes only and that various modifications or changes in light thereof will be suggested to persons skilled in the art and are to be included within the spirit and purview of this application and scope of the appended claims Example 1A: Anti-Tumor Activity of Drug A in Combination with Venetoclax in an Acute Leukemia Model In this Example, the anti-tumor activity of Drug A, i.e., an exemplary polypeptide comprising a SIRPα d1 domain variant and an Fc variant, in combination with venetoclax was assessed in a RS4;11 xenograft model.

Materials and Methods

RS4;11 Xenograft Model

The RS4;11 cells (described in Stong et al. (1985) *Blood.* 65(1): 21-31) was injected into the right flank of NOD-SCID female mice at a concentration of $5 \times 10^6$ cells per mouse using a 1:1 matrigel (Corning) and RPMI 1640 ratio. Tumors were monitored until the average size of all tumors reached 190 mm³. Mice were randomized into PBS control, Venetoclax (Selleckchem), Drug A, and Venetoclax/Drug A combination cohorts, with 10 mice per cohort. The formulation for Venetoclax was a ratio of DMSO:ethanol:Cremophor EL:dextrose 5% in water (D5W) was 2.5:5:10:20:67.5, by volume. Venetoclax-treated mice were dosed with 250 µg of Venetoclax by oral gavage 2 times total, 3 days apart. Drug A-treated mice were dosed IP at 10 mg/kg, 4 times total, 3-4 days apart. Venetoclax/Drug A-treated mice were dosed with 250 µg of Venetoclax by oral gavage 2 times total, 3 days apart, and with Drug A 1 day post Venetoclax dosage at 10 mg/kg, 4 times total, 3-4 days apart. Tumors were measured in two dimensions with calipers, and tumor volume was calculated as: length×width×width×0.5, where length was the larger of the two measurements.

Results

Single agent venetoclax inhibited tumor growth (see FIG. 1A), whereas single agent Drug A did not have an appreciable effect on tumor growth. The combination of venetoclax and Drug A inhibited tumor growth to a greater degree than venetoclax alone (see FIG. 1A). On day 41, 1 out of 10 of the mice treated with Venetoclax only was tumor-free ("TF"), whereas 6 out of 10 mice treated with the Venetoclax/Drug A combination were TF (FIG. 1A).

Figure 1B:
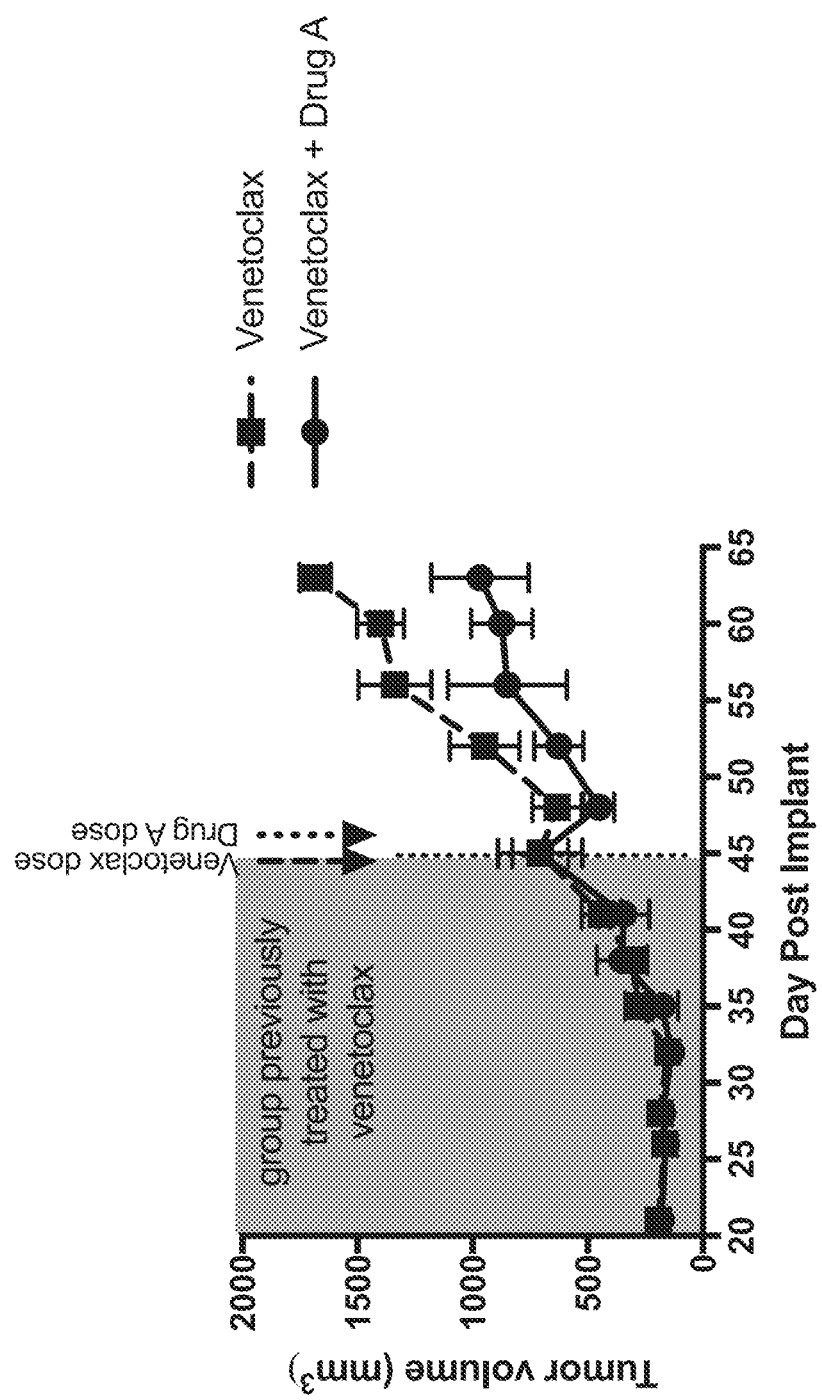
FIG. 1B provides tumor volumes (mm$^3$) at the indicated times post implant in NOD-SCID female mice injected with RS4; 11 leukemia cells that had received treatment venetoclax, and which were subsequently re-treated with single agent venetoclax or with a venetoclax/Drug A combination.

The Venetoclax-treated mice (n=10) were then split into two groups (n=5/group) and either (a) re-treated with single agent Venetoclax on Day 45, or (b) treated with Venetoclax (administered on Day 45) in combination with Drug A (administered on Day 46). As shown in FIG. 1B, in mice who had received prior Venetoclax, treatment with Venetoclax in combination with Drug A inhibited tumor growth to a greater extent that re-treatment with Venetoclax alone. The average tumor volume at Day 65 of mice re-treated with Venetoclax was about 1685 mm³, whereas the average tumor volume at Day 65 of mice treated with the combination was about 970 mm³. The mouse that demonstrated tumor regression when treated with single-agent Venetoclax received single agent Venetoclax on Day 45. Notably, tumor regrowth was observed in this mouse.

Example 1B: Effect of Drug A in Combination with Venetoclax on Phagocytosis by Macrophages in an In Vitro Model In this Example, the effects of Drug A alone, venetoclax alone, and Drug A in combination with venetoclax on the phagocytosis of HL60 and OCIAML3 human acute myeloid leukemia cells by macrophages were assessed in an in vitro assay.

Materials and Methods

Derivation and Culture of Human Monocyte-Derived Macrophages for Phagocytosis

CD14⁺ monocytes were purified by negative selection using the Classical Monocytes Isolation Kit, human (Miltenyi Biotec) and LS columns (Miltenyi Biotec) according to the manufacturer's protocol. CD14⁺ monocytes were seeded into 150 mm tissue culture dishes (Corning) at 6 million cells per dish in 25 mL medium comprised of RPMI complete media, supplemented with 50 ng/mL M-CSF (Miltenyi Biotec), 10% human FBS serum (Thermo Fisher Scientific), 1% penicillin/streptomycin, and 1% GlutaMAX. Cells were cultured for seven to eleven days.

In Vitro Phagocytosis Assays

HL60 and OCI-AML3 cells were washed once in PBS and labeled with the Celltrace CFSE Cell Proliferation kit (Thermo Fisher Scientific) in suspension with 300 nM CFSE (carboxyfluorescein succinimidyl ester) according to the manufacturer's instructions and resuspended in RPMI complete media. Target cells were incubated overnight with two-fold serial dilutions of venetoclax between 39 nM to 2.5 µM in RPMI complete media. Prior to incubation with macrophages, cells were resuspended in RPMI. Macrophages were detached from culture plates by washing once with PBS and incubation in TrypLE Select for 20 minutes at 37° C. Cells were removed with a cell scraper (Corning), washed in PBS, and resuspended in RPMI.

CFSE-labeled target cells treated with venetoclax for 48 hours were spun and added to ultra-low attachment U-bottom 96 well plates (Corning) at 100,000 cells per well. Drug A was then added. Plates were incubated 30 minutes at 37° C. in a humidified incubator with 5% carbon dioxide, then 50,000 macrophages were added. Plates were incubated two hours at 37° C. in a humidified incubator with 5% carbon dioxide. Cells were pelleted by centrifugation for five minutes at 400×g and stained at 4° C. for 30 minutes in Fixable Viability Dye eFluor 780 (ebioscience) diluted 1:4000 in PBS. Cells were washed in FACS buffer (PBS with 0.5% BSA) and stained at 4° C. for 45 minutes in FACS buffer containing human FcR Blocking Reagent (Miltenyi Biotec), BV421 anti-CD33 (Biolegend), APC anti-CD14 (Biolegend) and PE-Cyanine7 anti-CD11b (Invitrogen). Cells were washed twice in FACS buffer and fixed overnight at 4 degrees C. in 0.5% paraformaldehyde diluted in PBS. Cells were analyzed on a FACS Canto II (BD Biosciences), with subsequent data analysis by Flowjo 10.6.1 (Becton Dickinson & Company). Dead cells were excluded by gating on the e780-negative population. Macrophages were identified as cell positive for the lineage markers CD33, CD11b and CD14. Of this population, macrophages that had phagocytosed tumor cells were identified as cells positive for CFSE.

Results

Briefly HL60 cells and OCI-AML3 cells (i.e., "target cells") were labeled with CFSE (carboxyfluorescein succinimidyl ester) and treated with venetoclax for 48 hours. The target cells were then spun and added to wells of 96 well plates at 100,000 cells per well. Drug A was then added. Untreated control target cells, as well as control target cells that treated only with venetoclax or only with Drug A, were prepared in parallel. Macrophages were added to the wells, and the plates were incubated two hours at 37° C. Macrophage cells were pelleted, stained, and analyzed via flow cytometry. Dead cells were excluded by gating on the e780-negative population. Macrophages were identified as cell positive for the lineage markers CD33, CD11b and CD14. Of this population, macrophages that had phagocytosed tumor cells were identified as cells positive for CFSE.

Figure 5A:
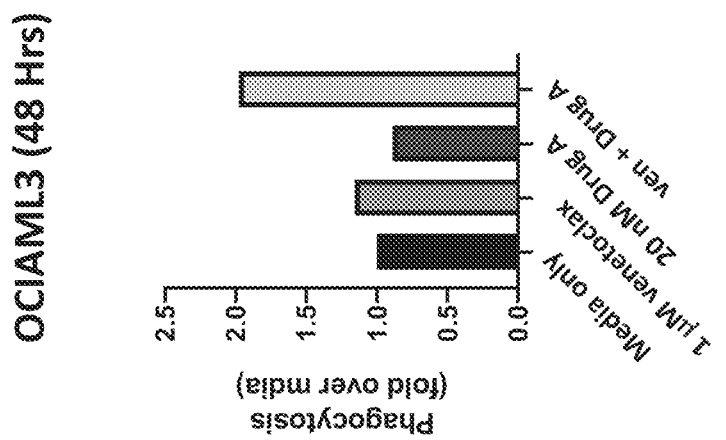
FIG. 5A provides the results of experiments that were performed to assess the effects of the addition of Drug A, venetoclax, or both Drug A and venetoclax in the phagocytosis of HL60 cells by macrophages in an in vitro assay.
Figure 5B:
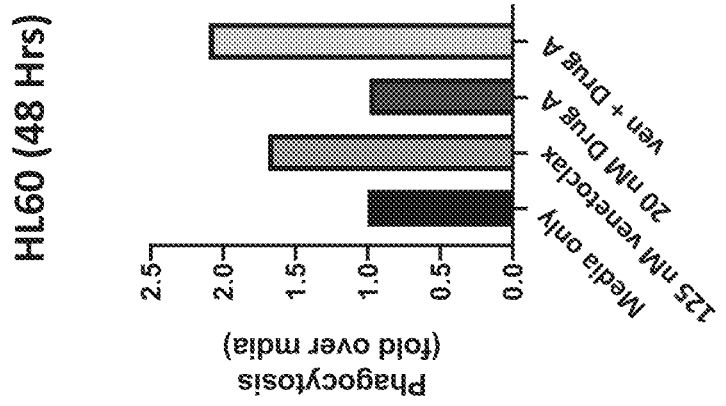
FIG. 5B provides the results of experiments that were performed to assess the effects of the addition of Drug A, venetoclax, or both Drug A and venetoclax in the phagocytosis of OCI-AML3 cells by macrophages in an in vitro assay.
Figure 6A:
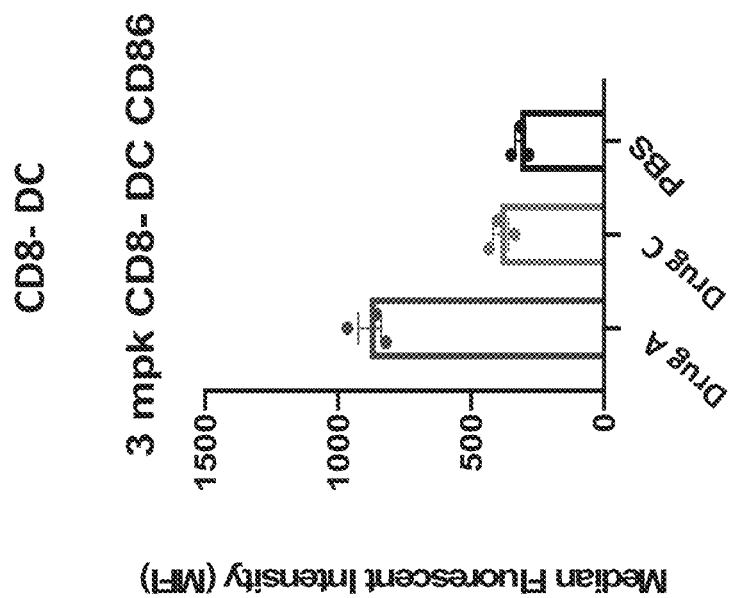
FIG. 6A provides the results of experiments that were performed to assess the effects of Drug A or Drug C on CD8$^+$ dendritic cell activation.
Figure 6B:
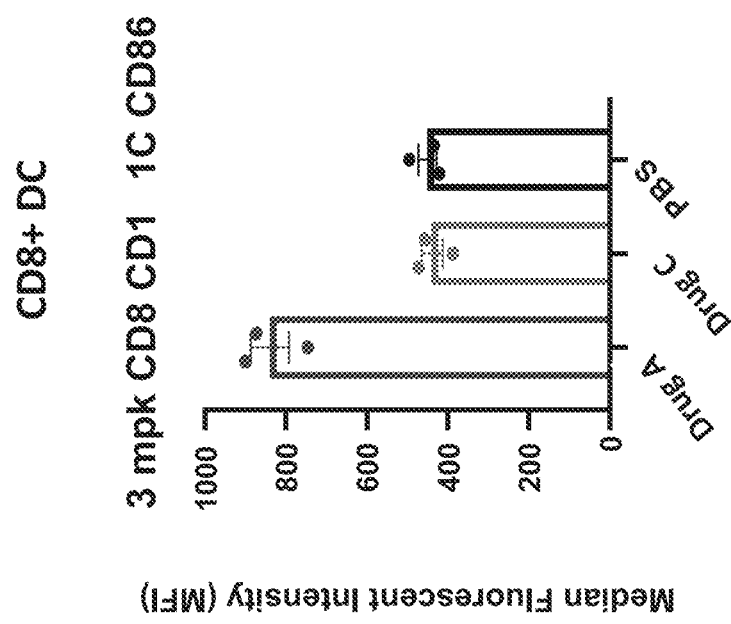
FIG. 6B provides the results of experiments that were performed to assess the effects of Drug A or Drug C on CD8$^-$ dendritic cell activation.

As shown in FIG. 5A, venetoclax as a single agent stimulated macrophage-mediated phagocytosis of HL60 cells, whereas Drug A as a single agent had little effect phagocytosis. (Compare Drug A treated cells to that of untreated cells.) The combination of 20 nM Drug A and 125 nM venetoclax stimulated phagocytosis of HL60 cells by macrophages to a greater degree than either Drug A alone or venetoclax alone. Similar results were observed using 20 nM Drug A and 1 µM venetoclax in OCI-AML3 cells. See FIG. 5B.

Example 2: Anti-Tumor Activity of Drug A in Combination with Cisplatin in a Colon Carcinoma Model In this Example, the anti-tumor activity of Drug A in combination with cisplatin was assessed in a CT26 syngeneic mouse colon carcinoma model. See, e.g., Mosely et al. (2016) "Rational Selection of Syngeneic Preclinical Tumor Models for Immunotherapeutic Drug Discovery." *Cancer Immunol Res.* 5(1): 29-41.

Materials and Methods

CT26 Syngeneic Model

The CT26 cells (see Wang et al. (1995) *J. Immunol.* 154:4685-4692) were injected into the right flank of BALB/c female mice at a concentration of $5 \times 10^5$ cells per mouse in RPMI 1640. Tumors were monitored until the average size of all tumors reached 65-70 mm$^3$. Mice were randomized into PBS control, cisplatin (Selleckchem), Drug A, and cisplatin/Drug A combination cohorts, with n=5-10 per cohort. Drug A was administered intraperitoneally (IP) at twice at a dose of 30 mg/kg ("mpk"). The two 30 mpk doses were given 10 days apart. Cisplatin was administered IP according to one of two regimens: once at a dose of 10 mpk or twice at a dose of 5 mpk. The two 5 mpk cisplatin doses were given 10 days apart. Mice receiving both cisplatin and Drug were administered with cisplatin (IP) according to one of the regimens described above, and with Drug A as described above. In mice receiving combination treatment, Drug A was administered one day after cisplatin. Tumors were measured in two dimensions with calipers, and tumor volume was calculated as: length×width×width×0.5, where length was the larger of the two measurements.

Results

Figure 2A:
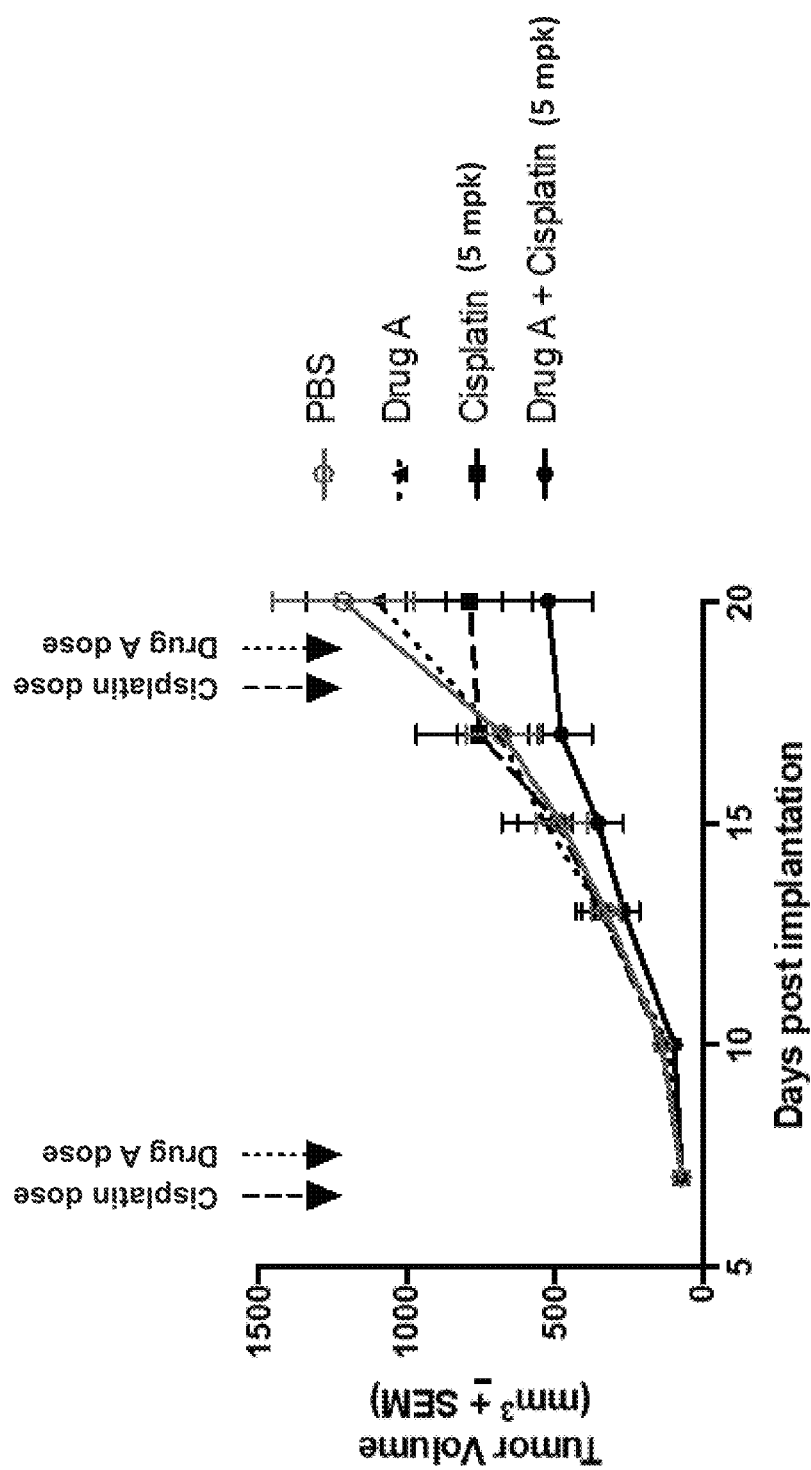
FIGS. 2A-2D provide the tumor volume (mm$^3$) and body weight of BALB/c female mice injected with CT26 tumor cells following treatment with Drug A, Cisplatin, Cisplatin/Drug A combination, or vehicle (PBS) at the indicated times post implantation.
Figure 2B:
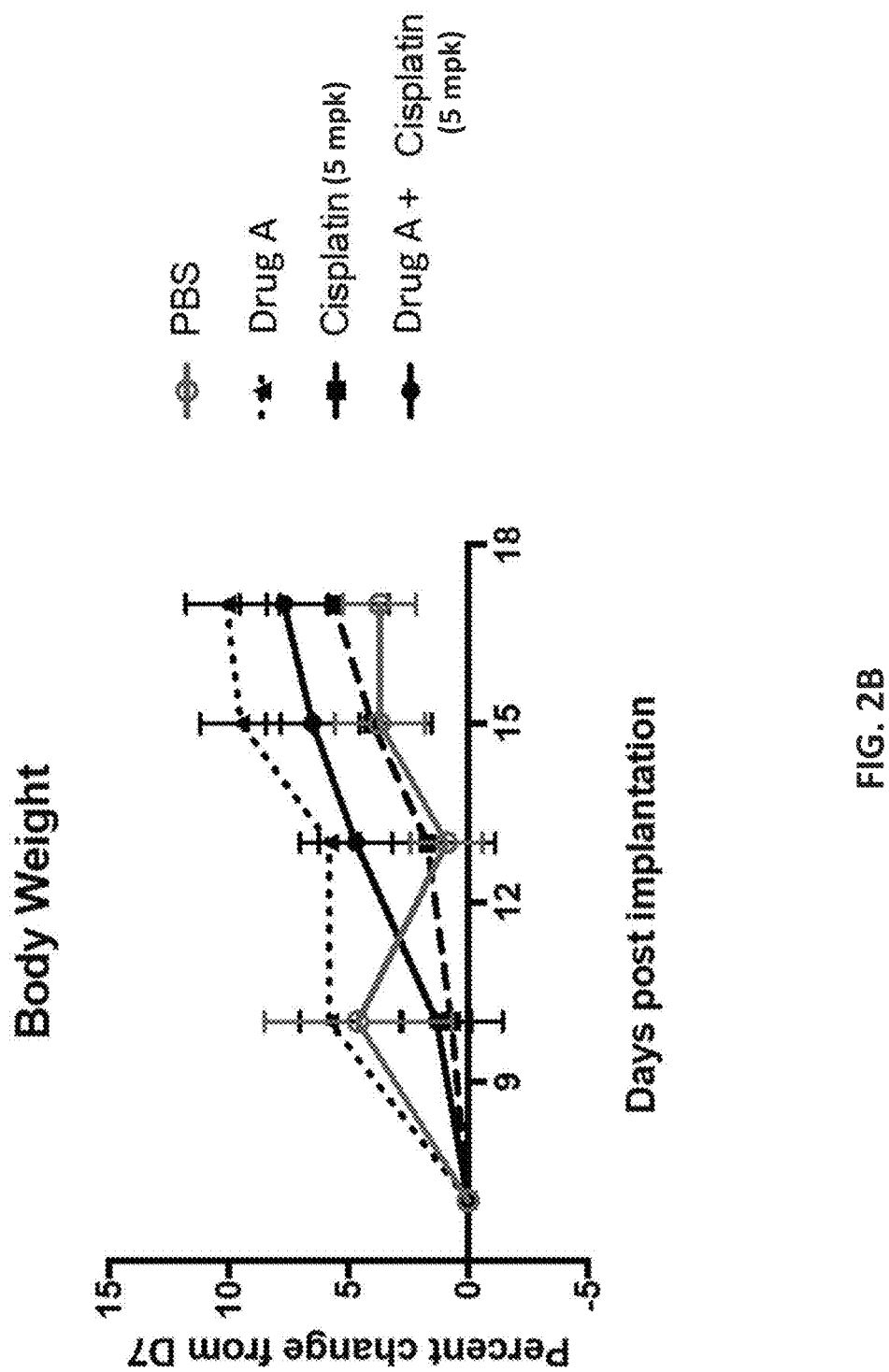

As shown in FIG. 2A, at day 20, tumor growth in mice treated with single agent cisplatin (two 5 mpk doses, each given 10 days apart) was inhibited somewhat, whereas Drug A did not have an appreciable effect of tumor growth. Treatment with cisplatin in combination with Drug A delayed CT26 tumor growth in mice to a greater degree than either drug alone. Further, as shown in FIG. 2B, mice treated with cisplatin in combination with Drug A gained more weight during the course of treatment than mice given cisplatin alone. Additionally, only 10% of the mice in each of the PBS control, cisplatin, and Drug A treatment groups found to have a tumor volume<500 mm$^3$, whereas 33% of the mice in the cisplatin+Drug A treatment groups had tumors<500 mm$^3$ in volume.

Figure 2C:
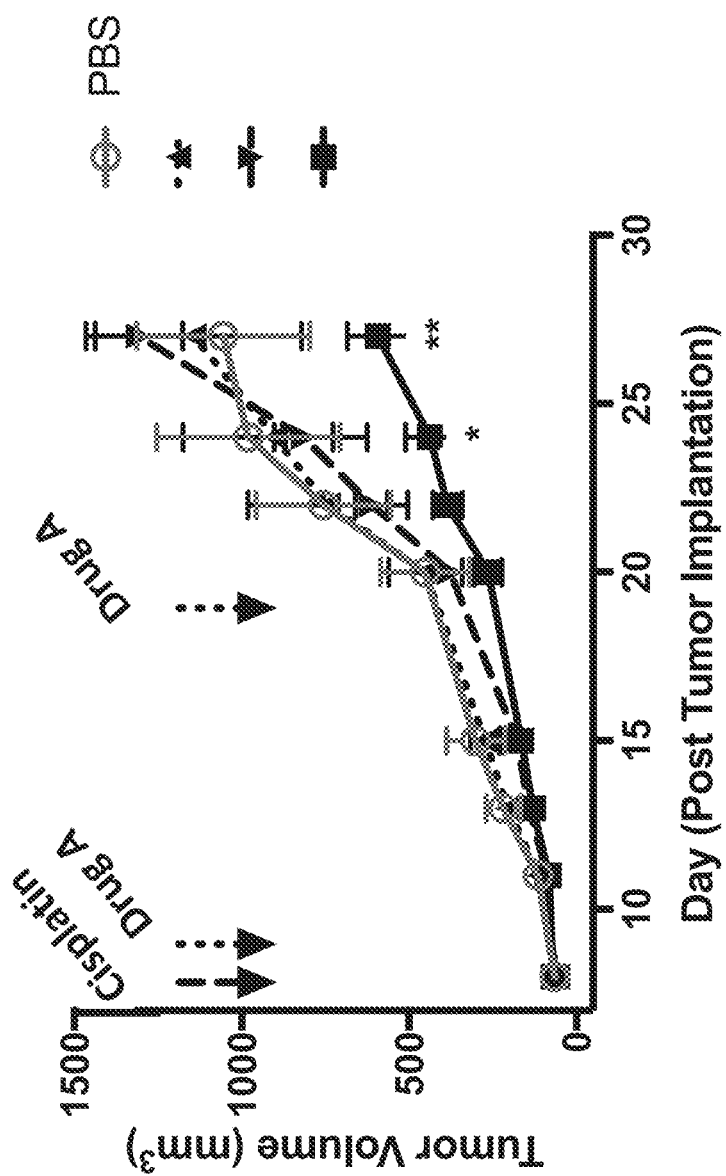
Figure 2D:
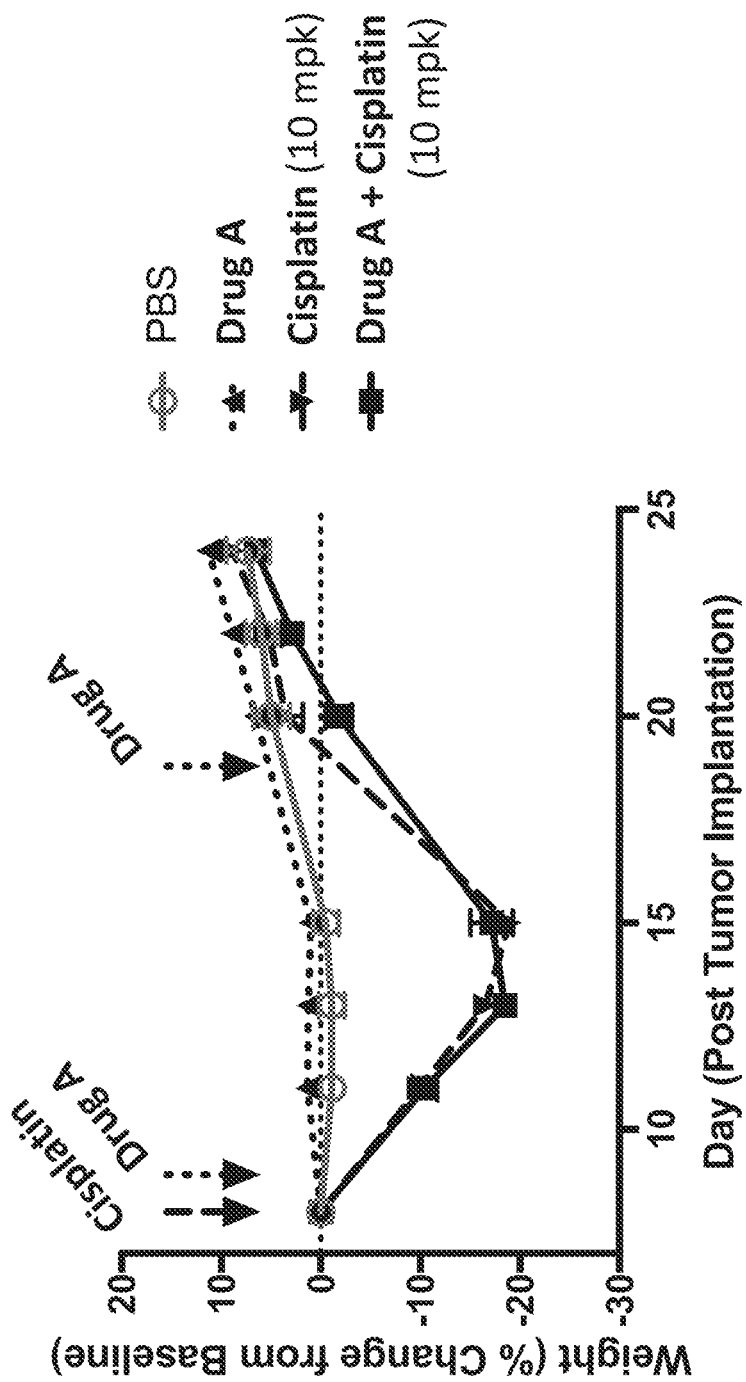

Similar results were observed in the groups treated with a single 10 mpk dose of cisplatin, either alone or in combination with Drug A. Treatment with cisplatin in combination with Drug A delayed CT26 tumor growth in mice to a greater degree than either drug alone. See FIG. 2C. See Mice treated with cisplatin alone or in combination with Drug A showed similar body weight change (* $p<0.0106$ and ** $p<0.0021$, two-tailed t-test was performed on Days 24 and 27, respectively, between cisplatin and Drug A+cisplatin treated groups). See FIG. 2D.

Example 3: Phagocytic Activity of Drug A in Combination with an Anti-TROP2 Antibody DLD-1 cells were washed twice with 20 ml PBS and incubated in 10 ml TRYPLE™ Select (Gibco) cell-dissociation enzymes for 10 minutes at 37° C. in order to detach the cells from the culture plates. The detached cells were then centrifuged, washed in PBS, and resuspended in medium. Cells were labeled with the fluorescent label provided with the CELLTRACE™ CFSE Cell Proliferation kit (Thermo Fisher) according to the manufacturer's instructions and resuspended in IMDM (Iscove's Modified Dulbecco Medium). Macrophages were detached from culture plates by washing twice with 20 ml PBS and incubation in 10 ml TRYPLE™ Select (Gibco) cell-dissociation enzymes for 20 minutes at 37° C. Cells were removed with a cell scraper (Corning), washed in PBS, and resuspended in IMDM.

Phagocytosis assays were assembled in ultra-low attachment U-bottom 96 well plates (Corning) containing 100,000 DLD-1, 50,000 macrophages, five-fold serial dilutions of Drug A or negative control antibody from 100 nM to 6.4 pM, and anti-TROP2 antibody at 0.01 µg/ml. The plates were incubated two hours at 37° C. in a humidified incubator with 5 percent carbon dioxide. Cells were then pelleted by centrifugation for five minutes at 400×g and washed in 250 µl FACS buffer. Macrophages were stained on ice for 15 minutes in 50 µl FACS buffer containing 10 µl human FcR Blocking Reagent (Miltenyi Biotec), 0.5 µl anti-CD33 Ab conjugated to BV421 label (Biolegend), and 0.5 µl anti-CD206 conjugated to Allophycocyanin-Cy7 label (Biolegend). Next, the cells were washed in 200 µl FACS buffer, washed in 250 µl PBS, and stained on ice for 30 minutes in 50 µl Fixable Viability Dye EFLUOR™ 506 (ebioscience) viability dye diluted 1:1000 in PBS. Cells were then washed twice in 250 µl FACS buffer and fixed overnight in 0.5% paraformaldehyde. The fixed cells were analyzed on a FACS CANTO II™ (BD Biosciences) fluorescence-activated cell sorting analyzer, with subsequent data analysis by FlowJo 10.7 (Treestar) flow cytometry software. Dead cells were excluded by gating on the e506-negative population. Macrophages that had phagocytosed tumor cells were identified as cells positive for CD33, CD206, and CFSE (i.e., carboxyfluorescein succinimidyl ester).

Figure 3:
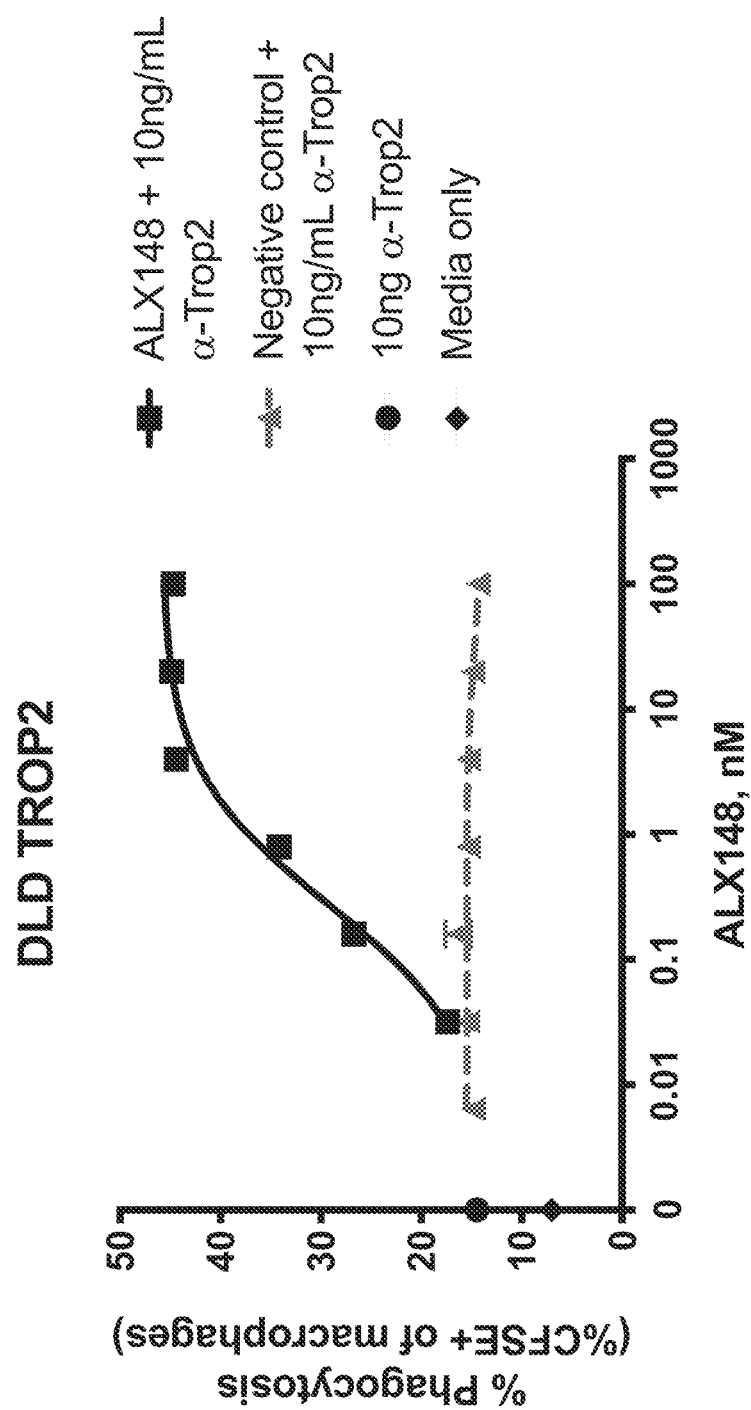
FIG. 3 provides the results of experiments that were performed to determine the effect of Drug A in combination with an anti-TROP2 antibody on the phagocytosis of CFSE-labeled DLD-1 tumor cells by human monocyte-derived macrophages.
Figure 4:
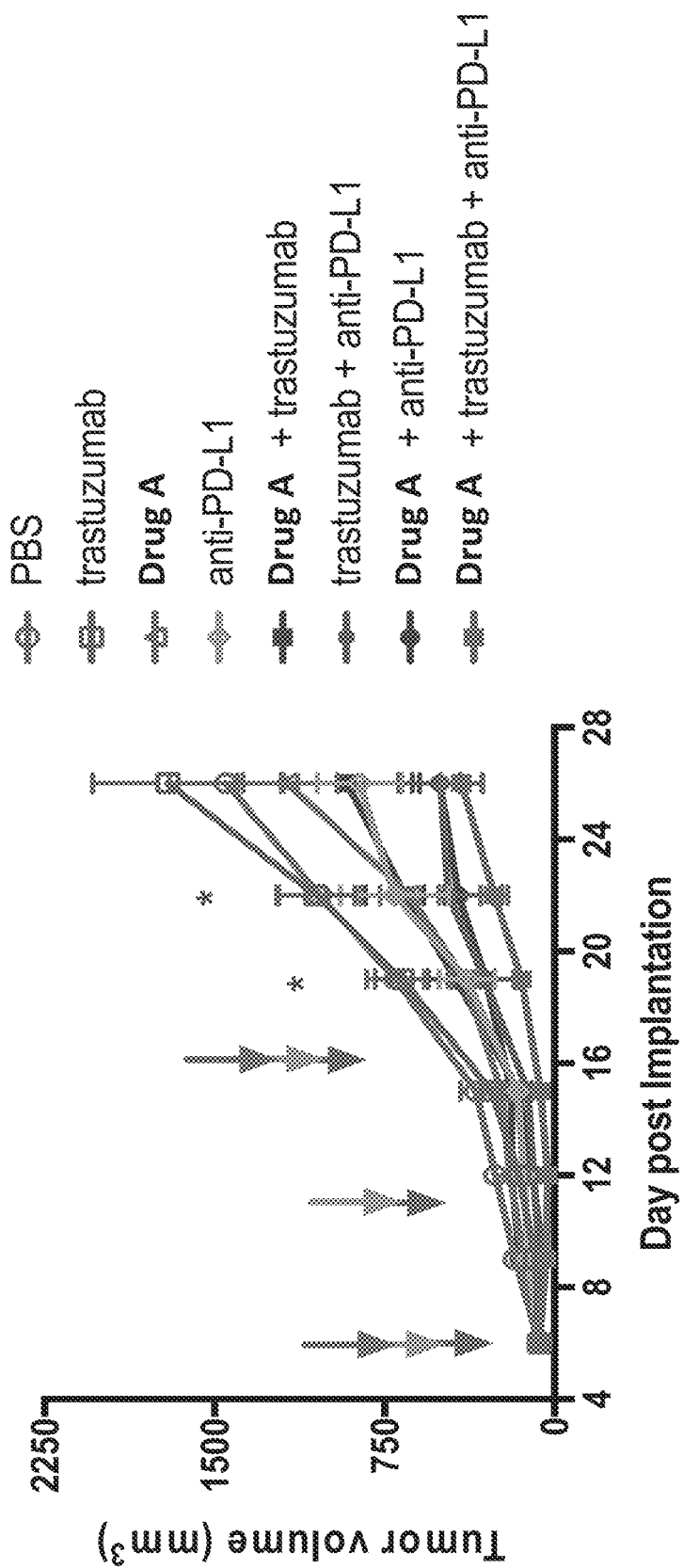
FIG. 4 provides the results of experiments that were performed to determine the effect of Drug A in combination with (a) an anti-HER2 antibody, (b) an anti-PD-L1 antibody, or (c) an anti-HER2 antibody and an anti-PD-L1 on tumor growth in a MC38 m/h colon cancer model.

Enhanced phagocytosis of CFSE-labeled DLD-1 tumor cells by human monocyte-derived macrophages in the presence of Drug A in combination of anti-Trop2. In FIG. 3, the percent of macrophages that phagocytosed CFSE-labeled tumor cells is indicated on the y-axis. Macrophages were incubated with the indicated concentration of Drug A and 10 ng/mL anti-TROP2 antibody. Cells were also incubated with 10 ng/mL anti-TROP2 antibody alone, with negative control human IgG antibody in combination with anti-TROP2 antibody, and in media only. Phagocytosis of CFSE-labeled DLD-1 tumor cells by human monocyte-derived macrophages was enhanced in the presence of Drug A in combination of anti-TROP2 antibody. See FIG. 3.

Example 4: Anti-Tumor Activity of Drug A in Combination with Trastuzumab and an Anti-PD1 Antibody in a Colon Cancer Model MC38 m/h HER2 cells were generated by infecting MC38 murine colon adenocarcinoma cells with a lentivirus vector encoding a chimera of mouse and human HER2 transmembrane and extracellular domains. MC38 m/h HER2 cells were maintained in DMEM (Thermo Fisher Scientific 11965092) supplemented with 10% FBS, 1% Penicillin-Streptomycin, 1% GlutaMAX and 1 mM Sodium Pyruvate (Thermo Fisher Scientific 11360070) at 37° C., 5% CO2 incubator. All tissue culture was performed under aseptic conditions.

Prior to implantation, a master cell bank of each cell line was generated to assure that cells used in subsequent experiments were of the same passage number. Cells were harvested and washed two times in 50 mL cold PBS (Life Technologies 10010072). After the final wash, cells were resuspended in PBS or RPMI at $5 \times 10^6$ cells/mL for MC38 m/h HER2 cell line. 100 µL of cell suspension were subcutaneously injected into the right flank of C57BL/6 mice for MC38 m/h HER2. When tumor size reached an average of 65-69 mm³ for MC38 m/h HER2 tumors, the animals were randomized into 8 groups of 10 mice. Each group was assigned to a treatment group outlined in Table A:

TABLE A

Treatment Groups - MC38 m/h Tumor Model

| Treatment Group | Dosing regimen |
| --- | --- |
| Drug A (single agent) | Drug A (IP): 30 mg/kg, 2q10d |
| anti-PDL1 antibody (single agent) | anti-PDL antibody (IP): 1 mg/kg, 3q5d |
| Trastuzumab (single agent) | trastuzumab (IP): 30 mg/kg, 3q5d |
| Drug A + anti-PDL1 antibody doublet | Drug A (IP): 30 mg/kg, 2q10d<br>anti-PDL1 antibody (IP): 1 mg/kg, 3q5d |
| Drug A + trastuzumab doublet | Drug A (IP): 30 mg/kg, 2q10d<br>trastuzumab (IP): 30 mg/kg, 3q5d |
| anti-PDL1 antibody + trastuzumab doublet | anti-PDL1 antibody (IP): 1 mg/kg, 3q5d<br>trastuzumab (IP): 30 mg/kg, 3q5d |
| Drug A + anti-PDL1 antibody + trastuzumab | Drug A (IP): 30 mg/kg, 2q10d<br>anti-PDL1 antibody (IP): 1 mg/kg, 3q5d |
| PBS (control) | |

Tumor volume (mm³) using Mitutoyo Digital Caliper (Mitutoyo America, Aurora, Illinois) and body weights were recorded two or three times per week. Mice exceeding tumor volume of 2000 mm³ or loss of 20% body weight were euthanized according to IACUC guidelines. Tumor volume is calculated ([length×{width×width}]×0.5=volume in mm³). Statistical analysis and p values were calculated using GraphPad Prism Software.

Chimeric m/h HER2, with the extracellular domain from human HER2 and intracellular domain from mouse HER2, was expressed on MC38 colon cells to permit evaluation of trastuzumab's activity against MC38 murine tumors. As shown in FIG. 5, Monotherapy with trastuzumab had no effect on tumor growth, while Drug A monotherapy and anti-PD-L1 antibody monotherapy each had a moderate effect on tumor growth. Treatment with the Drug A+anti-PD-L1 antibody doublet or the trastuzumab+anti-PD-L1 antibody doublet showed improved tumor growth inhibition as compared to monotherapy alone. Treatment with the Drug A+anti-PD-L1+trastuzumab triple combination showed improved tumor inhibition when compared to each doublet. The effect in reducing tumor growth of the triple combination as compared to the Drug A+anti-PD-L1 antibody doublet or the trastuzumab+anti-PD-L1 antibody doublet was most evident on days 19 and 22, which were 3-6 days post last dose. By day 26, triple combination was minimally better at reducing tumor growth as compared to the Drug A+anti-PD-L1 antibody doublet or the trastuzumab+anti-PD-L1 antibody doublet. No adverse effects were observed in any of the treatment cohorts in the MC38 m/h HER2 colon tumor models.

Example 5A: Exemplary Clinical Trials to Assess the Anti-Tumor Activity of Drug A Combination Therapies in Human Patients Gastric or Gastroesophageal Junction (GEJ) Adenocarcinoma A clinical trial is performed to assess the safety, tolerability, and efficacy of the combination of Drug A, trastuzumab, ramucirumab, and paclitaxel in patients with HER2+ overexpressing advanced or metastatic gastric or GEJ adenocarcinoma that has progressed during or after prior therapy with trastuzumab and fluoropyrimidine-containing chemotherapy (e.g., fluorouracil); during or after prior therapy with trastuzumab and platinum-containing chemotherapy; or during or after prior therapy with trastuzumab, fluoropyrimidine-containing chemotherapy (e.g., fluorouracil), and platinum-containing chemotherapy. The patients enrolled in the trial are suitable for treatment with trastuzumab. The patients have not received prior therapy with an anti-CD47 agent or an anti-SIRPα agent.

A clinical trial is performed to assess the safety, tolerability, and efficacy of the combination of Drug A, pembrolizumab, cisplatin, and either 5-fluorouracil or capecitabine in patients with gastric or GEJ adenocarcinoma (e.g., HER2+ overexpressing gastric or GEJ adenocarcinoma). The patients enrolled in the trial have not received prior therapy with an anti-CD47 agent or an anti-SIRPα agent. Patients have adequate organ function and hemoglobin is greater or equal to 9 g/dL.

Head and Neck Squamous Cell Carcinoma (HNSCC)

A clinical trial is performed to assess the safety, tolerability, and efficacy of the combination of Drug A, pembrolizumab, 5-fluorouracil, and either carboplatin or cisplatin in patients with metastatic or with unresectable, recurrent HNSCC who have not yet been treated for their advanced disease.

Example 5B: Preliminary Safety Results from the Exemplary Clinical Trials Described in Example 5A One patient with untreated advanced head and neck squamous cell carcinoma received treatment with Drug A (10 mg/kg IV QW), pembrolizumab (200 mg IV Q3W), 5-fluorouracil (1,000 mg/m$^2$ per day on days 1, 2, 3, 4 Q3W×6), and carboplatin (AUC=5 mg/ml/min on Day 1, Q3W×6). (In expansion studies, cisplatin (100 mg/m$^2$ Q3W×6) or carboplatin (AUC=5 mg/ml/min on Day 1, Q3W×6) is administered in combination with Drug A, pembrolizumab, and fluorouracil. Patients who receive carboplatin continue to receive carboplatin for the duration of the expansion studies; patients who receive cisplatin continue to receive cisplatin for the duration of the expansion studies). Three patients with HER2-positive gastric/gastroesophageal cancer who progressed on prior treatment(s) with trastuzumab, fluorouracil, and a platinum agent received treatment with Drug A (10 mg/kg IV QW), trastuzumab (8 mg/kg IV for the initial dose, followed by 6 mg/kg Q3W), ramucirumab (8 mg/kg on Days 1 and 15 Q4W), and paclitaxel (80 mg/m2 on Days 1, 8, and 15 Q4W). Three additional patients with HER2-positive gastric/gastroesophageal cancer who progressed on prior treatment(s) with trastuzumab, fluorouracil, and a platinum agent received treatment with Drug A (15 mg/kg IV QW), trastuzumab (8 mg/kg IV for the initial dose, followed by 6 mg/kg Q3W), ramucirumab (8 mg/kg on Days 1 and 15 Q4W), and paclitaxel (80 mg/m2 on Days 1, 8, and 15 Q4W).

Initial results suggest that Drug A, when administered a dose of 10 mg/kg or 15 mg/kg QW in the combination regimens discussed above, is well tolerated with no dose-limiting toxicities to date. Three patients (50%) administered with Drug A+trastuzumab+ramucirumab+paclitaxel and no patient (0%) administered with Drug A+pembrolizumab+fluorouracil+carboplatin experienced treatment-related adverse events (TRAEs). There were no dose limiting toxicities in patients receiving Drug A+pembrolizumab+fluorouracil+carboplatin or Drug A+trastuzumab+ramucirumab+paclitaxel. There were also no treatment related adverse events (TRAE) that occurred in two or more patients in the following 3 cohorts:

Drug A (10 mg/kg QW)+pembrolizumab+fluorouracil+carboplatin (N=1)

Drug A (10 mg/kg QW)+trastuzumab+ramucirumab+paclitaxel (N=3)

Drug A (15 mg/kg QW)+trastuzumab+ramucirumab+paclitaxel (N=3)

And finally, there were also no grade 3 or above Treatment related adverse events (TRAE≥Grade 3) reported in patients treated with Drug A+pembrolizumab+fluorouracil+carboplatin or Drug A+trastuzumab+ramucirumab+paclitaxel.

Example 5C: Preliminary Efficacy Results from the Exemplary Clinical Trials Described in Example 5A The patient with untreated advanced head and neck squamous cell carcinoma who received treatment with Drug A, pembrolizumab, 5-fluorouracil, and a platinum agent at the dosages and administration schedule described in Example 5B achieved partial response (PR) based on investigator-assessed response using RECIST v1.1 criteria.

Among the three patients with HER2-positive gastric/gastroesophageal cancer who received treatment with Drug A (10 mg/kg QW), trastuzumab, ramucirumab, and paclitaxel, (see Example 5B) two were not yet evaluable. One patient achieved PR based on investigator-assessed response using RECIST v1.1 criteria.

Among the three patients with HER2-positive gastric/gastroesophageal cancer who received treatment with Drug A (15 mg/kg QW), trastuzumab, ramucirumab, and paclitaxel, (see Example 5B) two were not yet evaluable. One patient achieved PR based on investigator-assessed response using RECIST v1.1 criteria. Low rates of cytopenias were observed.

Drug A in combination with pembrolizumab, 5-fluorouracil, and a platinum agent showed clinical activity in the treatment of advanced 1 L HNSCC (i.e., as a first treatment in patients with advanced HNSCC who have not received prior therapy for HNSCC.) Drug A in combination with trastuzumab, ramucirumab, and paclitaxel showed clinical activity in the treatment of advanced ≥2 L gastric/gastroesophageal cancer (i.e., as a treatment in patients who have received at least one prior therapy for gastric or GEJ cancer).

Results from pharmacodynamics analyses indicated that near complete CD47 target occupancy (also known as receptor occupancy) is maintained throughout the Drug A dosing interval when combined with chemotherapy-containing regimens.

Example 5D: Additional Results from the Exemplary Clinical Trials Described in Example 5A CD47 is a myeloid checkpoint up-regulated by tumors to evade the anticancer immune response. Drug A is an exemplary high affinity CD47-blocking fusion protein with an inactive Fc region designed to safely enhance anticancer therapeutics (Kauder et al. (2018) *PLoS ONE*. 13(8): e0201832: Chow et al. (2020) *Journal of Clinical Oncology*. 38:15_suppl, 3056-3056). Drug A in combination with standard chemotherapy and antibody regimens was evaluated in patients with advanced HER2-positive gastric cancer (GC) or with head and neck squamous cell carcinoma (HNSCC).

Methods

Patients with previously treated advanced HER2-positive GC received Drug A (A) 10 mg/kg QW or 15 mg/kg QW in combination with trastuzumab (T)+ramucirumab (ram)+paclitaxel (pac) as 2nd or later-line treatment. The GC patients had progressed during or following a prior fluoropyrimidine therapy (or a fluoropyrimidine-containing therapy). GC patients who had progressed during or following a prior therapy with trastuzumab and/or a platinum-based chemotherapeutic agent were included. Patients with untreated advanced HNSCC received Drug A (A) 10 mg/kg QW or 15 mg/kg QW in combination with pembrolizumab (P)+5FU+ platinum (cisplatin or carboplatin) as 1st line therapy. The primary endpoint was dose limiting toxicity (DLT). Tumor response, pharmacokinetic (PK), and pharmacodynamic (PD) markers were assessed in all patients.

Results

Fifty-five pts were enrolled in the study. Patients' baseline characteristics are shown in Table B:

TABLE B

Baseline Characteristics

|  | | Drug A + trastuzumab + chemo ≥2L GC (N = 14) | Drug A + pembrolizumab + chemo 1L HNSCC (N = 5) |
|---|---|---|---|
| Median age, years (range) | | 63 (36-83) | 61 (45-63) |
| Sex, n | M | 10 | 4 |
|  | F | 4 | 1 |
| Race, n | Asian | 11 | 4 |
|  | White | 3 | 1 |
|  | Other | — | — |
| ECOG PS, n | 0 | 5 | 4 |
|  | 1 | 9 | 1 |
| Progressed upon prior anti-HER2 Therapy, n (%) | | 13 (93) | N/A |
| Progressed upon ≥2 prior anti-HER2 therapy n (%) | | 1 (7.1) | N/A |
| Progressed upon prior CPI Therapy, n (%) | | 1 (7.1) | 0 (0) |
| Visceral distant metastasis, n (%) | | 13 (93) | 1 (20) |

1 patients with ≥2 L GC received A+T+ram+pac and were evaluated for safety. No dose-limiting toxicities (DLTs) were reported, and the Drug A maximum administered dose was 15 mg/kg QW. Of the 9 patients who experienced any adverse event, 8 patients reported treatment-related adverse events (TRAE). The most common TRAEs were low grade diarrhea, fatigue, pruritus/urticaria and rash (each n=21%). TRAEs≥Grade 3 severity were of low frequency. There were no treatment related SAEs reported amongst GC patients treated with A+T+ram+pac. Among the 11 GC patients who received Drug A at 15 mg/kg qw+trastuzumab+ramucirumab+paclitaxel, 7 demonstrated partial response, 3 demonstrated stable disease, and 1 demonstrated progressive disease. Among the 3 patients who received Drug A at 10 mg/kg qw+trastuzumab+ramucirumab+paclitaxel, 2 demonstrated partial response, and one demonstrated stable disease.

Three patients with previously untreated HNSCC were administered A+P+5FU+platinum, as described above. No DLTs were reported. Three pts experienced any adverse events (AE), none were treatment-related. The HNSCC patient who received Drug A at 15 mg/kg qw+pembrolizumab+5-fluorouracil+a platinum-based chemotherapeutic agent was CPI naive and demonstrated partial response. Of the three patients who received Drug A at 10 mg/kg qw+pembrolizumab+5-fluorouracil+a platinum-based chemotherapeutic agent, all were CPI naïve. One patient demonstrated complete response, one patient demonstrated partial response, and one demonstrated progressive disease.

The clinical activity of Drug A chemotherapy combinations in response evaluable patients are summarized in Table C below:

TABLE C

Responses to Drug A Chemotherapy Combinations

| Patient/Treatment | N | ORR (95% CI) | Median Follow-up* (95% CI) |
|---|---|---|---|
| ≥2L Gastric Cancer/ Drug A + trastuzumab + ramucirumab + paclitaxel | 14 | 64.3% [38.8%; 83.7%] | 5.3 [2.8; 6.7] |
| Drug A (15 mg/kg qw) | 11 | 63.6% [35.4%; 84.8%] | 4.2 [2.4; 6.2] |
| Drug A (10 mg/kg qw) | 3 | 66.7% [20.8%; 93.9%] | 8.9 [5.1; 9.6] |
| 1L HNSCC/Drug A + pembrolizumab + 5FU + platinum | 4 | 75% [30.0%; 95.0%] | 5.0 [1.3; 8.8] |
| Drug A (15 mg/kg qw) | 1 | 100% [20.5; 100%] | 1.6 [1.3; 1.9] |
| Drug A (10 mg/kg qw) | 3 | 66.7% [20.8%; 93.9%] | 5.3 [5.0; 8.8] |

Initial Drug A combination PK and CD47 target occupancy are similar to that of single agent administration. Near complete (80%-100%) CD47 target occupancy is maintained throughout Drug A dosing interval when combined with chemotherapy-containing regimens. Circulating immune cell profiles (CD4$^+$ T cells, CD8$^+$ T cells, CD19$^+$ B cells, and CD16$^+$CD56$^+$ NK cells) are generally unchanged following Drug A combined with chemotherapy-containing regimens. Drug A PK following combination therapies with pembrolizumab or trastuzumab is comparable, with and without chemotherapy.

CONCLUSIONS

Preliminary data indicated that Drug A is well tolerated and can be safety combined with the anticancer antibody+ multi-agent chemotherapy regimens studied with no maximum tolerated dose reached. The maximum administered dose of Drug A in combination was 15 mg/kg QW.

Drug A demonstrates initial ORR of 64% in patients with ≥2 L HER2 positive GC in combination with trastuzumab and ramucirumab+paclitaxel that compares favorably with the clinical experience of ramucirumab+paclitaxel in patients whose disease has progressed upon prior trastuzumab-containing regimens.

Drug A demonstrates initial anti-cancer activity including complete and partial objective responses in combination with pembrolizumab+5FU+platinum in patients who have not received prior treatment for their advanced HNSCC.

Preliminary pharmacokinetics and pharmacodynamic analysis demonstrates no impact of the combination partners upon Drug A exposure levels with full CD47 receptor occupancy.

Example 6: Further Characterization of Fusion Polypeptides Comprising a SIRPα Variant and an Fc Variant Previous studies described in Liu et al. (2015) *Nature Medicine.* 21(1): 1; Soto-Pantoja et al. (2014) *Cancer Research.* 74(23): 6771-83; and Tseng D et al. (2013) *Proc Natl Acad Sci USA.* 110(27): 11103-11108 have that shown dendritic cells (DCs) and T play an important role in antitumor response. The effects of the administration of Drug A, Drug B, or Drug C on DC activation were assessed in a mouse model. Drug A is a fusion polypeptide comprising a SIRPα variant that binds hCD47 with a $K_D$ of ~140 pM. The C-terminus of the SIRPα variant of Drug A is fused to the N-terminus of an Fc variant with ablated effector function. Drug B is a fusion polypeptide comprising the SIRPα variant of Drug A whose C-terminus is fused to the N-terminus of a WT Fc (i.e., the WT Fc from which the Fc variant of Drug A was derived). Drug C is a fusion polypeptide comprising a SIRPα variant that binds hCD47 with a $K_D$ of ~3 nM whose C-terminus is fused to the N-terminus of the Fc variant of Drug A.

Figure 7A:
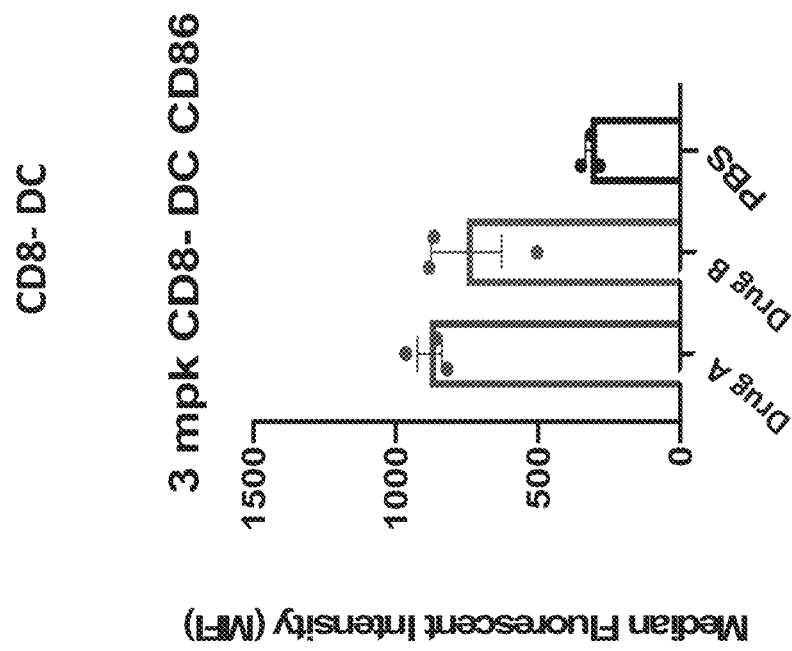
FIG. 7A provides the results of experiments that were performed to assess the effects of Drug A or Drug B on CD8$^+$ dendritic cell activation.
Figure 7B:
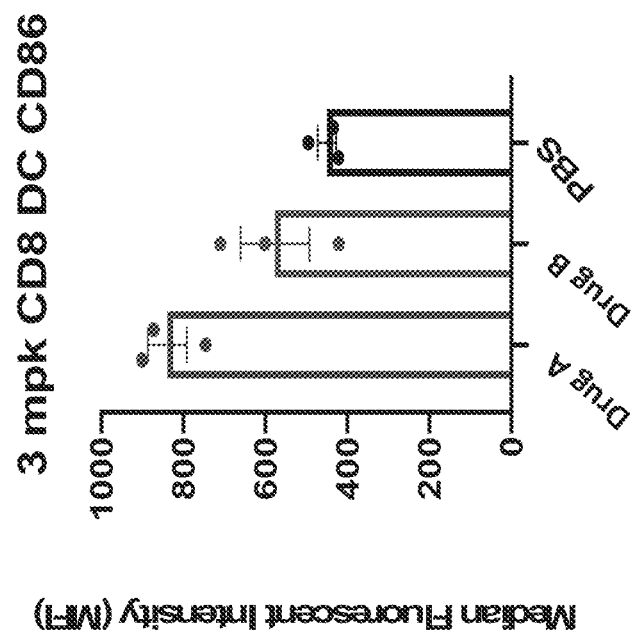
FIG. 7B provides the results of experiments that were performed to assess the effects of Drug A or Drug B on CD8$^-$ dendritic cell activation.

Briefly, C57BL6 mice were randomized into 4 groups (n=3 per group) and administered with 3 mg/kg (or "mpk") of Drug A, Drug B, or Drug C, or with vehicle (PBS). 3.5 hours following intravenous injection, spleens were harvested an analyzed for up-regulation of CD86, a cell-surface marker that indicates dendritic cell activation. As shown in FIGS. 6A, 6B, 7A, and 7B, CD8+ and CD8− dendritic cells were activated in spleens of mice that were administered with Drug A. The level of CD8+ dendritic cell activation (FIG. 6A) and CD8− dendritic cell activation (FIG. 6B) in the spleens of mice administered with Drug C was the same as in mice administered with PBS control. As shown in FIGS. 7A and 7B, CD8+ and CD8− dendritic cells were activated in the spleens of mice administered with Drug B, but to a lesser extent than CD8+ and CD8− dendritic cells in the spleens of mice administered with Drug A. These data indicate that the administration of a therapeutic agent comprising a CD47 binding moiety (e.g., a SIRPα variant) that has an affinity for hCD47 that is better than about 10 nM and/or an Fc variant with ablated effector function leads to higher CD8+ and CD8− DC activation than administration of a therapeutic agent that comprises a CD47 binding moiety (e.g., a SIRPα variant) that has an affinity for CD47 (e.g., hCD47) that is higher than 10 nM and/or a WT Fc domain. Moreover, a therapeutic agent that binds CD47 and comprises an Fc domain with ablated effector function (e.g., a fusion polypeptide described herein) demonstrates improved safety following administration as compared to a therapeutic agent that binds CD47 and comprises a WT Fc domain. See, e.g., Kauder et al. (2018) *PLoS ONE* 13(8): e0201832.

In vitro receptor occupancy assays were performed to assess the binding of Drug A, F59/magrolimab, TTI-621, and TTI-622 to hCD47. As discussed herein, Drug A is a fusion polypeptide comprising a SIRPα variant that binds hCD47 with a $K_D$ of ~140 pM whose C-terminus is fused to the N-terminus of an Fc variant with ablated effector function. F59/magrolimab is a therapeutic anti-CD47 antibody comprising a human IgG4 Fc domain with WT effector function. TTI-621 is a therapeutic fusion polypeptide comprising the CD47 binding domain of human SIRPα linked to a human IgG1 Fc domain with WT effector function. TTI-622 is a therapeutic fusion polypeptide comprising the CD47 binding domain of human SIRPα linked to a to a human IgG4 Fc domain with WT effector function. The affinities of Drug A, F59/magrolimab, TTI-621, and TTI-622 for hCD47 are shown in Table D below.

TABLE D

| Drug/Agent | $K_D$ for human CD47 (nM) |
|---|---|
| Drug A | 0.14 nM |
| F59/magrolimab | 7 nM |
| TTI-621 | 500 nM |
| TTI-622 | 500 nM |

Figure 8A:
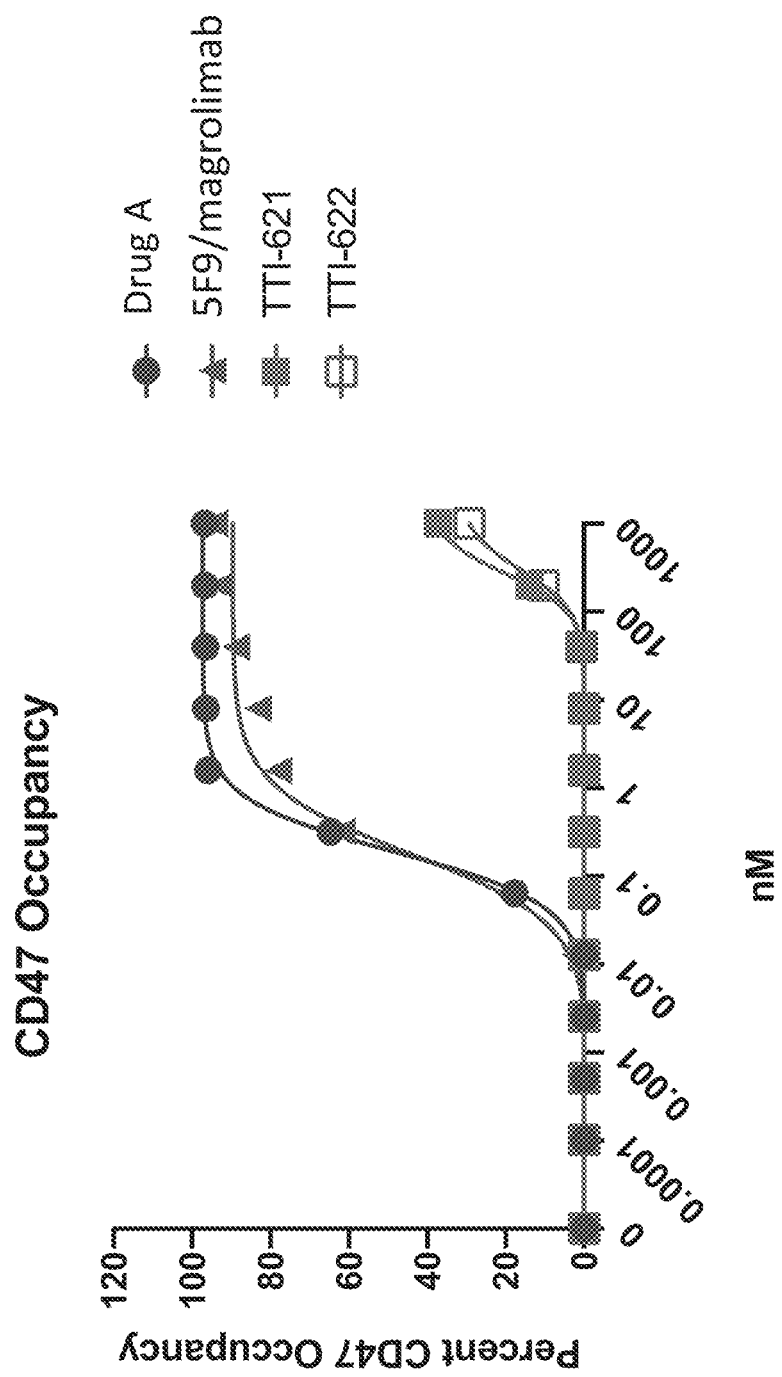
FIG. 8A provides the results of experiments that were performed to assess the binding of Drug A, F59/magrolimab, TTI-621, and TTI-622 to hCD47.

As shown in FIG. 8A, Drug A exhibited about 100% receptor occupancy at a concentration of ~1 nM. F59/magrolimab exhibited about 90% receptor occupancy at a concentration of ~1 nM. Agents 2 and 3 exhibited about 40% receptor occupancy at a concentration of ~1 μM.

A validated SIRPα signaling assay (PathHunter SIRPα Signaling Bioassay from DiscoverX) was used to assess the degree to which Drug A, F59/magrolimab, TTI-621, and TTI-622 inhibit the interaction between hSIRPα and hCD47. The EC50 values of Drug A, F59/magrolimab, TTI-621, and TTI-622 for hCD47 are shown in Table E below.

TABLE E

| Drug/Agent | EC50 (ng/ml) |
|---|---|
| Drug A | 25.1 |
| F59/magrolimab | 74.4 |
| TTI-621 | >150 |
| TTI-622 | >150 |

Figure 8B:
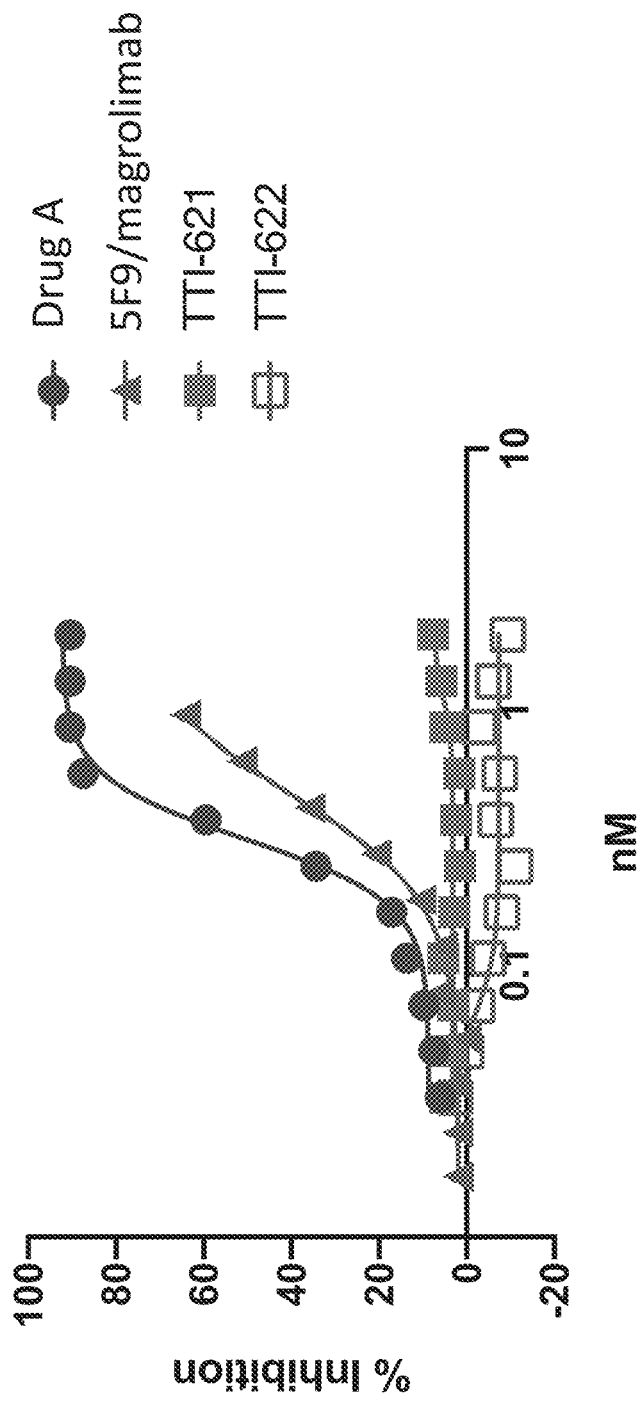
FIG. 8B provides the results of quantitative experiments that were performed to assess the effect of Drug A, F59/magrolimab, TTI-621, and TTI-622 on SIRPα signaling.

A shown in FIG. 8B, at a concentration of 1 nM, Drug A completely inhibited SIRPα signaling. F59/magrolimab inhibited SIRPα signaling by about 80% at a concentration of 1 nM. By contrast, TTI-621 and TTI-622 inhibited SIRPα signaling by less than about 10% at a concentration of 1 nM.

The preceding Examples are offered for illustrative purposes only, and are not intended to limit the scope of the present invention in any way. Various modifications of the invention in addition to those shown and described herein will become apparent to those skilled in the art from the foregoing description and fall within the scope of the appended claims.

The invention claimed is:

1. A method of treating cancer in an individual, comprising administering to the individual an effective amount of: (a) a polypeptide comprising a SIRPα D1 domain variant and an Fc domain variant, (b) trastuzumab, (c) ramucirumab, and (d) paclitaxel;
   wherein the SIRPα D1 domain variant comprises the amino acid sequence of SEQ ID NO: 81 or SEQ ID NO: 85;
   wherein the Fc domain variant is
   a human IgG1 Fc region comprising L234A, L235A, G237A, and N297A mutations, wherein numbering is according to the EU index of Kabat;
   wherein the cancer is gastric cancer or gastroesophageal junction (GEJ) cancer, and wherein the individual has received at least one prior therapy for the gastric or the GEJ cancer.

2. The method of claim 1, wherein the individual has received prior therapy with an anti-HER2 antibody, with an anti-HER2 antibody and a fluoropyrimidine, or with an anti HER2 antibody and a platinum-based chemotherapy agent.

3. The method of claim 2, wherein the anti-HER2 antibody of the prior therapy is trastuzumab.

4. The method of claim 1, wherein the gastric cancer or the GEJ cancer is HER2$^+$ gastric cancer or HER2$^+$ GEJ cancer.

5. The method of claim 1, wherein the polypeptide comprising a SIRPα D1 domain variant and an Fc domain variant is administered at a dose of 10 mg/kg once a week.

6. The method of claim 1, wherein the polypeptide comprising a SIRPα D1 domain variant and an Fc domain variant is administered at a dose of 15 mg/kg once a week.

7. The method of claim 1, wherein the SIRPα D1 domain variant comprises the amino acid sequence of SEQ ID NO: 85.

8. The method of claim 1, wherein the SIRPα D1 domain variant comprises the amino acid sequence of SEQ ID NO: 81.

9. The method of claim 1, wherein the Fc domain variant comprises the amino acid sequence of SEQ ID NO: 91.

10. The method of claim 1, wherein the polypeptide comprising a SIRPα D1 domain variant and an Fc domain variant comprises the amino acid sequence of SEQ ID NO: 136.

11. The method of claim 1, wherein the polypeptide comprising a SIRPα D1 domain variant and an Fc domain variant comprises the amino acid sequence of SEQ ID NO: 135.

12. The method of claim 1, wherein the polypeptide comprising a SIRPα D1 domain variant and an Fc domain variant forms a homodimer.

13. The method of claim 1, wherein the individual is a human.

* * * * *

SEQUENCE LISTING

```
Sequence total quantity: 224
SEQ ID NO: 1            moltype = AA  length = 119
FEATURE                 Location/Qualifiers
REGION                  1..119
                        note = Synthetic Construct
source                  1..119
                        mol_type = protein
                        organism = synthetic construct
SEQUENCE: 1
EEELQVIQPD KSVLVAAGET ATLRCTATSL IPVGPIQWFR GAGPGRELIY NQKEGHFPRV  60
```

TTVSDLTKRN NMDFSIRIGN ITPADAGTYY CVKFRKGSPD DVEFKSGAGT ELSVRAKPS    119

SEQ ID NO: 2                moltype = AA   length = 118
FEATURE                     Location/Qualifiers
REGION                      1..118
                            note = Synthetic Construct
source                      1..118
                            mol_type = protein
                            organism = synthetic construct
SEQUENCE: 2
EEELQVIQPD KSVSVAAGES AILHCTVTSL IPVGPIQWFR GAGPARELIY NQKEGHFPRV    60
TTVSESTKRE NMDFSISISN ITPADAGTYY CVKFRKGSPD TEFKSGAGTE LSVRAKPS     118

SEQ ID NO: 3                moltype = AA   length = 118
FEATURE                     Location/Qualifiers
REGION                      1..118
                            note = Synthetic Construct
source                      1..118
                            mol_type = protein
                            organism = synthetic construct
SEQUENCE: 3
EEELQVIQPD KSVSVAAGES AILLCTVTSL IPVGPIQWFR GAGPARELIY NQKEGHFPRV    60
TTVSESTKRE NMDFSISISN ITPADAGTYY CVKFRKGSPD TEFKSGAGTE LSVRAKPS     118

SEQ ID NO: 4                moltype = AA   length = 119
FEATURE                     Location/Qualifiers
REGION                      1..119
                            note = Synthetic Construct
source                      1..119
                            mol_type = protein
                            organism = synthetic construct
SEQUENCE: 4
EEGLQVIQPD KSVSVAAGES AILHCTATSL IPVGPIQWFR GAGPGRELIY NQKEGHFPRV    60
TTVSDLTKRN NMDFSIRIGN ITPADAGTYY CVKFRKGSPD DVEFKSGAGT ELSVRAKPS    119

SEQ ID NO: 5                moltype = AA   length = 119
FEATURE                     Location/Qualifiers
REGION                      1..119
                            note = Synthetic Construct
source                      1..119
                            mol_type = protein
                            organism = synthetic construct
SEQUENCE: 5
EEELQVIQPD KFVLVAAGET ATLRCTATSL IPVGPIQWFR GAGPGRELIY NQKEGHFPRV    60
TTVSDLTKRN NMDFSIRIGN ITPADAGTYY CVKFRKGSPD DVEFKSGAGT ELSVRAKPS    119

SEQ ID NO: 6                moltype = AA   length = 119
FEATURE                     Location/Qualifiers
REGION                      1..119
                            note = Synthetic Construct
source                      1..119
                            mol_type = protein
                            organism = synthetic construct
SEQUENCE: 6
EEELQVIQPD KSVLVAAGET ATLRCTATSL IPVGPIQWFR GAGPGRELIY NQKEGHFPRV    60
TTVSDLTKRN NMDFPIRIGN ITPADAGTYY CVKFRKGSPD DVEFKSGAGT ELSVRAKPS    119

SEQ ID NO: 7                moltype = AA   length = 118
FEATURE                     Location/Qualifiers
REGION                      1..118
                            note = Synthetic Construct
source                      1..118
                            mol_type = protein
                            organism = synthetic construct
SEQUENCE: 7
EEELQVIQPD KSVSVAAGES AILHCTVTSL IPVGPIQWFR GAGPARELIY NQKEGHFPRV    60
TTVSESTKRE NMDFSISISN ITPADAGTYY CVKFRKGSPD TEFKSGAGTE LSVRGKPS     118

SEQ ID NO: 8                moltype = AA   length = 118
FEATURE                     Location/Qualifiers
REGION                      1..118
                            note = Synthetic Construct
source                      1..118
                            mol_type = protein
                            organism = synthetic construct
SEQUENCE: 8
EEELQVIQPD KSVLVAAGET ATLRCTATSL IPVGPIQWFR GAGPARELIY NQKEGHFPRV    60
TTVSESTKRE NMDFSISISN ITPADAGTYY CVKFRKGSPD TEFKSGAGTE LSVRAKPS     118

```
SEQ ID NO: 9                moltype = AA  length = 119
FEATURE                     Location/Qualifiers
REGION                      1..119
                            note = Synthetic Construct
source                      1..119
                            mol_type = protein
                            organism = synthetic construct
SEQUENCE: 9
EEELQVIQPD KSVLVAAGET ATLRCTATSL IPVGPIQWFR GAGPGRELIY NQKEGHFPRV  60
TTVSDLTKRN NMDFSIRISN ITPADAGTYY CVKFRKGSPD DVEFKSGAGT ELSVRAKPS  119

SEQ ID NO: 10               moltype = AA  length = 118
FEATURE                     Location/Qualifiers
REGION                      1..118
                            note = Synthetic Construct
source                      1..118
                            mol_type = protein
                            organism = synthetic construct
SEQUENCE: 10
EEELQVIQPD KSVSVAAGES AILHCTVTSL IPVGPIQWFR GAGPARELIY NQKEGHFPRV  60
TTVSESTKRE NMDFSISISN ITPADAGTYY CVKFRKGSPD TEFKSGAGTE LSVRAKPS  118

SEQ ID NO: 11               moltype = AA  length = 119
FEATURE                     Location/Qualifiers
REGION                      1..119
                            note = Synthetic Construct
VARIANT                     3
                            note = Xaa = E or G
VARIANT                     12
                            note = Xaa = S or F
VARIANT                     14
                            note = Xaa = L or S
VARIANT                     20
                            note = Xaa = T or S
VARIANT                     22
                            note = Xaa = T or I
VARIANT                     24
                            note = Xaa = R, H, or L
VARIANT                     27
                            note = Xaa = A or V
VARIANT                     45
                            note = Xaa = G or A
VARIANT                     65
                            note = Xaa = D or E
VARIANT                     66
                            note = Xaa = L or S
VARIANT                     70
                            note = Xaa = N, E or D
VARIANT                     75
                            note = Xaa = S or P
VARIANT                     77
                            note = Xaa = R or S
VARIANT                     79
                            note = Xaa = G or S
VARIANT                     99
                            note = Xaa = P or absent
VARIANT                     100
                            note = Xaa = D or P
VARIANT                     102
                            note = Xaa = V or T
VARIANT                     116
                            note = Xaa = A or G
source                      1..119
                            mol_type = protein
                            organism = synthetic construct
SEQUENCE: 11
EEXLQVIQPD KXVXVAAGEX AXLXCTXTSL IPVGPIQWFR GAGPXRELIY NQKEGHFPRV  60
TTVSXXTKRX NMDFXIXIXN ITPADAGTYY CVKFRKGSXX DXEFKSGAGT ELSVRXKPS  119

SEQ ID NO: 12               moltype = AA  length = 10
FEATURE                     Location/Qualifiers
REGION                      1..10
                            note = Synthetic Construct
VARIANT                     1
                            note = Xaa = Any Amino Acid
VARIANT                     3
                            note = Xaa = Any Amino Acid
VARIANT                     5
                            note = Xaa = Any Amino Acid
```

```
VARIANT           7
                  note = Xaa = Any Amino Acid
VARIANT           9
                  note = Xaa = Any Amino Acid
REGION            3..4
                  note = Can be present or absent
REGION            5..6
                  note = Can be present or absent
REGION            7..8
                  note = Can be present or absent
REGION            9..10
                  note = Can be present or absent
source            1..10
                  mol_type = protein
                  organism = synthetic construct
SEQUENCE: 12
XPXPXPXPXP                                                                            10

SEQ ID NO: 13     moltype = AA  length = 119
FEATURE           Location/Qualifiers
REGION            1..119
                  note = Synthetic Construct
VARIANT           4
                  note = Xaa = L, I, V
VARIANT           6
                  note = Xaa = V, L, I
VARIANT           21
                  note = Xaa = A, V
VARIANT           27
                  note = Xaa = A, I, L
VARIANT           31
                  note = Xaa = I, T, S, F
VARIANT           47
                  note = Xaa = E, V, L
VARIANT           53
                  note = Xaa = K, R
VARIANT           54
                  note = Xaa = E, Q
VARIANT           56
                  note = Xaa = H, P, R
VARIANT           66
                  note = Xaa = L, T, G
VARIANT           68
                  note = Xaa = K, R
VARIANT           92
                  note = Xaa = V, I
VARIANT           94
                  note = Xaa = F, L, V
VARIANT           104
                  note = Xaa = F, V
source            1..119
                  mol_type = protein
                  organism = synthetic construct
SEQUENCE: 13
EEEXQXIQPD KSVLVAAGET XTLRCTXTSL XPVGPIQWFR GAGPGRXLIY NQXXGXFPRV    60
TTVSDXTXRN NMDFSIRIGN ITPADAGTYY CXKXRKGSPD DVEXKSGAGT ELSVRAKPS    119

SEQ ID NO: 14     moltype = AA  length = 118
FEATURE           Location/Qualifiers
REGION            1..118
                  note = Synthetic Construct
VARIANT           4
                  note = Xaa = L, I, V
VARIANT           6
                  note = Xaa = V, L, I
VARIANT           21
                  note = Xaa = A, V
VARIANT           27
                  note = Xaa = V, I, L
VARIANT           31
                  note = Xaa = I, T, S, F
VARIANT           47
                  note = Xaa = E, V, L
VARIANT           53
                  note = Xaa = K, R
VARIANT           54
                  note = Xaa = E, Q
VARIANT           56
                  note = Xaa = H, P, R
```

```
VARIANT                 66
                        note = Xaa = S, T, G
VARIANT                 68
                        note = Xaa = K, R
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 14
EEEXQXIQPD KSVSVAAGES XILHCTXTSL XPVGPIQWFR GAGPARXLIY NQXXGXFPRV    60
TTVSEXTXRE NMDFSISISN ITPADAGTYY CXKXRKGSPD TEXKSGAGTE LSVRAKPS     118

SEQ ID NO: 15           moltype = AA  length = 118
FEATURE                 Location/Qualifiers
REGION                  1..118
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = V, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = S, T, G
VARIANT                 68
                        note = Xaa = K, R
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 15
EEEXQXIQPD KSVSVAAGES XILLCTXTSL XPVGPIQWFR GAGPARXLIY NQXXGXFPRV    60
TTVSEXTXRE NMDFSISISN ITPADAGTYY CXKXRKGSPD TEXKSGAGTE LSVRAKPS     118

SEQ ID NO: 16           moltype = AA  length = 119
FEATURE                 Location/Qualifiers
REGION                  1..119
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = A, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
```

```
                              note = Xaa = L, T, G
VARIANT                       68
                              note = Xaa = K, R
VARIANT                       92
                              note = Xaa = V, I
VARIANT                       94
                              note = Xaa = F, L, V
VARIANT                       104
                              note = Xaa = F, V
source                        1..119
                              mol_type = protein
                              organism = synthetic construct
SEQUENCE: 16
EEGXQXIQPD KSVSVAAGES XILHCTXTSL XPVGPIQWFR GAGPGRXLIY NQXXGXFPRV    60
TTVSDXTXRN NMDFSIRIGN ITPADAGTYY CXKXRKGSPD DVEXKSGAGT ELSVRAKPS    119

SEQ ID NO: 17                 moltype = AA  length = 119
FEATURE                       Location/Qualifiers
REGION                        1..119
                              note = Synthetic Construct
VARIANT                       4
                              note = Xaa = L, I, V
VARIANT                       6
                              note = Xaa = V, L, I
VARIANT                       21
                              note = Xaa = A, V
VARIANT                       27
                              note = Xaa = A, I, L
VARIANT                       31
                              note = Xaa = I, T, S, F
VARIANT                       47
                              note = Xaa = E, V, L
VARIANT                       53
                              note = Xaa = K, R
VARIANT                       54
                              note = Xaa = E, Q
VARIANT                       56
                              note = Xaa = H, P, R
VARIANT                       66
                              note = Xaa = L, T, G
VARIANT                       68
                              note = Xaa = K, R
VARIANT                       92
                              note = Xaa = V, I
VARIANT                       94
                              note = Xaa = F, L, V
VARIANT                       104
                              note = Xaa = F, V
source                        1..119
                              mol_type = protein
                              organism = synthetic construct
SEQUENCE: 17
EEEXQXIQPD KFVLVAAGET XTLRCTXTSL XPVGPIQWFR GAGPGRXLIY NQXXGXFPRV    60
TTVSDXTXRN NMDFSIRIGN ITPADAGTYY CXKXRKGSPD DVEXKSGAGT ELSVRAKPS    119

SEQ ID NO: 18                 moltype = AA  length = 119
FEATURE                       Location/Qualifiers
REGION                        1..119
                              note = Synthetic Construct
VARIANT                       4
                              note = Xaa = L, I, V
VARIANT                       6
                              note = Xaa = V, L, I
VARIANT                       21
                              note = Xaa = A, V
VARIANT                       27
                              note = Xaa = A, I, L
VARIANT                       31
                              note = Xaa = I, T, S, F
VARIANT                       47
                              note = Xaa = E, V, L
VARIANT                       53
                              note = Xaa = K, R
VARIANT                       54
                              note = Xaa = E, Q
VARIANT                       56
                              note = Xaa = H, P, R
VARIANT                       66
                              note = Xaa = L, T, G
```

```
VARIANT                 68
                        note = Xaa = K, R
VARIANT                 92
                        note = Xaa = V, I
VARIANT                 94
                        note = Xaa = F, L, V
VARIANT                 104
                        note = Xaa = F, V
source                  1..119
                        mol_type = protein
                        organism = synthetic construct
SEQUENCE: 18
EEEXQXIQPD KSVLVAAGET XTLRCTXTSL XPVGPIQWFR GAGPGRXLIY NQXXGXFPRV   60
TTVSDXTXRN NMDFPIRIGN ITPADAGTYY CXKXRKGSPD DVEXKSGAGT ELSVRAKPS    119

SEQ ID NO: 19           moltype = AA  length = 118
FEATURE                 Location/Qualifiers
REGION                  1..118
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = V, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = S, T, G
VARIANT                 68
                        note = Xaa = K, R
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 19
EEEXQXIQPD KSVSVAAGES XILHCTXTSL XPVGPIQWFR GAGPARXLIY NQXXGXFPRV   60
TTVSEXTXRE NMDFSISISN ITPADAGTYY CXKXRKGSPD TEXKSGAGTE LSVRGKPS     118

SEQ ID NO: 20           moltype = AA  length = 118
FEATURE                 Location/Qualifiers
REGION                  1..118
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = A, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = S, T, G
VARIANT                 68
```

```
                        note = Xaa = K, R
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 20
EEEXQXIQPD KSVLVAAGET XTLRCTXTSL XPVGPIQWFR GAGPARXLIY NQXXGXFPRV   60
TTVSEXTXRE NMDFSISISN ITPADAGTYY CXKXRKGSPD TEXKSGAGTE LSVRAKPS    118

SEQ ID NO: 21           moltype = AA   length = 119
FEATURE                 Location/Qualifiers
REGION                  1..119
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = A, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = L, T, G
VARIANT                 68
                        note = Xaa = K, R
VARIANT                 92
                        note = Xaa = V, I
VARIANT                 94
                        note = Xaa = F, L, V
VARIANT                 104
                        note = Xaa = F, V
source                  1..119
                        mol_type = protein
                        organism = synthetic construct
SEQUENCE: 21
EEEXQXIQPD KSVLVAAGET XTLRCTXTSL XPVGPIQWFR GAGPGRXLIY NQXXGXFPRV   60
TTVSDXTXRN NMDFSIRISN ITPADAGTYY CXKXRKGSPD DVEXKSGAGT ELSVRAKPS   119

SEQ ID NO: 22           moltype = AA   length = 118
FEATURE                 Location/Qualifiers
REGION                  1..118
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = V, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = S, T, G
VARIANT                 68
                        note = Xaa = K, R
```

```
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 22
EEEXQXIQPD KSVSVAAGES XILHCTXTSL XPVGPIQWFR GAGPARXLIY NQXXGXFPRV   60
TTVSEXTXRE NMDFSISISN ITPADAGTYY CXKXRKGSPD TEXKSGAGTE LSVRAKPS    118

SEQ ID NO: 23           moltype = AA  length = 119
FEATURE                 Location/Qualifiers
REGION                  1..119
                        note = Synthetic Construct
VARIANT                 3
                        note = Xaa = E, G
VARIANT                 4
                        note = Xaa = L, I, V
VARIANT                 6
                        note = Xaa = V, L, I
VARIANT                 12
                        note = Xaa = S, F
VARIANT                 14
                        note = Xaa = L, S
VARIANT                 20
                        note = Xaa = S, T
VARIANT                 21
                        note = Xaa = A, V
VARIANT                 22
                        note = Xaa = I, T
VARIANT                 24
                        note = Xaa = H, R
VARIANT                 27
                        note = Xaa = A, V, I, L
VARIANT                 31
                        note = Xaa = I, T, S, F
VARIANT                 45
                        note = Xaa = A, G
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 65
                        note = Xaa = D, E
VARIANT                 66
                        note = Xaa = S, L, T, G
VARIANT                 68
                        note = Xaa = K, R
VARIANT                 70
                        note = Xaa = E, D
VARIANT                 75
                        note = Xaa = S, P
VARIANT                 77
                        note = Xaa = S, R
VARIANT                 79
                        note = Xaa = S, G
VARIANT                 92
                        note = Xaa = V, I
VARIANT                 94
                        note = Xaa = F, L, V
VARIANT                 101
                        note = Xaa = D or absent
VARIANT                 102
                        note = Xaa = T, V
VARIANT                 104
                        note = Xaa = F, V
VARIANT                 116
                        note = Xaa = A, G
source                  1..119
                        mol_type = protein
                        organism = synthetic construct
SEQUENCE: 23
```

```
EEXXQXIQPD KXVXVAAGEX XXLXCTXTSL XPVGPIQWFR GAGPXRXLIY NQXXGXFPRV    60
TTVSXXTXRX NMDFXIXIXN ITPADAGTYY CXKXRKGSPD XXEXKSGAGT ELSVRXKPS    119

SEQ ID NO: 24           moltype = AA  length = 102
FEATURE                 Location/Qualifiers
REGION                  1..102
                        note = Synthetic Construct
source                  1..102
                        mol_type = protein
                        organism = synthetic construct
SEQUENCE: 24
APVVSGPAAR ATPQHTVSFT CESHGFSPRD ITLKWFKNGN ELSDFQTNVD PVGESVSYSI    60
HSTAKVVLTR EDVHSQVICE VAHVTLQGDP LRGTANLSET IR                     102

SEQ ID NO: 25           moltype = AA  length = 99
FEATURE                 Location/Qualifiers
REGION                  1..99
                        note = Synthetic Construct
source                  1..99
                        mol_type = protein
                        organism = synthetic construct
SEQUENCE: 25
VPPTLEVTQQ PVRAENQVNV TCQVRKFYPQ RLQLTWLENG NVSRTETAST VTENKDGTYN    60
WMSWLLVNVS AHRDDVKLTC QVEHDGQPAV SKSHDLKVS                           99

SEQ ID NO: 26           moltype = AA  length = 118
FEATURE                 Location/Qualifiers
REGION                  1..118
                        note = Synthetic Construct
source                  1..118
                        mol_type = protein
                        organism = synthetic construct
SEQUENCE: 26
EEELQVIQPD KSVSVAAGES AILHCTITSL IPVGPIQWFR GAGPARELIY NQREGHFPRV    60
TTVSETTRRE NMDFSISISN ITPADAGTYY CVKFRKGSPD TEVKSGAGTE LSVRAKPS    118

SEQ ID NO: 27           moltype = AA  length = 118
FEATURE                 Location/Qualifiers
REGION                  1..118
                        note = Synthetic Construct
source                  1..118
                        mol_type = protein
                        organism = synthetic construct
SEQUENCE: 27
EEEVQVIQPD KSVSVAAGES AILHCTLTSL IPVGPIQWFR GAGPARVLIY NQRGHFPRV     60
TTVSEGTRRE NMDFSISISN ITPADAGTYY CIKFRKGSPD TEFKSGAGTE LSVRAKPS    118

SEQ ID NO: 28           moltype = AA  length = 118
FEATURE                 Location/Qualifiers
REGION                  1..118
                        note = Synthetic Construct
source                  1..118
                        mol_type = protein
                        organism = synthetic construct
SEQUENCE: 28
EEEVQIIQPD KSVSVAAGES VILHCTITSL TPVGPIQWFR GAGPARLLIY NQREGPFPRV    60
TTVSETTRRE NMDFSISISN ITPADAGTYY CVKLRKGSPD TEFKSGAGTE LSVRAKPS    118

SEQ ID NO: 29           moltype = AA  length = 118
FEATURE                 Location/Qualifiers
REGION                  1..118
                        note = Synthetic Construct
source                  1..118
                        mol_type = protein
                        organism = synthetic construct
SEQUENCE: 29
EEELQIIQPD KSVSVAAGES AILHCTITSL SPVGPIQWFR GAGPARVLIY NQRGPFPRV     60
TTVSEGTKRE NMDFSISISN ITPADAGTYY CIKLRKGSPD TEFKSGAGTE LSVRAKPS    118

SEQ ID NO: 30           moltype = AA  length = 118
FEATURE                 Location/Qualifiers
REGION                  1..118
                        note = Synthetic Construct
source                  1..118
                        mol_type = protein
                        organism = synthetic construct
SEQUENCE: 30
EEEIQVIQPD KSVSVAAGES VIIHCTVTSL FPVGPIQWFR GAGPARVLIY NQRGRFPRV     60
TTVSEGTKRE NMDFSISISN ITPADAGTYY CVKVRKGSPD TEVKSGAGTE LSVRAKPS    118
```

```
SEQ ID NO: 31          moltype = AA  length = 118
FEATURE                Location/Qualifiers
REGION                 1..118
                       note = Synthetic Construct
source                 1..118
                       mol_type = protein
                       organism = synthetic construct
SEQUENCE: 31
EEEVQIIQPD KSVSVAAGES IILHCTVTSL FPVGPIQWFR GAGPARVLIY NQREGRFPRV   60
TTVSEGTRRE NMDFSISISN ITPADAGTYY CIKLRKGSPD TEFKSGAGTE LSVRAKPS    118

SEQ ID NO: 32          moltype = AA  length = 118
FEATURE                Location/Qualifiers
REGION                 1..118
                       note = Synthetic Construct
source                 1..118
                       mol_type = protein
                       organism = synthetic construct
SEQUENCE: 32
EEEVQLIQPD KSVSVAAGES AILHCTVTSL FPVGPIQWFR GAGPARVLIY NQREGPFPRV   60
TTVSEGTKRE NMDFSISISN ITPADAGTYY CIKFRKGSPD TEVKSGAGTE LSVRAKPS    118

SEQ ID NO: 33          moltype = AA  length = 119
FEATURE                Location/Qualifiers
REGION                 1..119
                       note = Synthetic Construct
source                 1..119
                       mol_type = protein
                       organism = synthetic construct
SEQUENCE: 33
EEELQIIQPD KSVLVAAGET ATLRCTITSL FPVGPIQWFR GAGPGRVLIY NQRQGPFPRV   60
TTVSDTTKRN NMDFSIRIGN ITPADAGTYY CIKFRKGSPD DVEFKSGAGT ELSVRAKPS   119

SEQ ID NO: 34          moltype = AA  length = 118
FEATURE                Location/Qualifiers
REGION                 1..118
                       note = Synthetic Construct
source                 1..118
                       mol_type = protein
                       organism = synthetic construct
SEQUENCE: 34
EEELQIIQPD KSVSVAAGES AILHCTITSL FPVGPIQWFR GAGPARLLIY NQRQGPFPRV   60
TTVSETTKRE NMDFSISISN ITPADAGTYY CVKFRKGSPD TEFKSGAGTE LSVRAKPS    118

SEQ ID NO: 35          moltype = AA  length = 118
FEATURE                Location/Qualifiers
REGION                 1..118
                       note = Synthetic Construct
source                 1..118
                       mol_type = protein
                       organism = synthetic construct
SEQUENCE: 35
EEEVQIIQPD KSVSVAAGES AILHCTITSL FPVGPIQWFR GAGPARVLIY NQKQGPFPRV   60
TTISETTRRE NMDFSISISN ITPADAGTYY CIKFRKGSPD TEFKSGAGTE LSVRAKPS    118

SEQ ID NO: 36          moltype = AA  length = 118
FEATURE                Location/Qualifiers
REGION                 1..118
                       note = Synthetic Construct
source                 1..118
                       mol_type = protein
                       organism = synthetic construct
SEQUENCE: 36
EEELQIIQPD KSVSVAAGES AILHCTITSL TPVGPIQWFR GAGPARVLIY NQRQGPFPRV   60
TTVSEGTRRE NMDFSISISN ITPADAGTYY CIKFRKGSPD TEVKSGAGTE LSVRAKPS    118

SEQ ID NO: 37          moltype = AA  length = 119
FEATURE                Location/Qualifiers
REGION                 1..119
                       note = Synthetic Construct
VARIANT                4
                       note = Xaa = L, I, V
VARIANT                6
                       note = Xaa = V, L, I
VARIANT                21
                       note = Xaa = A, V
VARIANT                27
                       note = Xaa = A, I, L
```

```
VARIANT         31
                note = Xaa = I, T, S, F
VARIANT         47
                note = Xaa = E, V, L
VARIANT         53
                note = Xaa = K, R
VARIANT         54
                note = Xaa = E, Q
VARIANT         56
                note = Xaa = H, P, R
VARIANT         66
                note = Xaa = L, T, G
VARIANT         68
                note = Xaa = K, R
VARIANT         80
                note = Xaa = N, A, C, D, E, F, G, H, I, K, L, M, P, Q, R,
                S, T, V, W, Y
VARIANT         83
                note = Xaa = P, A, C, D, E, F, G, H, I, K, L, M, N, Q, R,
                S, T, V, W, Y
VARIANT         92
                note = Xaa = V, I
VARIANT         94
                note = Xaa = F, L, V
VARIANT         104
                note = Xaa = F, V
source          1..119
                mol_type = protein
                organism = synthetic construct
SEQUENCE: 37
EEEXQXIQPD KSVLVAAGET XTLRCTXTSL XPVGPIQWFR GAGPGRXLIY NQXXGXFPRV   60
TTVSDXTXRN NMDFSIRIGX ITXADAGTYY CXKXRKGSPD DVEXKSGAGT ELSVRAKPS    119

SEQ ID NO: 38           moltype = AA  length = 118
FEATURE                 Location/Qualifiers
REGION          1..118
                note = Synthetic Construct
VARIANT         4
                note = Xaa = L, I, V
VARIANT         6
                note = Xaa = V, L, I
VARIANT         21
                note = Xaa = A, V
VARIANT         27
                note = Xaa = V, I, L
VARIANT         31
                note = Xaa = I, T, S, F
VARIANT         47
                note = Xaa = E, V, L
VARIANT         53
                note = Xaa = K, R
VARIANT         54
                note = Xaa = E, Q
VARIANT         56
                note = Xaa = H, P, R
VARIANT         66
                note = Xaa = S, T, G
VARIANT         68
                note = Xaa = K, R
VARIANT         80
                note = Xaa = N, A, C, D, E, F, G, H, I, K, L, M, P, Q, R,
                S, T, V, W, Y
VARIANT         83
                note = Xaa = P, A, C, D, E, F, G, H, I, K, L, M, N, Q, R,
                S, T, V, W, Y
VARIANT         92
                note = Xaa = V, I
VARIANT         94
                note = Xaa = F, L, V
VARIANT         103
                note = Xaa = F, V
source          1..118
                mol_type = protein
                organism = synthetic construct
SEQUENCE: 38
EEEXQXIQPD KSVSVAAGES XILHCTXTSL XPVGPIQWFR GAGPARXLIY NQXXGXFPRV   60
TTVSEXTXRE NMDFSISISX ITXADAGTYY CXKXRKGSPD TEXKSGAGTE LSVRAKPS     118

SEQ ID NO: 39           moltype = AA  length = 118
```

```
FEATURE                 Location/Qualifiers
REGION                  1..118
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = V, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = S, T, G
VARIANT                 68
                        note = Xaa = K, R
VARIANT                 80
                        note = Xaa = N, A, C, D, E, F, G, H, I, K, L, M, P, Q, R,
                        S, T, V, W, Y
VARIANT                 83
                        note = Xaa = P, A, C, D, E, F, G, H, I, K, L, M, N, Q, R,
                        S, T, V, W, Y
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 39
EEEXQXIQPD KSVSVAAGES XILLCTXTSL XPVGPIQWFR GAGPARXLIY NQXXGXFPRV   60
TTVSEXTXRE NMDFSISISX ITXADAGTYY CXKXRKGSPD TEXKSGAGTE LSVRAKPS    118

SEQ ID NO: 40           moltype = AA  length = 119
FEATURE                 Location/Qualifiers
REGION                  1..119
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = A, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = L, T, G
VARIANT                 68
                        note = Xaa = K, R
VARIANT                 80
                        note = Xaa = N, A, C, D, E, F, G, H, I, K, L, M, P, Q, R,
                        S, T, V, W, Y
VARIANT                 83
                        note = Xaa = P, A, C, D, E, F, G, H, I, K, L, M, N, Q, R,
                        S, T, V, W, Y
VARIANT                 92
                        note = Xaa = V, I
VARIANT                 94
```

```
VARIANT            104
                   note = Xaa = F, V
source             1..119
                   mol_type = protein
                   organism = synthetic construct
SEQUENCE: 40
EEGXQXIQPD KSVSVAAGES XILHCTXTSL XPVGPIQWFR GAGPGRXLIY NQXXGXFPRV   60
TTVSDXTXRN NMDFSIRIGX ITXADAGTYY CXKXRKGSPD DVEXKSGAGT ELSVRAKPS   119

SEQ ID NO: 41      moltype = AA  length = 119
FEATURE            Location/Qualifiers
REGION             1..119
                   note = Synthetic Construct
VARIANT            4
                   note = Xaa = L, I, V
VARIANT            6
                   note = Xaa = V, L, I
VARIANT            21
                   note = Xaa = A, V
VARIANT            27
                   note = Xaa = A, I, L
VARIANT            31
                   note = Xaa = I, T, S, F
VARIANT            47
                   note = Xaa = E, V, L
VARIANT            53
                   note = Xaa = K, R
VARIANT            54
                   note = Xaa = E, Q
VARIANT            56
                   note = Xaa = H, P, R
VARIANT            66
                   note = Xaa = L, T, G
VARIANT            68
                   note = Xaa = K, R
VARIANT            80
                   note = Xaa = N, A, C, D, E, F, G, H, I, K, L, M, P, Q, R,
                    S, T, V, W, Y
VARIANT            83
                   note = Xaa = P, A, C, D, E, F, G, H, I, K, L, M, N, Q, R,
                    S, T, V, W, Y
VARIANT            92
                   note = Xaa = V, I
VARIANT            94
                   note = Xaa = F, L, V
VARIANT            104
                   note = Xaa = F, V
source             1..119
                   mol_type = protein
                   organism = synthetic construct
SEQUENCE: 41
EEEXQXIQPD KFVLVAAGET XTLRCTXTSL XPVGPIQWFR GAGPGRXLIY NQXXGXFPRV   60
TTVSDXTXRN NMDFSIRIGX ITXADAGTYY CXKXRKGSPD DVEXKSGAGT ELSVRAKPS   119

SEQ ID NO: 42      moltype = AA  length = 119
FEATURE            Location/Qualifiers
REGION             1..119
                   note = Synthetic Construct
VARIANT            4
                   note = Xaa = L, I, V
VARIANT            6
                   note = Xaa = V, L, I
VARIANT            21
                   note = Xaa = A, V
VARIANT            27
                   note = Xaa = A, I, L
VARIANT            31
                   note = Xaa = I, T, S, F
VARIANT            47
                   note = Xaa = E, V, L
VARIANT            53
                   note = Xaa = K, R
VARIANT            54
                   note = Xaa = E, Q
VARIANT            56
                   note = Xaa = H, P, R
VARIANT            66
                   note = Xaa = L, T, G
```

| | | |
|---|---|---|
| VARIANT | 68 | |
| | note = Xaa = K, R | |
| VARIANT | 80 | |
| | note = Xaa = N, A, C, D, E, F, G, H, I, K, L, M, P, Q, R, S, T, V, W, Y | |
| VARIANT | 83 | |
| | note = Xaa = P, A, C, D, E, F, G, H, I, K, L, M, N, Q, R, S, T, V, W, Y | |
| VARIANT | 92 | |
| | note = Xaa = V, I | |
| VARIANT | 94 | |
| | note = Xaa = F, L, V | |
| VARIANT | 104 | |
| | note = Xaa = F, V | |
| source | 1..119 | |
| | mol_type = protein | |
| | organism = synthetic construct | |

SEQUENCE: 42
EEEXQXIQPD KSVLVAAGET XTLRCTXTSL XPVGPIQWFR GAGPGRXLIY NQXXGXFPRV   60
TTVSDXTXRN NMDFPIRIGX ITXADAGTYY CXKXRKGSPD DVEXKSGAGT ELSVRAKPS   119

| | | |
|---|---|---|
| SEQ ID NO: 43 | moltype = AA length = 118 | |
| FEATURE | Location/Qualifiers | |
| REGION | 1..118 | |
| | note = Synthetic Construct | |
| VARIANT | 4 | |
| | note = Xaa = L, I, V | |
| VARIANT | 6 | |
| | note = Xaa = V, L, I | |
| VARIANT | 21 | |
| | note = Xaa = A, V | |
| VARIANT | 27 | |
| | note = Xaa = V, I, L | |
| VARIANT | 31 | |
| | note = Xaa = I, T, S, F | |
| VARIANT | 47 | |
| | note = Xaa = E, V, L | |
| VARIANT | 53 | |
| | note = Xaa = K, R | |
| VARIANT | 54 | |
| | note = Xaa = E, Q | |
| VARIANT | 56 | |
| | note = Xaa = H, P, R | |
| VARIANT | 66 | |
| | note = Xaa = S, T, G | |
| VARIANT | 68 | |
| | note = Xaa = K, R | |
| VARIANT | 80 | |
| | note = Xaa = N, A, C, D, E, F, G, H, I, K, L, M, P, Q, R, S, T, V, W, Y | |
| VARIANT | 83 | |
| | note = Xaa = P, A, C, D, E, F, G, H, I, K, L, M, N, Q, R, S, T, V, W, Y | |
| VARIANT | 92 | |
| | note = Xaa = V, I | |
| VARIANT | 94 | |
| | note = Xaa = F, L, V | |
| VARIANT | 103 | |
| | note = Xaa = F, V | |
| source | 1..118 | |
| | mol_type = protein | |
| | organism = synthetic construct | |

SEQUENCE: 43
EEEXQXIQPD KSVSVAAGES XILHCTXTSL XPVGPIQWFR GAGPARXLIY NQXXGXFPRV   60
TTVSEXTXRE NMDFSISISX ITXADAGTYY CXKXRKGSPD TEXKSGAGTE LSVRGKPS   118

| | | |
|---|---|---|
| SEQ ID NO: 44 | moltype = AA length = 118 | |
| FEATURE | Location/Qualifiers | |
| REGION | 1..118 | |
| | note = Synthetic Construct | |
| VARIANT | 4 | |
| | note = Xaa = L, I, V | |
| VARIANT | 6 | |
| | note = Xaa = V, L, I | |
| VARIANT | 21 | |
| | note = Xaa = A, V | |
| VARIANT | 27 | |
| | note = Xaa = A, I, L | |
| VARIANT | 31 | |

```
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = S, T, G
VARIANT                 68
                        note = Xaa = K, R
VARIANT                 80
                        note = Xaa = N, A, C, D, E, F, G, H, I, K, L, M, P, Q, R,
                         S, T, V, W, Y
VARIANT                 83
                        note = Xaa = P, A, C, D, E, F, G, H, I, K, L, M, N, Q, R,
                         S, T, V, W, Y
VARIANT                 92
                        note = Xaa = V, I
VARIANT                 94
                        note = Xaa = F, L, V
VARIANT                 103
                        note = Xaa = F, V
source                  1..118
                        mol_type = protein
                        organism = synthetic construct
SEQUENCE: 44
EEEXQXIQPD KSVLVAAGET XTLRCTXTSL XPVGPIQWFR GAGPARXLIY NQXXGXFPRV   60
TTVSEXTXRE NMDFSISISX ITXADAGTYY CXKXRKGSPD TEXKSGAGTE LSVRAKPS    118

SEQ ID NO: 45           moltype = AA  length = 119
FEATURE                 Location/Qualifiers
REGION                  1..119
                        note = Synthetic Construct
VARIANT                 4
                        note = Xaa = L, I, V
VARIANT                 6
                        note = Xaa = V, L, I
VARIANT                 21
                        note = Xaa = A, V
VARIANT                 27
                        note = Xaa = A, I, L
VARIANT                 31
                        note = Xaa = I, T, S, F
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = L, T, G
VARIANT                 68
                        note = Xaa = K, R
VARIANT                 80
                        note = Xaa = N, A, C, D, E, F, G, H, I, K, L, M, P, Q, R,
                         S, T, V, W, Y
VARIANT                 83
                        note = Xaa = P, A, C, D, E, F, G, H, I, K, L, M, N, Q, R,
                         S, T, V, W, Y
VARIANT                 92
                        note = Xaa = V, I
VARIANT                 94
                        note = Xaa = F, L, V
VARIANT                 104
                        note = Xaa = F, V
source                  1..119
                        mol_type = protein
                        organism = synthetic construct
SEQUENCE: 45
EEEXQXIQPD KSVLVAAGET XTLRCTXTSL XPVGPIQWFR GAGPGRXLIY NQXXGXFPRV   60
TTVSDXTXRN NMDFSIRISX ITXADAGTYY CXKXRKGSPD DVEXKSGAGT ELSVRAKPS   119

SEQ ID NO: 46           moltype = AA  length = 118
FEATURE                 Location/Qualifiers
```

```
REGION              1..118
                    note = Synthetic Construct
VARIANT             4
                    note = Xaa = L, I, V
VARIANT             6
                    note = Xaa = V, L, I
VARIANT             21
                    note = Xaa = A, V
VARIANT             27
                    note = Xaa = V, I, L
VARIANT             31
                    note = Xaa = I, T, S, F
VARIANT             47
                    note = Xaa = E, V, L
VARIANT             53
                    note = Xaa = K, R
VARIANT             54
                    note = Xaa = E, Q
VARIANT             56
                    note = Xaa = H, P, R
VARIANT             66
                    note = Xaa = S, T, G
VARIANT             68
                    note = Xaa = K, R
VARIANT             80
                    note = Xaa = N, A, C, D, E, F, G, H, I, K, L, M, P, Q, R,
                    S, T, V, W, Y
VARIANT             83
                    note = Xaa = P, A, C, D, E, F, G, H, I, K, L, M, N, Q, R,
                    S, T, V, W, Y
VARIANT             92
                    note = Xaa = V, I
VARIANT             94
                    note = Xaa = F, L, V
VARIANT             103
                    note = Xaa = F, V
source              1..118
                    mol_type = protein
                    organism = synthetic construct
SEQUENCE: 46
EEEXQXIQPD KSVSVAAGES XILHCTXTSL XPVGPIQWFR GAGPARXLIY NQXXGXFPRV    60
TTVSEXTXRE NMDFSISISX ITXADAGTYY CXKXRKGSPD TEXKSGAGTE LSVRAKPS     118

SEQ ID NO: 47       moltype = AA  length = 119
FEATURE             Location/Qualifiers
REGION              1..119
                    note = Synthetic Construct
VARIANT             3
                    note = Xaa = E, G
VARIANT             4
                    note = Xaa = L, I, V
VARIANT             6
                    note = Xaa = V, L, I
VARIANT             12
                    note = Xaa = S, F
VARIANT             14
                    note = Xaa = L, S
VARIANT             20
                    note = Xaa = S, T
VARIANT             21
                    note = Xaa = A, V
VARIANT             22
                    note = Xaa = I, T
VARIANT             24
                    note = Xaa = H, R, L
VARIANT             27
                    note = Xaa = A, V, I, L
VARIANT             31
                    note = Xaa = I, T, S, F
VARIANT             45
                    note = Xaa = A, G
VARIANT             47
                    note = Xaa = E, V, L
VARIANT             53
                    note = Xaa = K, R
VARIANT             54
                    note = Xaa = E, Q
VARIANT             56
                    note = Xaa = H, P, R
```

```
VARIANT              65
                     note = Xaa = D, E
VARIANT              66
                     note = Xaa = S, L, T, G
VARIANT              68
                     note = Xaa = K, R
VARIANT              70
                     note = Xaa = E, N
VARIANT              75
                     note = Xaa = S, P
VARIANT              77
                     note = Xaa = S, R
VARIANT              79
                     note = Xaa = S, G
VARIANT              80
                     note = Xaa = Any Amino Acid
VARIANT              83
                     note = Xaa = Any Amino Acid
VARIANT              92
                     note = Xaa = V, I
VARIANT              94
                     note = Xaa = F, L, V
VARIANT              101
                     note = Xaa = D or absent
VARIANT              102
                     note = Xaa = T, V
VARIANT              104
                     note = Xaa = F, V
VARIANT              116
                     note = Xaa = A, G
source               1..119
                     mol_type = protein
                     organism = synthetic construct
SEQUENCE: 47
EEXXQXIQPD KXVXVAAGEX XXLXCTXTSL XPVGPIQWFR GAGPXRXLIY NQXXGXFPRV    60
TTVSXXTXRX NMDFXIXIXX ITXADAGTYY CXKXRKGSPD XXEXKSGAGT ELSVRXKPS    119

SEQ ID NO: 48        moltype = AA  length = 119
FEATURE              Location/Qualifiers
REGION               1..119
                     note = Synthetic Construct
VARIANT              6
                     note = Xaa = V, I
VARIANT              14
                     note = Xaa = L, S
VARIANT              20
                     note = Xaa = T, S
VARIANT              22
                     note = Xaa = T, I
VARIANT              24
                     note = Xaa = R, H
VARIANT              27
                     note = Xaa = A, V, I
VARIANT              31
                     note = Xaa = I, R, Y, K, F
VARIANT              45
                     note = Xaa = G, A
VARIANT              47
                     note = Xaa = E, V
VARIANT              53
                     note = Xaa = K, R
VARIANT              54
                     note = Xaa = E, D, Q
VARIANT              56
                     note = Xaa = H, P
VARIANT              65
                     note = Xaa = D, E
VARIANT              66
                     note = Xaa = S, L, T
VARIANT              70
                     note = Xaa = N, E
VARIANT              77
                     note = Xaa = R, S
VARIANT              79
                     note = Xaa = G, S
VARIANT              80
                     note = Xaa = N, A
VARIANT              92
                     note = Xaa = V, I
```

```
VARIANT                 98
                        note = Xaa = S, I, M
VARIANT                 99
                        note = Xaa = P or absent
VARIANT                 100
                        note = Xaa = D, P
VARIANT                 102
                        note = Xaa = V, T
source                  1..119
                        mol_type = protein
                        organism = synthetic construct
SEQUENCE: 48
EEELQXIQPD KSVXVAAGEX AXLXCTXTSL XPVGPIQWFR GAGPXRXLIY NQXXGXFPRV   60
TTVSXXTKRX NMDFSIXIXX ITPADAGTYY CXKFRKGXXX DXEFKSGAGT ELSVRAKPS   119

SEQ ID NO: 49           moltype = AA  length = 119
FEATURE                 Location/Qualifiers
REGION                  1..119
                        note = Synthetic Construct
VARIANT                 6
                        note = Xaa = V, I, L
VARIANT                 27
                        note = Xaa = A, I, V, L
VARIANT                 31
                        note = Xaa = I, F, S, T
VARIANT                 47
                        note = Xaa = E, V, L
VARIANT                 53
                        note = Xaa = K, R
VARIANT                 54
                        note = Xaa = E, Q
VARIANT                 56
                        note = Xaa = H, P, R
VARIANT                 66
                        note = Xaa = L, T, S, G
VARIANT                 80
                        note = Xaa = A
VARIANT                 92
                        note = Xaa = V, I
source                  1..119
                        mol_type = protein
                        organism = synthetic construct
SEQUENCE: 49
EEELQXIQPD KSVLVAAGET ATLRCTXTSL XPVGPIQWFR GAGPGRXLIY NQXXGXFPRV   60
TTVSDXTKRN NMDFSIRIGX ITPADAGTYY CXKFRKGSPD DVEFKSGAGT ELSVRAKPS   119

SEQ ID NO: 50           moltype = AA  length = 118
FEATURE                 Location/Qualifiers
REGION                  1..118
                        note = Synthetic Construct
VARIANT                 6
                        note = Xaa = V, I
VARIANT                 27
                        note = Xaa = V, I
VARIANT                 31
                        note = Xaa = I, F
VARIANT                 47
                        note = Xaa = E, V
VARIANT                 53
                        note = Xaa = K, R
VARIANT                 54
                        note = Xaa = E, Q
VARIANT                 56
                        note = Xaa = H, P
VARIANT                 66
                        note = Xaa = S, T
VARIANT                 80
                        note = Xaa = N, A
VARIANT                 92
                        note = Xaa = V, I
source                  1..118
                        mol_type = protein
                        organism = synthetic construct
SEQUENCE: 50
EEELQXIQPD KSVSVAAGES AILHCTXTSL XPVGPIQWFR GAGPARXLIY NQXXGXFPRV   60
TTVSEXTKRE NMDFSISISX ITPADAGTYY CXKFRKGSPD TEFKSGAGTE LSVRAKPS    118

SEQ ID NO: 51           moltype = AA  length = 119
FEATURE                 Location/Qualifiers
```

```
REGION                   1..119
                         note = Synthetic Construct
VARIANT                  6
                         note = Xaa = V, I
VARIANT                  27
                         note = Xaa = A, I
VARIANT                  31
                         note = Xaa = I, F
VARIANT                  47
                         note = Xaa = E, V
VARIANT                  53
                         note = Xaa = K, R
VARIANT                  56
                         note = Xaa = H, P
VARIANT                  66
                         note = Xaa = L, T
VARIANT                  80
                         note = Xaa = N, A
VARIANT                  92
                         note = Xaa = V, I
source                   1..119
                         mol_type = protein
                         organism = synthetic construct
SEQUENCE: 51
EEELQXIQPD KSVLVAAGET ATLRCTXTSL XPVGPIQWFR GAGPGRXLIY NQXEGXFPRV    60
TTVSDXTKRN NMDFSIRIGX ITPADAGTYY CXKFRKGSPD DVEFKSGAGT ELSVRAKPS    119

SEQ ID NO: 52            moltype = AA  length = 119
FEATURE                  Location/Qualifiers
REGION                   1..119
                         note = Synthetic Construct
VARIANT                  6
                         note = Xaa = V, L, I
VARIANT                  27
                         note = Xaa = A, I, L
VARIANT                  31
                         note = Xaa = I, T, S, F
VARIANT                  53
                         note = Xaa = K, R
VARIANT                  56
                         note = Xaa = H, P, R
VARIANT                  66
                         note = Xaa = L, T, G
VARIANT                  80
                         note = Xaa = N, A
source                   1..119
                         mol_type = protein
                         organism = synthetic construct
SEQUENCE: 52
EEELQXIQPD KSVLVAAGET ATLRCTXTSL XPVGPIQWFR GAGPGRELIY NQXEGXFPRV    60
TTVSDXTKRN NMDFSIRIGX ITPADAGTYY CVKFRKGSPD DVEFKSGAGT ELSVRAKPS    119

SEQ ID NO: 53            moltype = AA  length = 118
FEATURE                  Location/Qualifiers
REGION                   1..118
                         note = Synthetic Construct
source                   1..118
                         mol_type = protein
                         organism = synthetic construct
SEQUENCE: 53
EEELQIIQPD KSVSVAAGES AILHCTITSL FPVGPIQWFR GAGPARVLIY NQRQGPFPRV    60
TTVSETTKRE NMDFSISISN ITPADAGTYY CIKFRKGSPD TEFKSGAGTE LSVRAKPS     118

SEQ ID NO: 54            moltype = AA  length = 118
FEATURE                  Location/Qualifiers
REGION                   1..118
                         note = Synthetic Construct
source                   1..118
                         mol_type = protein
                         organism = synthetic construct
SEQUENCE: 54
EEELQVIQPD KSVSVAAGES AILHCTVTSL FPVGPIQWFR GAGPARELIY NQRQGPFPRV    60
TTVSESTKRE NMDFSISISN ITPADAGTYY CVKFRKGSPD TEFKSGAGTE LSVRAKPS     118

SEQ ID NO: 55            moltype = AA  length = 118
FEATURE                  Location/Qualifiers
REGION                   1..118
                         note = Synthetic Construct
source                   1..118
```

-continued

```
                            mol_type = protein
                            organism = synthetic construct
SEQUENCE: 55
EEELQVIQPD KSVSVAAGES AILHCTITSL FPVGPIQWFR GAGPARVLIY NQRQGPFPRV    60
TTVSETTKRE NMDFSISISN ITPADAGTYY CIKFRKGSPD TEFKSGAGTE LSVRAKPS     118

SEQ ID NO: 56           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 56
EEELQIIQPD KSVSVAAGES AILHCTVTSL FPVGPIQWFR GAGPARVLIY NQRQGPFPRV    60
TTVSETTKRE NMDFSISISN ITPADAGTYY CIKFRKGSPD TEFKSGAGTE LSVRAKPS     118

SEQ ID NO: 57           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 57
EEELQIIQPD KSVSVAAGES AILHCTITSL IPVGPIQWFR GAGPARVLIY NQRQGPFPRV    60
TTVSETTKRE NMDFSISISN ITPADAGTYY CIKFRKGSPD TEFKSGAGTE LSVRAKPS     118

SEQ ID NO: 58           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 58
EEELQIIQPD KSVSVAAGES AILHCTITSL FPVGPIQWFR GAGPARELIY NQRQGPFPRV    60
TTVSETTKRE NMDFSISISN ITPADAGTYY CIKFRKGSPD TEFKSGAGTE LSVRAKPS     118

SEQ ID NO: 59           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 59
EEELQIIQPD KSVSVAAGES AILHCTITSL FPVGPIQWFR GAGPARVLIY NQKQGPFPRV    60
TTVSETTKRE NMDFSISISN ITPADAGTYY CIKFRKGSPD TEFKSGAGTE LSVRAKPS     118

SEQ ID NO: 60           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 60
EEELQIIQPD KSVSVAAGES AILHCTITSL FPVGPIQWFR GAGPARVLIY NQREGPFPRV    60
TTVSETTKRE NMDFSISISN ITPADAGTYY CIKFRKGSPD TEFKSGAGTE LSVRAKPS     118

SEQ ID NO: 61           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 61
EEELQIIQPD KSVSVAAGES AILHCTITSL FPVGPIQWFR GAGPARVLIY NQRQGHFPRV    60
TTVSETTKRE NMDFSISISN ITPADAGTYY CIKFRKGSPD TEFKSGAGTE LSVRAKPS     118

SEQ ID NO: 62           moltype = AA   length = 118
FEATURE                 Location/Qualifiers
REGION                  1..118
                        note = Synthetic Construct
source                  1..118
                        mol_type = protein
                        organism = synthetic construct
```

```
SEQUENCE: 62
EEELQIIQPD KSVSVAAGES AILHCTITSL FPVGPIQWFR GAGPARVLIY NQRQGPFPRV   60
TTVSESTKRE NMDFSISISN ITPADAGTYY CIKFRKGSPD TEFKSGAGTE LSVRAKPS    118

SEQ ID NO: 63           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 63
EEELQIIQPD KSVSVAAGES AILHCTITSL FPVGPIQWFR GAGPARVLIY NQRQGPFPRV   60
TTVSETTKRE NMDFSISISN ITPADAGTYY CVKFRKGSPD TEFKSGAGTE LSVRAKPS    118

SEQ ID NO: 64           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 64
EEELQVIQPD KSVSVAAGES AILHCTVTSL IPVGPIQWFR GAGPARELIY NQREGPFPRV   60
TTVSESTKRE NMDFSISISN ITPADAGTYY CVKFRKGSPD TEFKSGAGTE LSVRAKPS    118

SEQ ID NO: 65           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 65
EEELQVIQPD KSVSVAAGES AILHCTVTSL FPVGPIQWFR GAGPARELIY NQREGPFPRV   60
TTVSESTKRE NMDFSISISN ITPADAGTYY CVKFRKGSPD TEFKSGAGTE LSVRAKPS    118

SEQ ID NO: 66           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 66
EEELQVIQPD KSVSVAAGES AILHCTITSL FPVGPIQWFR GAGPARELIY NQREGPFPRV   60
TTVSESTKRE NMDFSISISN ITPADAGTYY CVKFRKGSPD TEFKSGAGTE LSVRAKPS    118

SEQ ID NO: 67           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 67
EEELQVIQPD KSVSVAAGES AILHCTITSL FPVGPIQWFR GAGPARELIY NQREGPFPRV   60
TTVSETTKRE NMDFSISISN ITPADAGTYY CVKFRKGSPD TEFKSGAGTE LSVRAKPS    118

SEQ ID NO: 68           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 68
EEELQIIQPD KSVSVAAGES AILHCTITSL FPVGPIQWFR GAGPARELIY NQREGPFPRV   60
TTVSESTKRE NMDFSISISN ITPADAGTYY CVKFRKGSPD TEFKSGAGTE LSVRAKPS    118

SEQ ID NO: 69           moltype = AA   length = 118
FEATURE                 Location/Qualifiers
REGION                  1..118
                        note = Synthetic Construct
source                  1..118
                        mol_type = protein
                        organism = synthetic construct
SEQUENCE: 69
EEELQVIQPD KSVSVAAGES AILHCTITSL IPVGPIQWFR GAGPARELIY NQREGPFPRV   60
```

```
TTVSESTKRE NMDFSISISN ITPADAGTYY CVKFRKGSPD TEFKSGAGTE LSVRAKPS      118

SEQ ID NO: 70            moltype = AA   length = 118
FEATURE                  Location/Qualifiers
REGION                   1..118
                         note = Synthetic Construct
source                   1..118
                         mol_type = protein
                         organism = synthetic construct
SEQUENCE: 70
EEELQIIQPD KSVSVAAGES AILHCTITSL FPVGPIQWFR GAGPARELIY NQREGPFPRV     60
TTVSETTKRE NMDFSISISN ITPADAGTYY CVKFRKGSPD TEFKSGAGTE LSVRAKPS      118

SEQ ID NO: 71            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 71
EEELQVIQPD KSVLVAAGET ATLRCTATSL FPVGPIQWFR GAGPGRELIY NQRQGPFPRV     60
TTVSDLTKRN NMDFSIRIGN ITPADAGTYY CVKFRKGSPD DVEFKSGAGT ELSVRAKPS    119

SEQ ID NO: 72            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 72
EEELQIIQPD KSVLVAAGET ATLRCTITSL FPVGPIQWFR GAGPGRELIY NQREGPFPRV     60
TTVSDLTKRN NMDFSIRIGN ITPADAGTYY CVKFRKGSPD DVEFKSGAGT ELSVRAKPS    119

SEQ ID NO: 73            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 73
EEELQVIQPD KSVLVAAGET ATLRCTITSL FPVGPIQWFR GAGPGRELIY NQREGPFPRV     60
TTVSDTTKRN NMDFSIRIGN ITPADAGTYY CVKFRKGSPD DVEFKSGAGT ELSVRAKPS    119

SEQ ID NO: 74            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 74
EEELQIIQPD KSVLVAAGET ATLRCTITSL FPVGPIQWFR GAGPGRELIY NQREGPFPRV     60
TTVSDTTKRN NMDFSIRIGN ITPADAGTYY CVKFRKGSPD DVEFKSGAGT ELSVRAKPS    119

SEQ ID NO: 75            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 75
EEELQVIQPD KSVLVAAGET ATLRCTITSL FPVGPIQWFR GAGPGRELIY NQREGPFPRV     60
TTVSDLTKRN NMDFSIRIGN ITPADAGTYY CVKFRKGSPD DVEFKSGAGT ELSVRAKPS    119

SEQ ID NO: 76            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 76
EEELQVIQPD KSVLVAAGET ATLRCTATSL FPVGPIQWFR GAGPGRELIY NQREGPFPRV     60
TTVSDLTKRN NMDFSIRIGN ITPADAGTYY CVKFRKGSPD DVEFKSGAGT ELSVRAKPS    119
```

-continued

```
SEQ ID NO: 77            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 77
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPS    119

SEQ ID NO: 78            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 78
EEELQIIQPD KSVLVAAGET ATLRCTITSL FPVGPIQWFR GAGPGRVLIY NQRQGPFPRV    60
TTVSDTTKRN NMDFSIRIGA ITPADAGTYY CIKFRKGSPD DVEFKSGAGT ELSVRAKPS    119

SEQ ID NO: 79            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 79
EEELQVIQPD KSVLVAAGET ATLRCTATSL FPVGPIQWFR GAGPGRELIY NQRQGPFPRV    60
TTVSDLTKRN NMDFSIRIGA ITPADAGTYY CVKFRKGSPD DVEFKSGAGT ELSVRAKPS    119

SEQ ID NO: 80            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 80
EEELQIIQPD KSVLVAAGET ATLRCTITSL FPVGPIQWFR GAGPGRVLIY NQREGPFPRV    60
TTVSDTTKRN NMDFSIRIGA ITPADAGTYY CIKFRKGSPD DVEFKSGAGT ELSVRAKPS    119

SEQ ID NO: 81            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 81
EEELQVIQPD KSVLVAAGET ATLRCTATSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPS    119

SEQ ID NO: 82            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 82
EEELQVIQPD KSVLVAAGET ATLRCTITSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPS    119

SEQ ID NO: 83            moltype = AA   length = 119
FEATURE                  Location/Qualifiers
REGION                   1..119
                         note = Synthetic Construct
source                   1..119
                         mol_type = protein
                         organism = synthetic construct
SEQUENCE: 83
EEELQIIQPD KSVLVAAGET ATLRCTITSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPS    119

SEQ ID NO: 84            moltype = AA   length = 119
FEATURE                  Location/Qualifiers
```

```
REGION                  1..119
                        note = Synthetic Construct
source                  1..119
                        mol_type = protein
                        organism = synthetic construct
SEQUENCE: 84
EEELQVIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPS    119

SEQ ID NO: 85           moltype = AA  length = 119
FEATURE                 Location/Qualifiers
REGION                  1..119
                        note = Synthetic Construct
source                  1..119
                        mol_type = protein
                        organism = synthetic construct
SEQUENCE: 85
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPS    119

SEQ ID NO: 86           moltype = AA  length = 119
FEATURE                 Location/Qualifiers
REGION                  1..119
                        note = Synthetic Construct
source                  1..119
                        mol_type = protein
                        organism = synthetic construct
SEQUENCE: 86
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPS    119

SEQ ID NO: 87           moltype = AA  length = 119
FEATURE                 Location/Qualifiers
REGION                  1..119
                        note = Synthetic Construct
source                  1..119
                        mol_type = protein
                        organism = synthetic construct
SEQUENCE: 87
EEELQVIQPD KSVLVAAGET ATLRCTATSL IPVGPIQWFR GAGPGRELIY NQKEGHFPRV    60
TTVSDLTKRN NMDFSIRIGN ITPADAGTYY CVKFRKGSPD DVEFKSGAGT ELSVRAKPS    119

SEQ ID NO: 88           moltype = AA  length = 232
FEATURE                 Location/Qualifiers
REGION                  1..232
                        note = Synthetic Construct
source                  1..232
                        mol_type = protein
                        organism = synthetic construct
SEQUENCE: 88
EPKSCDKTHT CPPCPAPELL GGPSVFLFPP KPKDTLMISR TPEVTCVVVD VSHEDPEVKF    60
NWYVDGVEVH NAKTKPREEQ YNSTYRVVSV LTVLHQDWLN GKEYKCKVSN KALPAPIEKT   120
ISKAKGQPRE PQVYTLPPSR EEMTKNQVSL TCLVKGFYPS DIAVEWESNG QPENNYKTTP   180
PVLDSDGSFF LYSKLTVDKS RWQQGNVFSC SVMHEALHNH YTQKSLSLSP GK           232

SEQ ID NO: 89           moltype = AA  length = 325
FEATURE                 Location/Qualifiers
REGION                  1..325
                        note = Synthetic Construct
source                  1..325
                        mol_type = protein
                        organism = synthetic construct
SEQUENCE: 89
STKGPSVFPL APCSRSTSES TAALGCLVKD YFPEPVTVSW NSGALTSGVH TFPAVLQSSG    60
LYSLSSVVTV PSSSLGTQTY TCNVDHKPSN TKVDKTVERK CCVECPPCPA PPVAGPSVFL   120
FPPKPKDTLM ISRTPEVTCV VVDVSHEDPE VQFNWYVDGV EVHNAKTKPR EEQFNSTFRV   180
VSVLTVVHQD WLNGKEYKCK VSNKGLPAPI EKTISKTKGQ PREPQVYTLP PSREEMTKNQ   240
VSLTCLVKGF YPSDIAVEWE SNGQPENNYK TTPPMLDSDG SFFLYSKLTV DKSRWQQGNV   300
FSCSVMHEAL HNHYTQKSLS LSPGK                                         325

SEQ ID NO: 90           moltype = AA  length = 227
FEATURE                 Location/Qualifiers
REGION                  1..227
                        note = Synthetic Construct
source                  1..227
                        mol_type = protein
                        organism = synthetic construct
SEQUENCE: 90
DKTHTCPPCP APEAAGAPSV FLFPPKPKDT LMISRTPEVT CVVVDVSHED PEVKFNWYVD    60
```

```
GVEVHNAKTK PREEQYASTY RVVSVLTVLH QDWLNGKEYK CKVSNKALPA PIEKTISKAK    120
GQPREPQVYT LPPSREEMTK NQVSLTCLVK GFYPSDIAVE WESNGQPENN YKTTPPVLDS    180
DGSFFLYSKL TVDKSRWQQG NVFSCSVMHE ALHNHYTQKS LSLSPGK                 227

SEQ ID NO: 91              moltype = AA  length = 226
FEATURE                    Location/Qualifiers
REGION                     1..226
                           note = Synthetic Construct
source                     1..226
                           mol_type = protein
                           organism = synthetic construct
SEQUENCE: 91
DKTHTCPPCP APEAAGAPSV FLFPPKPKDT LMISRTPEVT CVVVDVSHED PEVKFNWYVD    60
GVEVHNAKTK PREEQYASTY RVVSVLTVLH QDWLNGKEYK CKVSNKALPA PIEKTISKAK    120
GQPREPQVYT LPPSREEMTK NQVSLTCLVK GFYPSDIAVE WESNGQPENN YKTTPPVLDS    180
DGSFFLYSKL TVDKSRWQQG NVFSCSVMHE ALHNHYTQKS LSLSPG                  226

SEQ ID NO: 92              moltype = AA  length = 223
FEATURE                    Location/Qualifiers
REGION                     1..223
                           note = Synthetic Construct
source                     1..223
                           mol_type = protein
                           organism = synthetic construct
SEQUENCE: 92
VECPPCPAPP VAGPSVFLFP PKPKDTLMIS RTPEVTCVVV DVSHEDPEVQ FNWYVDGVEV    60
HNAKTKPREE QFASTFRVVS VLTVVHQDWL NGKEYKCKVS NKGLPSSIEK TISKTKGQPR    120
EPQVYTLPPS REEMTKNQVS LTCLVKGFYP SDIAVEWESN GQPENNYKTT PPMLDSDGSF    180
FLYSKLTVDK SRWQQGNVFS CSVMHEALHN HYTQKSLSLS PGK                     223

SEQ ID NO: 93              moltype = AA  length = 222
FEATURE                    Location/Qualifiers
REGION                     1..222
                           note = Synthetic Construct
source                     1..222
                           mol_type = protein
                           organism = synthetic construct
SEQUENCE: 93
VECPPCPAPP VAGPSVFLFP PKPKDTLMIS RTPEVTCVVV DVSHEDPEVQ FNWYVDGVEV    60
HNAKTKPREE QFASTFRVVS VLTVVHQDWL NGKEYKCKVS NKGLPSSIEK TISKTKGQPR    120
EPQVYTLPPS REEMTKNQVS LTCLVKGFYP SDIAVEWESN GQPENNYKTT PPMLDSDGSF    180
FLYSKLTVDK SRWQQGNVFS CSVMHEALHN HYTQKSLSLS PG                      222

SEQ ID NO: 94              moltype = AA  length = 228
FEATURE                    Location/Qualifiers
REGION                     1..228
                           note = Synthetic Construct
source                     1..228
                           mol_type = protein
                           organism = synthetic construct
SEQUENCE: 94
ERKSSVECPP CPAPPVAGPS VFLFPPKPKD TLMISRTPEV TCVVVDVSHE DPEVQFNWYV    60
DGVEVHNAKT KPREEQFAST FRVVSVLTVV HQDWLNGKEY KCKVSNKGLP SSIEKTISKT    120
KGQPREPQVY TLPPSREEMT KNQVSLTCLV KGFYPSDIAV EWESNGQPEN NYKTTPPMLD    180
SDGSFFLYSK LTVDKSRWQQ GNVFSCSVMH EALHNHYTQK SLSLSPGK                228

SEQ ID NO: 95              moltype = AA  length = 227
FEATURE                    Location/Qualifiers
REGION                     1..227
                           note = Synthetic Construct
source                     1..227
                           mol_type = protein
                           organism = synthetic construct
SEQUENCE: 95
ERKSSVECPP CPAPPVAGPS VFLFPPKPKD TLMISRTPEV TCVVVDVSHE DPEVQFNWYV    60
DGVEVHNAKT KPREEQFAST FRVVSVLTVV HQDWLNGKEY KCKVSNKGLP SSIEKTISKT    120
KGQPREPQVY TLPPSREEMT KNQVSLTCLV KGFYPSDIAV EWESNGQPEN NYKTTPPMLD    180
SDGSFFLYSK LTVDKSRWQQ GNVFSCSVMH EALHNHYTQK SLSLSPG                 227

SEQ ID NO: 96              moltype = AA  length = 346
FEATURE                    Location/Qualifiers
REGION                     1..346
                           note = Synthetic Construct
source                     1..346
                           mol_type = protein
                           organism = synthetic construct
SEQUENCE: 96
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSD    120
```

```
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPGK                 346

SEQ ID NO: 97           moltype = AA   length = 346
FEATURE                 Location/Qualifiers
REGION                  1..346
                        note = Synthetic Construct
source                  1..346
                        mol_type = protein
                        organism = synthetic construct
SEQUENCE: 97
EEELQVIQPD KSVLVAAGET ATLRCTATSL FPVGPIQWFR GAGPGRELIY NQRGPFPRV    60
TTVSDLTKRN NMDFSIRIGN ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                346

SEQ ID NO: 98           moltype = AA   length = 346
FEATURE                 Location/Qualifiers
REGION                  1..346
                        note = Synthetic Construct
source                  1..346
                        mol_type = protein
                        organism = synthetic construct
SEQUENCE: 98
EEELQIIQPD KSVLVAAGET ATLRCTITSL FPVGPIQWFR GAGPGRVLIY NQRQGPFPRV   60
TTVSDTTKRN NMDFSIRIGA ITPADAGTYY CIKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                346

SEQ ID NO: 99           moltype = AA   length = 346
FEATURE                 Location/Qualifiers
REGION                  1..346
                        note = Synthetic Construct
source                  1..346
                        mol_type = protein
                        organism = synthetic construct
SEQUENCE: 99
EEELQVIQPD KSVLVAAGET ATLRCTATSL FPVGPIQWFR GAGPGRELIY NQRQGPFPRV   60
TTVSDLTKRN NMDFSIRIGA ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                346

SEQ ID NO: 100          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 100
EEELQVIQPD KSVLVAAGET ATLRCTATSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                346

SEQ ID NO: 101          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 101
EEELQVIQPD KSVLVAAGET ATLRCTITSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                346
```

```
SEQ ID NO: 102              moltype = AA  length = 346
FEATURE                     Location/Qualifiers
REGION                      1..346
                            note = Synthetic Construct
source                      1..346
                            mol_type = protein
                            organism = synthetic construct
SEQUENCE: 102
EEELQIIQPD KSVLVAAGET ATLRCTITSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                 346

SEQ ID NO: 103              moltype = AA  length = 346
FEATURE                     Location/Qualifiers
REGION                      1..346
                            note = Synthetic Construct
source                      1..346
                            mol_type = protein
                            organism = synthetic construct
SEQUENCE: 103
EEELQVIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                 346

SEQ ID NO: 104              moltype = AA  length = 346
FEATURE                     Location/Qualifiers
REGION                      1..346
                            note = Synthetic Construct
source                      1..346
                            mol_type = protein
                            organism = synthetic construct
SEQUENCE: 104
EEELQIIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                 346

SEQ ID NO: 105              moltype = AA  length = 342
FEATURE                     Location/Qualifiers
REGION                      1..342
                            note = Synthetic Construct
source                      1..342
                            mol_type = protein
                            organism = synthetic construct
SEQUENCE: 105
EEELQIIQPD KSVLVAAGET ATLRCTITSL FPVGPIQWFR GAGPGRVLIY NQRGPFPRV    60
TTVSDTTKRN NMDFSIRIGN ITPADAGTYY CIKFRKGSPD DVEFKSGAGT ELSVRAKPSV  120
ECPPCPAPPV AGPSVFLFPP KPKDTLMISR TPEVTCVVVD VSHEDPEVQF NWYVDGVEVH  180
NAKTKPREEQ FASTFRVVSV LTVVHQDWLN GKEYKCKVSN KGLPSSIEKT ISKTKGQPRE  240
PQVYTLPPSR EEMTKNQVSL TCLVKGFYPS DIAVEWESNG QPENNYKTTP PMLDSDGSFF  300
LYSKLTVDKS RWQQGNVFSC SVMHEALHNH YTQKSLSLSP GK                     342

SEQ ID NO: 106              moltype = AA  length = 342
FEATURE                     Location/Qualifiers
REGION                      1..342
                            note = Synthetic Construct
source                      1..342
                            mol_type = protein
                            organism = synthetic construct
SEQUENCE: 106
EEELQVIQPD KSVLVAAGET ATLRCTATSL FPVGPIQWFR GAGPGRELIY NQRGPFPRV    60
TTVSDLTKRN NMDFSIRIGN ITPADAGTYY CVKFRKGSPD DVEFKSGAGT ELSVRAKPSV  120
ECPPCPAPPV AGPSVFLFPP KPKDTLMISR TPEVTCVVVD VSHEDPEVQF NWYVDGVEVH  180
NAKTKPREEQ FASTFRVVSV LTVVHQDWLN GKEYKCKVSN KGLPSSIEKT ISKTKGQPRE  240
PQVYTLPPSR EEMTKNQVSL TCLVKGFYPS DIAVEWESNG QPENNYKTTP PMLDSDGSFF  300
LYSKLTVDKS RWQQGNVFSC SVMHEALHNH YTQKSLSLSP GK                     342

SEQ ID NO: 107              moltype = AA  length = 342
FEATURE                     Location/Qualifiers
REGION                      1..342
```

```
                         note      = Synthetic Construct
source                   1..342
                         mol_type  = protein
                         organism  = synthetic construct
SEQUENCE: 107
EEELQIIQPD KSVLVAAGET ATLRCTITSL FPVGPIQWFR GAGPGRVLIY NQRQGPFPRV    60
TTVSDTTKRN NMDFSIRIGA ITPADAGTYY CIKFRKGSPD DVEFKSGAGT ELSVRAKPSV   120
ECPPCPAPPV AGPSVFLFPP KPKDTLMISR TPEVTCVVVD VSHEDPEVQF NWYVDGVEVH   180
NAKTKPREEQ FASTFRVVSV LTVVHQDWLN GKEYKCKVSN KGLPSSIEKT ISKTKGQPRE   240
PQVYTLPPSR EEMTKNQVSL TCLVKGFYPS DIAVEWESNG QPENNYKTTP PMLDSDGSFF   300
LYSKLTVDKS RWQQGNVFSC SVMHEALHNH YTQKSLSLSP GK                      342

SEQ ID NO: 108           moltype = AA    length = 342
FEATURE                  Location/Qualifiers
REGION                   1..342
                         note      = Synthetic Construct
source                   1..342
                         mol_type  = protein
                         organism  = synthetic construct
SEQUENCE: 108
EEELQVIQPD KSVLVAAGET ATLRCTATSL FPVGPIQWFR GAGPGRELIY NQRQGPFPRV    60
TTVSDLTKRN NMDFSIRIGA ITPADAGTYY CVKFRKGSPD DVEFKSGAGT ELSVRAKPSV   120
ECPPCPAPPV AGPSVFLFPP KPKDTLMISR TPEVTCVVVD VSHEDPEVQF NWYVDGVEVH   180
NAKTKPREEQ FASTFRVVSV LTVVHQDWLN GKEYKCKVSN KGLPSSIEKT ISKTKGQPRE   240
PQVYTLPPSR EEMTKNQVSL TCLVKGFYPS DIAVEWESNG QPENNYKTTP PMLDSDGSFF   300
LYSKLTVDKS RWQQGNVFSC SVMHEALHNH YTQKSLSLSP GK                      342

SEQ ID NO: 109           moltype = AA    length = 342
FEATURE                  Location/Qualifiers
REGION                   1..342
                         note      = Synthetic Construct
source                   1..342
                         mol_type  = protein
                         organism  = synthetic construct
SEQUENCE: 109
EEELQVIQPD KSVLVAAGET ATLRCTATSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPSV   120
ECPPCPAPPV AGPSVFLFPP KPKDTLMISR TPEVTCVVVD VSHEDPEVQF NWYVDGVEVH   180
NAKTKPREEQ FASTFRVVSV LTVVHQDWLN GKEYKCKVSN KGLPSSIEKT ISKTKGQPRE   240
PQVYTLPPSR EEMTKNQVSL TCLVKGFYPS DIAVEWESNG QPENNYKTTP PMLDSDGSFF   300
LYSKLTVDKS RWQQGNVFSC SVMHEALHNH YTQKSLSLSP GK                      342

SEQ ID NO: 110           moltype = AA    length = 342
FEATURE                  Location/Qualifiers
REGION                   1..342
                         note      = Synthetic Construct
source                   1..342
                         mol_type  = protein
                         organism  = synthetic construct
SEQUENCE: 110
EEELQVIQPD KSVLVAAGET ATLRCTITSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPSV   120
ECPPCPAPPV AGPSVFLFPP KPKDTLMISR TPEVTCVVVD VSHEDPEVQF NWYVDGVEVH   180
NAKTKPREEQ FASTFRVVSV LTVVHQDWLN GKEYKCKVSN KGLPSSIEKT ISKTKGQPRE   240
PQVYTLPPSR EEMTKNQVSL TCLVKGFYPS DIAVEWESNG QPENNYKTTP PMLDSDGSFF   300
LYSKLTVDKS RWQQGNVFSC SVMHEALHNH YTQKSLSLSP GK                      342

SEQ ID NO: 111           moltype = AA    length = 342
FEATURE                  Location/Qualifiers
REGION                   1..342
                         note      = Synthetic Construct
source                   1..342
                         mol_type  = protein
                         organism  = synthetic construct
SEQUENCE: 111
EEELQIIQPD KSVLVAAGET ATLRCTITSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPSV   120
ECPPCPAPPV AGPSVFLFPP KPKDTLMISR TPEVTCVVVD VSHEDPEVQF NWYVDGVEVH   180
NAKTKPREEQ FASTFRVVSV LTVVHQDWLN GKEYKCKVSN KGLPSSIEKT ISKTKGQPRE   240
PQVYTLPPSR EEMTKNQVSL TCLVKGFYPS DIAVEWESNG QPENNYKTTP PMLDSDGSFF   300
LYSKLTVDKS RWQQGNVFSC SVMHEALHNH YTQKSLSLSP GK                      342

SEQ ID NO: 112           moltype = AA    length = 342
FEATURE                  Location/Qualifiers
REGION                   1..342
                         note      = Synthetic Construct
source                   1..342
                         mol_type  = protein
                         organism  = synthetic construct
```

```
SEQUENCE: 112
EEELQVIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSV  120
ECPPCPAPPV AGPSVFLFPP KPKDTLMISR TPEVTCVVVD VSHEDPEVQF NWYVDGVEVH  180
NAKTKPREEQ FASTFRVVSV LTVVHQDWLN GKEYKCKVSN KGLPSSIEKT ISKTKGQPRE  240
PQVYTLPPSR EEMTKNQVSL TCLVKGFYPS DIAVEWESNG QPENNYKTTP PMLDSDGSFF  300
LYSKLTVDKS RWQQGNVFSC SVMHEALHNH YTQKSLSLSP GK                    342

SEQ ID NO: 113           moltype = AA  length = 342
FEATURE                  Location/Qualifiers
REGION                   1..342
                         note = Synthetic Construct
source                   1..342
                         mol_type = protein
                         organism = synthetic construct
SEQUENCE: 113
EEELQIIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSV  120
ECPPCPAPPV AGPSVFLFPP KPKDTLMISR TPEVTCVVVD VSHEDPEVQF NWYVDGVEVH  180
NAKTKPREEQ FASTFRVVSV LTVVHQDWLN GKEYKCKVSN KGLPSSIEKT ISKTKGQPRE  240
PQVYTLPPSR EEMTKNQVSL TCLVKGFYPS DIAVEWESNG QPENNYKTTP PMLDSDGSFF  300
LYSKLTVDKS RWQQGNVFSC SVMHEALHNH YTQKSLSLSP GK                    342

SEQ ID NO: 114           moltype = AA  length = 347
FEATURE                  Location/Qualifiers
REGION                   1..347
                         note = Synthetic Construct
source                   1..347
                         mol_type = protein
                         organism = synthetic construct
SEQUENCE: 114
EEELQIIQPD KSVLVAAGET ATLRCTITSL FPVGPIQWFR GAGPGRVLIY NQRQGPFPRV   60
TTVSDTTKRN NMDFSIRIGN ITPADAGTYY CIKFRKGSPD DVEFKSGAGT ELSVRAKPSE  120
RKSSVECPPC PAPPVAGPSV FLFPPKPKDT LMISRTPEVT CVVVDVSHED PEVQFNWYVD  180
GVEVHNAKTK PREEQFASTF RVVSVLTVVH QDWLNGKEYK CKVSNKGLPS SIEKTISKTK  240
GQPREPQVYT LPPSREEMTK NQVSLTCLVK GFYPSDIAVE WESNGQPENN YKTTPPMLDS  300
DGSFFLYSKL TVDKSRWQQG NVFSCSVMHE ALHNHYTQKS LSLSPGK                347

SEQ ID NO: 115           moltype = AA  length = 347
FEATURE                  Location/Qualifiers
REGION                   1..347
                         note = Synthetic Construct
source                   1..347
                         mol_type = protein
                         organism = synthetic construct
SEQUENCE: 115
EEELQVIQPD KSVLVAAGET ATLRCTATSL FPVGPIQWFR GAGPGRELIY NQRGPFPRV    60
TTVSDLTKRN NMDFSIRIGN ITPADAGTYY CVKFRKGSPD DVEFKSGAGT ELSVRAKPSE  120
RKSSVECPPC PAPPVAGPSV FLFPPKPKDT LMISRTPEVT CVVVDVSHED PEVQFNWYVD  180
GVEVHNAKTK PREEQFASTF RVVSVLTVVH QDWLNGKEYK CKVSNKGLPS SIEKTISKTK  240
GQPREPQVYT LPPSREEMTK NQVSLTCLVK GFYPSDIAVE WESNGQPENN YKTTPPMLDS  300
DGSFFLYSKL TVDKSRWQQG NVFSCSVMHE ALHNHYTQKS LSLSPGK                347

SEQ ID NO: 116           moltype = AA  length = 347
FEATURE                  Location/Qualifiers
REGION                   1..347
                         note = Synthetic Construct
source                   1..347
                         mol_type = protein
                         organism = synthetic construct
SEQUENCE: 116
EEELQIIQPD KSVLVAAGET ATLRCTITSL FPVGPIQWFR GAGPGRVLIY NQRQGPFPRV   60
TTVSDTTKRN NMDFSIRIGA ITPADAGTYY CIKFRKGSPD DVEFKSGAGT ELSVRAKPSE  120
RKSSVECPPC PAPPVAGPSV FLFPPKPKDT LMISRTPEVT CVVVDVSHED PEVQFNWYVD  180
GVEVHNAKTK PREEQFASTF RVVSVLTVVH QDWLNGKEYK CKVSNKGLPS SIEKTISKTK  240
GQPREPQVYT LPPSREEMTK NQVSLTCLVK GFYPSDIAVE WESNGQPENN YKTTPPMLDS  300
DGSFFLYSKL TVDKSRWQQG NVFSCSVMHE ALHNHYTQKS LSLSPGK                347

SEQ ID NO: 117           moltype = AA  length = 347
FEATURE                  Location/Qualifiers
REGION                   1..347
                         note = Synthetic Construct
source                   1..347
                         mol_type = protein
                         organism = synthetic construct
SEQUENCE: 117
EEELQVIQPD KSVLVAAGET ATLRCTATSL FPVGPIQWFR GAGPGRELIY NQRGPFPRV    60
TTVSDLTKRN NMDFSIRIGA ITPADAGTYY CVKFRKGSPD DVEFKSGAGT ELSVRAKPSE  120
RKSSVECPPC PAPPVAGPSV FLFPPKPKDT LMISRTPEVT CVVVDVSHED PEVQFNWYVD  180
```

```
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 118            moltype = AA  length = 347
FEATURE                   Location/Qualifiers
REGION                    1..347
                          note = Synthetic Construct
source                    1..347
                          mol_type = protein
                          organism = synthetic construct
SEQUENCE: 118
EEELQVIQPD KSVLVAAGET ATLRCTATSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSE   120
RKSSVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 119            moltype = AA  length = 347
FEATURE                   Location/Qualifiers
REGION                    1..347
                          note = Synthetic Construct
source                    1..347
                          mol_type = protein
                          organism = synthetic construct
SEQUENCE: 119
EEELQVIQPD KSVLVAAGET ATLRCTITSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSE   120
RKSSVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 120            moltype = AA  length = 347
FEATURE                   Location/Qualifiers
REGION                    1..347
                          note = Synthetic Construct
source                    1..347
                          mol_type = protein
                          organism = synthetic construct
SEQUENCE: 120
EEELQIIQPD KSVLVAAGET ATLRCTITSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSE   120
RKSSVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 121            moltype = AA  length = 347
FEATURE                   Location/Qualifiers
REGION                    1..347
                          note = Synthetic Construct
source                    1..347
                          mol_type = protein
                          organism = synthetic construct
SEQUENCE: 121
EEELQVIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSE   120
RKSSVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 122            moltype = AA  length = 347
FEATURE                   Location/Qualifiers
REGION                    1..347
                          note = Synthetic Construct
source                    1..347
                          mol_type = protein
                          organism = synthetic construct
SEQUENCE: 122
EEELQIIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSE   120
RKSSVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347
```

| SEQ ID NO: 123 | moltype = AA length = 346 |
| --- | --- |
| FEATURE | Location/Qualifiers |
| REGION | 1..346 |
| | note = Synthetic Construct |
| source | 1..346 |
| | mol_type = protein |
| | organism = synthetic construct |

SEQUENCE: 123
```
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSD   120
KTHTCPPCPA PELLGGPSVF LFPPKPKDTL MISRTPEVTC VVVDVSHEDP EVKFNWYVDG   180
VEVHNAKTKP REEQYNSTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPGK                  346
```

| SEQ ID NO: 124 | moltype = AA length = 346 |
| --- | --- |
| FEATURE | Location/Qualifiers |
| REGION | 1..346 |
| | note = Synthetic Construct |
| source | 1..346 |
| | mol_type = protein |
| | organism = synthetic construct |

SEQUENCE: 124
```
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYNSTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPGK                  346
```

| SEQ ID NO: 125 | moltype = AA length = 346 |
| --- | --- |
| FEATURE | Location/Qualifiers |
| REGION | 1..346 |
| | note = Synthetic Construct |
| source | 1..346 |
| | mol_type = protein |
| | organism = synthetic construct |

SEQUENCE: 125
```
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSD   120
KTHTCPPCPA PELLGGPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPGK                  346
```

| SEQ ID NO: 126 | moltype = AA length = 347 |
| --- | --- |
| FEATURE | Location/Qualifiers |
| REGION | 1..347 |
| | note = Synthetic Construct |
| source | 1..347 |
| | mol_type = protein |
| | organism = synthetic construct |

SEQUENCE: 126
```
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSD   120
RKCCVECPPC PAPPVAGPSV FLFPPKPKDT LMISRTPEVT CVVVDVSHED PEVQFNWYVD   180
GVEVHNAKTK PREEQFNSTF RVVSVLTVVH QDWLNGKEYK CKVSNKGLPA PIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                 347
```

| SEQ ID NO: 127 | moltype = AA length = 347 |
| --- | --- |
| FEATURE | Location/Qualifiers |
| REGION | 1..347 |
| | note = Synthetic Construct |
| source | 1..347 |
| | mol_type = protein |
| | organism = synthetic construct |

SEQUENCE: 127
```
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSE   120
RKCCVECPPC PAPPVAGPSV FLFPPKPKDT LMISRTPEVT CVVVDVSHED PEVQFNWYVD   180
GVEVHNAKTK PREEQFNSTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                 347
```

| SEQ ID NO: 128 | moltype = AA length = 347 |
| --- | --- |
| FEATURE | Location/Qualifiers |
| REGION | 1..347 |
| | note = Synthetic Construct |

```
                        -continued source                  1..347
                        mol_type = protein
                        organism = synthetic construct
SEQUENCE: 128
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSE   120
RKCCVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPA PIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 129          moltype = AA  length = 347
FEATURE                 Location/Qualifiers
REGION                  1..347
                        note = Synthetic Construct
source                  1..347
                        mol_type = protein
                        organism = synthetic construct
SEQUENCE: 129
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSE   120
RKCCVECPPC PAPPVAGPSV FLFPPKPKDT LMISRTPEVT CVVVDVSHED PEVQFNWYVD   180
GVEVHNAKTK PREEQFASTF RVVSVLTVVH QDWLNGKEYK CKVSNKGLPS SIEKTISKTK   240
GQPREPQVYT LPPSREEMTK NQVSLTCLVK GFYPSDIAVE WESNGQPENN YKTTPPMLDS   300
DGSFFLYSKL TVDKSRWQQG NVFSCSVMHE ALHNHYTQKS LSLSPGK                347

SEQ ID NO: 130          moltype = AA  length = 347
FEATURE                 Location/Qualifiers
REGION                  1..347
                        note = Synthetic Construct
source                  1..347
                        mol_type = protein
                        organism = synthetic construct
SEQUENCE: 130
EEELQVIQPD KSVSVAAGES AILHCTVTSL IPVGPIQWFR GAGPARELIY NQKEGHFPRV    60
TTVSESTKRE NMDFSISISN ITPADAGTYY CVKFRKGSPD TEFKSGAGTE LSVRAKPSES   120
KYGPPCPSCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 131          moltype = AA  length = 348
FEATURE                 Location/Qualifiers
REGION                  1..348
                        note = Synthetic Construct
source                  1..348
                        mol_type = protein
                        organism = synthetic construct
SEQUENCE: 131
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSE   120
SKYGPPCPPC PAPEFLGGPS VFLFPPKPKD TLMISRTPEV TCVVVDVSQE DPEVQFNWYV   180
DGVEVHNAKT KPREEQFNST YRVVSVLTVL HQDWLNGKEY KCKVSNKGLP SSIEKTISKA   240
KGQPREPQVY TLPPSQEEMT KNQVSLTCLV KGFYPSDIAV EWESNGQPEN NYKTTPPVLD   300
SDGSFFLYSR LTVDKSRWQE GNVFSCSVMH EALHNHYTQK SLSLSLGK                348

SEQ ID NO: 132          moltype = AA  length = 348
FEATURE                 Location/Qualifiers
REGION                  1..348
                        note = Synthetic Construct
source                  1..348
                        mol_type = protein
                        organism = synthetic construct
SEQUENCE: 132
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSE   120
SKYGPPCPPC PAPEFEGGPS VFLFPPKPKD TLMISRTPEV TCVVVDVSQE DPEVQFNWYV   180
DGVEVHNAKT KPREEQFNST YRVVSVLTVL HQDWLNGKEY KCKVSNKGLP SSIEKTISKA   240
KGQPREPQVY TLPPSQEEMT KNQVSLTCLV KGFYPSDIAV EWESNGQPEN NYKTTPPVLD   300
SDGSFFLYSR LTVDKSRWQE GNVFSCSVMH EALHNHYTQK SLSLSLGK                348

SEQ ID NO: 133          moltype = AA  length = 347
FEATURE                 Location/Qualifiers
REGION                  1..347
                        note = Synthetic Construct
source                  1..347
                        mol_type = protein
                        organism = synthetic construct
SEQUENCE: 133
```

```
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSE   120
SKYGPPCPPC PAPPVAGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 134           moltype = AA  length = 346
FEATURE                  Location/Qualifiers
REGION                   1..346
                         note = Synthetic Construct
source                   1..346
                         mol_type = protein
                         organism = synthetic construct
SEQUENCE: 134
EEELQIIQPD KSVLVAAGET ATLRCTITSL FPVGPIQWFR GAGPGRVLIY NQRQGPFPRV    60
TTVSDTTKRN NMDFSIRIGN ITPADAGTYY CIKFRKGSPD DVEFKSGAGT ELSVRAKPSA   120
AAPPCPPCPA PEFLGGPSVF LFPPKPKDTL MISRTPEVTC VVVDVSQEDP EVQFNWYVDG   180
VEVHNAKTKP REEQFNSTYR VVSVLTVLHQ DWLNGKEYKC KVSNKGLPSS IEKTISKAKG   240
QPREPQVYTL PPSQEEMTKN QVSLTCLVKG FYPSDIAVEW ESNGQPENNY KTTPPVLDSD   300
GSFFLYSRLT VDKSRWQEGN VFSCSVMHEA LHNHYTQKSL SLSPGK                 346

SEQ ID NO: 135           moltype = AA  length = 345
FEATURE                  Location/Qualifiers
REGION                   1..345
                         note = Synthetic Construct
source                   1..345
                         mol_type = protein
                         organism = synthetic construct
SEQUENCE: 135
EEELQVIQPD KSVLVAAGET ATLRCTATSL FPVGPIQWFR GAGPGRELIY NQREGPFPRV    60
TTVSDLTKRN NMDFSIRIGA ITPADAGTYY CVKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPG                  345

SEQ ID NO: 136           moltype = AA  length = 345
FEATURE                  Location/Qualifiers
REGION                   1..345
                         note = Synthetic Construct
source                   1..345
                         mol_type = protein
                         organism = synthetic construct
SEQUENCE: 136
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPG                  345

SEQ ID NO: 137           moltype = AA  length = 345
FEATURE                  Location/Qualifiers
REGION                   1..345
                         note = Synthetic Construct
source                   1..345
                         mol_type = protein
                         organism = synthetic construct
SEQUENCE: 137
EEELQIIQPD KSVLVAAGET ATLRCTITSL FPVGPIQWFR GAGPGRVLIY NQREGPFPRV    60
TTVSDTTKRN NMDFSIRIGA ITPADAGTYY CIKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLTCLVKG FYPSDIAVEW ESNGQPENNY KTTPPVLDSD   300
GSFFLYSKLT VDKSRWQQGN VFSCSVMHEA LHNHYTQKSL SLSPG                  345

SEQ ID NO: 138           moltype = AA  length = 346
FEATURE                  Location/Qualifiers
REGION                   1..346
                         note = Synthetic Construct
source                   1..346
                         mol_type = protein
                         organism = synthetic construct
SEQUENCE: 138
EEELQIIQPD KSVLVAAGET ATLRCTITSL FPVGPIQWFR GAGPGRVLIY NQRQGPFPRV    60
TTVSDTTKRN NMDFSIRIGA ITPADAGTYY CIKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
```

```
QPREPQVYTL PPSREEMTKN QVSLWCLVKG FYPSDIAVEW ESNGQPENNY KTTPPVLDSD    300
GSFFLYSKLT VDKSRWQQGN VFSCSVMHEA LHNHYTQKSL SLSPGK                  346

SEQ ID NO: 139          moltype = AA   length = 227
FEATURE                 Location/Qualifiers
REGION                  1..227
                        note = Synthetic Construct
source                  1..227
                        mol_type = protein
                        organism = synthetic construct
SEQUENCE: 139
DKTHTCPPCP APEAAGAPSV FLFPPKPKDT LMISRTPEVT CVVVDVSHED PEVKFNWYVD    60
GVEVHNAKTK PREEQYASTY RVVSVLTVLH QDWLNGKEYK CKVSNKALPA PIEKTISKAK   120
GQPREPQVYT LPPSREEMTK NQVSLSCAVK GFYPSDIAVE WESNGQPENN YKTTPPVLDS   180
DGSFFLVSKL TVDKSRWQQG NVFSCSVMHE ALHNHYTQKS LSLSPGK                 227

SEQ ID NO: 140          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 140
EEELQIIQPD KSVLVAAGET ATLRCTITSL FPVGPIQWFR GAGPGRVLIY NQRQGPFPRV    60
TTVSDTTKRN NMDFSIRIGA ITPADAGTYY CIKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLSCAVKG FYPSDIAVEW ESNGQPENNY KTTPPVLDSD   300
GSFFLVSKLT VDKSRWQQGN VFSCSVMHEA LHNHYTQKSL SLSPGK                  346

SEQ ID NO: 141          moltype = AA   length = 227
FEATURE                 Location/Qualifiers
REGION                  1..227
                        note = Synthetic Construct
source                  1..227
                        mol_type = protein
                        organism = synthetic construct
SEQUENCE: 141
DKTHTCPPCP APEAAGAPSV FLFPPKPKDT LMISRTPEVT CVVVDVSHED PEVKFNWYVD    60
GVEVHNAKTK PREEQYASTY RVVSVLTVLH QDWLNGKEYK CKVSNKALPA PIEKTISKAK   120
GQPREPQVYT LPPSREEMTK NQVSLWCLVK GFYPSDIAVE WESNGQPENN YKTTPPVLDS   180
DGSFFLYSKL TVDKSRWQQG NVFSCSVMHE ALHNHYTQKS LSLSPGK                 227

SEQ ID NO: 142          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 142
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLWCLVKG FYPSDIAVEW ESNGQPENNY KTTPPVLDSD   300
GSFFLYSKLT VDKSRWQQGN VFSCSVMHEA LHNHYTQKSL SLSPGK                  346

SEQ ID NO: 143          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 143
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLSCAVKG FYPSDIAVEW ESNGQPENNY KTTPPVLDSD   300
GSFFLVSKLT VDKSRWQQGN VFSCSVMHEA LHNHYTQKSL SLSPGK                  346

SEQ ID NO: 144          moltype = AA   length = 449
FEATURE                 Location/Qualifiers
REGION                  1..449
                        note = Synthetic Construct
source                  1..449
```

```
                        mol_type = protein
                        organism = synthetic construct
SEQUENCE: 144
QVQLKQSGPG LVQPSQSLSI TCTVSGFSLT NYGVHWVRQS PGKGLEWLGV IWSGGNTDYN    60
TPFTSRLSIN KDNSKSQVFF KMNSLQSNDT AIYYCARALT YDYEFAYWG QGTLVTVSSA    120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKKVEPK SCRKTHTCPR CPAPELLGGP   240
SVFLFPPKPK DTLMISRTPE VTCVVVDVSH EDPEVKFNWY VDGVEVHNAK TKPREEQYAS   300
TYRVVSVLTV LHQDWLNGKE YKCKVSNKAL PAPIEKTISK AKGQPREPQV YTLPPSREEM   360
TKNQVSLTCL VKGFYPSDIA VEWESNGQPE NNYKTTPPVL DSDGSFFLYS RLTVDKSRWQ   420
QGNVFSCSVM HEALHNHYTQ KSLSLSPGK                                    449

SEQ ID NO: 145          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 145
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD DVEFKSGAGT ELSVRAKPSE   120
KTHTCPECPA PEAAGAPSVF LFPPKPKDTL MISRTPEVTC VVVDVSHEDP EVKFNWYVDG   180
VEVHNAKTKP REEQYASTYR VVSVLTVLHQ DWLNGKEYKC KVSNKALPAP IEKTISKAKG   240
QPREPQVYTL PPSREEMTKN QVSLTCEVKG FYPSDIAVEW ESNGQPENNY KTTPPVLDSD   300
GSFFLYSKLT VDKSRWQQGN VFSCSVMHEA LHNHYTQKSL SLSPGK                 346

SEQ ID NO: 146          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 146
EEELQVIQPD KSVLVAAGET ATLRCTATSL FPVGPIQWFR GAGPGRELIY NQRQGPFPRV    60
TTVSDLTKRN NMDFSIRIGN ITPADAGTYY CVKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYNSTYR VVSVLTVLHQ DWLNGKEYKC KVSNKALPAP IEKTISKAKG   240
QPREPQVYTL PPSREEMTKN QVSLWCLVKG FYPSDIAVEW ESNGQPENNY KTTPPVLDSD   300
GSFFLYSKLT VDKSRWQQGN VFSCSVMHEA LHNHYTQKSL SLSPGK                 346

SEQ ID NO: 147          moltype = AA   length = 227
FEATURE                 Location/Qualifiers
REGION                  1..227
                        note = Synthetic Construct
source                  1..227
                        mol_type = protein
                        organism = synthetic construct
SEQUENCE: 147
DKTHTCPPCP APEAAGAPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLSCAVK GFYPSDIAVE WESNGQPENN YKTTPPVLDS   180
DGSFFLVSKL TVDKSRWQQG NVFSCSVMHE ALHNHYTQKS LSLSPGK                227

SEQ ID NO: 148          moltype = AA   length = 346
FEATURE                 Location/Qualifiers
REGION                  1..346
                        note = Synthetic Construct
source                  1..346
                        mol_type = protein
                        organism = synthetic construct
SEQUENCE: 148
EEELQVIQPD KSVLVAAGET ATLRCTATSL FPVGPIQWFR GAGPGRELIY NQRQGPFPRV    60
TTVSDLTKRN NMDFSIRIGN ITPADAGTYY CVKFRKGSPD DVEFKSGAGT ELSVRAKPSD   120
KTHTCPPCPA PEAAGAPSVF LFPPKPKDTL MISRTPEVTC VVVDVSHEDP EVKFNWYVDG   180
VEVHNAKTKP REEQYNSTYR VVSVLTVLHQ DWLNGKEYKC KVSNKALPAP IEKTISKAKG   240
QPREPQVYTL PPSREEMTKN QVSLSCAVKG FYPSDIAVEW ESNGQPENNY KTTPPVLDSD   300
GSFFLVSKLT VDKSRWQQGN VFSCSVMHEA LHNHYTQKSL SLSPGK                 346

SEQ ID NO: 149          moltype = AA   length = 227
FEATURE                 Location/Qualifiers
REGION                  1..227
                        note = Synthetic Construct
source                  1..227
                        mol_type = protein
                        organism = synthetic construct
SEQUENCE: 149
DKTHTCPPCP APEAAGAPSV FLFPPKPKDT LMISRTPEVT CVVVDVSHED PEVKFNWYVD    60
```

```
GVEVHNAKTK PREEQYNSTY RVVSVLTVLH QDWLNGKEYK CKVSNKALPA PIEKTISKAK   120
GQPREPQVYT LPPSREEMTK NQVSLWCLVK GFYPSDIAVE WESNGQPENN YKTTPPVLDS   180
DGSFFLYSKL TVDKSRWQQG NVFSCSVMHE ALHNHYTQKS LSLSPGK                227

SEQ ID NO: 150          moltype =    length =
SEQUENCE: 150
000

SEQ ID NO: 151          moltype =    length =
SEQUENCE: 151
000

SEQ ID NO: 152          moltype =    length =
SEQUENCE: 152
000

SEQ ID NO: 153          moltype =    length =
SEQUENCE: 153
000

SEQ ID NO: 154          moltype =    length =
SEQUENCE: 154
000

SEQ ID NO: 155          moltype =    length =
SEQUENCE: 155
000

SEQ ID NO: 156          moltype =    length =
SEQUENCE: 156
000

SEQ ID NO: 157          moltype =    length =
SEQUENCE: 157
000

SEQ ID NO: 158          moltype =    length =
SEQUENCE: 158
000

SEQ ID NO: 159          moltype =    length =
SEQUENCE: 159
000

SEQ ID NO: 160          moltype =    length =
SEQUENCE: 160
000

SEQ ID NO: 161          moltype = AA  length = 226
FEATURE                 Location/Qualifiers
REGION                  1..226
                        note = Synthetic Construct
source                  1..226
                        mol_type = protein
                        organism = synthetic construct
SEQUENCE: 161
DKTHTCPPCP APELLGGPSV FLFPPKPKDT LMISRTPEVT CVVVDVSHED PEVKFNWYVD   60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPG                 226

SEQ ID NO: 162          moltype = AA  length = 227
FEATURE                 Location/Qualifiers
source                  1..227
                        mol_type = protein
                        organism = Homo sapiens
SEQUENCE: 162
ERKCCVECPP CPAPPVAGPS VFLFPPKPKD TLMISRTPEV TCVVVDVSHE DPEVQFNWYV   60
DGVEVHNAKT KPREEQFNST FRVVSVLTVV HQDWLNGKEY KCKVSNKGLP APIEKTISKT   120
KGQPREPQVY TLPPSREEMT KNQVSLTCLV KGFYPSDIAV EWESNGQPEN NYKTTPPMLD   180
SDGSFFLYSK LTVDKSRWQQ GNVFSCSVMH EALHNHYTQK SLSLSPG                227

SEQ ID NO: 163          moltype = AA  length = 5
FEATURE                 Location/Qualifiers
REGION                  1..5
                        note = Synthetic Construct
source                  1..5
                        mol_type = protein
                        organism = synthetic construct
```

```
SEQUENCE: 163
GGGGS                                                                  5

SEQ ID NO: 164         moltype = AA  length = 4
FEATURE                Location/Qualifiers
REGION                 1..4
                       note = Synthetic Construct
source                 1..4
                       mol_type = protein
                       organism = synthetic construct
SEQUENCE: 164
GGSG                                                                   4

SEQ ID NO: 165         moltype = AA  length = 4
FEATURE                Location/Qualifiers
REGION                 1..4
                       note = Synthetic Construct
source                 1..4
                       mol_type = protein
                       organism = synthetic construct
SEQUENCE: 165
SGGG                                                                   4

SEQ ID NO: 166         moltype = AA  length = 4
FEATURE                Location/Qualifiers
REGION                 1..4
                       note = Synthetic Construct
source                 1..4
                       mol_type = protein
                       organism = synthetic construct
SEQUENCE: 166
GSGS                                                                   4

SEQ ID NO: 167         moltype = AA  length = 6
FEATURE                Location/Qualifiers
REGION                 1..6
                       note = Synthetic Construct
source                 1..6
                       mol_type = protein
                       organism = synthetic construct
SEQUENCE: 167
GSGSGS                                                                 6

SEQ ID NO: 168         moltype = AA  length = 8
FEATURE                Location/Qualifiers
REGION                 1..8
                       note = Synthetic Construct
source                 1..8
                       mol_type = protein
                       organism = synthetic construct
SEQUENCE: 168
GSGSGSGS                                                               8

SEQ ID NO: 169         moltype = AA  length = 10
FEATURE                Location/Qualifiers
REGION                 1..10
                       note = Synthetic Construct
source                 1..10
                       mol_type = protein
                       organism = synthetic construct
SEQUENCE: 169
GSGSGSGSGS                                                            10

SEQ ID NO: 170         moltype = AA  length = 12
FEATURE                Location/Qualifiers
REGION                 1..12
                       note = Synthetic Construct
source                 1..12
                       mol_type = protein
                       organism = synthetic construct
SEQUENCE: 170
GSGSGSGSGS GS                                                         12

SEQ ID NO: 171         moltype = AA  length = 6
FEATURE                Location/Qualifiers
REGION                 1..6
                       note = Synthetic Construct
source                 1..6
                       mol_type = protein
```

```
                        organism = synthetic construct
SEQUENCE: 171
GGSGGS                                                                          6

SEQ ID NO: 172          moltype = AA   length = 9
FEATURE                 Location/Qualifiers
REGION                  1..9
                        note = Synthetic Construct
source                  1..9
                        mol_type = protein
                        organism = synthetic construct
SEQUENCE: 172
GGSGGSGGS                                                                       9

SEQ ID NO: 173          moltype = AA   length = 12
FEATURE                 Location/Qualifiers
REGION                  1..12
                        note = Synthetic Construct
source                  1..12
                        mol_type = protein
                        organism = synthetic construct
SEQUENCE: 173
GGSGGSGGSG GS                                                                  12

SEQ ID NO: 174          moltype = AA   length = 8
FEATURE                 Location/Qualifiers
REGION                  1..8
                        note = Synthetic Construct
source                  1..8
                        mol_type = protein
                        organism = synthetic construct
SEQUENCE: 174
GGSGGGSG                                                                        8

SEQ ID NO: 175          moltype = AA   length = 12
FEATURE                 Location/Qualifiers
REGION                  1..12
                        note = Synthetic Construct
source                  1..12
                        mol_type = protein
                        organism = synthetic construct
SEQUENCE: 175
GGSGGGSGGG SG                                                                  12

SEQ ID NO: 176          moltype = AA   length = 15
FEATURE                 Location/Qualifiers
REGION                  1..15
                        note = Synthetic Construct
source                  1..15
                        mol_type = protein
                        organism = synthetic construct
SEQUENCE: 176
GGGGSGGGGS GGGGS                                                               15

SEQ ID NO: 177          moltype =    length =
SEQUENCE: 177
000

SEQ ID NO: 178          moltype = AA   length = 4
FEATURE                 Location/Qualifiers
REGION                  1..4
                        note = Synthetic Construct
source                  1..4
                        mol_type = protein
                        organism = synthetic construct
SEQUENCE: 178
AAAL                                                                            4

SEQ ID NO: 179          moltype = AA   length = 4
FEATURE                 Location/Qualifiers
REGION                  1..4
                        note = Synthetic Construct
source                  1..4
                        mol_type = protein
                        organism = synthetic construct
SEQUENCE: 179
AAAK                                                                            4

SEQ ID NO: 180          moltype = AA   length = 4
```

| | | |
|---|---|---|
| FEATURE | Location/Qualifiers | |
| REGION | 1..4 | |
| | note = Synthetic Construct | |
| source | 1..4 | |
| | mol_type = protein | |
| | organism = synthetic construct | |
| SEQUENCE: 180 | | |
| AAAR | | 4 |
| | | |
| SEQ ID NO: 181 | moltype = AA length = 14 | |
| FEATURE | Location/Qualifiers | |
| REGION | 1..14 | |
| | note = Synthetic Construct | |
| source | 1..14 | |
| | mol_type = protein | |
| | organism = synthetic construct | |
| SEQUENCE: 181 | | |
| EGKSSGSGSE SKST | | 14 |
| | | |
| SEQ ID NO: 182 | moltype = AA length = 12 | |
| FEATURE | Location/Qualifiers | |
| REGION | 1..12 | |
| | note = Synthetic Construct | |
| source | 1..12 | |
| | mol_type = protein | |
| | organism = synthetic construct | |
| SEQUENCE: 182 | | |
| GSAGSAAGSG EF | | 12 |
| | | |
| SEQ ID NO: 183 | moltype = AA length = 12 | |
| FEATURE | Location/Qualifiers | |
| REGION | 1..12 | |
| | note = Synthetic Construct | |
| source | 1..12 | |
| | mol_type = protein | |
| | organism = synthetic construct | |
| SEQUENCE: 183 | | |
| AEAAAKEAAA KA | | 12 |
| | | |
| SEQ ID NO: 184 | moltype = AA length = 18 | |
| FEATURE | Location/Qualifiers | |
| REGION | 1..18 | |
| | note = Synthetic Construct | |
| source | 1..18 | |
| | mol_type = protein | |
| | organism = synthetic construct | |
| SEQUENCE: 184 | | |
| KESGSVSSEQ LAQFRSLD | | 18 |
| | | |
| SEQ ID NO: 185 | moltype = AA length = 9 | |
| FEATURE | Location/Qualifiers | |
| REGION | 1..9 | |
| | note = Synthetic Construct | |
| source | 1..9 | |
| | mol_type = protein | |
| | organism = synthetic construct | |
| SEQUENCE: 185 | | |
| GGGGAGGGG | | 9 |
| | | |
| SEQ ID NO: 186 | moltype = AA length = 10 | |
| FEATURE | Location/Qualifiers | |
| REGION | 1..10 | |
| | note = Synthetic Construct | |
| source | 1..10 | |
| | mol_type = protein | |
| | organism = synthetic construct | |
| SEQUENCE: 186 | | |
| GENLYFQSGG | | 10 |
| | | |
| SEQ ID NO: 187 | moltype = AA length = 8 | |
| FEATURE | Location/Qualifiers | |
| REGION | 1..8 | |
| | note = Synthetic Construct | |
| source | 1..8 | |
| | mol_type = protein | |
| | organism = synthetic construct | |
| SEQUENCE: 187 | | |
| SACYCELS | | 8 |

```
SEQ ID NO: 188          moltype = AA  length = 5
FEATURE                 Location/Qualifiers
REGION                  1..5
                        note = Synthetic Construct
source                  1..5
                        mol_type = protein
                        organism = synthetic construct
SEQUENCE: 188
RSIAT                                                                    5

SEQ ID NO: 189          moltype = AA  length = 17
FEATURE                 Location/Qualifiers
REGION                  1..17
                        note = Synthetic Construct
source                  1..17
                        mol_type = protein
                        organism = synthetic construct
SEQUENCE: 189
RPACKIPNDL KQKVMNH                                                      17

SEQ ID NO: 190          moltype = AA  length = 36
FEATURE                 Location/Qualifiers
REGION                  1..36
                        note = Synthetic Construct
source                  1..36
                        mol_type = protein
                        organism = synthetic construct
SEQUENCE: 190
GGSAGGSGSG SSGGSSGASG TGTAGGTGSG SGTGSG                                 36

SEQ ID NO: 191          moltype = AA  length = 17
FEATURE                 Location/Qualifiers
REGION                  1..17
                        note = Synthetic Construct
source                  1..17
                        mol_type = protein
                        organism = synthetic construct
SEQUENCE: 191
AAANSSIDLI SVPVDSR                                                      17

SEQ ID NO: 192          moltype = AA  length = 36
FEATURE                 Location/Qualifiers
REGION                  1..36
                        note = Synthetic Construct
source                  1..36
                        mol_type = protein
                        organism = synthetic construct
SEQUENCE: 192
GGSGGGSEGG GSEGGGSEGG GSEGGGSEGG GSGGGS                                 36

SEQ ID NO: 193          moltype = AA  length = 5
FEATURE                 Location/Qualifiers
REGION                  1..5
                        note = Synthetic Construct
source                  1..5
                        mol_type = protein
                        organism = synthetic construct
SEQUENCE: 193
EAAAK                                                                    5

SEQ ID NO: 194          moltype = AA  length = 5
FEATURE                 Location/Qualifiers
REGION                  1..5
                        note = Synthetic Construct
source                  1..5
                        mol_type = protein
                        organism = synthetic construct
SEQUENCE: 194
PAPAP                                                                    5

SEQ ID NO: 195          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 195
EEELQIIQPD KSVLVAAGET ATLRCTMTSL FPVGPIQWFR GAGPGRELIY NQREGPFPRV        60
```

```
TTVSDTTKRN NMDFSIRIGA ITPADAGTYY CVKFRKGSPD DVEFKSGAGT ELSVRAKPS    119

SEQ ID NO: 196          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 196
EEELQIIQPD KSVLVAAGET ATLRCTITSL KPVGPIQWFR GAGPGRELIY NQREGPFPRV    60
TTVSDTTKRN NMDFSIRIGA ITPADAGTYY CVKFRKGSPD DVEFKSGAGT ELSVRAKPS    119

SEQ ID NO: 197          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 197
EEELQIIQPD KSVLVAAGET ATLRCTITSL RPVGPIQWFR GAGPGRELIY NQREGPFPRV    60
TTVSDTTKRN NMDFSIRIGA ITPADAGTYY CVKFRKGSPD DVEFKSGAGT ELSVRAKPS    119

SEQ ID NO: 198          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 198
EEELQIIQPD KSVLVAAGET ATLRCTITSL YPVGPIQWFR GAGPGRELIY NQREGPFPRV    60
TTVSDTTKRN NMDFSIRIGA ITPADAGTYY CVKFRKGSPD DVEFKSGAGT ELSVRAKPS    119

SEQ ID NO: 199          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 199
EEELQIIQPD KSVLVAAGET ATLRCTITSL FPVGPIQWFR GAGPGRELIY NQRDGPFPRV    60
TTVSDTTKRN NMDFSIRIGA ITPADAGTYY CVKFRKGSPD DVEFKSGAGT ELSVRAKPS    119

SEQ ID NO: 200          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 200
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGIPD DVEFKSGAGT ELSVRAKPS    119

SEQ ID NO: 201          moltype = AA  length = 119
FEATURE                 Location/Qualifiers
REGION                  1..119
                        note = Synthetic Construct
source                  1..119
                        mol_type = protein
                        organism = synthetic construct
SEQUENCE: 201
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGMPD DVEFKSGAGT ELSVRAKPS    119

SEQ ID NO: 202          moltype = AA  length = 118
FEATURE                 Location/Qualifiers
REGION                  1..118
                        note = Synthetic Construct
source                  1..118
                        mol_type = protein
                        organism = synthetic construct
SEQUENCE: 202
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSPD VEFKSGAGTE LSVRAKPS     118
```

```
SEQ ID NO: 203            moltype = AA  length = 120
FEATURE                   Location/Qualifiers
REGION                    1..120
                          note = Synthetic Construct
source                    1..120
                          mol_type = protein
                          organism = synthetic construct
SEQUENCE: 203
EEELQIIQPD KSVLVAAGET ATLRCTITSL FPVGPIQWFR GAGPGRELIY NQREGPFPRV    60
TTVSDTTKRN NMDFSIRIGA ITPADAGTYY CVKFRKGSSE PDVEFKSGAG TELSVRAKPS   120

SEQ ID NO: 204            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 204
EEELQIIQPD KSVLVAAGET ATLRCTITSL RPVGPIQWFR GAGPGRELIY NQRDGPFPRV    60
TTVSDTTKRN NMDFSIRIGA ITPADAGTYY CVKFRKGSPD DVEFKSGAGT ELSVRAKPS    119

SEQ ID NO: 205            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 205
EEELQIIQPD KSVLVAAGET ATLRCTITSL RPVGPIQWFR GAGPGRELIY NQREGPFPRV    60
TTVSDTTKRN NMDFSIRIGA ITPADAGTYY CVKFRKGIPD DVEFKSGAGT ELSVRAKPS    119

SEQ ID NO: 206            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 206
EEELQIIQPD KSVLVAAGET ATLRCTITSL RPVGPIQWFR GAGPGRELIY NQRDGPFPRV    60
TTVSDTTKRN NMDFSIRIGA ITPADAGTYY CVKFRKGIPD DVEFKSGAGT ELSVRAKPS    119

SEQ ID NO: 207            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 207
EEELQIIQPD KSVLVAAGET ATLRCTITSL YPVGPIQWFR GAGPGRELIY NQRDGPFPRV    60
TTVSDTTKRN NMDFSIRIGA ITPADAGTYY CVKFRKGSPD DVEFKSGAGT ELSVRAKPS    119

SEQ ID NO: 208            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 208
EEELQIIQPD KSVLVAAGET ATLRCTITSL YPVGPIQWFR GAGPGRELIY NQREGPFPRV    60
TTVSDTTKRN NMDFSIRIGA ITPADAGTYY CVKFRKGIPD DVEFKSGAGT ELSVRAKPS    119

SEQ ID NO: 209            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 209
EEELQIIQPD KSVLVAAGET ATLRCTITSL YPVGPIQWFR GAGPGRELIY NQRDGPFPRV    60
TTVSDTTKRN NMDFSIRIGA ITPADAGTYY CVKFRKGIPD DVEFKSGAGT ELSVRAKPS    119

SEQ ID NO: 210            moltype = AA  length = 119
FEATURE                   Location/Qualifiers
```

```
REGION                    1..119
                          note = Synthetic Construct
source                    1..119
                          mol_type = protein
                          organism = synthetic construct
SEQUENCE: 210
EEELQIIQPD KSVLVAAGET ATLRCTITSL FPVGPIQWFR GAGPGRELIY NQRDGPFPRV   60
TTVSDTTKRN NMDFSIRIGA ITPADAGTYY CVKFRKGIPD DVEFKSGAGT ELSVRAKPS   119

SEQ ID NO: 211            moltype = AA  length = 345
FEATURE                   Location/Qualifiers
REGION                    1..345
                          note = Synthetic Construct
source                    1..345
                          mol_type = protein
                          organism = synthetic construct
SEQUENCE: 211
EEELQIIQPD KSVLVAAGET ATLRCTITSL RPVGPIQWFR GAGPGRELIY NQRDGPFPRV   60
TTVSDTTKRN NMDFSIRIGA ITPADAGTYY CVKFRKGIPD DVEFKSGAGT ELSVRAKPSD  120
KTHTCPPCPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPG                  345

SEQ ID NO: 212            moltype = AA  length = 118
FEATURE                   Location/Qualifiers
REGION                    1..118
                          note = Synthetic Construct
VARIANT                   6
                          note = Xaa = V, L, I
VARIANT                   27
                          note = Xaa = V, I, L
VARIANT                   31
                          note = Xaa = I, T, S, F
VARIANT                   53
                          note = Xaa = K, R
VARIANT                   56
                          note = Xaa = H, P, R
VARIANT                   66
                          note = Xaa = S, T, G
VARIANT                   80
                          note = Xaa = N, A
source                    1..118
                          mol_type = protein
                          organism = synthetic construct
SEQUENCE: 212
EEELQXIQPD KSVSVAAGES AILHCTXTSL XPVGPIQWFR GAGPARELIY NQXEGXFPRV   60
TTVSEXTKRE NMDFSISISX ITPADAGTYY CVKFRKGSPD TEFKSGAGTE LSVRAKPS    118

SEQ ID NO: 213            moltype = AA  length = 119
FEATURE                   Location/Qualifiers
REGION                    1..119
                          note = Synthetic Construct
source                    1..119
                          mol_type = protein
                          organism = synthetic construct
SEQUENCE: 213
EEELQVIQPD KSVLVAAGET ATLRCTATSL FPVGPIQWFR GAGPGRELIY NQRGPFPRV    60
TTVSDLTKRN NMDFSIRIGN ITVADAGTYY CVKFRKGSPD DVEFKSGAGT ELSVRAKPS   119

SEQ ID NO: 214            moltype = AA  length = 346
FEATURE                   Location/Qualifiers
REGION                    1..346
                          note = Synthetic Construct
source                    1..346
                          mol_type = protein
                          organism = synthetic construct
SEQUENCE: 214
EEELQVIQPD KSVLVAAGET ATLRCTATSL FPVGPIQWFR GAGPGRELIY NQREGPFPRV   60
TTVSDLTKRN NMDFSIRIGA ITPADAGTYY CVKFRKGSPD DVEFKSGAGT ELSVRAKPSE  120
RKSSVECPPC PAPPVAGPSV FLFPPKPKDT LMISRTPEVT CVVVDVSHED PEVQFNWYVD  180
GVEVHNAKTK PREEQFASTF RVVSVLTVVH QDWLNGKEYK CKVSNKGLPS SIEKTISKTK  240
GQPREPQVYT LPPSREEMTK NQVSLTCLVK GFYPSDIAVE WESNGQPENN YKTTPPMLDS  300
DGSFFLYSKL TVDKSRWQQG NVFSCSVMHE ALHNHYTQKS LSLSPG                 346

SEQ ID NO: 215            moltype =     length =
SEQUENCE: 215
000
```

```
SEQ ID NO: 216           moltype = AA  length = 346
FEATURE                  Location/Qualifiers
REGION                   1..346
                         note = Synthetic Construct
source                   1..346
                         mol_type = protein
                         organism = synthetic construct
SEQUENCE: 216
EEELQIIQPD KSVLVAAGET ATLRCTITSL FPVGPIQWFR GAGPGRVLIY NQRGPFPRV    60
TTVSDTTKRN NMDFSIRIGN ITPADAGTYY CIKFRKGSPD DVEFKSGAGT ELSVRAKPSD  120
KTHTCPPCPA PELLGGPSVF LFPPKPKDTL MISRTPEVTC VVVDVSHEDP EVKFNWYVDG  180
VEVHNAKTKP REEQYNSTYR VVSVLTVLHQ DWLNGKEYKC KVSNKALPAP IEKTISKAKG  240
QPREPQVYTL PPSREEMTKN QVSLTCLVKG FYPSDIAVEW ESNGQPENNY KTTPPVLDSD  300
GSFFLYSKLT VDKSRWQQGN VFSCSVMHEA LHNHYTQKSL SLSPGK                 346

SEQ ID NO: 217           moltype = AA  length = 346
FEATURE                  Location/Qualifiers
REGION                   1..346
                         note = Synthetic Construct
source                   1..346
                         mol_type = protein
                         organism = synthetic construct
SEQUENCE: 217
EEELQIIQPD KSVLVAAGET ATLRCTITSL FPVGPIQWFR GAGPGRELIY NQREGPFPRV   60
TTVSDTTKRN NMDFSIRIGA ITPADAGTYY CVKFRKGSPD DVEFKSGAGT ELSVRAKPSE  120
KTHTCPECPA PEAAGAPSVF LFPPKPKDTL MISRTPEVTC VVVDVSHEDP EVKFNWYVDG  180
VEVHNAKTKP REEQYASTYR VVSVLTVLHQ DWLNGKEYKC KVSNKALPAP IEKTISKAKG  240
QPREPQVYTL PPSREEMTKN QVSLTCEVKG FYPSDIAVEW ESNGQPENNY KTTPPVLDSD  300
GSFFLYSKLT VDKSRWQQGN VFSCSVMHEA LHNHYTQKSL SLSPGK                 346

SEQ ID NO: 218           moltype = AA  length = 119
FEATURE                  Location/Qualifiers
REGION                   1..119
                         note = Synthetic Construct
VARIANT                  6
                         note = Xaa = V, L, or I
VARIANT                  27
                         note = Xaa = A, V, L, or I
VARIANT                  31
                         note = Xaa = I, S, T, or F
VARIANT                  47
                         note = Xaa = E, L, or V
VARIANT                  53
                         note = Xaa = K or R
VARIANT                  54
                         note = Xaa = E or Q
VARIANT                  56
                         note = Xaa = H, R or P
VARIANT                  66
                         note = Xaa = S, G, L or T
VARIANT                  80
                         note = Xaa = Any Amino Acid
VARIANT                  81
                         note = Xaa = Any Amino Acid
VARIANT                  82
                         note = Xaa = Any Amino Acid
VARIANT                  83
                         note = Xaa = Any Amino Acid
VARIANT                  92
                         note = Xaa = V or I
source                   1..119
                         mol_type = protein
                         organism = synthetic construct
SEQUENCE: 218
EEELQXIQPD KSVLVAAGET ATLRCTXTSL XPVGPIQWFR GAGPGRXLIY NQXXGXFPRV   60
TTVSDXTKRN NMDFSIRIGX XXXADAGTYY CXKFRKGSPD DVEFKSGAGT ELSVRAKPS   119

SEQ ID NO: 219           moltype = AA  length = 119
FEATURE                  Location/Qualifiers
REGION                   1..119
                         note = Synthetic Construct
VARIANT                  6
                         note = Xaa = V, L or I
VARIANT                  27
                         note = Xaa = A, V, L, or I
VARIANT                  31
                         note = Xaa = I, S, T or F
VARIANT                  47
                         note = Xaa = E, L, or V
```

```
VARIANT                    53
                           note = Xaa = K or R
VARIANT                    54
                           note = Xaa = E or Q
VARIANT                    56
                           note = Xaa = H, R or P
VARIANT                    66
                           note = Xaa = S,G, L, or T
VARIANT                    80
                           note = Xaa = N
VARIANT                    83
                           note = Xaa = Any Amino Acid other than P
VARIANT                    92
                           note = Xaa = V or I
source                     1..119
                           mol_type = protein
                           organism = synthetic construct
SEQUENCE: 219
EEELQXIQPD KSVLVAAGET ATLRCTXTSL XPVGPIQWFR GAGPGRXLIY NQXXGXFPRV   60
TTVSDXTKRN NMDFSIRIGX ITXADAGTYY CXKFRKGSPD DVEFKSGAGT ELSVRAKPS   119

SEQ ID NO: 220             moltype =    length =
SEQUENCE: 220
000

SEQ ID NO: 221             moltype = AA   length = 119
FEATURE                    Location/Qualifiers
REGION                     1..119
                           note = Synthetic Construct
VARIANT                    6
                           note = Xaa = V or I
VARIANT                    27
                           note = Xaa = A or I
VARIANT                    31
                           note = Xaa = I or F
VARIANT                    47
                           note = Xaa = E or V
VARIANT                    53
                           note = Xaa = K or R
VARIANT                    56
                           note = Xaa = H or P
VARIANT                    66
                           note = Xaa = L or T
VARIANT                    80
                           note = Xaa = Any Amino Acid other than N
VARIANT                    92
                           note = Xaa = V or I
source                     1..119
                           mol_type = protein
                           organism = synthetic construct
SEQUENCE: 221
EEELQXIQPD KSVLVAAGET ATLRCTXTSL XPVGPIQWFR GAGPGRXLIY NQXEGXFPRV   60
TTVSDXTKRN NMDFSIRIGX ITPADAGTYY CXKFRKGSPD DVEFKSGAGT ELSVRAKPS   119

SEQ ID NO: 222             moltype = AA   length = 119
FEATURE                    Location/Qualifiers
REGION                     1..119
                           note = Synthetic Construct
VARIANT                    6
                           note = Xaa = V, L, or I
VARIANT                    27
                           note = Xaa = A, I, or L
VARIANT                    31
                           note = Xaa = I, T, S, or F
VARIANT                    53
                           note = Xaa = K or R
VARIANT                    56
                           note = Xaa = H or P
VARIANT                    66
                           note = Xaa = L, T, or G
VARIANT                    80
                           note = Xaa = N or A
source                     1..119
                           mol_type = protein
                           organism = synthetic construct
SEQUENCE: 222
EEELQXIQPD KSVLVAAGET ATLRCTXTSL XPVGPIQWFR GAGPGRELIY NQXEGXFPRV   60
TTVSDXTKRN NMDFSIRIGX ITPADAGTYY CVKFRKGSPD DVEFKSGAGT ELSVRAKPS   119
```

```
SEQ ID NO: 223         moltype = AA  length = 6
FEATURE                Location/Qualifiers
REGION                 1..6
                       note = Synthetic Construct
source                 1..6
                       mol_type = protein
                       organism = synthetic construct
SEQUENCE: 223
HHHHHH                                                                    6

SEQ ID NO: 224         moltype = AA  length = 10
FEATURE                Location/Qualifiers
REGION                 1..10
                       note = Synthetic Construct
source                 1..10
                       mol_type = protein
                       organism = synthetic construct
SEQUENCE: 224
HHHHHHHHHH                                                               10
```